(12) United States Patent
McKenzie et al.

(10) Patent No.: US 12,299,251 B2
(45) Date of Patent: May 13, 2025

(54) DEVICES, METHODS, AND GRAPHICAL USER INTERFACES FOR PRESENTING VIRTUAL OBJECTS IN VIRTUAL ENVIRONMENTS

(71) Applicant: Apple Inc., Cupertino, CA (US)

(72) Inventors: Christopher D. McKenzie, Burlingame, CA (US); Nathan Gitter, Cupertino, CA (US); Alexis H. Palangie, Palo Alto, CA (US); Shih-Sang Chiu, San Francisco, CA (US); Benjamin H. Boesel, Jackson, NC (US); Dorian D. Dargan, San Ramon, CA (US); Zoey C. Taylor, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/932,999

(22) Filed: Sep. 16, 2022

(65) Prior Publication Data
US 2023/0152935 A1  May 18, 2023

Related U.S. Application Data

(60) Provisional application No. 63/261,667, filed on Sep. 25, 2021.

(51) Int. Cl.
*G06F 3/04815* (2022.01)
*G06F 3/01* (2006.01)
(Continued)

(52) U.S. Cl.
CPC ........ *G06F 3/04815* (2013.01); *G06F 3/0346* (2013.01); *G06F 3/04842* (2013.01);
(Continued)

(58) Field of Classification Search
CPC .............. G06F 3/04815; G06F 3/0346; G06F 3/04842; G06F 3/04845; G06F 3/1454; G06F 3/013; G06F 3/017; G06F 3/011
See application file for complete search history.

(56) References Cited

U.S. PATENT DOCUMENTS

| | | |
|---|---|---|
| 1,173,824 A | 2/1916 | Mckee |
| 5,515,488 A | 5/1996 | Hoppe et al. |
| (Continued) | | |

FOREIGN PATENT DOCUMENTS

| | | |
|---|---|---|
| CA | 3033344 A1 | 2/2018 |
| CN | 104714771 A | 6/2015 |
| (Continued) | | |

OTHER PUBLICATIONS

AquaSnap Window Manager: dock, snap, tile, organize [online], Nurgo Software, Available online at: <https://www.nurgo-software.com/products/aquasnap>, [retrieved on Jun. 27, 2023], 5 pages.
(Continued)

*Primary Examiner* — James T Tsai
(74) *Attorney, Agent, or Firm* — Kubota & Basol LLP

(57) ABSTRACT

In some embodiments, an electronic device updates the spatial arrangement of one or more virtual objects in a three-dimensional environment. In some embodiments, an electronic device updates the positions of multiple virtual objects together. In some embodiments, an electronic device displays objects in a three-dimensional environment based on an estimated location of a floor in the three-dimensional environment. In some embodiments, an electronic device moves (e.g., repositions) objects in a three-dimensional environment.

51 Claims, 66 Drawing Sheets

(51) Int. Cl.
  *G06F 3/0346*  (2013.01)
  *G06F 3/04842*  (2022.01)
  *G06F 3/04845*  (2022.01)
  *G06F 3/14*  (2006.01)
  *G06T 15/20*  (2011.01)
  *G06T 19/00*  (2011.01)

(52) U.S. Cl.
  CPC ........ *G06F 3/04845* (2013.01); *G06F 3/1454* (2013.01); *G06T 15/20* (2013.01); *G06T 19/006* (2013.01); *G06F 3/013* (2013.01); *G06F 3/017* (2013.01); *G06T 2219/024* (2013.01)

(56) References Cited

U.S. PATENT DOCUMENTS

| | | | |
|---|---|---|---|
| 5,524,195 | A | 6/1996 | Clanton et al. |
| 5,610,828 | A | 3/1997 | Kodosky et al. |
| 5,737,553 | A | 4/1998 | Bartok |
| 5,740,440 | A | 4/1998 | West |
| 5,751,287 | A | 5/1998 | Hahn et al. |
| 5,758,122 | A | 5/1998 | Corda et al. |
| 5,794,178 | A | 8/1998 | Caid et al. |
| 5,877,766 | A | 3/1999 | Bates et al. |
| 5,900,849 | A | 5/1999 | Gallery |
| 5,933,143 | A | 8/1999 | Kobayashi |
| 5,990,886 | A | 11/1999 | Serdy et al. |
| 6,061,060 | A | 5/2000 | Berry et al. |
| 6,078,310 | A | 6/2000 | Tognazzini |
| 6,108,004 | A | 8/2000 | Medl |
| 6,112,015 | A | 8/2000 | Planas et al. |
| 6,154,559 | A | 11/2000 | Beardsley |
| 6,323,846 | B1 | 11/2001 | Westerman et al. |
| 6,456,296 | B1 | 9/2002 | Cataudella et al. |
| 6,570,557 | B1 | 5/2003 | Westerman et al. |
| 6,584,465 | B1 | 6/2003 | Zhu et al. |
| 6,677,932 | B1 | 1/2004 | Westerman |
| 6,756,997 | B1 | 6/2004 | Ward et al. |
| 7,035,903 | B1 | 4/2006 | Baldonado |
| 7,134,130 | B1 | 11/2006 | Thomas |
| 7,137,074 | B1 | 11/2006 | Newton et al. |
| 7,230,629 | B2 | 6/2007 | Reynolds et al. |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,706,579 | B2 | 4/2010 | Oijer |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,239,784 | B2 | 8/2012 | Hotelling et al. |
| 8,279,180 | B2 | 10/2012 | Hotelling et al. |
| 8,341,541 | B2 | 12/2012 | Holecek et al. |
| 8,381,135 | B2 | 2/2013 | Hotelling et al. |
| 8,479,122 | B2 | 7/2013 | Hotelling et al. |
| 8,593,558 | B2 | 11/2013 | Gardiner et al. |
| 8,724,856 | B1 | 5/2014 | King |
| 8,793,620 | B2 | 7/2014 | Stafford |
| 8,793,729 | B2 | 7/2014 | Adimatyam et al. |
| 8,803,873 | B2 | 8/2014 | Yoo et al. |
| 8,866,880 | B2 | 10/2014 | Tan et al. |
| 8,896,632 | B2 | 11/2014 | Macdougall et al. |
| 8,947,323 | B1 | 2/2015 | Raffle et al. |
| 8,970,478 | B2 | 3/2015 | Johansson |
| 8,970,629 | B2 | 3/2015 | Kim et al. |
| 8,994,718 | B2 | 3/2015 | Latta et al. |
| 9,007,301 | B1 | 4/2015 | Raffle et al. |
| 9,108,109 | B2 | 8/2015 | Pare et al. |
| 9,185,062 | B1 | 11/2015 | Yang et al. |
| 9,189,611 | B2 | 11/2015 | Wssingbo |
| 9,201,500 | B2 | 12/2015 | Srinivasan et al. |
| 9,256,785 | B2 | 2/2016 | Qvarfordt |
| 9,293,118 | B2 | 3/2016 | Matsui |
| 9,316,827 | B2 | 4/2016 | Lindley et al. |
| 9,348,458 | B2 | 5/2016 | Hotelling et al. |
| 9,400,559 | B2 | 7/2016 | Latta et al. |
| 9,448,635 | B2 | 9/2016 | Macdougall et al. |
| 9,448,687 | B1 | 9/2016 | Mckenzie et al. |
| 9,465,479 | B2 | 10/2016 | Cho et al. |
| 9,526,127 | B1 | 12/2016 | Taubman et al. |
| 9,544,257 | B2 | 1/2017 | Ogundokun et al. |
| 9,563,331 | B2 | 2/2017 | Poulos et al. |
| 9,575,559 | B2 | 2/2017 | Andrysco |
| 9,619,519 | B1 | 4/2017 | Dorner |
| 9,672,588 | B1 | 6/2017 | Doucette et al. |
| 9,681,112 | B2 | 6/2017 | Son |
| 9,684,372 | B2 | 6/2017 | Xun et al. |
| 9,734,402 | B2 | 8/2017 | Jang et al. |
| 9,778,814 | B2 | 10/2017 | Ambrus et al. |
| 9,829,708 | B1 | 11/2017 | Asada |
| 9,851,866 | B2 | 12/2017 | Goossens et al. |
| 9,864,498 | B2 | 1/2018 | Olsson et al. |
| 9,886,087 | B1 | 2/2018 | Wald et al. |
| 9,933,833 | B2 | 4/2018 | Tu et al. |
| 9,933,937 | B2 | 4/2018 | Lemay et al. |
| 9,934,614 | B2 | 4/2018 | Ramsby et al. |
| 10,049,460 | B2 | 8/2018 | Romano et al. |
| 10,203,764 | B2 | 2/2019 | Katz et al. |
| 10,307,671 | B2 | 6/2019 | Barney et al. |
| 10,353,532 | B1 | 7/2019 | Holz et al. |
| 10,394,320 | B2 | 8/2019 | George-svahn et al. |
| 10,534,439 | B2 | 1/2020 | Raffa et al. |
| 10,565,448 | B2 | 2/2020 | Bell et al. |
| 10,664,048 | B2 | 5/2020 | Cieplinski et al. |
| 10,664,050 | B2 | 5/2020 | Alcaide et al. |
| 10,678,403 | B2 | 6/2020 | Duarte et al. |
| 10,699,488 | B1 | 6/2020 | Terrano |
| 10,732,721 | B1 | 8/2020 | Clements |
| 10,754,434 | B2 | 8/2020 | Hall et al. |
| 10,768,693 | B2 | 9/2020 | Powderly et al. |
| 10,861,242 | B2 | 12/2020 | Lacey et al. |
| 10,890,967 | B2 | 1/2021 | Stellmach et al. |
| 10,956,724 | B1 | 3/2021 | Terrano |
| 10,983,663 | B2 | 4/2021 | Iglesias |
| 11,055,920 | B1 | 7/2021 | Bramwell et al. |
| 11,079,995 | B1 | 8/2021 | Hulbert et al. |
| 11,082,463 | B2 | 8/2021 | Felman |
| 11,112,875 | B1 | 9/2021 | Zhou et al. |
| 11,175,791 | B1 | 11/2021 | Patnaikuni et al. |
| 11,199,898 | B2 | 12/2021 | Blume et al. |
| 11,200,742 | B1 | 12/2021 | Post et al. |
| 11,232,643 | B1 | 1/2022 | Stevens et al. |
| 11,294,472 | B2 | 4/2022 | Tang et al. |
| 11,294,475 | B1 | 4/2022 | Pinchon et al. |
| 11,307,653 | B1 | 4/2022 | Qian et al. |
| 11,340,756 | B2 | 5/2022 | Faulkner et al. |
| 11,348,300 | B2 | 5/2022 | Zimmermann et al. |
| 11,461,973 | B2 | 10/2022 | Pinchon |
| 11,496,571 | B2 | 11/2022 | Berliner et al. |
| 11,573,363 | B2 | 2/2023 | Zou et al. |
| 11,574,452 | B2 | 2/2023 | Berliner et al. |
| 11,720,171 | B2 | 8/2023 | Pastrana Vicente et al. |
| 11,726,577 | B2 | 8/2023 | Katz |
| 11,733,824 | B2 | 8/2023 | Iskandar et al. |
| 11,762,457 | B1 | 9/2023 | Ikkai et al. |
| 11,995,301 | B2 | 5/2024 | Hylak et al. |
| 12,099,653 | B2 | 9/2024 | Chawda et al. |
| 12,099,695 | B1 | 9/2024 | Smith et al. |
| 12,113,948 | B1 | 10/2024 | Smith et al. |
| 12,118,200 | B1 | 10/2024 | Shutzberg et al. |
| 2001/0047250 | A1 | 11/2001 | Schuller et al. |
| 2002/0015024 | A1 | 2/2002 | Westerman et al. |
| 2002/0044152 | A1 | 4/2002 | Abbott et al. |
| 2002/0065778 | A1 | 5/2002 | Bouet et al. |
| 2003/0038754 | A1 | 2/2003 | Goldstein et al. |
| 2003/0151611 | A1 | 8/2003 | Turpin et al. |
| 2003/0222924 | A1* | 12/2003 | Baron ................. G06F 3/04815 715/850 |
| 2004/0059784 | A1 | 3/2004 | Caughey |
| 2004/0104806 | A1 | 6/2004 | Yui et al. |
| 2004/0243926 | A1 | 12/2004 | Trenbeath et al. |
| 2005/0044510 | A1 | 2/2005 | Yi |

(56) References Cited

U.S. PATENT DOCUMENTS

| | | |
|---|---|---|
| 2005/0100210 A1 | 5/2005 | Rice et al. |
| 2005/0138572 A1 | 6/2005 | Good et al. |
| 2005/0144570 A1 | 6/2005 | Loverin et al. |
| 2005/0144571 A1 | 6/2005 | Loverin et al. |
| 2005/0175218 A1 | 8/2005 | Vertegaal et al. |
| 2005/0190059 A1 | 9/2005 | Wehrenberg |
| 2005/0198143 A1 | 9/2005 | Moody et al. |
| 2005/0216866 A1 | 9/2005 | Rosen et al. |
| 2006/0017692 A1 | 1/2006 | Wehrenberg et al. |
| 2006/0028400 A1 | 2/2006 | Lapstun et al. |
| 2006/0033724 A1 | 2/2006 | Chaudhri et al. |
| 2006/0080702 A1 | 4/2006 | Diez et al. |
| 2006/0156228 A1 | 7/2006 | Gallo et al. |
| 2006/0197753 A1 | 9/2006 | Hotelling |
| 2006/0256083 A1 | 11/2006 | Rosenberg |
| 2006/0283214 A1 | 12/2006 | Donadon et al. |
| 2007/0259716 A1 | 11/2007 | Mattice et al. |
| 2008/0181502 A1 | 7/2008 | Yang |
| 2008/0211771 A1 | 9/2008 | Richardson |
| 2009/0064035 A1 | 3/2009 | Shibata et al. |
| 2009/0146779 A1 | 6/2009 | Kumar et al. |
| 2009/0231356 A1 | 9/2009 | Barnes et al. |
| 2010/0097375 A1 | 4/2010 | Tadaishi et al. |
| 2010/0150526 A1 | 6/2010 | Rose et al. |
| 2010/0177049 A1 | 7/2010 | Levy et al. |
| 2010/0188503 A1 | 7/2010 | Tsai et al. |
| 2010/0269145 A1 | 10/2010 | Ingrassia et al. |
| 2011/0018895 A1 | 1/2011 | Buzyn et al. |
| 2011/0018896 A1 | 1/2011 | Buzyn et al. |
| 2011/0098029 A1 | 4/2011 | Rhoads et al. |
| 2011/0156879 A1 | 6/2011 | Matsushita et al. |
| 2011/0169927 A1 | 7/2011 | Mages et al. |
| 2011/0175932 A1 | 7/2011 | Yu et al. |
| 2011/0216060 A1 | 9/2011 | Weising et al. |
| 2011/0254865 A1 | 10/2011 | Yee et al. |
| 2011/0310001 A1 | 12/2011 | Madau et al. |
| 2012/0066638 A1 | 3/2012 | Ohri |
| 2012/0075496 A1 | 3/2012 | Akifusa et al. |
| 2012/0086624 A1 | 4/2012 | Thompson et al. |
| 2012/0113223 A1 | 5/2012 | Hilliges et al. |
| 2012/0124525 A1 | 5/2012 | Kang |
| 2012/0131631 A1 | 5/2012 | Bhogal et al. |
| 2012/0151416 A1 | 6/2012 | Bell et al. |
| 2012/0170840 A1 | 7/2012 | Caruso et al. |
| 2012/0184372 A1 | 7/2012 | Laarakkers et al. |
| 2012/0218395 A1 | 8/2012 | Andersen et al. |
| 2012/0256967 A1 | 10/2012 | Baldwin et al. |
| 2012/0257035 A1 | 10/2012 | Larsen |
| 2012/0272179 A1 | 10/2012 | Stafford |
| 2013/0027860 A1 | 1/2013 | Masaki et al. |
| 2013/0127850 A1 | 5/2013 | Bindon |
| 2013/0148850 A1 | 6/2013 | Matsuda et al. |
| 2013/0169533 A1 | 7/2013 | Jahnke |
| 2013/0190044 A1 | 7/2013 | Kulas |
| 2013/0211843 A1 | 8/2013 | Clarkson |
| 2013/0229345 A1 | 9/2013 | Day et al. |
| 2013/0265227 A1 | 10/2013 | Julian |
| 2013/0271397 A1 | 10/2013 | Hildreth et al. |
| 2013/0278501 A1 | 10/2013 | Bulzacki |
| 2013/0286004 A1 | 10/2013 | Mcculloch et al. |
| 2013/0293456 A1 | 11/2013 | Son et al. |
| 2013/0300648 A1 | 11/2013 | Kim et al. |
| 2013/0300654 A1 | 11/2013 | Seki |
| 2013/0326364 A1 | 12/2013 | Latta et al. |
| 2013/0342564 A1 | 12/2013 | Kinnebrew et al. |
| 2013/0342570 A1 | 12/2013 | Kinnebrew et al. |
| 2014/0002338 A1 | 1/2014 | Raffa et al. |
| 2014/0028548 A1 | 1/2014 | Bychkov et al. |
| 2014/0049462 A1 | 2/2014 | Weinberger et al. |
| 2014/0068692 A1 | 3/2014 | Archibong et al. |
| 2014/0075361 A1 | 3/2014 | Reynolds et al. |
| 2014/0108942 A1 | 4/2014 | Freeman et al. |
| 2014/0125584 A1 | 5/2014 | Xun et al. |
| 2014/0126782 A1 | 5/2014 | Takai et al. |
| 2014/0132499 A1 | 5/2014 | Schwesinger et al. |
| 2014/0139426 A1 | 5/2014 | Kryze et al. |
| 2014/0164928 A1 | 6/2014 | Kim |
| 2014/0168453 A1 | 6/2014 | Shoemake et al. |
| 2014/0198017 A1 | 7/2014 | Lamb et al. |
| 2014/0232639 A1 | 8/2014 | Hayashi et al. |
| 2014/0247210 A1 | 9/2014 | Henderek et al. |
| 2014/0258942 A1 | 9/2014 | Kutliroff et al. |
| 2014/0268054 A1 | 9/2014 | Olsson et al. |
| 2014/0282272 A1 | 9/2014 | Kies et al. |
| 2014/0285641 A1 | 9/2014 | Kato et al. |
| 2014/0304612 A1 | 10/2014 | Collin |
| 2014/0320404 A1 | 10/2014 | Kasahara |
| 2014/0347391 A1 | 11/2014 | Keane et al. |
| 2014/0351753 A1 | 11/2014 | Shin et al. |
| 2014/0372957 A1 | 12/2014 | Keane et al. |
| 2015/0009118 A1 | 1/2015 | Thomas et al. |
| 2015/0035822 A1* | 2/2015 | Arsan .................. G06T 19/006 345/419 |
| 2015/0035832 A1 | 2/2015 | Sugden et al. |
| 2015/0042679 A1 | 2/2015 | Järvenpää |
| 2015/0067580 A1 | 3/2015 | Um et al. |
| 2015/0077335 A1 | 3/2015 | Taguchi et al. |
| 2015/0082180 A1 | 3/2015 | Ames et al. |
| 2015/0095844 A1 | 4/2015 | Cho et al. |
| 2015/0123890 A1 | 5/2015 | Kapur et al. |
| 2015/0128075 A1 | 5/2015 | Kempinski |
| 2015/0131850 A1 | 5/2015 | Qvarfordt |
| 2015/0135108 A1 | 5/2015 | Pope et al. |
| 2015/0177937 A1 | 6/2015 | Poletto et al. |
| 2015/0187093 A1 | 7/2015 | Chu et al. |
| 2015/0205106 A1 | 7/2015 | Norden |
| 2015/0212576 A1 | 7/2015 | Ambrus et al. |
| 2015/0220152 A1 | 8/2015 | Tait et al. |
| 2015/0227285 A1 | 8/2015 | Lee et al. |
| 2015/0242095 A1 | 8/2015 | Sonnenberg |
| 2015/0317832 A1 | 11/2015 | Ebstyne et al. |
| 2015/0331240 A1 | 11/2015 | Poulos et al. |
| 2015/0331576 A1 | 11/2015 | Piya et al. |
| 2015/0332091 A1 | 11/2015 | Kim et al. |
| 2015/0370323 A1 | 12/2015 | Cieplinski et al. |
| 2016/0015470 A1* | 1/2016 | Border .................. A61B 1/00 600/117 |
| 2016/0018898 A1 | 1/2016 | Tu et al. |
| 2016/0018900 A1 | 1/2016 | Tu et al. |
| 2016/0026242 A1 | 1/2016 | Burns et al. |
| 2016/0026243 A1 | 1/2016 | Bertram et al. |
| 2016/0026253 A1 | 1/2016 | Bradski et al. |
| 2016/0062636 A1 | 3/2016 | Jung et al. |
| 2016/0093108 A1 | 3/2016 | Mao et al. |
| 2016/0098094 A1 | 4/2016 | Minkkinen |
| 2016/0133052 A1 | 5/2016 | Choi et al. |
| 2016/0171304 A1 | 6/2016 | Golding et al. |
| 2016/0179191 A1 | 6/2016 | Kim et al. |
| 2016/0179336 A1 | 6/2016 | Ambrus et al. |
| 2016/0196692 A1 | 7/2016 | Kjallstrom et al. |
| 2016/0216768 A1 | 7/2016 | Goetz et al. |
| 2016/0253063 A1 | 9/2016 | Critchlow |
| 2016/0253821 A1 | 9/2016 | Romano et al. |
| 2016/0275702 A1 | 9/2016 | Reynolds et al. |
| 2016/0306434 A1 | 10/2016 | Ferrin |
| 2016/0313890 A1 | 10/2016 | Walline et al. |
| 2016/0350973 A1 | 12/2016 | Shapira et al. |
| 2016/0357266 A1 | 12/2016 | Patel et al. |
| 2016/0379409 A1 | 12/2016 | Gavriliuc et al. |
| 2017/0038829 A1 | 2/2017 | Lanier et al. |
| 2017/0038837 A1 | 2/2017 | Faaborg et al. |
| 2017/0038849 A1 | 2/2017 | Hwang |
| 2017/0039770 A1 | 2/2017 | Lanier et al. |
| 2017/0046872 A1 | 2/2017 | Geselowitz et al. |
| 2017/0060230 A1 | 3/2017 | Faaborg et al. |
| 2017/0123487 A1 | 5/2017 | Hazra et al. |
| 2017/0131964 A1 | 5/2017 | Baek et al. |
| 2017/0132694 A1 | 5/2017 | Damy |
| 2017/0132822 A1 | 5/2017 | Marschke et al. |
| 2017/0153866 A1 | 6/2017 | Grinberg et al. |
| 2017/0206691 A1 | 7/2017 | Harrises et al. |
| 2017/0212583 A1 | 7/2017 | Krasadakis |
| 2017/0228130 A1 | 8/2017 | Palmaro |
| 2017/0236332 A1 | 8/2017 | Kipman et al. |

(56) References Cited

U.S. PATENT DOCUMENTS

| | | |
|---|---|---|
| 2017/0285737 A1 | 10/2017 | Khalid et al. |
| 2017/0308163 A1 | 10/2017 | Cieplinski et al. |
| 2017/0315715 A1 | 11/2017 | Fujita et al. |
| 2017/0344223 A1* | 11/2017 | Holzer .................. G06V 20/10 |
| 2017/0358141 A1* | 12/2017 | Stafford ................. G06T 7/246 |
| 2017/0364198 A1 | 12/2017 | Yoganandan et al. |
| 2018/0045963 A1 | 2/2018 | Hoover et al. |
| 2018/0075658 A1 | 3/2018 | Lanier et al. |
| 2018/0081519 A1 | 3/2018 | Kim |
| 2018/0095634 A1 | 4/2018 | Alexander |
| 2018/0095635 A1 | 4/2018 | Valdivia et al. |
| 2018/0101223 A1 | 4/2018 | Ishihara et al. |
| 2018/0114364 A1* | 4/2018 | McPhee .................. G06T 7/246 |
| 2018/0150204 A1 | 5/2018 | Macgillivray |
| 2018/0150997 A1 | 5/2018 | Austin |
| 2018/0157332 A1 | 6/2018 | Nie |
| 2018/0158222 A1 | 6/2018 | Hayashi |
| 2018/0181199 A1 | 6/2018 | Harvey et al. |
| 2018/0181272 A1 | 6/2018 | Olsson et al. |
| 2018/0188802 A1 | 7/2018 | Okumura |
| 2018/0197336 A1 | 7/2018 | Rochford et al. |
| 2018/0210628 A1 | 7/2018 | Mcphee et al. |
| 2018/0239144 A1 | 8/2018 | Woods et al. |
| 2018/0275753 A1 | 9/2018 | Publicover et al. |
| 2018/0300023 A1 | 10/2018 | Hein |
| 2018/0315248 A1 | 11/2018 | Bastov et al. |
| 2018/0322701 A1 | 11/2018 | Pahud et al. |
| 2018/0348861 A1 | 12/2018 | Uscinski et al. |
| 2019/0018498 A1 | 1/2019 | West et al. |
| 2019/0034076 A1 | 1/2019 | Vinayak et al. |
| 2019/0050062 A1 | 2/2019 | Chen et al. |
| 2019/0073109 A1 | 3/2019 | Zhang et al. |
| 2019/0080572 A1 | 3/2019 | Kim et al. |
| 2019/0088149 A1 | 3/2019 | Fink et al. |
| 2019/0094963 A1 | 3/2019 | Nijs |
| 2019/0094979 A1 | 3/2019 | Hall et al. |
| 2019/0101991 A1 | 4/2019 | Brennan |
| 2019/0130633 A1 | 5/2019 | Haddad et al. |
| 2019/0130733 A1 | 5/2019 | Hodge |
| 2019/0146128 A1 | 5/2019 | Cao et al. |
| 2019/0172261 A1 | 6/2019 | Alt et al. |
| 2019/0204906 A1 | 7/2019 | Ross et al. |
| 2019/0227763 A1 | 7/2019 | Kaufthal |
| 2019/0251884 A1 | 8/2019 | Burns et al. |
| 2019/0258365 A1* | 8/2019 | Zurmoehle ......... G06F 3/04845 |
| 2019/0279407 A1 | 9/2019 | Mchugh et al. |
| 2019/0294312 A1 | 9/2019 | Rohrbacher |
| 2019/0310757 A1 | 10/2019 | Lee et al. |
| 2019/0324529 A1 | 10/2019 | Stellmach et al. |
| 2019/0332244 A1 | 10/2019 | Beszteri et al. |
| 2019/0339770 A1 | 11/2019 | Kurlethimar et al. |
| 2019/0346678 A1 | 11/2019 | Nocham |
| 2019/0346922 A1 | 11/2019 | Young et al. |
| 2019/0354259 A1 | 11/2019 | Park |
| 2019/0361521 A1 | 11/2019 | Stellmach et al. |
| 2019/0362557 A1 | 11/2019 | Lacey et al. |
| 2019/0370492 A1 | 12/2019 | Falchuk et al. |
| 2019/0371072 A1 | 12/2019 | Lindberg et al. |
| 2019/0377487 A1 | 12/2019 | Bailey et al. |
| 2019/0379765 A1 | 12/2019 | Fajt et al. |
| 2019/0384406 A1 | 12/2019 | Smith et al. |
| 2020/0004401 A1 | 1/2020 | Hwang et al. |
| 2020/0012341 A1 | 1/2020 | Stellmach et al. |
| 2020/0026349 A1 | 1/2020 | Fontanel et al. |
| 2020/0043243 A1 | 2/2020 | Bhushan et al. |
| 2020/0082602 A1 | 3/2020 | Jones |
| 2020/0089314 A1 | 3/2020 | Poupyrev et al. |
| 2020/0092537 A1 | 3/2020 | Sutter et al. |
| 2020/0098140 A1 | 3/2020 | Jagnow et al. |
| 2020/0098173 A1 | 3/2020 | Mccall |
| 2020/0117213 A1 | 4/2020 | Tian et al. |
| 2020/0128232 A1 | 4/2020 | Hwang et al. |
| 2020/0129850 A1 | 4/2020 | Ohashi |
| 2020/0159017 A1 | 5/2020 | Lin et al. |
| 2020/0225735 A1 | 7/2020 | Schwarz |
| 2020/0225746 A1 | 7/2020 | Bar-Zeev et al. |
| 2020/0225747 A1 | 7/2020 | Bar-zeev et al. |
| 2020/0225830 A1 | 7/2020 | Tang et al. |
| 2020/0226814 A1 | 7/2020 | Tang et al. |
| 2020/0285314 A1 | 9/2020 | Cieplinski et al. |
| 2020/0356221 A1 | 11/2020 | Behzadi et al. |
| 2020/0357374 A1 | 11/2020 | Verweij et al. |
| 2020/0363867 A1 | 11/2020 | Azimi et al. |
| 2020/0371673 A1 | 11/2020 | Faulkner |
| 2020/0387214 A1 | 12/2020 | Ravasz et al. |
| 2020/0387228 A1 | 12/2020 | Ravasz et al. |
| 2020/0387287 A1 | 12/2020 | Ravasz et al. |
| 2021/0074062 A1 | 3/2021 | Madonna et al. |
| 2021/0090337 A1 | 3/2021 | Ravasz et al. |
| 2021/0096726 A1 | 4/2021 | Faulkner et al. |
| 2021/0103333 A1 | 4/2021 | Cieplinski et al. |
| 2021/0125414 A1 | 4/2021 | Berkebile |
| 2021/0191600 A1 | 6/2021 | Lemay et al. |
| 2021/0295602 A1 | 9/2021 | Scapel et al. |
| 2021/0303074 A1 | 9/2021 | Vanblon et al. |
| 2021/0303107 A1 | 9/2021 | Pla I Conesa et al. |
| 2021/0319617 A1 | 10/2021 | Ahn et al. |
| 2021/0327140 A1 | 10/2021 | Rothkopf et al. |
| 2021/0339134 A1 | 11/2021 | Knoppert |
| 2021/0350564 A1 | 11/2021 | Peuhkurinen et al. |
| 2021/0350604 A1 | 11/2021 | Pejsa et al. |
| 2021/0368136 A1 | 11/2021 | Chalmers et al. |
| 2021/0375022 A1 | 12/2021 | Lee et al. |
| 2022/0011577 A1 | 1/2022 | Lawver et al. |
| 2022/0011855 A1 | 1/2022 | Hazra et al. |
| 2022/0012002 A1 | 1/2022 | Bar-Zeev et al. |
| 2022/0030197 A1 | 1/2022 | Ishimoto |
| 2022/0070241 A1 | 3/2022 | Yerli |
| 2022/0083197 A1 | 3/2022 | Rockel et al. |
| 2022/0092862 A1 | 3/2022 | Faulkner et al. |
| 2022/0100270 A1 | 3/2022 | Pastrana Vicente et al. |
| 2022/0101593 A1 | 3/2022 | Rockel et al. |
| 2022/0101612 A1 | 3/2022 | Palangie et al. |
| 2022/0104910 A1 | 4/2022 | Shelton et al. |
| 2022/0121344 A1 | 4/2022 | Pastrana Vicente et al. |
| 2022/0130107 A1 | 4/2022 | Lindh |
| 2022/0137705 A1 | 5/2022 | Hashimoto et al. |
| 2022/0155909 A1 | 5/2022 | Kawashima et al. |
| 2022/0157083 A1 | 5/2022 | Jandhyala et al. |
| 2022/0187907 A1 | 6/2022 | Lee et al. |
| 2022/0191570 A1 | 6/2022 | Reid et al. |
| 2022/0197403 A1 | 6/2022 | Hughes et al. |
| 2022/0229524 A1 | 7/2022 | Mckenzie et al. |
| 2022/0229534 A1 | 7/2022 | Terre et al. |
| 2022/0232191 A1 | 7/2022 | Kawakami et al. |
| 2022/0245888 A1 | 8/2022 | Singh et al. |
| 2022/0253136 A1 | 8/2022 | Holder et al. |
| 2022/0253149 A1 | 8/2022 | Berliner et al. |
| 2022/0253194 A1 | 8/2022 | Berliner et al. |
| 2022/0255995 A1 | 8/2022 | Berliner et al. |
| 2022/0276720 A1 | 9/2022 | Yasui |
| 2022/0317776 A1 | 10/2022 | Sundstrom et al. |
| 2022/0326837 A1 | 10/2022 | Dessero et al. |
| 2022/0365595 A1 | 11/2022 | Cieplinski et al. |
| 2022/0413691 A1 | 12/2022 | Becker et al. |
| 2022/0414999 A1 | 12/2022 | Ravasz et al. |
| 2023/0004216 A1 | 1/2023 | Rodgers et al. |
| 2023/0008537 A1 | 1/2023 | Henderson et al. |
| 2023/0021861 A1 | 1/2023 | Fujiwara et al. |
| 2023/0032545 A1 | 2/2023 | Mindlin et al. |
| 2023/0068660 A1 | 3/2023 | Brent et al. |
| 2023/0069764 A1 | 3/2023 | Jonker et al. |
| 2023/0074080 A1 | 3/2023 | Miller et al. |
| 2023/0092282 A1 | 3/2023 | Boesel et al. |
| 2023/0093979 A1 | 3/2023 | Stauber et al. |
| 2023/0100689 A1 | 3/2023 | Chiu et al. |
| 2023/0133579 A1 | 5/2023 | Chang et al. |
| 2023/0152889 A1 | 5/2023 | Cieplinski et al. |
| 2023/0154122 A1 | 5/2023 | Dascola et al. |
| 2023/0163987 A1 | 5/2023 | Young et al. |
| 2023/0168788 A1 | 6/2023 | Faulkner et al. |
| 2023/0185426 A1 | 6/2023 | Rockel et al. |
| 2023/0186577 A1 | 6/2023 | Rockel et al. |
| 2023/0244857 A1 | 8/2023 | Weiss et al. |

(56) References Cited

U.S. PATENT DOCUMENTS

| | | |
|---|---|---|
| 2023/0259265 A1 | 8/2023 | Krivoruchko et al. |
| 2023/0273706 A1 | 8/2023 | Smith et al. |
| 2023/0274504 A1 | 8/2023 | Ren et al. |
| 2023/0308610 A1 | 9/2023 | Henderson et al. |
| 2023/0315385 A1 | 10/2023 | Akmal et al. |
| 2023/0316634 A1 | 10/2023 | Chiu et al. |
| 2023/0325004 A1 | 10/2023 | Burns et al. |
| 2023/0333646 A1 | 10/2023 | Pastrana Vicente et al. |
| 2023/0350539 A1 | 11/2023 | Owen et al. |
| 2023/0359199 A1* | 11/2023 | Adachi ............... G06F 3/012 |
| 2023/0384907 A1 | 11/2023 | Boesel et al. |
| 2023/0388357 A1 | 11/2023 | Faulkner et al. |
| 2024/0086031 A1 | 3/2024 | Palangie et al. |
| 2024/0086032 A1 | 3/2024 | Palangie et al. |
| 2024/0087256 A1 | 3/2024 | Hylak et al. |
| 2024/0094863 A1 | 3/2024 | Smith et al. |
| 2024/0094882 A1 | 3/2024 | Brewer et al. |
| 2024/0095984 A1 | 3/2024 | Ren et al. |
| 2024/0103613 A1 | 3/2024 | Chawda et al. |
| 2024/0103676 A1 | 3/2024 | Pastrana Vicente et al. |
| 2024/0103684 A1 | 3/2024 | Yu et al. |
| 2024/0103687 A1 | 3/2024 | Pastrana Vicente et al. |
| 2024/0103701 A1 | 3/2024 | Pastrana Vicente et al. |
| 2024/0103704 A1 | 3/2024 | Pastrana Vicente et al. |
| 2024/0103707 A1 | 3/2024 | Henderson et al. |
| 2024/0103716 A1 | 3/2024 | Pastrana Vicente et al. |
| 2024/0103803 A1 | 3/2024 | Krivoruchko et al. |
| 2024/0104836 A1 | 3/2024 | Dessero et al. |
| 2024/0104873 A1 | 3/2024 | Pastrana Vicente et al. |
| 2024/0104877 A1 | 3/2024 | Henderson et al. |
| 2024/0111479 A1 | 4/2024 | Paul |
| 2024/0119682 A1 | 4/2024 | Rudman et al. |
| 2024/0221291 A1 | 7/2024 | Henderson et al. |
| 2024/0272782 A1 | 8/2024 | Pastrana Vicente et al. |
| 2024/0291953 A1 | 8/2024 | Cerra et al. |
| 2024/0310971 A1 | 9/2024 | Kawashima et al. |
| 2024/0329797 A1 | 10/2024 | Hylak et al. |
| 2024/0361835 A1 | 10/2024 | Hylak et al. |
| 2024/0393876 A1 | 11/2024 | Chawda et al. |
| 2024/0402800 A1 | 12/2024 | Shutzberg et al. |
| 2024/0402821 A1 | 12/2024 | Meyer et al. |
| 2024/0404206 A1 | 12/2024 | Chiu et al. |
| 2024/0411444 A1 | 12/2024 | Shutzberg et al. |
| 2024/0420435 A1 | 12/2024 | Gitter et al. |
| 2024/0428488 A1 | 12/2024 | Ren et al. |
| 2025/0008057 A1 | 1/2025 | Chiu et al. |
| 2025/0013343 A1 | 1/2025 | Smith et al. |
| 2025/0013344 A1 | 1/2025 | Smith et al. |
| 2025/0024008 A1 | 1/2025 | Cerra et al. |

FOREIGN PATENT DOCUMENTS

| | | |
|---|---|---|
| CN | 105264461 A | 1/2016 |
| CN | 105264478 A | 1/2016 |
| CN | 108633307 A | 10/2018 |
| CN | 110476142 A | 11/2019 |
| CN | 110673718 A | 1/2020 |
| CN | 109491508 B | 8/2022 |
| EP | 0816983 A2 | 1/1998 |
| EP | 1530115 A2 | 5/2005 |
| EP | 2551763 A1 | 1/2013 |
| EP | 2741175 A2 | 6/2014 |
| EP | 2947545 A1 | 11/2015 |
| EP | 3088997 A1 | 11/2016 |
| EP | 3249497 A1 | 11/2017 |
| EP | 3316075 A1 | 5/2018 |
| EP | 3451135 A1 | 3/2019 |
| EP | 3503101 A1 | 6/2019 |
| EP | 3570144 A1 | 11/2019 |
| EP | 3588255 A1 | 1/2020 |
| EP | 3654147 A1 | 5/2020 |
| JP | H06-4596 A | 1/1994 |
| JP | H10-51711 A | 2/1998 |
| JP | H10-78845 A | 3/1998 |
| JP | 2005-215144 A | 8/2005 |
| JP | 2005-333524 A | 12/2005 |
| JP | 2006-107048 A | 4/2006 |
| JP | 2006-146803 A | 6/2006 |
| JP | 2006-295236 A | 10/2006 |
| JP | 2011-203880 A | 10/2011 |
| JP | 2012-234550 A | 11/2012 |
| JP | 2013-196158 A | 9/2013 |
| JP | 2013-257716 A | 12/2013 |
| JP | 2013254358 A | 12/2013 |
| JP | 2014-21565 A | 2/2014 |
| JP | 2014-59840 A | 4/2014 |
| JP | 2014-71663 A | 4/2014 |
| JP | 2014-99184 A | 5/2014 |
| JP | 2014-514652 A | 6/2014 |
| JP | 2015-56173 A | 3/2015 |
| JP | 2015-515040 A | 5/2015 |
| JP | 2015-118332 A | 6/2015 |
| JP | 2016-96513 A | 5/2016 |
| JP | 2016-194744 A | 11/2016 |
| JP | 2017-027206 A | 2/2017 |
| JP | 2017058528 A | 3/2017 |
| JP | 2018-005516 A | 1/2018 |
| JP | 2018005517 A | 1/2018 |
| JP | 2018-41477 A | 3/2018 |
| JP | 2018106499 A | 7/2018 |
| JP | 2019-40333 A | 3/2019 |
| JP | 2019-169154 A | 10/2019 |
| JP | 2019-175449 A | 10/2019 |
| JP | 2019-536131 A | 12/2019 |
| JP | 2022-53334 A | 4/2022 |
| KR | 20110017236 A | 2/2011 |
| KR | 10-2016-0012139 A | 2/2016 |
| KR | 10-2019-0100957 A | 8/2019 |
| WO | 2010026519 A1 | 3/2010 |
| WO | 2011/008638 A1 | 1/2011 |
| WO | 2012/145180 A1 | 10/2012 |
| WO | 2013/169849 A2 | 11/2013 |
| WO | 2014/105276 A1 | 7/2014 |
| WO | 2014/203301 A1 | 12/2014 |
| WO | 2015/195216 A1 | 12/2015 |
| WO | 2017/088487 A1 | 6/2017 |
| WO | 2018/046957 A2 | 3/2018 |
| WO | 2018/175735 A1 | 9/2018 |
| WO | 2019/142560 A1 | 7/2019 |
| WO | 2019/217163 A1 | 11/2019 |
| WO | 2020/066682 A1 | 4/2020 |
| WO | 2021/173839 A1 | 9/2021 |
| WO | 2021/202783 A1 | 10/2021 |
| WO | 2022/046340 A1 | 3/2022 |
| WO | 2022/055822 A1 | 3/2022 |
| WO | 2022/066399 A1 | 3/2022 |
| WO | 2022/066535 A2 | 3/2022 |
| WO | 2022/146936 A1 | 7/2022 |
| WO | 2022/147146 A1 | 7/2022 |
| WO | 2022146938 A1 | 7/2022 |
| WO | 2022/164881 A1 | 8/2022 |
| WO | 2023096940 A2 | 6/2023 |
| WO | 2023/141535 A1 | 7/2023 |

OTHER PUBLICATIONS

Corrected Notice of Allowance received for U.S. Appl. No. 17/478,593, mailed on Dec. 21, 2022, 2 pages.
Extended European Search Report received for European Patent Application No. 23158818.7, mailed on Jul. 3, 2023, 12 pages.
Extended European Search Report received for European Patent Application No. 23158929.2, mailed on Jun. 27, 2023, 12 pages.
Final Office Action received for U.S. Appl. No. 17/448,875, mailed on Mar. 16, 2023, 24 pages.
Home | Virtual Desktop [online], Virtual Desktop, Available online at: <https://www.vrdesktop.net>, [retrieved on Jun. 29, 2023], 4 pages.
International Search Report received for PCT Application No. PCT/US2022/076603, mailed on Jan. 9, 2023, 4 pages.
International Search Report received for PCT Application No. PCT/US2023/017335, mailed on Aug. 22, 2023, 6 pages.
International Search Report received for PCT Application No. PCT/US2023/018213, mailed on Jul. 26, 2023, 6 pages.

(56) References Cited

OTHER PUBLICATIONS

International Search Report received for PCT Application No. PCT/US2023/019458, mailed on Aug. 8, 2023, 7 pages.
International Search Report received for PCT Application No. PCT/US2023/060943, mailed on Jun. 6, 2023, 7 pages.
International Search Report received for PCT Patent Application No. PCT/US2021/049131, mailed on Dec. 21, 2021, 4 pages.
International Search Report received for PCT Patent Application No. PCT/US2021/050948, mailed on Mar. 4, 2022, 6 pages.
International Search Report received for PCT Patent Application No. PCT/US2021/065240, mailed on May 23, 2022, 6 pages.
International Search Report received for PCT Patent Application No. PCT/US2021/071595, mailed on Mar. 17, 2022, 7 pages.
International Search Report received for PCT Patent Application No. PCT/US2022/013208, mailed on Apr. 26, 2022, 7 pages.
International Search Report received for PCT Patent Application No. PCT/US2021/065242, mailed on Apr. 4, 2022, 3 pages.
Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023, 30 pages.
Non-Final Office Action received for U.S. Appl. No. 18/182,300, mailed on Oct. 26, 2023, 29 pages.
Notice of Allowance received for U.S. Appl. No. 17/478,593, mailed on Aug. 31, 2022, 10 pages.
Notice of Allowance received for U.S. Appl. No. 17/580,495, mailed on Jun. 6, 2023, 6 pages.
Notice of Allowance received for U.S. Appl. No. 17/580,495, mailed on Nov. 30, 2022, 12 pages.
Notice of Allowance received for U.S. Appl. No. 18/465,098, mailed on Nov. 17, 2023, 8 pages.
Bhowmick, Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Bolt et al., "Two-Handed Gesture in Multi-Modal Natural Dialog", Uist '92, 5th Annual Symposium on User Interface Software and Technology. Proceedings of the ACM Symposium on User Interface Software and Technology, Monterey, Nov. 15-18, 1992, pp. 7-14.
Brennan, Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.
Camalich, Sergio, "CSS Buttons with Pseudo-elements", Available online at: <https://tympanus.net/codrops/2012/01/11/css-buttons-with-pseudo-elements/>, [retrieved on Jul. 12, 2017], Jan. 11, 2012, 8 pages.
Chatterjee et al., "Gaze+Gesture: Expressive, Precise and Targeted Free-Space Interactions", ICMI '15, Nov. 9-13, 2015, 8 pages.
Lin et al., "Towards Naturally Grabbing and Moving Objects in VR", IS&T International Symposium on Electronic Imaging and the Engineering Reality of Virtual Reality, 2016, 6 pages.
McGill et al., "Expanding The Bounds of Seated Virtual Workspaces", University of Glasgow, Available online at: <https://core.ac.uk/download/pdf/323988271.pdf>, [retrieved on Jun. 27, 2023], Jun. 5, 2020, 44 pages.
Pfeuffer et al., "Gaze + Pinch Interaction in Virtual Reality", In Proceedings of SUI '17, Brighton, United Kingdom, Oct. 16-17, 2017, pp. 99-108.
Corrected Notice of Allowability received for U.S. Appl. No. 17/448,875, mailed on Apr. 24, 2024, 4 pages.
Corrected Notice of Allowability received for U.S. Appl. No. 17/659,147, mailed on Feb. 14, 2024, 6 pages.
Corrected Notice of Allowability received for U.S. Appl. No. 17/932,655, mailed on Oct. 12, 2023, 2 pages.
Corrected Notice of Allowability received for U.S. Appl. No. 18/465,098, mailed on Mar. 13, 2024, 3 pages.
European Search Report received for European Patent Application No. 21791153.6, mailed on Mar. 22, 2024, 5 pages.
European Search Report received for European Patent Application No. 21801378.7, mailed on Jul. 10, 2024, 5 pages.
Extended European Search Report received for European Patent Application No. 23197572.3, mailed on Feb. 19, 2024, 7 pages.
Final Office Action received for U.S. Appl. No. 17/580,495, mailed on May 13, 2024, 29 pages.
Final Office Action received for U.S. Appl. No. 17/659,147, mailed on Oct. 4, 2023, 17 pages.
Final Office Action received for U.S. Appl. No. 18/182,300, mailed on Feb. 16, 2024, 32 pages.
International Search Report received for PCT Patent Application No. PCT/US2021/071596, mailed on Apr. 8, 2022, 7 pages.
International Search Report received for PCT Patent Application No. PCT/US2022/071704, mailed on Aug. 26, 2022, 6 pages.
International Search Report received for PCT Patent Application No. PCT/US2023/074257, mailed on Nov. 21, 2023, 5 pages.
International Search Report received for PCT Patent Application No. PCT/US2023/074950, mailed on Jan. 3, 2024, 9 pages.
International Search Report received for PCT Patent Application No. PCT/US2023/074979, mailed on Feb. 26, 2024, 6 pages.
Non-Final Office Action received for U.S. Appl. No. 17/580,495, mailed on Dec. 11, 2023, 27 pages.
Non-Final Office Action received for U.S. Appl. No. 17/659,147, mailed on Mar. 16, 2023, 19 pages.
Non-Final Office Action received for U.S. Appl. No. 17/932,655, mailed on Apr. 20, 2023, 10 pages.
Non-Final Office Action received for U.S. Appl. No. 18/157,040, mailed on May 2, 2024, 25 pages.
Non-Final Office Action received for U.S. Appl. No. 18/182,300, mailed on May 29, 2024, 33 pages.
Non-Final Office Action received for U.S. Appl. No. 18/305,201, mailed on May 23, 2024, 11 pages.
Notice of Allowance received for U.S. Appl. No. 17/448,875, mailed on Apr. 17, 2024, 8 pages.
Notice of Allowance received for U.S. Appl. No. 17/448,875, mailed on Jul. 12, 2024, 8 pages.
Notice of Allowance received for U.S. Appl. No. 17/448,876, mailed on Apr. 7, 2022, 9 pages.
Notice of Allowance received for U.S. Appl. No. 17/448,876, mailed on Jul. 20, 2022, 8 pages.
Notice of Allowance received for U.S. Appl. No. 17/659,147, mailed on Jan. 26, 2024, 13 pages.
Notice of Allowance received for U.S. Appl. No. 17/659,147, mailed on May 29, 2024, 13 pages.
Notice of Allowance received for U.S. Appl. No. 17/932,655, mailed on Jan. 24, 2024, 7 pages.
Notice of Allowance received for U.S. Appl. No. 17/932,655, mailed on Sep. 29, 2023, 7 pages.
Notice of Allowance received for U.S. Appl. No. 18/154,757, mailed on Jan. 23, 2024, 10 pages.
Notice of Allowance received for U.S. Appl. No. 18/154,757, mailed on May 10, 2024, 12 pages.
Notice of Allowance received for U.S. Appl. No. 18/421,675, mailed on Apr. 11, 2024, 9 pages.
Notice of Allowance received for U.S. Appl. No. 18/423,187, mailed on Jun. 5, 2024, 9 pages.
Notice of Allowance received for U.S. Appl. No. 18/463,739, mailed on Jun. 17, 2024, 9 pages.
Notice of Allowance received for U.S. Appl. No. 18/465,098, mailed on Jun. 20, 2024, 8 pages.
Notice of Allowance received for U.S. Appl. No. 18/463,739, mailed on Feb. 1, 2024, 10 pages.
Notice of Allowance received for U.S. Appl. No. 18/463,739, mailed on Oct. 30, 2023, 11 pages.
Notice of Allowance received for U.S. Appl. No. 18/465,098, mailed on Mar. 4, 2024, 6 pages.
Search Report received for Chinese Patent Application No. 202310873465.7, mailed on Feb. 1, 2024, 5 pages (2 pages of English Translation and 3 pages of Official Copy).
Corrected Notice of Allowability received for U.S. Appl. No. 18/154,757, mailed on Aug. 30, 2024, 2 pages.

(56) References Cited

OTHER PUBLICATIONS

Corrected Notice of Allowability received for U.S. Appl. No. 18/421,827, mailed on Aug. 29, 2024, 2 pages.
Final Office Action received for U.S. Appl. No. 18/375,280, mailed on Jul. 12, 2024, 19 pages.
Non-Final Office Action received for U.S. Appl. No. 17/580,495, mailed on Aug. 15, 2024, 28 pages.
Notice of Allowance received for U.S. Appl. No. 18/154,757, mailed on Aug. 26, 2024, 12 pages.
Notice of Allowance received for U.S. Appl. No. 18/421,675, mailed on Jul. 31, 2024, 8 pages.
Notice of Allowance received for U.S. Appl. No. 18/421,827, mailed on Aug. 14, 2024, 10 pages.
Corrected Notice of Allowability received for U.S. Appl. No. 17/479,791, mailed on May 19, 2023, 2 pages.
Corrected Notice of Allowability received for U.S. Appl. No. 18/463,739, mailed on Oct. 4, 2024, 2 pages.
Corrected Notice of Allowability received for U.S. Appl. No. 17/935,095, mailed on Oct. 18, 2024, 3 pages.
Extended European Search Report received for European Patent Application No. 24159868.9, mailed on Oct. 9, 2024, 13 pages.
Extended European Search Report received for European Patent Application No. 24178730.8, mailed on Oct. 14, 2024, 8 pages.
Extended European Search Report received for European Patent Application No. 24178752.2, mailed on Oct. 4, 2024, 8 pages.
Extended European Search Report received for European Patent Application No. 24179233.2, mailed on Oct. 2, 2024, 10 pages.
Extended European Search Report received for European Patent Application No. 24179830.5, mailed on Nov. 5, 2024, 11 pages.
Final Office Action received for U.S. Appl. No. 14/531,874, mailed on Nov. 4, 2016, 10 pages.
Final Office Action received for U.S. Appl. No. 15/644,639, mailed on Sep. 19, 2019, 12 pages.
Final Office Action received for U.S. Appl. No. 17/202,034, mailed on May 4, 2023, 41 pages.
Final Office Action received for U.S. Appl. No. 17/202,034, mailed on Nov. 4, 2024, 50 pages.
Final Office Action received for U.S. Appl. No. 17/816,314, mailed on Jan. 20, 2023, 11 pages.
Final Office Action received for U.S. Appl. No. 17/935,095, mailed on Dec. 29, 2023, 15 pages.
Final Office Action received for U.S. Appl. No. 18/157,040, mailed on Dec. 2, 2024, 25 pages.
Final Office Action received for U.S. Appl. No. 18/182,300, mailed on Oct. 31, 2024, 34 pages.
Final Office Action received for U.S. Appl. No. 18/473,196, mailed on Dec. 6, 2024, 22 pages.
International Search Report received for PCT Application No. PCT/US2023/060052, mailed on May 24, 2023, 6 pages.
International Search Report received for PCT Application No. PCT/US2023/074962, mailed on Jan. 19, 2024, 9 pages.
International Search Report received for PCT Application No. PCT/US2024/030107, mailed on Oct. 23, 2024, 9 pages.
International Search Report received for PCT Application No. PCT/US2024/032314, mailed on Nov. 11, 2024, 6 pages.
International Search Report received for PCT Patent Application No. PCT/US2015/029727, mailed on Nov. 2, 2015, 6 pages.
International Search Report received for PCT Patent Application No. PCT/US2021/022413, mailed on Aug. 13, 2021, 7 pages.
International Search Report received for PCT Patent Application No. PCT/US2021/071518, mailed on Feb. 25, 2022, 7 pages.
International Search Report received for PCT Patent Application No. PCT/US2022/076985, mailed on Feb. 20, 2023, 5 pages.
International Search Report received for PCT Patent Application No. PCT/US2023/074793, mailed on Feb. 6, 2024, 6 pages.
International Search Report received for PCT Patent Application No. PCT/US2024/026102, mailed on Aug. 26, 2024, 5 pages.
Letter Restarting Period for Response received for U.S. Appl. No. 15/644,639, mailed on Sep. 28, 2018, 8 pages.
Non-Final Office Action received for U.S. Appl. No. 14/531,874, mailed on May 18, 2016, 11 pages.
Non-Final Office Action received for U.S. Appl. No. 15/644,639, mailed on Apr. 12, 2019, 11 pages.
Non-Final Office Action received for U.S. Appl. No. 15/644,639, mailed on Sep. 10, 2018, 9 pages.
Non-Final Office Action received for U.S. Appl. No. 16/881,599, mailed on Apr. 28, 2021, 8 pages.
Non-Final Office Action received for U.S. Appl. No. 17/123,000, mailed on Nov. 12, 2021, 8 pages.
Non-Final Non-Final Office Action received for U.S. Appl. No. 17/202,034, mailed on Jan. 19, 2024, 44 pages.
Non-Final Office Action received for U.S. Appl. No. 17/202,034, mailed on Jul. 20, 2022, 38 pages.
Non-Final Office Action received for U.S. Appl. No. 17/479,791, mailed on May 11, 2022, 18 pages.
Non-Final Office Action received for U.S. Appl. No. 17/816,314, mailed on Jul. 6, 2023, 10 pages.
Non-Final Office Action received for U.S. Appl. No. 17/816,314, mailed on Sep. 23, 2022, 10 pages.
Non-Final Office Action received for U.S. Appl. No. 17/935,095, mailed on Jun. 22, 2023, 15 pages.
Non-Final Office Action received for U.S. Appl. No. 18/154,697, mailed on Nov. 24, 2023, 10 pages.
Non-Final Office Action received for U.S. Appl. No. 18/322,469, mailed on Nov. 15, 2024, 34 pages.
Non-Final Office Action received for U.S. Appl. No. 18/336,770, mailed on Jun. 5, 2024, 12 pages.
Non-Final Office Action received for U.S. Appl. No. 18/473,196, mailed on Aug. 16, 2024, 21 pages.
Notice of Allowance received for U.S. Appl. No. 14/531,874, mailed on Mar. 28, 2017, 9 pages.
Notice of Allowance received for U.S. Appl. No. 15/644,639, mailed on Jan. 16, 2020, 16 pages.
Notice of Allowance received for U.S. Appl. No. 16/881,599, mailed on Dec. 17, 2021, 7 pages.
Notice of Allowance received for U.S. Appl. No. 17/123,000, mailed on May 27, 2022, 8 pages.
Notice of Allowance received for U.S. Appl. No. 17/123,000, mailed on Sep. 19, 2022, 7 pages.
Notice of Allowance received for U.S. Appl. No. 17/479,791, mailed on Mar. 13, 2023, 9 pages.
Notice of Allowance received for U.S. Appl. No. 17/479,791, mailed on Nov. 17, 2022, 9 pages.
Notice of Allowance received for U.S. Appl. No. 17/816,314, mailed on Jan. 4, 2024, 6 pages.
Notice of Allowance received for U.S. Appl. No. 17/935,095, mailed on Jul. 3, 2024, 9 pages.
Notice of Allowance received for U.S. Appl. No. 18/154,697, mailed on Aug. 6, 2024, 8 pages.
Notice of Allowance received for U.S. Appl. No. 18/154,697, mailed on Dec. 3, 2024, 7 pages.
Notice of Allowance received for U.S. Appl. No. 18/336,770, mailed on Nov. 29, 2024, 9 pages.
Supplemental Notice of Allowance received for U.S. Appl. No. 18/515,188, mailed on Nov. 27, 2024, 9 pages.
Notice of Allowance received for U.S. Appl. No. 14/531,874, mailed on Jul. 26, 2017, 5 pages.
Bohn Dieter, "Rebooting WebOS: How LG Rethought The Smart TV", The Verge, Available online at: < http://www.theverge.com/2014/1/6/5279220/rebooting-webos-how-lg-rethought-the-smart-tv>, [Retrieved 2019-08-26], Jan. 6, 2014, 5 pages.
Fatima et al., "Eye Movement Based Human Computer Interaction", 3rd International Conference On Recent Advances In Information Technology (RAIT), Mar. 3, 2016, pp. 489-494.
Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
Pfeuffer et al., "Gaze and Touch Interaction on Tablets", UIST '16, Tokyo, Japan, ACM, Oct. 16-19, 2016, pp. 301-311.

(56) References Cited

OTHER PUBLICATIONS

Schenk et al., "Spock: A Smooth Pursuit Oculomotor Control Kit", CHI'16 Extended Abstracts, San Jose, CA, USA, ACM, May 7-12, 2016, pp. 2681-2687.
Simple Modal Window With Background Blur Effect, Available online at: <http://web.archive.org/web/20160313233427/https://www.cssscript.com/simple-modal-window-with-background-blur-effect/>, Mar. 13, 2016, 5 pages.
Yamada Yoshihiro, "How to Generate a Modal Window with ModalPopup Control", Available online at: <http://web.archive.org/web/20210920015801/https://atmarkit.itmedia.co.jp/fdotnet/dotnettips/580aspajaxmodalpopup/aspajaxmodalpopup.html>[Search Date Aug. 22, 2023], Sep. 20, 2021, 8 pages (1 page of English Abstract and 7 pages of Official Copy).
Corrected Notice of Allowability received for U.S. Appl. No. 18/174,337, mailed on Jan. 15, 2025, 2 pages.
Extended European Search Report received for European Patent Application No. 24190323.6, mailed on Dec. 12, 2024, 9 pages.
International Search Report received for PCT Application No. PCT/US2024/032451, mailed on Nov. 15, 2024, 6 pages.
International Search Report received for PCT Application No. PCT/US2024/032456, mailed on Nov. 14, 2024, 6 pages.
Non-Final Office Action received for U.S. Appl. No. 18/149,640, mailed on Jan. 15, 2025, 17 pages.
Non-Final Office Action received for U.S. Appl. No. 18/375,280, mailed on Nov. 27, 2024, 17 pages.
Non-Final Office Action received for U.S. Appl. No. 18/427,434, mailed on Nov. 21, 2024, 17 pages.
Notice of Allowance received for U.S. Appl. No. 18/174,337, mailed on Jan. 2, 2025, 8 pages.
Notice of Allowance received for U.S. Appl. No. 18/671,936, mailed on Jan. 15, 2025, 9 pages.
Restriction Requirement received for U.S. Appl. No. 18/473,187, mailed on Dec. 30, 2024, 5 pages.
Supplemental Notice of Allowance received for U.S. Appl. No. 18/515,188, mailed on Dec. 12, 2024, 2 pages.

\* cited by examiner

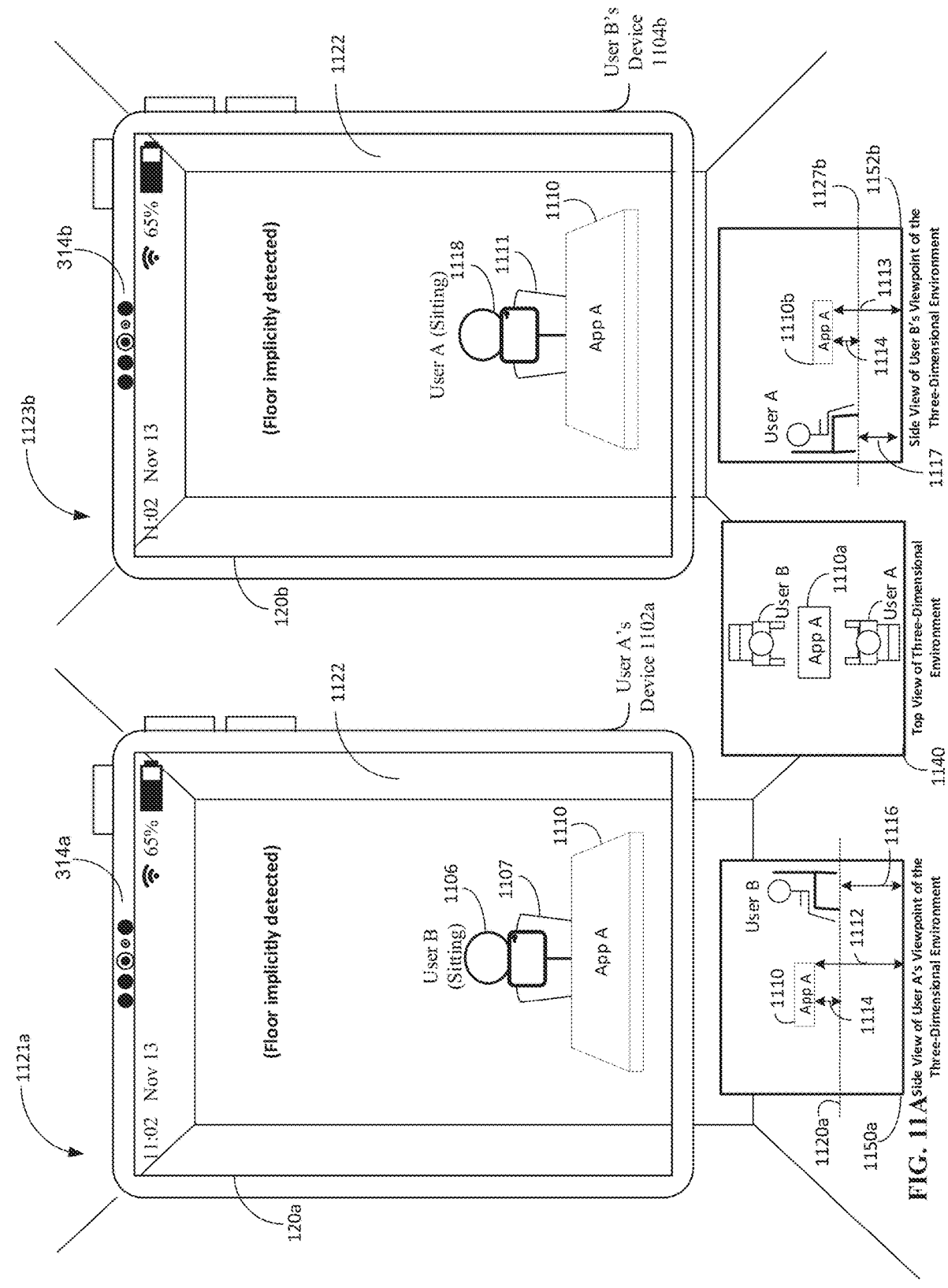

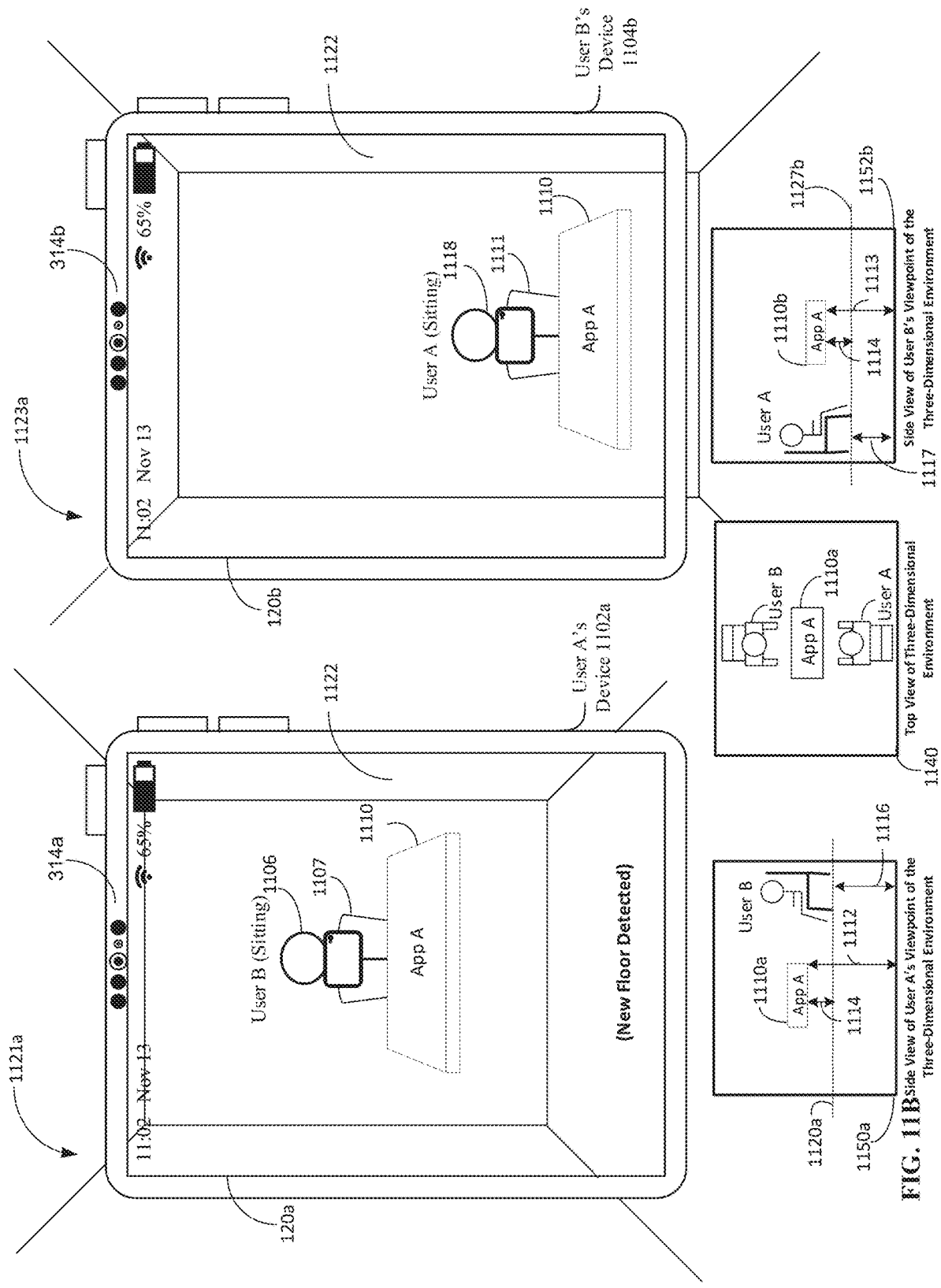

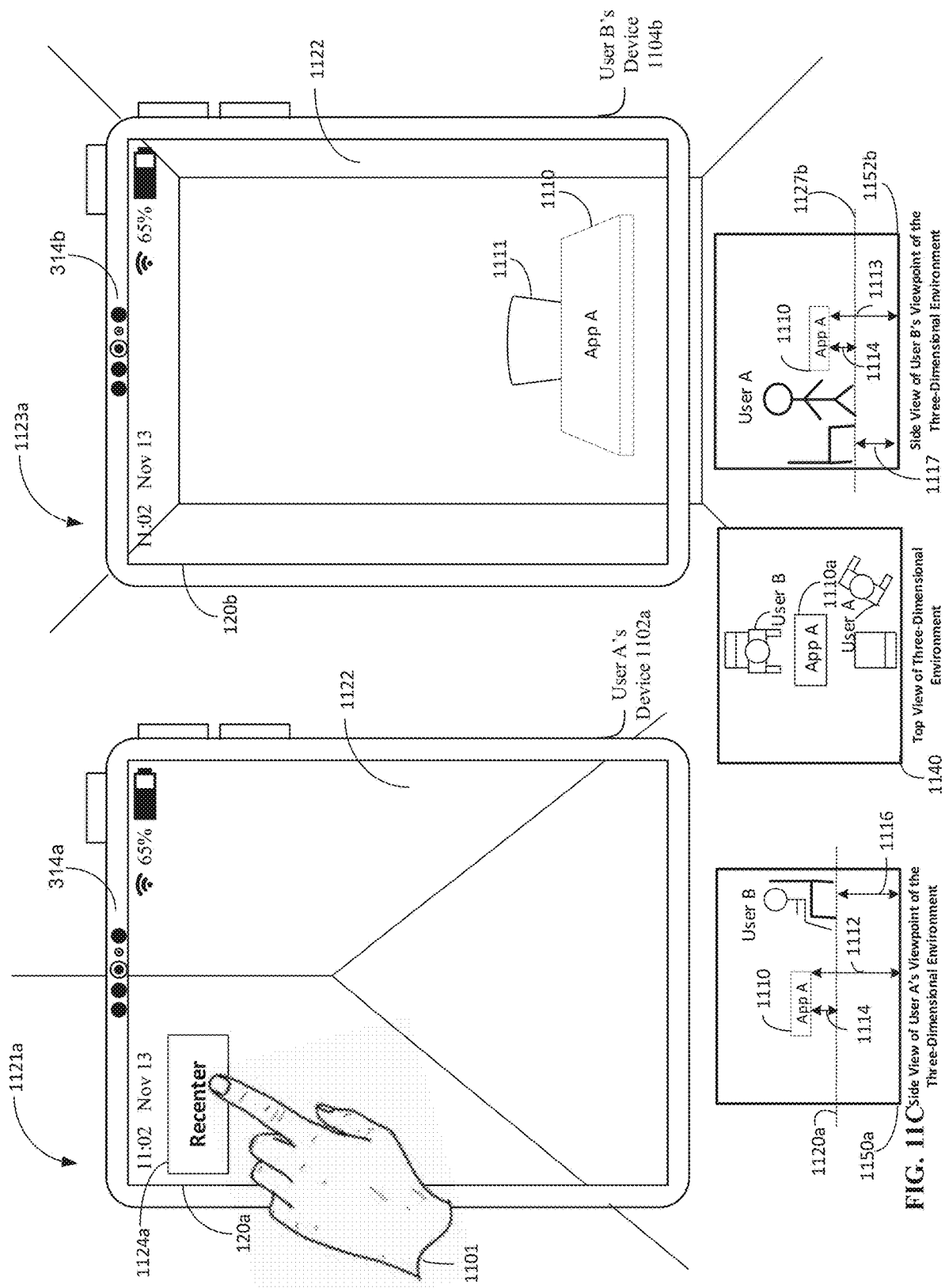

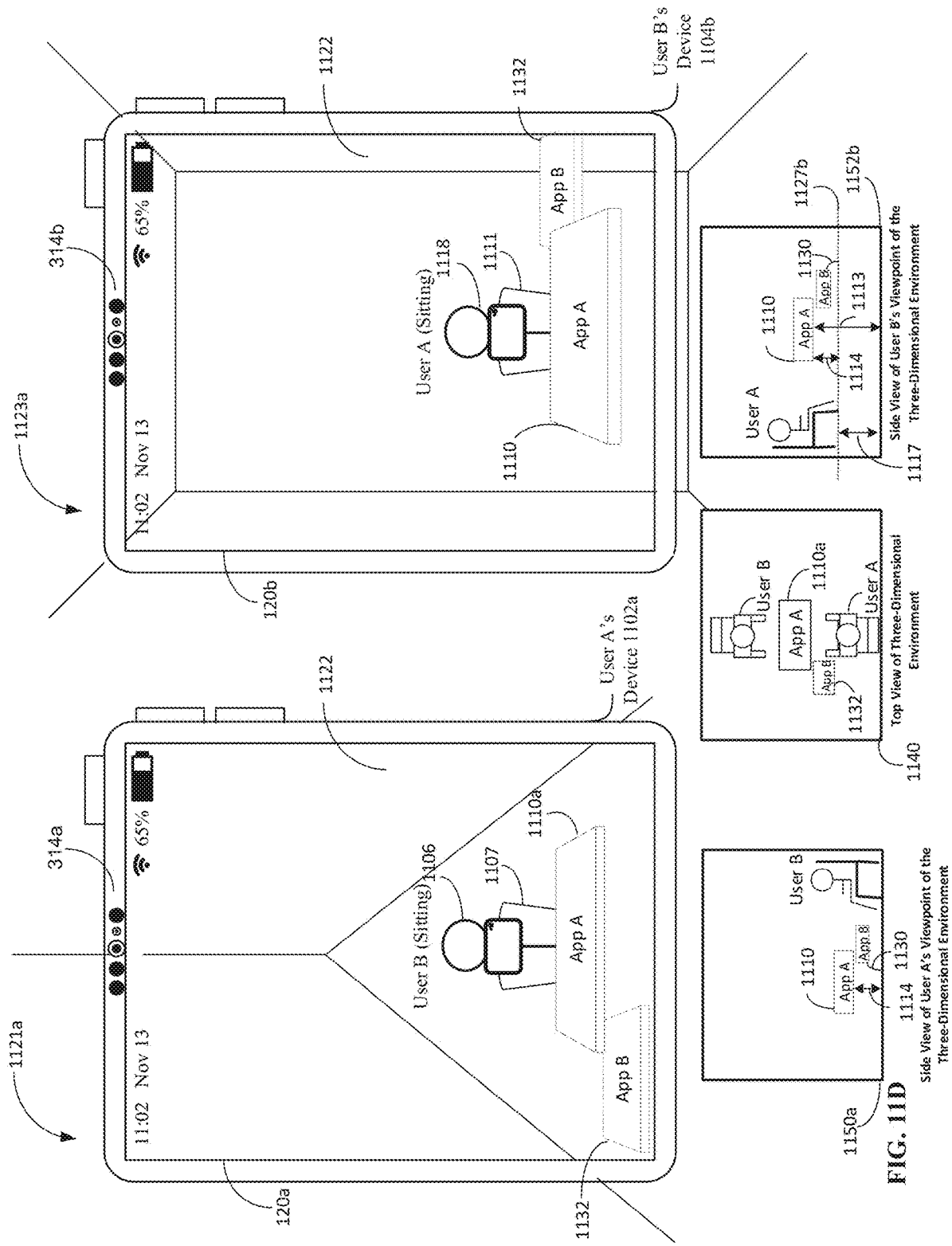

1200

1202a — Display, via a display generation component, a three-dimensional environment from a viewpoint of a user, including:

1202b — One or more first virtual objects in the three-dimensional environment at locations determined based at least in part on a first estimated floor location in the three-dimensional environment

1202c — While displaying the three-dimensional environment from the viewpoint of the user based on the first estimated floor location, determine a second estimated floor location, different from the first estimated floor location, corresponding to an estimated location of a physical floor in the physical environment of the electronic device

1202d — After determining the second estimated floor location corresponding to the estimated location of the physical floor in the physical environment of the electronic device:

1202e — In accordance with a determination that one or more criteria are satisfied:

1202f — Display the one or more first virtual objects at updated locations in the three-dimensional environment based on the second estimated floor location

1202g — In accordance with a determination that one or more criteria are not satisfied:

1202h — Maintain the one or more first virtual objects at their locations in the three-dimensional environment based on the first estimated floor location FIG. 12A 

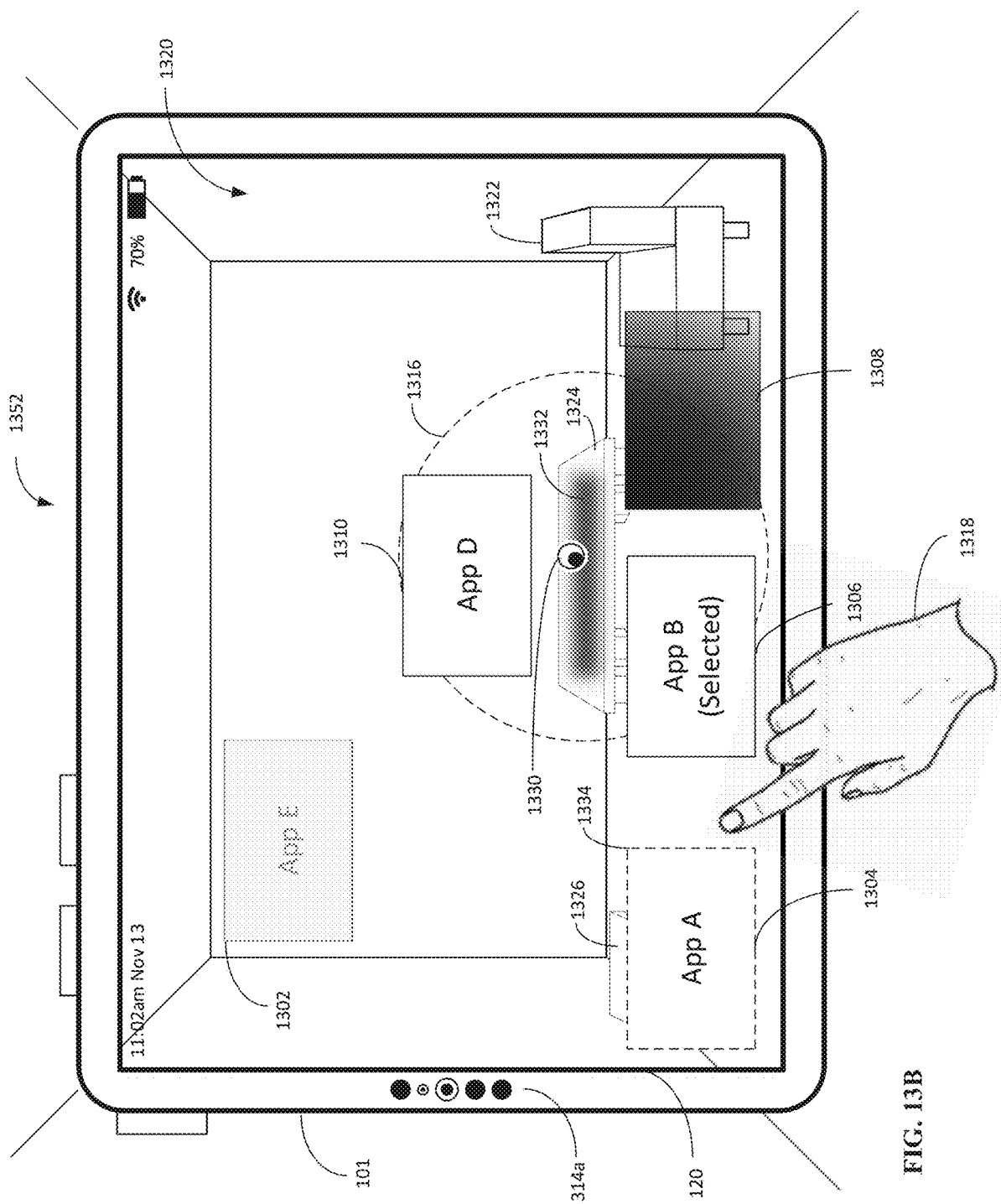

DEVICES, METHODS, AND GRAPHICAL USER INTERFACES FOR PRESENTING VIRTUAL OBJECTS IN VIRTUAL ENVIRONMENTS

CROSS-REFERENCE TO RELATED APPLICATIONS

This application claims the benefit of U.S. Provisional Application No. 63/261,667, filed Sep. 25, 2021, the content of which is incorporated herein by reference in its entirety for all purposes.

TECHNICAL FIELD

This relates generally to computer systems with a display generation component and one or more input devices that present graphical user interfaces, including but not limited to electronic devices that present graphical user interfaces, via the display generation component, in virtual environments.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects include digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious and error-prone, create a significant cognitive burden on a user, and detract from the experience with the virtual/augmented reality environment. In addition, these methods take longer than necessary, thereby wasting energy. This latter consideration is particularly important in battery-operated devices.

Accordingly, there is a need for computer systems with improved methods and interfaces for providing computer generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for navigating user interfaces. Such methods and interfaces may complement or replace conventional methods for interacting with a graphical user interface. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, an electronic device updates the spatial arrangement of one or more virtual objects in a three-dimensional environment. In some embodiments, an electronic device updates the positions of multiple virtual objects together. In some embodiments, an electronic device displays objects in a three-dimensional environment based on an estimated location of a floor in the three-dimensional environment. In some embodiments, an electronic device moves (e.g., repositions) objects in a three-dimensional environment.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 11A-11E illustrate exemplary ways of displaying objects in a three-dimensional environment based on an estimated location of a floor for the three-dimensional environment in accordance with some embodiments.

FIGS. 12A-12G is a flowchart illustrating a method of displaying objects in a three-dimensional environment based on an estimated location of a floor for the three-dimensional environment in accordance with some embodiments.

FIGS. 13A-13D illustrate exemplary ways of moving objects in a three-dimensional environment in accordance with some embodiments of the disclosure.

DESCRIPTION OF EMBODIMENTS

Figure 1:
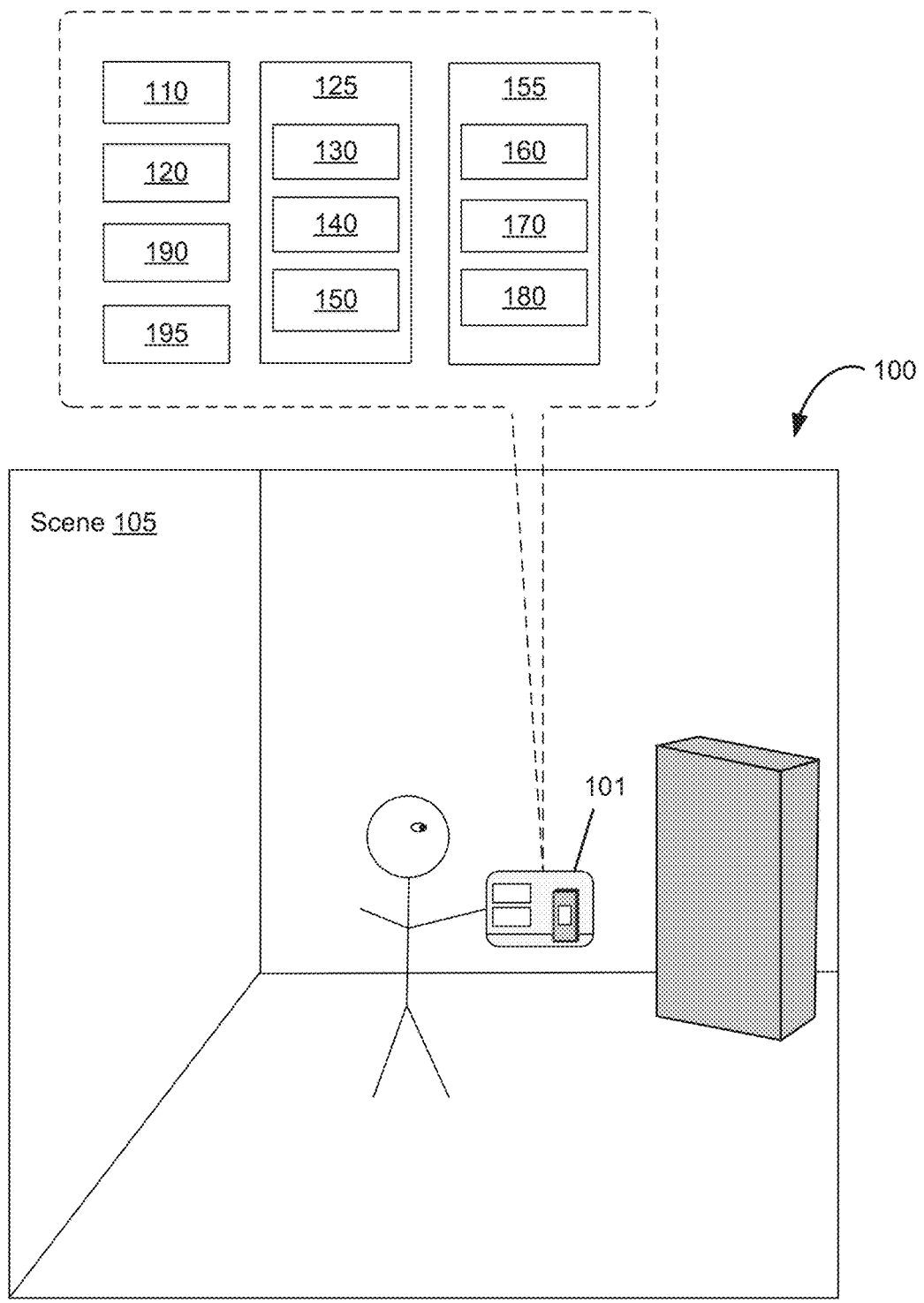
FIG. 1 is a block diagram illustrating an operating environment of a computer system for providing XR experiences in accordance with some embodiments.

The present disclosure relates to user interfaces for providing a computer generated reality (XR) experience to a user, in accordance with some embodiments.

The systems, methods, and GUIs described herein provide improved ways for an electronic device to present content corresponding to physical locations indicated in a navigation user interface element.

In some embodiments, a computer system displays, in a three-dimensional environment, one or more virtual objects (e.g., user interfaces of applications, representations of other users, content items, etc.). In some embodiments, the computer system evaluates the spatial arrangement of the virtual objects relative to a viewpoint of the user in the three-dimensional environment according to one or more spatial criteria described in more detail below. In some embodiments, the computer system detects a user input corresponding to a request to update the positions and/or orientations of the virtual objects to satisfy the one or more spatial criteria. In some embodiments, in response to the input, the computer system updates the positions and/or orientations of the virtual objects to satisfy the one or more spatial criteria. Updating the positions and/or orientations of the virtual objects in this manner provides an efficient way of enabling the user to access, view, and/or interact with the virtual objects, which additional reduces power usage and improves battery life of the computer system by enabling the user to use the computer system more quickly and efficiently.

In some embodiments, a computer system updates the positions and/or orientations of a plurality of virtual objects relative to a viewpoint of a user of the computer system in a three-dimensional environment. In some embodiments, the computer system receives an input corresponding to a request to update the positions and/or orientations of a plurality of virtual objects relative to a viewpoint of a user. In some embodiments, in response to the input, the computer system updates the positions and/or orientations of a plurality of virtual objects relative to a viewpoint of a user while maintaining the spatial relationship among the plurality of virtual objects. Updating the positions and/or orientations of a plurality of virtual objects relative to a viewpoint of a user in this way provides an efficient way of updating the view of the three-dimensional environment from the viewpoint of the user, which additionally reduces power usage and improves battery life of the computer system by enabling the user to use the computer system more quickly and efficiently.

In some embodiments, a computer system presents objects in a three-dimensional environment based on an estimated location of a physical floor in the physical environment of the computer system. In some embodiments, while the computer system is presenting objects in the three-dimensional environment based on the estimated location of the physical floor in the physical environment of the computer system, the computer system determines a new estimated location of the physical floor in the physical environment of the computer system. In some embodiments, the computer system continues to present objects in the three-dimensional environment based on a previous estimated location of the physical floor in the physical environment of the computer system until certain conditions/criteria are satisfied. Displaying objects in the three-dimensional environment based on a previous estimated location of a physical floor until certain conditions/criteria are satisfied provides an efficient way for updating locations of objects in the three-dimensional environment when certain conditions/criteria are satisfied and not before those conditions/criteria are satisfied, which additionally reduces power usage and improves battery life of the computer system by enabling the user to use the computer system more quickly and efficiently In some embodiments, a computer system presents one or more user interface objects in a three-dimensional environment. In some embodiments, the computer system receives a request to move (e.g., reposition) a respective user interface object in the three-dimensional environment to a new location in the three-dimensional environment. In some embodiments, while moving (e.g., repositioning) the respective user interface object to the new location in the three-dimensional environment, the computer system visually deemphasizes one or more portions of the respective user interface object. Visually deemphasizing portions of the respective user interface object while moving the respective user interface object in the three-dimensional environment reduces potential disorientation that can lead to vertigo or motion sickness symptoms, thus providing a mechanism via which the user is able to safely interact with a three-dimensional environment, thereby reducing cognitive burden on the user when interacting with the three-dimensional environment.

FIGS. 1-6 provide a description of example computer systems for providing XR experiences to users (such as described below with respect to methods 800, 1000, 1200, and 1400). FIGS. 7A-7G illustrate examples techniques for updating the spatial arrangement of one or more virtual objects in a three-dimensional environment in accordance with some embodiments. FIGS. 8A-8K is a flowchart illustrating a method of updating the spatial arrangement of one or more virtual objects in a three-dimensional environment in accordance with some embodiments. FIGS. 9A-9G illustrate example techniques for updating the positions of multiple virtual objects together in accordance with some embodiments. FIGS. 10A-10K is a flow chart illustrating a method of updating the positions of multiple virtual objects together in accordance with some embodiments. FIGS. 11A-11E illustrate example techniques for displaying objects in a three-dimensional environment based on an estimated location of a floor for the three-dimensional environment in accordance with some embodiments. FIGS. 12A-12G is a flowchart illustrating a method of displaying objects in a three-dimensional environment based on an estimated location of a floor for the three-dimensional environment in accordance with some embodiments. FIGS. 13A-13D illustrate exemplary techniques for moving objects in a three-dimensional environment in accordance with some embodiments of the disclosure. FIGS. 14A-14G is a flowchart illustrating a method of moving objects in a three-dimensional environment in accordance with some embodiments.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with CRG content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
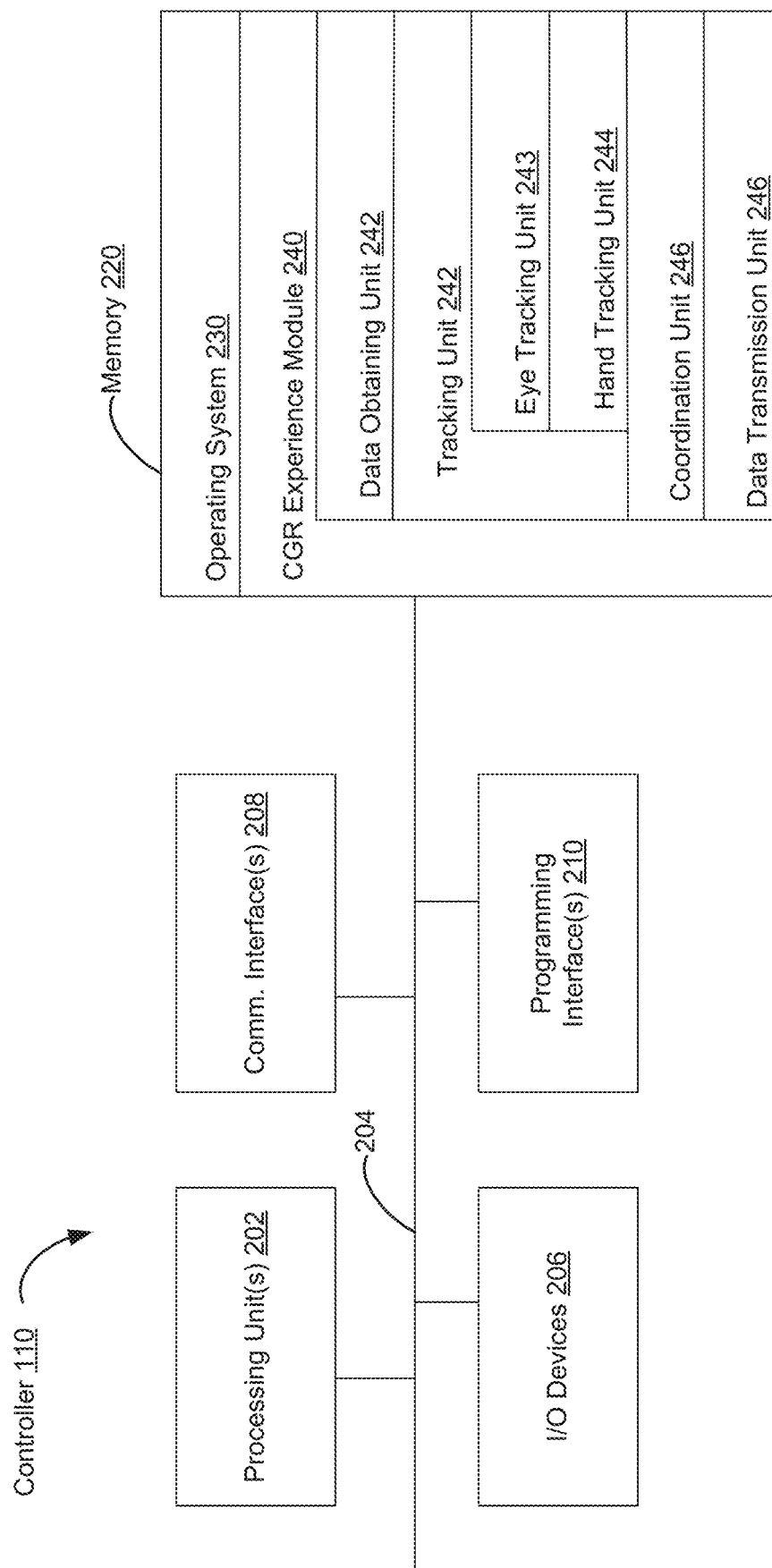
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
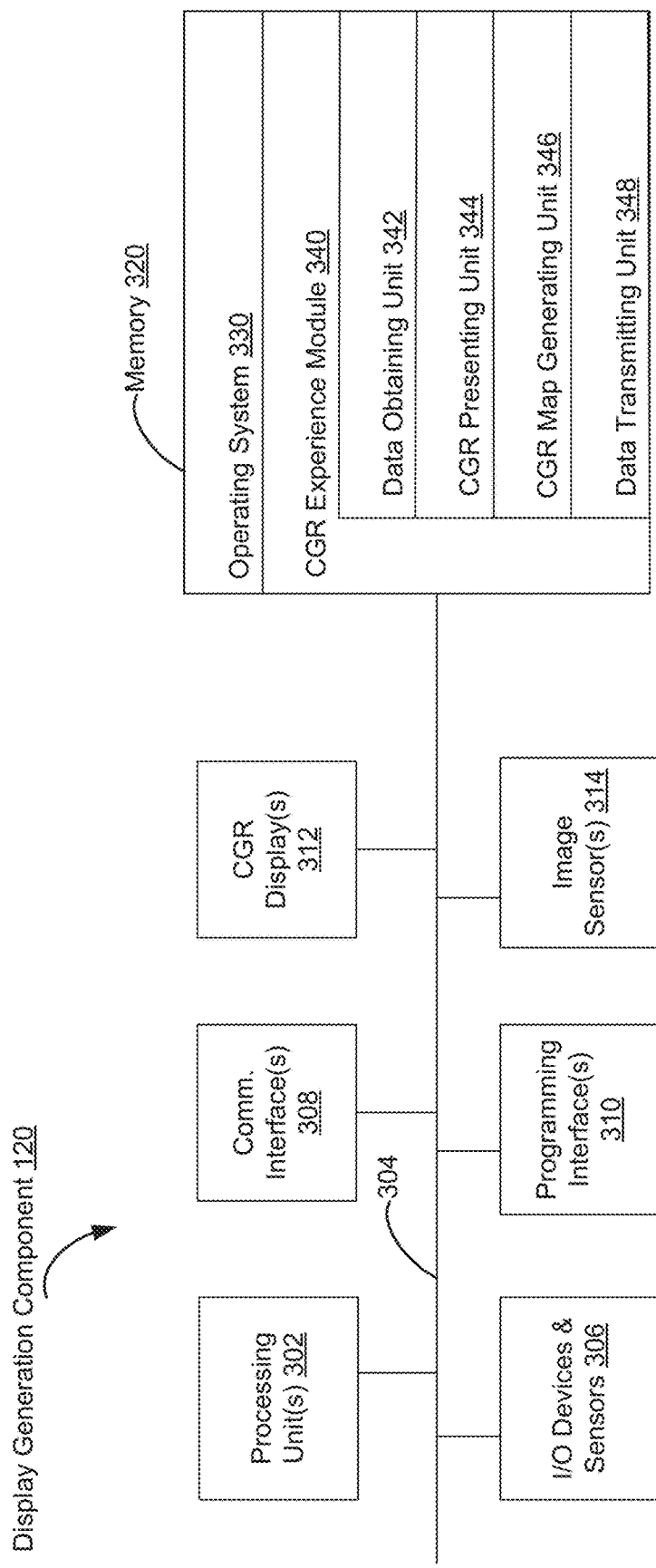
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
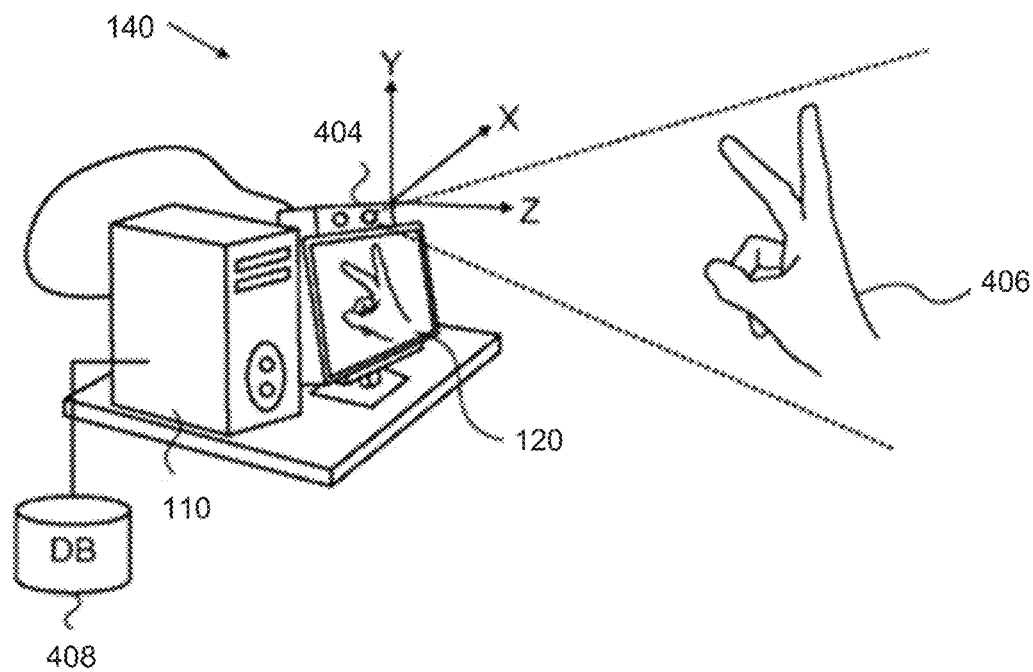
FIG. 4 is a block diagram illustrating a hand tracking unit of a computer system that is configured to capture gesture inputs of the user in accordance with some embodiments.
Figure 4:
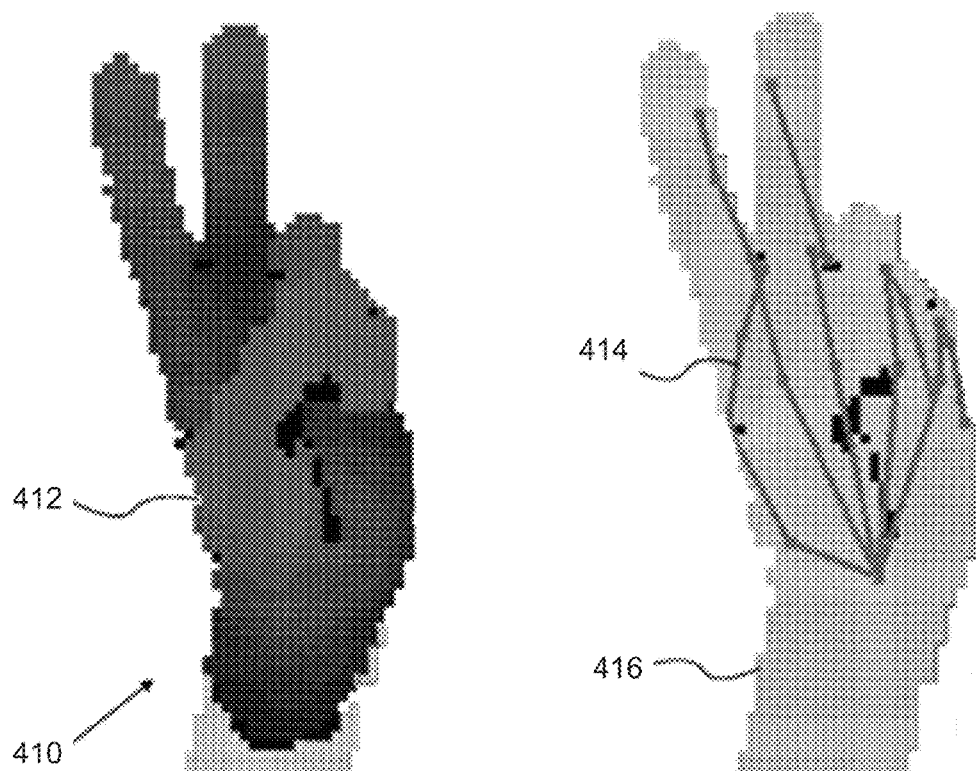

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands)

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
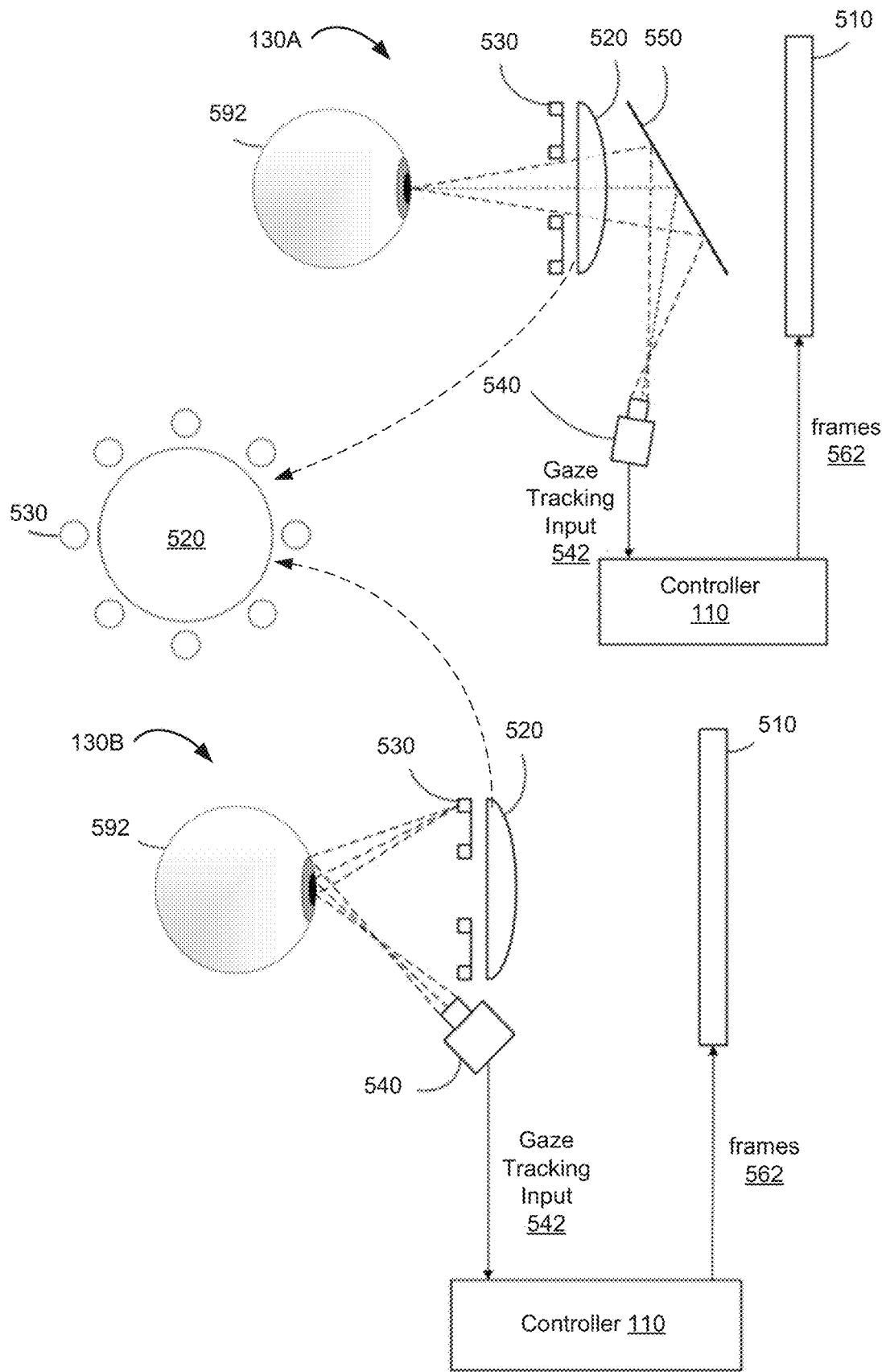
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 245 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6A:
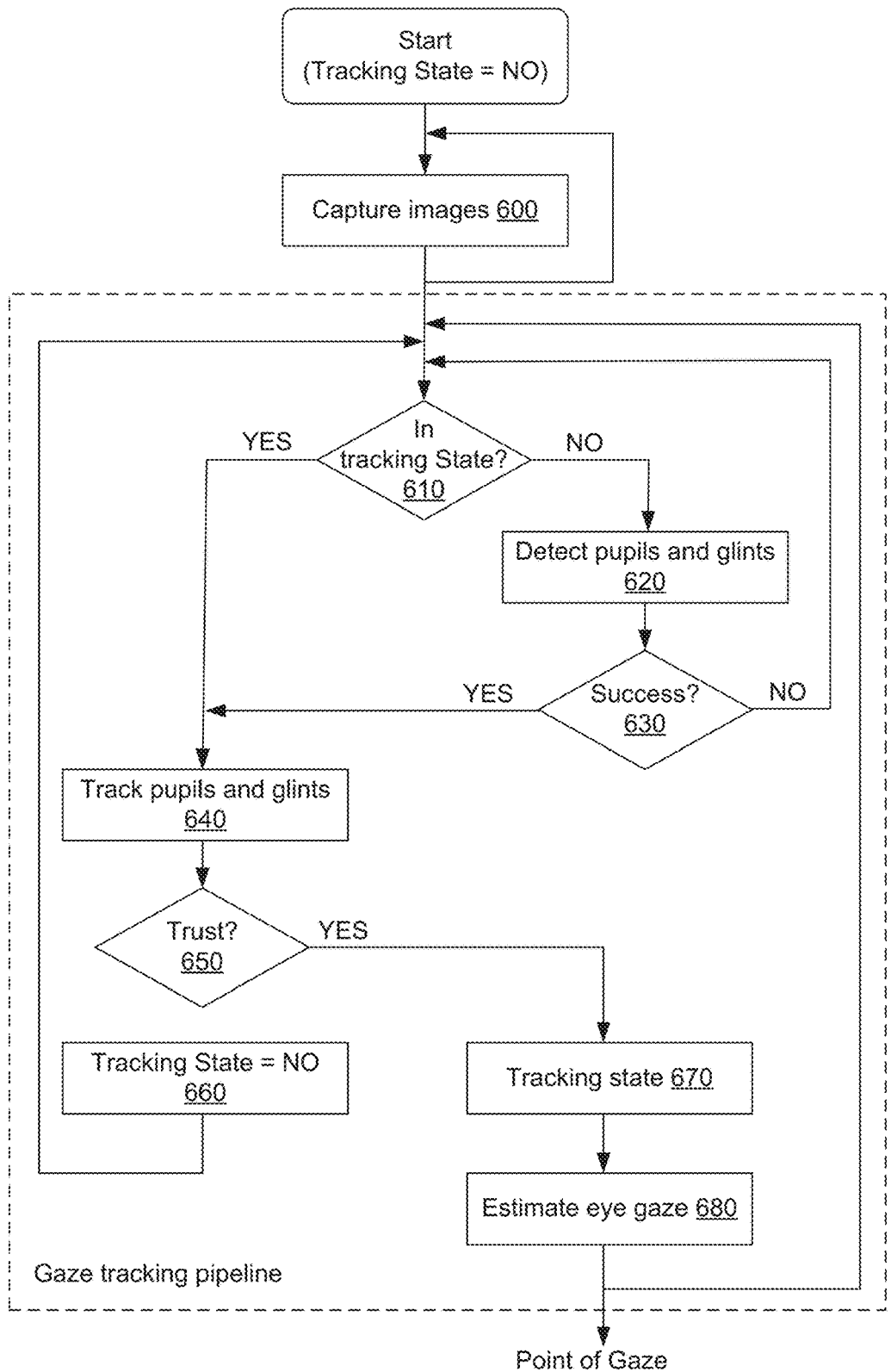
FIG. 6A is a flowchart illustrating a glint-assisted gaze tracking pipeline in accordance with some embodiments.

FIG. 6A illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame.

When not in the tracking state, the glint-assisted gaze tracking system attempts to detect the pupil and glints in the current frame and, if successful, initializes the tracking state to "YES" and continues with the next frame in the tracking state.

As shown in FIG. 6A, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6A is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Figure 6B:
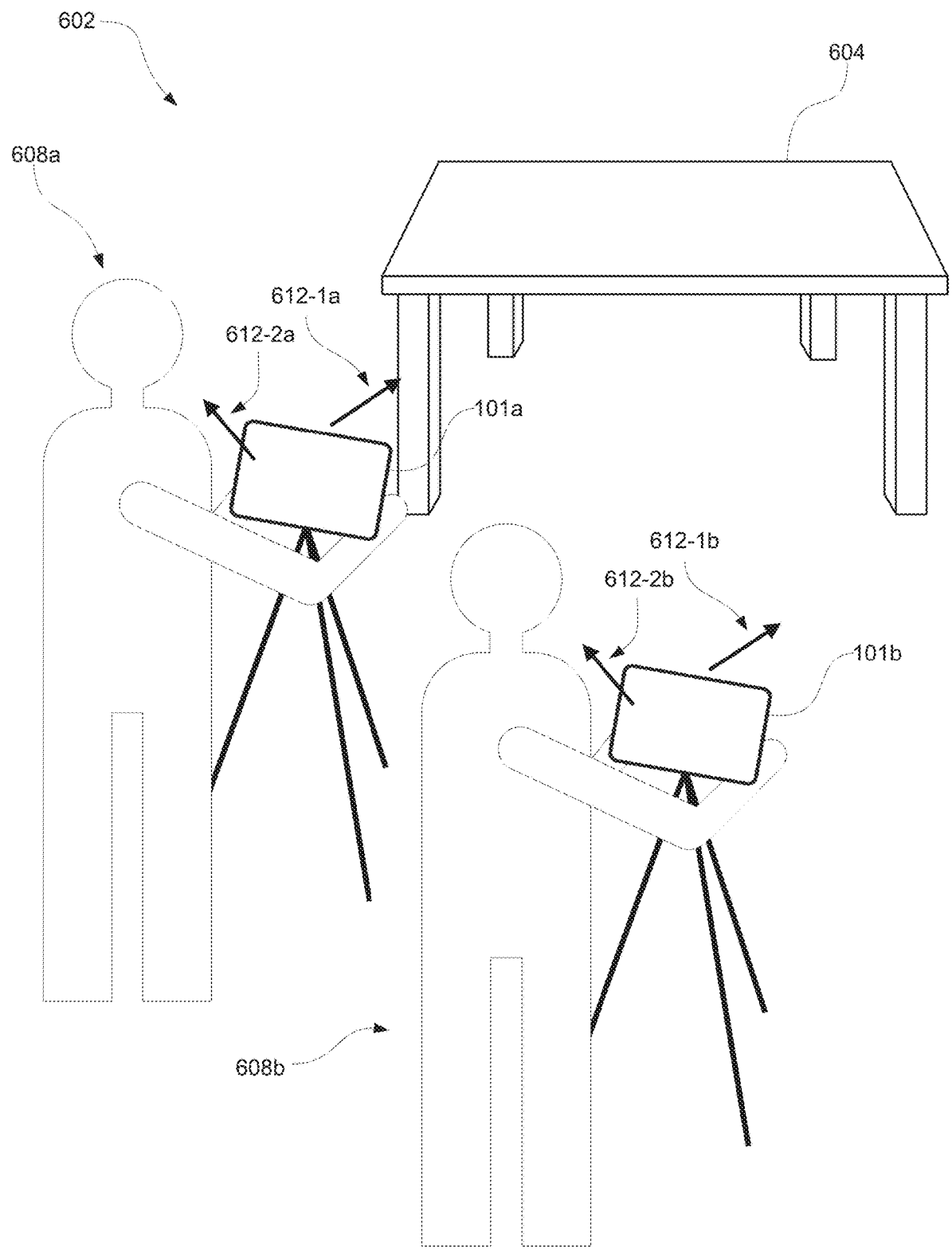
FIG. 6B illustrates an exemplary environment of an electronic device providing a XR experience in accordance with some embodiments.

FIG. 6B illustrates an exemplary environment of an electronic device 101 providing a XR experience in accordance with some embodiments. In FIG. 6B, real world environment 602 includes electronic device 101, user 608, and a real world object (e.g., table 604). As shown in FIG. 6B, electronic device 101 is optionally mounted on a tripod or otherwise secured in real world environment 602 such that one or more hands of user 608 are free (e.g., user 608 is optionally not holding device 101 with one or more hands). As described above, device 101 optionally has one or more groups of sensors positioned on different sides of device 101. For example, device 101 optionally includes sensor group 612-1 and sensor group 612-2 located on the "back" and "front" sides of device 101, respectively (e.g., which are able to capture information from the respective sides of device 101). As used herein, the front side of device 101 is the side that is facing user 608, and the back side of device 101 is the side facing away from user 608.

In some embodiments, sensor group 612-2 includes an eye tracking unit (e.g., eye tracking unit 245 described above with reference to FIG. 2) that includes one or more sensors for tracking the eyes and/or gaze of the user such that the eye tracking unit is able to "look" at user 608 and track the eye(s) of user 608 in the manners previously described. In some embodiments, the eye tracking unit of device 101 is able to capture the movements, orientation, and/or gaze of the eyes of user 608 and treat the movements, orientation, and/or gaze as inputs.

In some embodiments, sensor group 612-1 includes a hand tracking unit (e.g., hand tracking unit 243 described above with reference to FIG. 2) that is able to track one or more hands of user 608 that are held on the "back" side of device 101, as shown in FIG. 6B. In some embodiments, the hand tracking unit is optionally included in sensor group 612-2 such that user 608 is able to additionally or alternatively hold one or more hands on the "front" side of device 101 while device 101 tracks the position of the one or more hands. As described above, the hand tracking unit of device 101 is able to capture the movements, positions, and/or gestures of the one or more hands of user 608 and treat the movements, positions, and/or gestures as inputs.

In some embodiments, sensor group 612-1 optionally includes one or more sensors configured to capture images of real world environment 602, including table 604 (e.g., such as image sensors 404 described above with reference to FIG. 4). As described above, device 101 is able to capture images of portions (e.g., some or all) of real world environment 602 and present the captured portions of real world environment 602 to the user via one or more display generation components of device 101 (e.g., the display of device 101, which is optionally located on the side of device 101 that is facing the user, opposite of the side of device 101 that is facing the captured portions of real world environment 602).

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of an computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

Similarly, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7G illustrate examples of how an electronic device updates the spatial arrangement of one or more virtual objects in a three-dimensional environment in accordance with some embodiments.

Figure 7A:
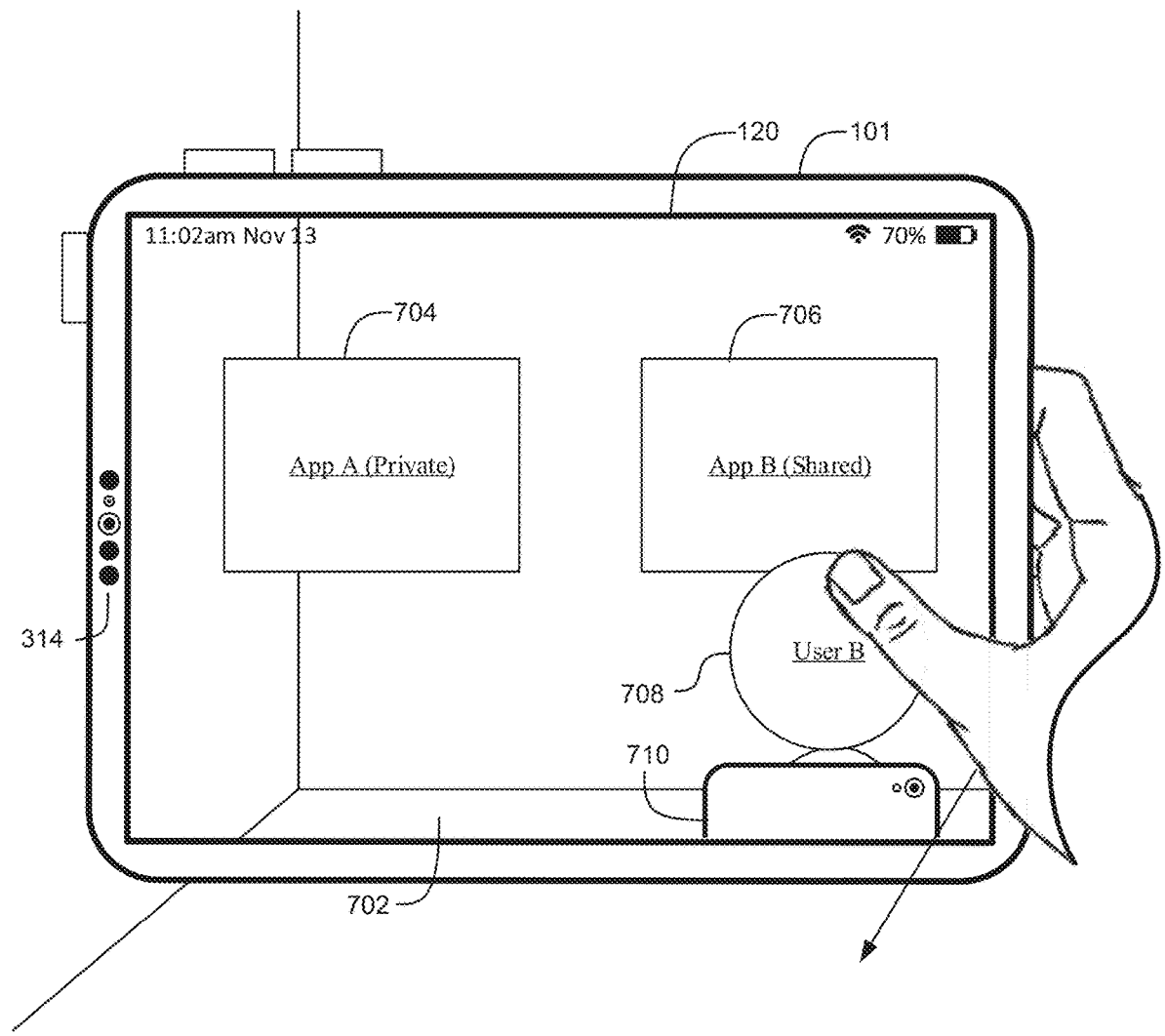
FIGS. 7A-7G illustrate examples of how an electronic device updates the spatial arrangement of one or more virtual objects in a three-dimensional environment in accordance with some embodiments.
Figure 7A:
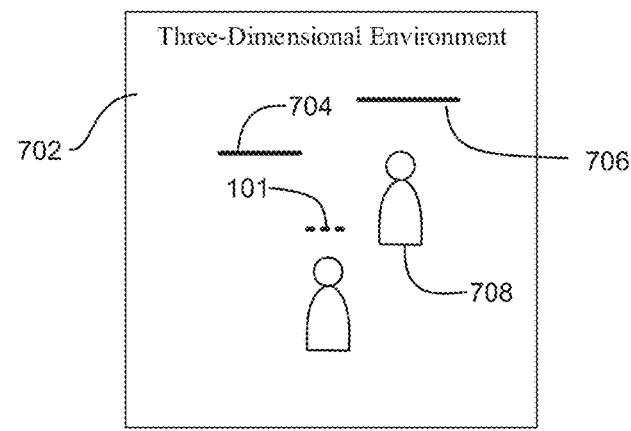

FIG. 7A illustrates an electronic device 101 displaying, via a display generation component 120, a three-dimensional environment 702. It should be understood that, in some embodiments, electronic device 101 utilizes one or more techniques described with reference to FIGS. 7A-7G in a two-dimensional environment without departing from the scope of the disclosure. As described above with reference to FIGS. 1-6, the electronic device 101 optionally includes a display generation component 120 (e.g., a touch screen) and a plurality of image sensors 314. The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, display generation component 120 is a touch screen that is able to detect gestures and movements of a user's hand. In some embodiments, the user interfaces shown below could also be implemented on a head-mounted display that includes a display generation component that displays the user interface to the user, and sensors to detect the physical environment and/or movements of the user's hands (e.g., external sensors facing outwards from the user), and/or gaze of the user (e.g., internal sensors facing inwards towards the face of the user).

In FIG. 7A, the electronic device 101 displays a three-dimensional environment 702 that includes a first user interface 704 of a first application, a second user interface 706 of a second application, a representation 708 of a second user of a second electronic device with access to the three-dimensional environment 702, and a representation 710 of the second electronic device, for example. In some embodiments, the electronic device 101 displays the three-dimensional environment 702 from a viewpoint of the user of the electronic device 101. In some embodiments, the viewpoint of the user of the electronic device 101 is located at a location in the three-dimensional environment 702 corresponding to the physical location of the electronic device 101 in the physical environment of the electronic device 101.

In some embodiments, the first application is private to the electronic device 101 and is not shared with the second electronic device, so the electronic device 101 displays the user interface 704 of the first application but the second electronic device does not display the user interface 704 of the first application. In some embodiments, the second application is shared between the electronic device 101 and the second electronic device, so the first electronic device 101 and the second electronic device display the user interface 706 of the second application.

In some embodiments, the representation 708 of the second user and/or the representation 710 of the second electronic device are views of the second user and the second electronic device through a transparent portion of the display generation component 120 (e.g., true or real passthrough). For example, the second electronic device is located in the physical environment of the electronic device 120 with the same spatial relationship to the electronic device 101 as the spatial relationship between the representation 710 of the second electronic device and the viewpoint of the user in the three-dimensional environment 702. In some embodiments, the representation 708 of the second user and/or the representation 710 of the second electronic device are representations displayed via the display generation component 120 (e.g., virtual or video passthrough). For example, the second electronic device is located remotely from the electronic device 101 or in a different spatial relationship relative to the electronic device 101 than the spatial relationship between the representation 710 of the second electronic device and the viewpoint of the user in the three-dimensional environment. In some embodiments, the electronic device 101 displays representations 708 and 710 via the display generation component while the second electronic device is located in the physical environment of the electronic device 120 with the same spatial relationship to the electronic device 101 as the spatial relationship between the representation 710 of the second electronic device and the viewpoint of the user in the three-dimensional environment 702. In some embodiments, the electronic device 101 displays a representation 708 of the second user without displaying a representation 710 of the second electronic device.

In some embodiments, the spatial arrangement of the user interfaces 704 and 706 and the representations 708 and 710 relative to the viewpoint of the user of the electronic device 101 satisfy one or more criteria specifying a range of positions and/or orientations of (e.g., virtual) objects relative to the viewpoint of the user in the three-dimensional environment 702. For example, the one or more criteria define spatial arrangements of the user interfaces 704 and 706 and representations 708 and 710 relative to the viewpoint of the user of the electronic device 101 that enable the user of the electronic device 101 (and optionally the second user of the second electronic device) to view and interact with the user interfaces 704 and 706 and representations 708 and 710. For example, the spatial arrangement of the user interfaces 704 and 706 and representations 708 and 710 relative to the viewpoint of the user illustrated in FIG. 7A enables the user of the electronic device 101 to view and/or interact with the user interfaces 704 and 706.

In some embodiments, the electronic device 101 updates the viewpoint of the user from which the electronic device 101 displays the three-dimensional environment 702 in response to detecting movement of the electronic device 101 (e.g., and/or display generation component 120) in the physical environment of the electronic device 101 (e.g., and/or display generation component 120), as shown in FIG. 7A. In some embodiments, the electronic device 101 updates the viewpoint of the user in response to detecting (e.g., via input devices 314) movement of the user of the electronic device 101 in the physical environment of the user and/or electronic device 101 and/or display generation component 120.

Figure 7B:
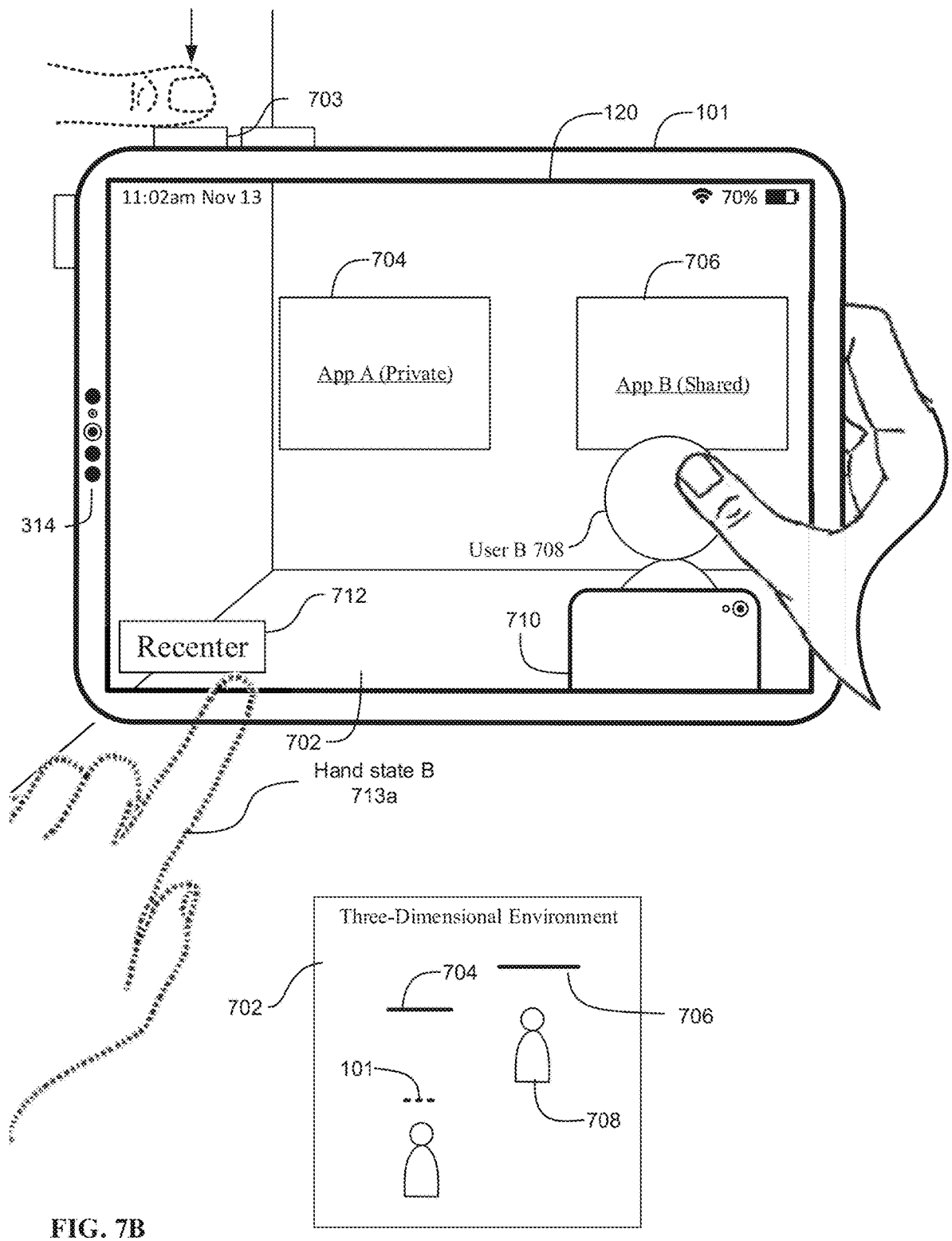

FIG. 7B illustrates an example of the electronic device 101 updating display of the three-dimensional environment 702 in response to detecting movement of the electronic device 101 illustrated in FIG. 7A. In some embodiments, the electronic device 101 similarly updates the three-dimensional environment 702 in response to an input corresponding to a request to update the positions of the virtual objects (e.g., the user interfaces 704 and 706 and representations 708 and 710) together or separately according to one or more steps of method 1000. As shown in FIG. 7B, the position of the electronic device 101 in the physical environment of the electronic device 101 is updated in response to the movement illustrated in FIG. 7A and the viewpoint of the user in the three-dimensional environment 702 from which the electronic device 101 displays the three-dimensional environment 702 is also updated accordingly. For example, user interfaces 704 and 706 and representations 708 and 710 are further from the viewpoint of the user in FIG. 7B than they were in FIG. 7A.

In some embodiments, the spatial arrangement of user interfaces 704 and 706 and representations 708 and 710 relative to the viewpoint of the user of the electronic device 101 does not satisfy the one or more criteria. For example, the criteria are not satisfied because user interface 704 and/or user interface 706 is greater than a threshold distance from the viewpoint of the user in the three-dimensional environment (e.g., a threshold distance for legibility and/or the ability of the user to provide inputs to the user interfaces 704 and/or 706). Additional criteria are described below with reference to method 800. In some embodiments, because the spatial arrangement does not satisfy the one or more criteria, the electronic device 101 displays a selectable option 712 that, when selected, causes the electronic device 101 to update the three-dimensional environment 702 so that the spatial arrangement of the user interfaces 704 and 706 and representations 708 and 710 relative to the viewpoint of the user satisfy the one or more criteria (e.g., "recentering" the three-dimensional environment 702).

In some embodiments, the electronic device 101 detects an input corresponding to a request to recenter the three-dimensional environment 702, such as detecting selection of the selectable recentering option 712 or detecting an input directed to a mechanical input device in communication with the electronic device 101, such as button 703.

In some embodiments, the electronic device 101 detects selection of one of the user interface elements, such as selectable option 712, by detecting an indirect selection input, a direct selection input, an air gesture selection input, or an input device selection input. In some embodiments, detecting selection of a user interface element includes detecting the hand 713a of the user perform a respective gesture (e.g., "Hand State B"). In some embodiments, detecting an indirect selection input includes detecting, via input devices 314, the gaze of the user directed to a respective user interface element while detecting the hand 713a of the user make a selection gesture (e.g., "Hand State B"), such as a pinch hand gesture in which the user touches their thumb to another finger of the hand. In some embodiments, detecting a direct selection input includes detecting, via input devices 314, the hand 713a of the user make a selection gesture (e.g., "Hand State B"), such as the pinch gesture within a predefined threshold distance (e.g., 1, 2, 3, 5, 10, 15, or 30 centimeters) of the location of the respective user interface element or a pressing gesture in which the hand or finger of the user "presses" the location of the respective user interface element while in a pointing hand shape. In some embodiments, detecting an air gesture input includes detecting the gaze of the user directed to a respective user interface element while detecting a pressing gesture at the location of an air gesture user interface element displayed in the three-dimensional environment 702 via display generation component 120. In some embodiments, detecting an input device selection includes detecting manipulation of a mechanical input device (e.g., a stylus, mouse, keyboard, trackpad, etc.) in a predefined manner corresponding to selection of a user interface element while a cursor controlled by the input device is associated with the location of the respective user interface element and/or while the gaze of the user is directed to the respective user interface element.

In some embodiments, button 703 is a multi-functioning button. For example, in response to detecting the user press the button 703a for less than a threshold period of time (e.g., 0.1, 0.2, 0.3, 0.5, 1, or 2 seconds), the electronic device 101 displays a home user interface (e.g., a user interface of the operating system of the electronic device 101) and in response to detecting the user press the button 703 for greater than the threshold period of time, the electronic device 101 recenters the three-dimensional environment 702. In some embodiments, the electronic device 101 is in communication with a crown or a dial configured to detect the user pressing the dial or turning the dial. In some embodiments, in response to detecting the user turn the dial, the electronic device updates a level of visual emphasis of virtual objects (e.g., user interfaces 704 and 706, representations 708 and 710) relative to other portions of the three-dimensional environment 702 in accordance with the direction and magnitude by which the dial is turned. In some embodiments, in response to detecting the user press the dial for less than the threshold period of time, the electronic device 101 displays the home user interface and in response to detecting the user press the dial for greater than the threshold period of time, the electronic device 101 recenters the three-dimensional environment 702.

Figure 7C:
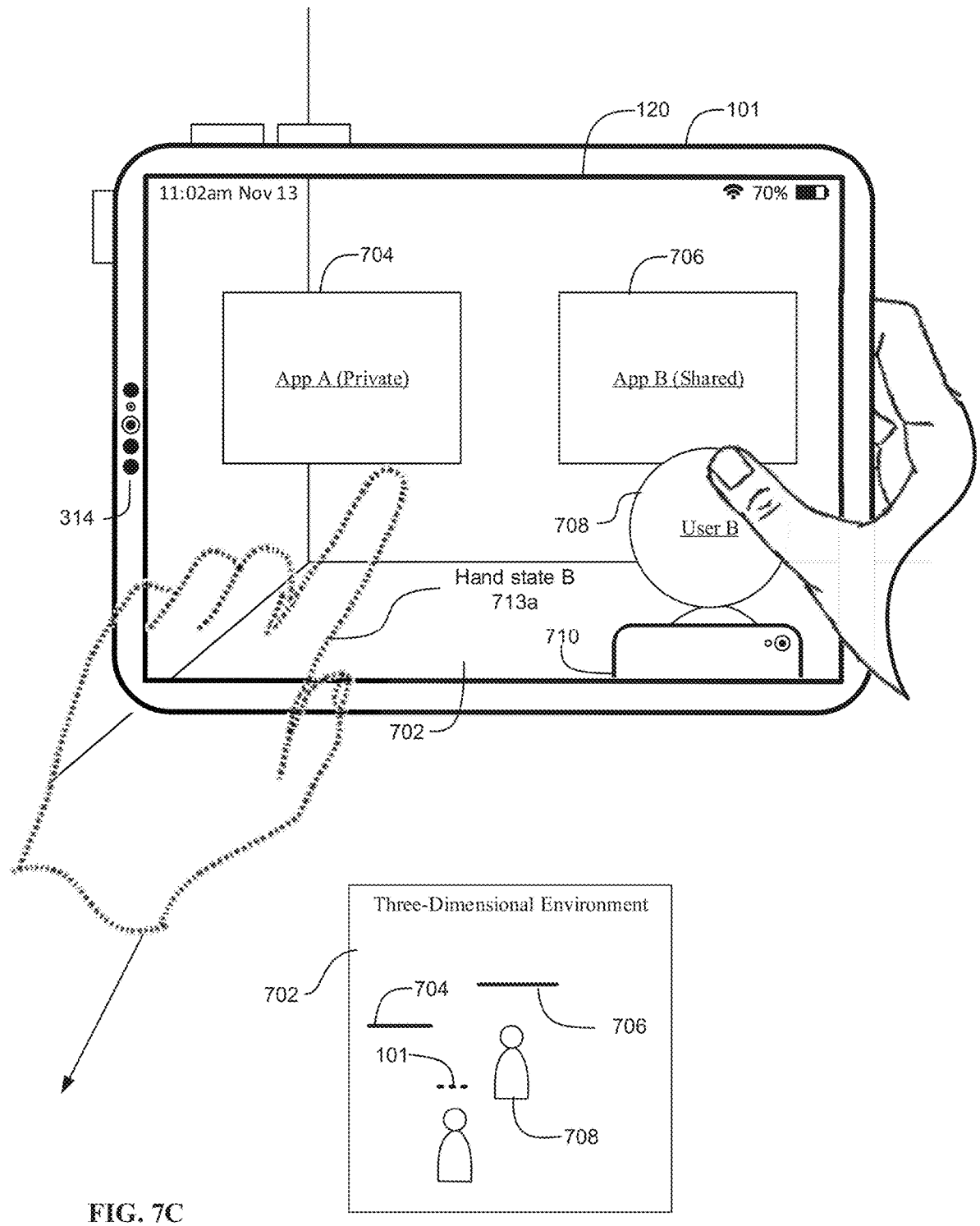

In some embodiments, the input directed to recentering option 712 and the input directed to button 703 in FIG. 7B correspond to a request to recenter the three-dimensional environment 702. Although FIG. 7B illustrates both inputs, it should be understood that, in some embodiments, the electronic device 101 detects one of these inputs at a time rather than detecting the inputs simultaneously. In some embodiments, in response to one (or more) of the inputs illustrated in FIG. 7B, the electronic device 101 updates the three-dimensional environment 702 as illustrated in FIG. 7C. In some embodiments, the electronic device 101 does not recenter the three-dimensional environment 702 unless and until an input corresponding to a request to do so is received (e.g., even if the spatial arrangement of virtual objects relative to the viewpoint of the user does not satisfy the one or more criteria).

FIG. 7C illustrates the electronic device 101 displaying the three-dimensional environment 702 updated in accordance with one or more of the inputs illustrated in FIG. 7B. In some embodiments, because the viewpoint of the user of the electronic device 101 moved away from the user interfaces 704 and 706 and representations 708 and 710 as shown in FIG. 7A prior to the electronic device 101 receiving the recentering input illustrated in FIG. 7B, in response to the recentering input, the electronic device 101 updates the positions of the user interfaces 704 and 706 and representations 708 and 710 in the three-dimensional environment 702 so the spatial arrangement of the user interfaces 704 and 706 and representations 708 and 710 relative to the viewpoint of the user satisfies the one or more criteria described above. For example, the electronic device 101 updates the positions and/or orientations of the user interfaces 704 and 706 and the representations 708 and 710 based on the updated viewpoint of the user in the three-dimensional environment 702 so that the spatial arrangement of the user interfaces 704 and 706 and representations 708 and 710 relative to the updated viewpoint of the user satisfies the one or more criteria. In some embodiments, when the spatial arrangement of the user interfaces 704 and 706 and representations 708 and 710 relative to the updated viewpoint of the user satisfy the one or more criteria, the user interfaces 704 and 706 are at distances from and/or orientations relative to the viewpoint of the user of the electronic device 101 that facilitate user interaction with the user interfaces.

In some embodiments, the electronic device 101 uses a spatial template associated with one or more virtual objects to recenter the three-dimensional environment 702. For example, the user interface 706 of the second application is shared content (e.g., video content) being consumed by the user of the electronic device 101 and the second user of the second electronic device, and is associated with a shared content spatial template. In some embodiments, the shared content spatial template includes positioning user interface 706 and representations 708 and 710 relative to the viewpoint of the user of the electronic device 101 such that the viewpoint of the user of the electronic device 101 and the viewpoint of the user of the second electronic device (e.g., represented by representations 708 and 710) are on the same side of the user interface 706 at a distance at which the content included in user interface 706 is visible to the users.

Thus, as shown in FIGS. 7B-7C, in some embodiments, in response to detecting the request to recenter the three-dimensional environment 702 after the viewpoint of the user was updated (e.g., in response to movement of the electronic device 101 illustrated in FIG. 7A), the electronic device 101 recenters the three-dimensional environment 702 by updating the positions and/or orientations of the user interfaces 704 and 706 and representations 708 and 710. In some embodiments, the electronic device 101 detects inputs corresponding to requests to move user interfaces 704 and 706 and representations 708 and 710 away from the viewpoint of the user prior to detecting the recentering input. In some embodiments, in response to detecting the recentering input after detecting the request(s) to move user interfaces 704 and 706 and representations 708 and 710, the electronic device 101 updates the viewpoint of the user in the three-dimensional environment 702 (e.g., as opposed to updating the positions and/or orientations of user interfaces 704 and 706 and/or representations 708 and 710). For example, the electronic device 101 moves the viewpoint of the user to a new location in the three-dimensional environment (e.g., independent from the location of the electronic device 101 in the physical environment) to update the spatial arrangement of the user interfaces 704 and 706 and representations 708 and 710 relative to the viewpoint of the user to satisfy the one or more criteria described above.

FIG. 7C also illustrates an example of the electronic device 101 detecting an input corresponding to a request to update the position of the user interface 704 of the first application in the three-dimensional environment 702. For example, hand 713a provides a selection input directed to the user interface 704 of the first application as described above. In some embodiments, after detecting a portion of the selection input, such as while the hand is in a pinch hand shape with the thumb touching another finger but before moving the thumb and finger apart to complete the pinch gesture, the electronic device 101 detects movement of the hand 713a. In some embodiments, the electronic device 101 updates the position of the user interface 704 of the first application in accordance with the movement of the hand 713a detected partway through the selection input as shown in FIG. 7D.

Figure 7D:
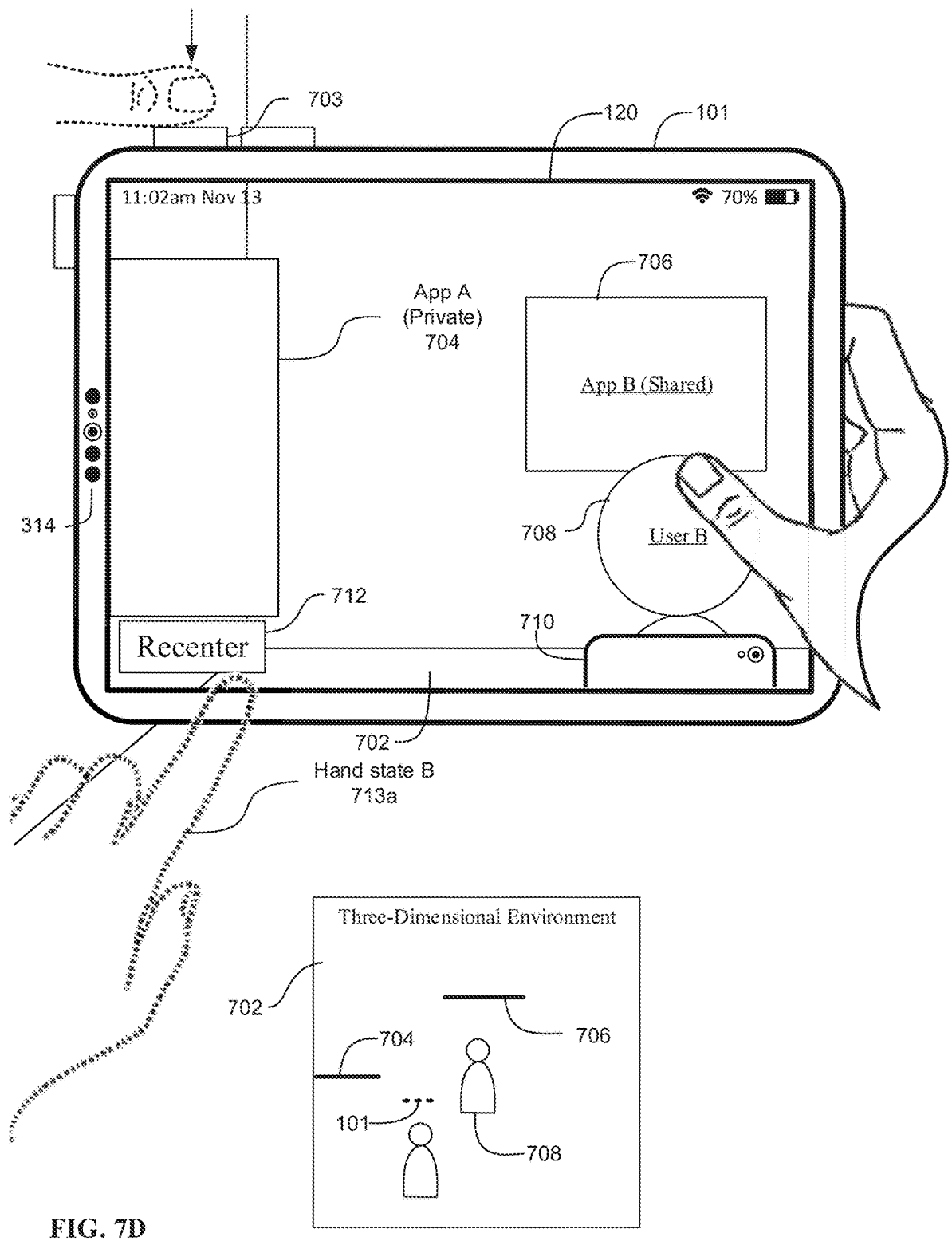

FIG. 7D illustrates an example of the electronic device 101 displaying the user interface 704 of the first application at the updated location in the three-dimensional environment 702 in response to the input illustrated in FIG. 7C. In some embodiments, updating the location of the user interface 704 of the first application causes the spatial arrangement of the user interfaces 704 and 706 and representations 708 and 710 relative to the viewpoint of the user not to satisfy the one or more criteria. For example, the user interface 704 of the first application is not fully within the field of view of the electronic device 101. As another example, the spacing between the user interface 704 of the first application and the user interface 706 of the second application exceeds a predefined threshold included in the one or more criteria described below with reference to method 800. In some embodiments, in response to detecting that the one or more criteria are not satisfied, the electronic device 101 displays the recentering option 712.

In some embodiments, the electronic device 101 detects an input corresponding to a request to recenter the three-dimensional environment 702. For example, the electronic device 101 detects selection of the recentering option 712 with hand 713a or detects an input via button 703 in FIG. 7D, as described in more detail above. In some embodiments, in response to detecting the input corresponding to the request to recenter the three-dimensional environment 101 after the position of the user interface 704 was updated, the electronic device 101 updates the position of the user interface 704 to satisfy the one or more criteria, as illustrated in FIG. 7E.

Figure 7E:
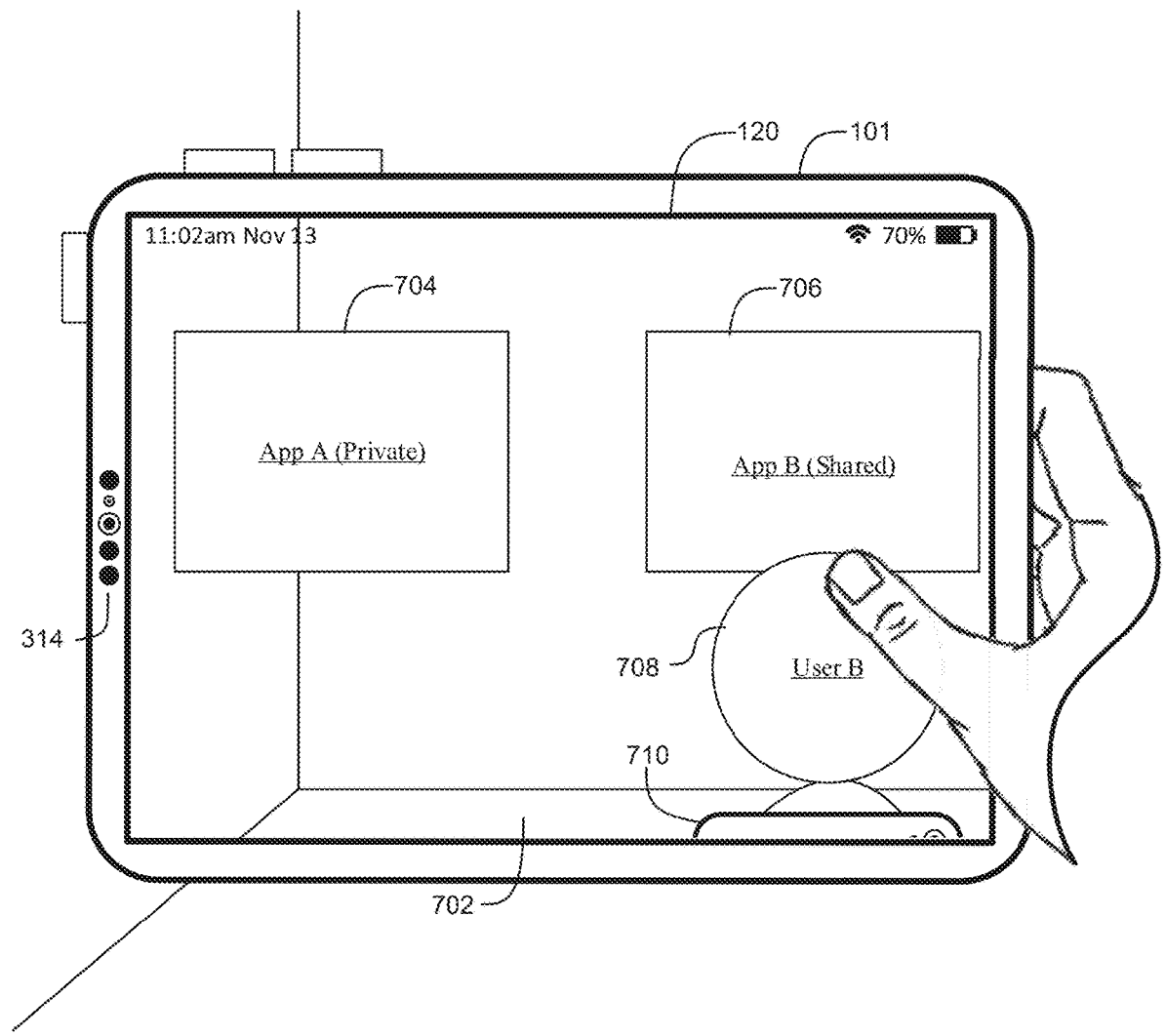
Figure 7E:
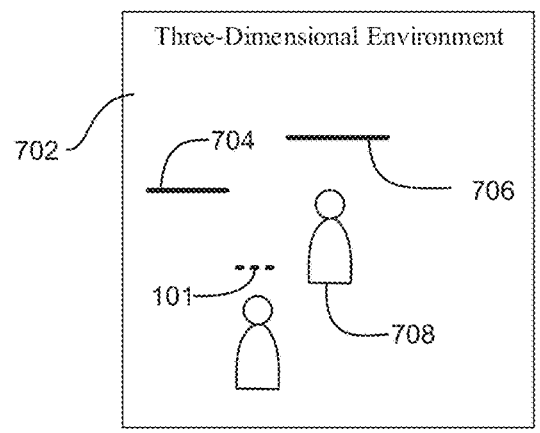

FIG. 7E illustrates the electronic device 101 displaying the user interface 704 of the first application at an updated location (e.g., and/or orientation) in the three-dimensional environment 702 in response to the recentering input illustrated in FIG. 7D. In some embodiments, because the position (e.g., and/or orientation) of the user interface 704 of the first application was updated prior to receiving the input corresponding to the request to recenter the three-dimensional environment 702 (e.g., as opposed to movement of the viewpoint of the user being the cause of the one or more criteria not being satisfied), the electronic device 101 updates the position (e.g., and/or orientation) of the user interface 704 of the first application in the three-dimensional environment 702 in response to the recentering input (e.g., without updating the viewpoint of the user). For example, the electronic device 101 updates the position and/or orientation of the user interface 704 of the first application to be within a threshold distance (e.g., included in the one or more criteria) of the user interface 706 of the second application and to ensure the user interface 704 of the first application is within the field of view of the electronic device 101. In some embodiments, if the electronic device 101 had detected movement of a different virtual object, such as the user interface 706 of the second application, prior to detecting the recentering input, the electronic device 101 would instead update the position (e.g., and/or orientation) of that virtual object in response to the recentering input.

In some embodiments, the electronic device 101 updates the position of the user interface 704 of the first application in response to the recentering input irrespective of which electronic device provided the previous request to reposition and/or reorient the user interface 704 prior to the electronic device 101 detecting the recentering input. For example, if the second user of the second electronic device updates the position of the user interface 706 of the second application (e.g., that both electronic devices have access to), the second electronic device and the electronic device 101 would display the user interface 706 at the updated position and/or orientation in the three-dimensional environment 702 in accordance with the input provided by the second user of the second electronic device. If the electronic device 101 detects a recentering input while the user interface 706 is displayed at the position and orientation in accordance with the input detected by the second electronic device, the electronic device 101 updates the position and/or orientation of the user interface 706 in the three-dimensional environment 702 to satisfy the one or more criteria described above. In some embodiments, updating the position of the user interface 706 in the three-dimensional environment 702 causes the electronic device 101 and the second electronic device to display the user interface 706 at the updated position and/or location.

Figure 7F:
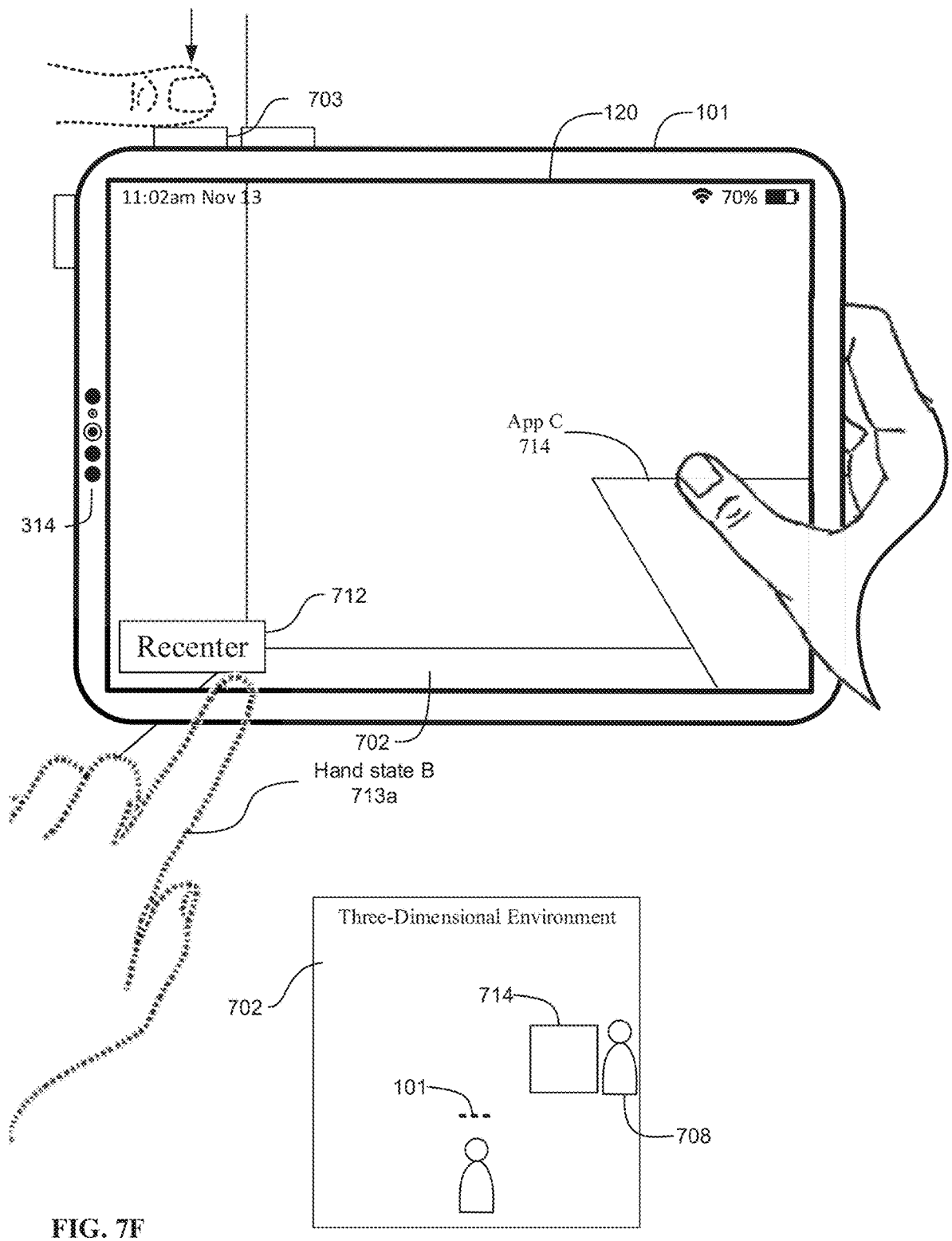

FIG. 7F illustrates an example of the electronic device 101 displaying the three-dimensional environment 702 including a user interface 714 of a third application. As shown in FIG. 7F, a portion of the user interface 714 of the third application is within the field of view of the electronic device 101 and a portion of the user interface 714 of the third application is beyond the field of view of the electronic device 101. Although the second user 708 is included in the three-dimensional environment 702, because the second user 708 is not in the field of view of the electronic device 101, the electronic device 101 does not display a representation of the second user or a representation of the second electronic device. In some embodiments, the spatial arrangement of the viewpoint of the user, the user interface 714 of the third application, and the second user 708 does not satisfy the one or more criteria described above. For example, the one or more criteria are not satisfied at least because the second user 708 is not in the field of view of the electronic device 101 and a portion of the user interface 714 of the third application is not in the field of view of the electronic device 101. Because the one or more criteria are not satisfied, the electronic device 101 displays the recentering option 712 in the three-dimensional environment 702.

In some embodiments, as shown in FIG. 7F, the electronic device 101 detects an input corresponding to a request to recenter the three-dimensional environment 702. In some embodiments, the input includes detecting an input directed to button 703. In some embodiments, the input includes detecting selection of the recentering option 712 by hand 713a. Although FIG. 7F illustrates both inputs, it should be understood that, in some embodiments, the inputs are not concurrently detected. In some embodiments, in response to the recentering input, the electronic device 101 updates the three-dimensional environment 702 as illustrated in FIG. 7G.

Figure 7G:
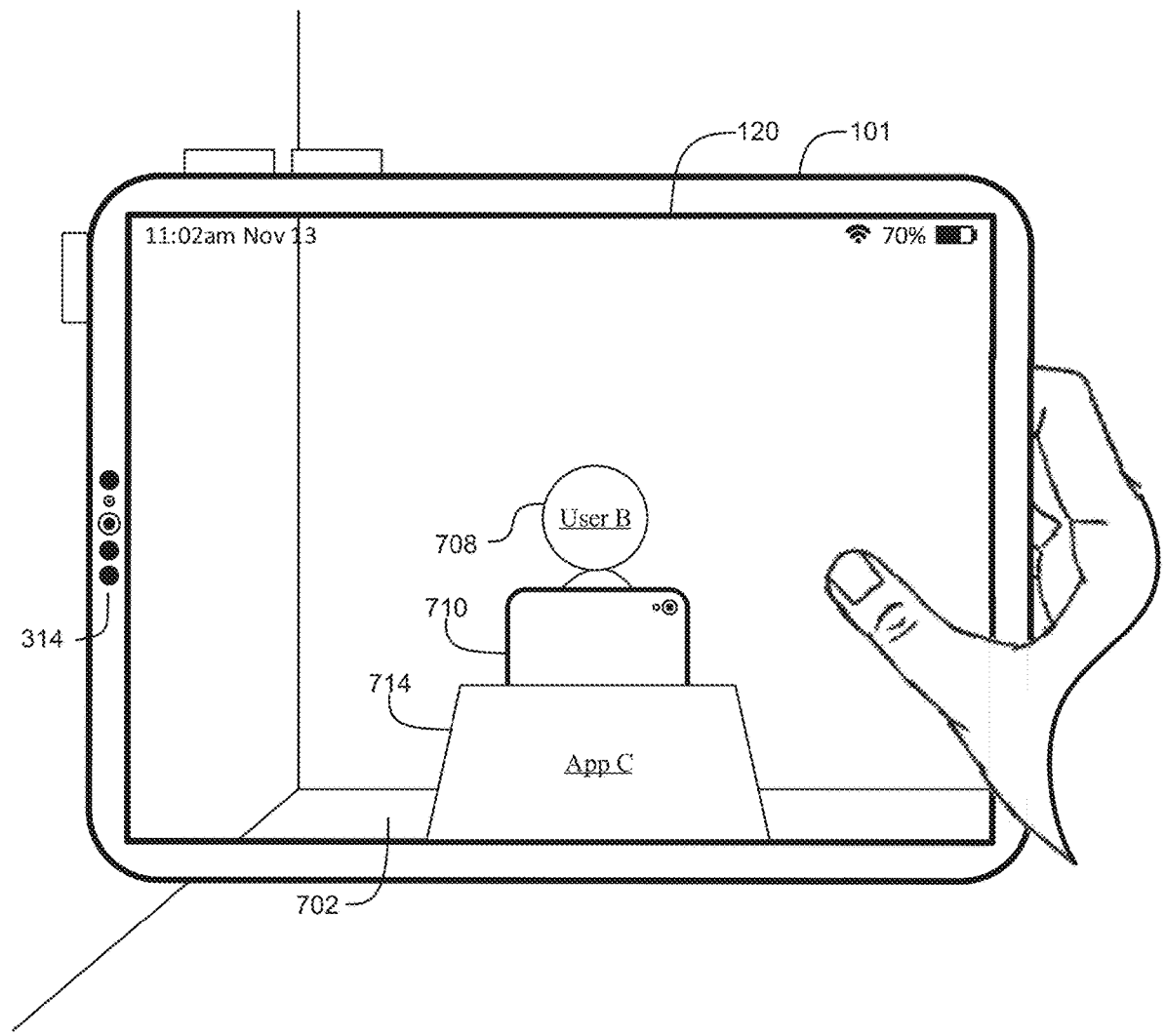
Figure 7G:
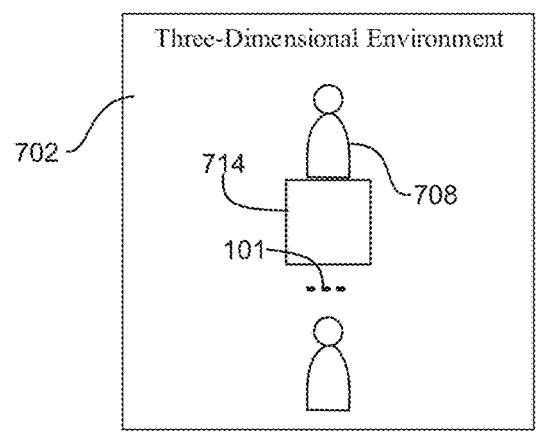
Figure 8A:
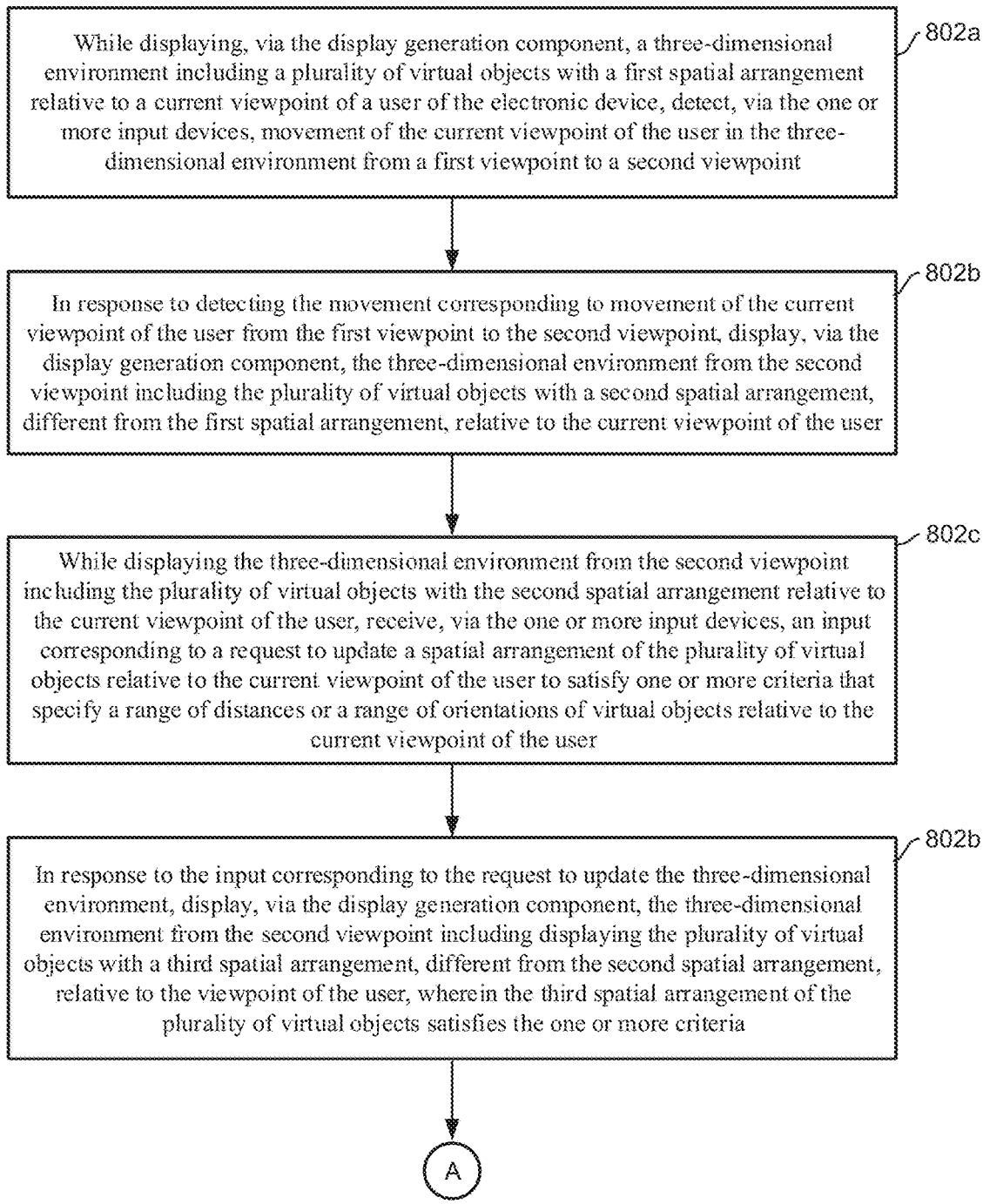
FIGS. 8A-8K is a flowchart illustrating a method of updating the spatial arrangement of one or more virtual objects in a three-dimensional environment in accordance with some embodiments.
Figure 8B:
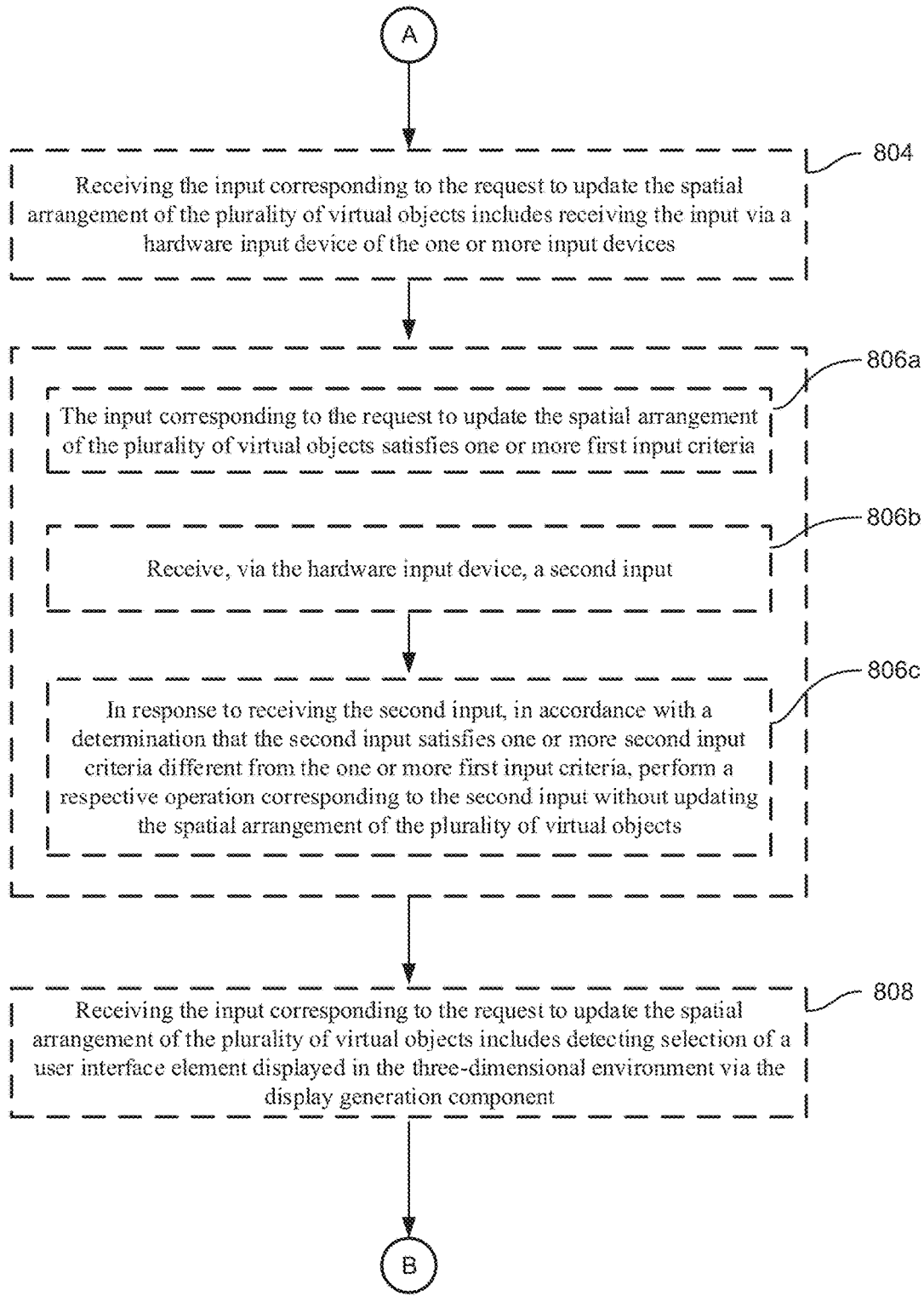
Figure 8C:
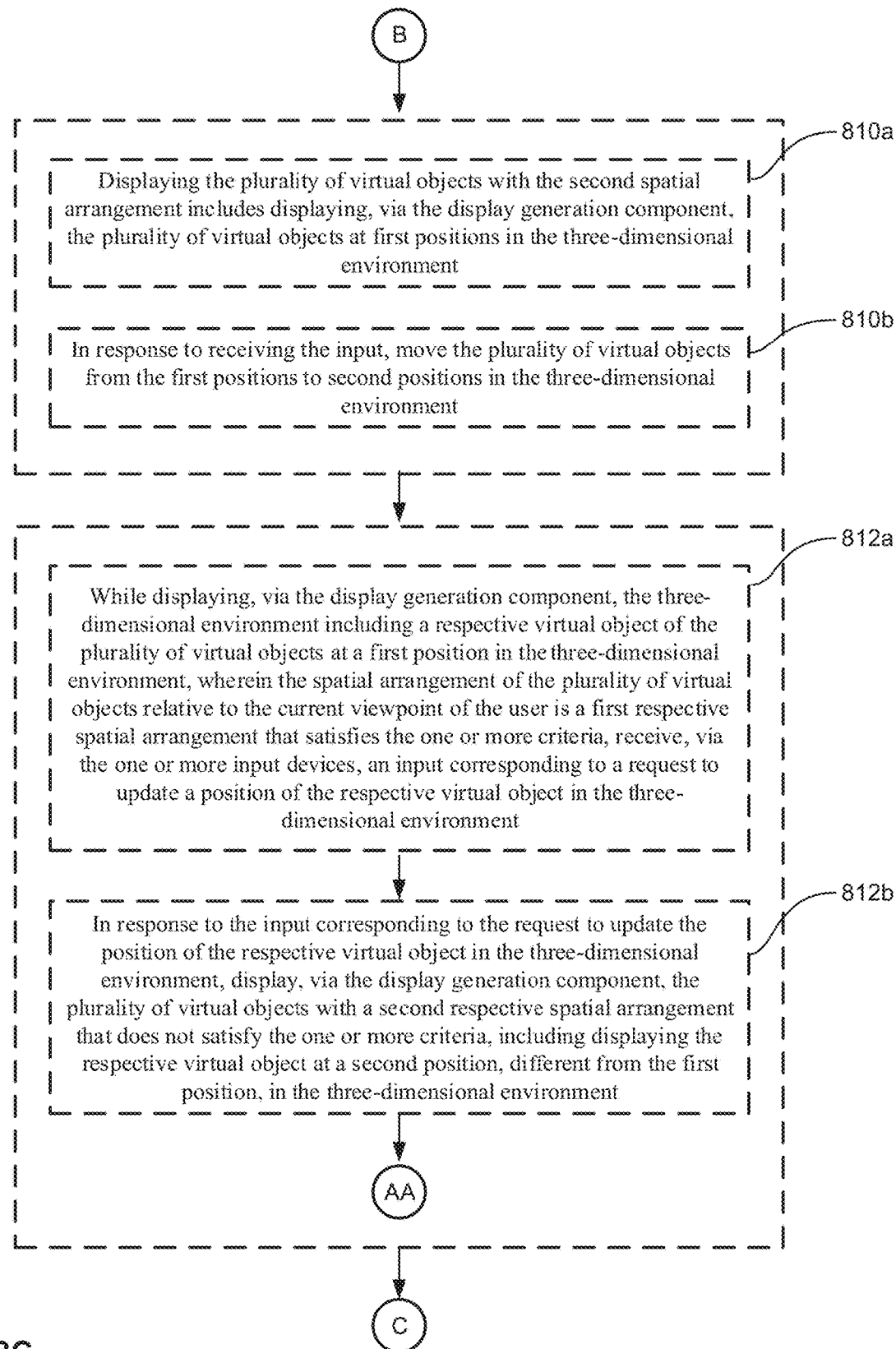
Figure 8D:
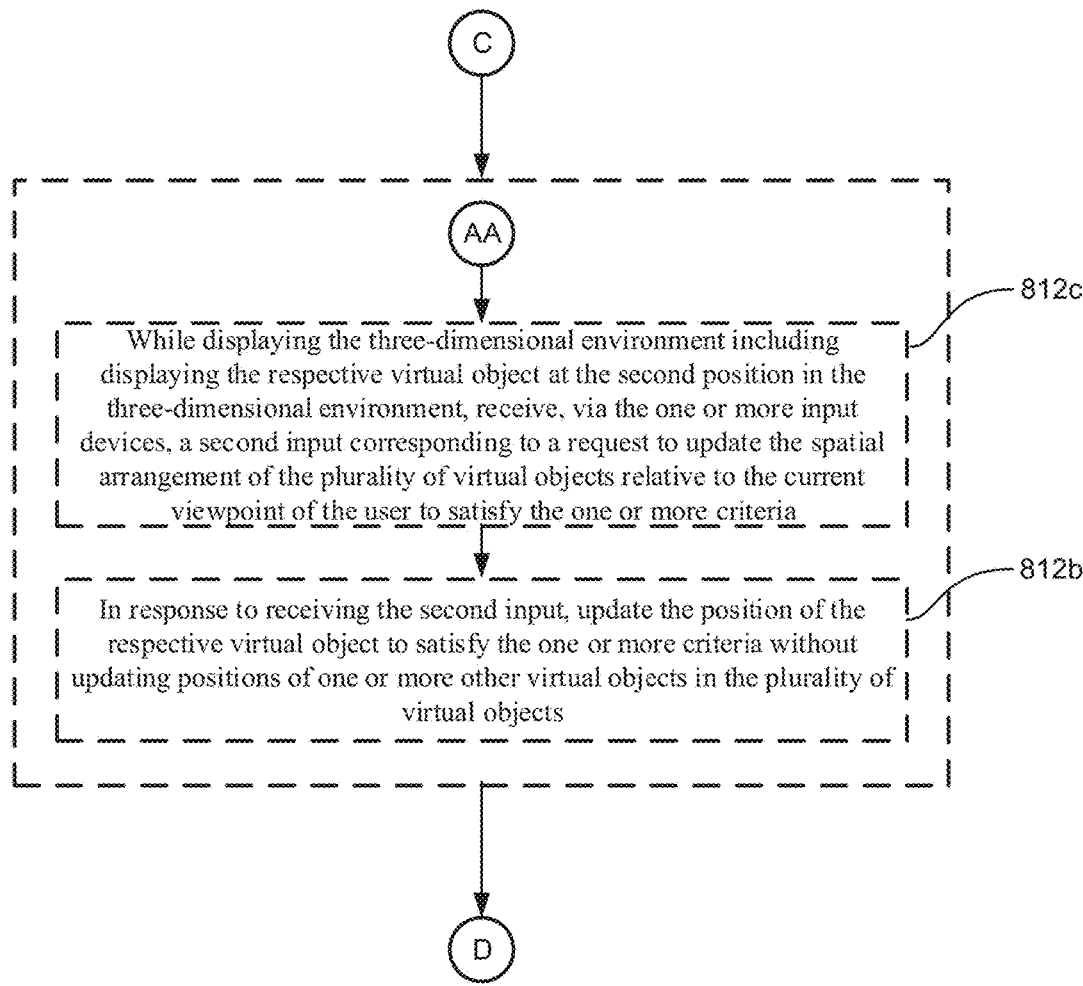
Figure 8E:
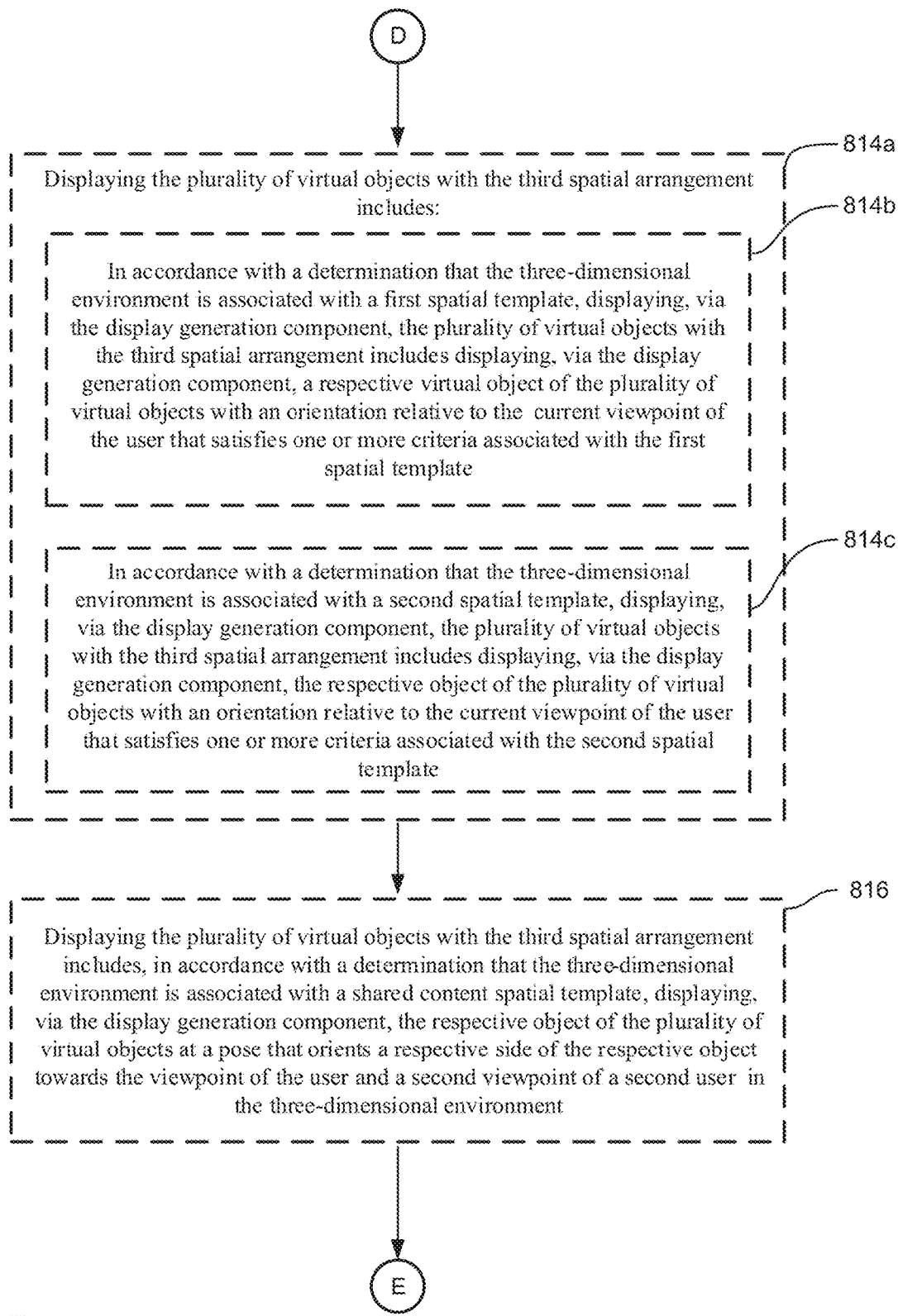
Figure 8F:
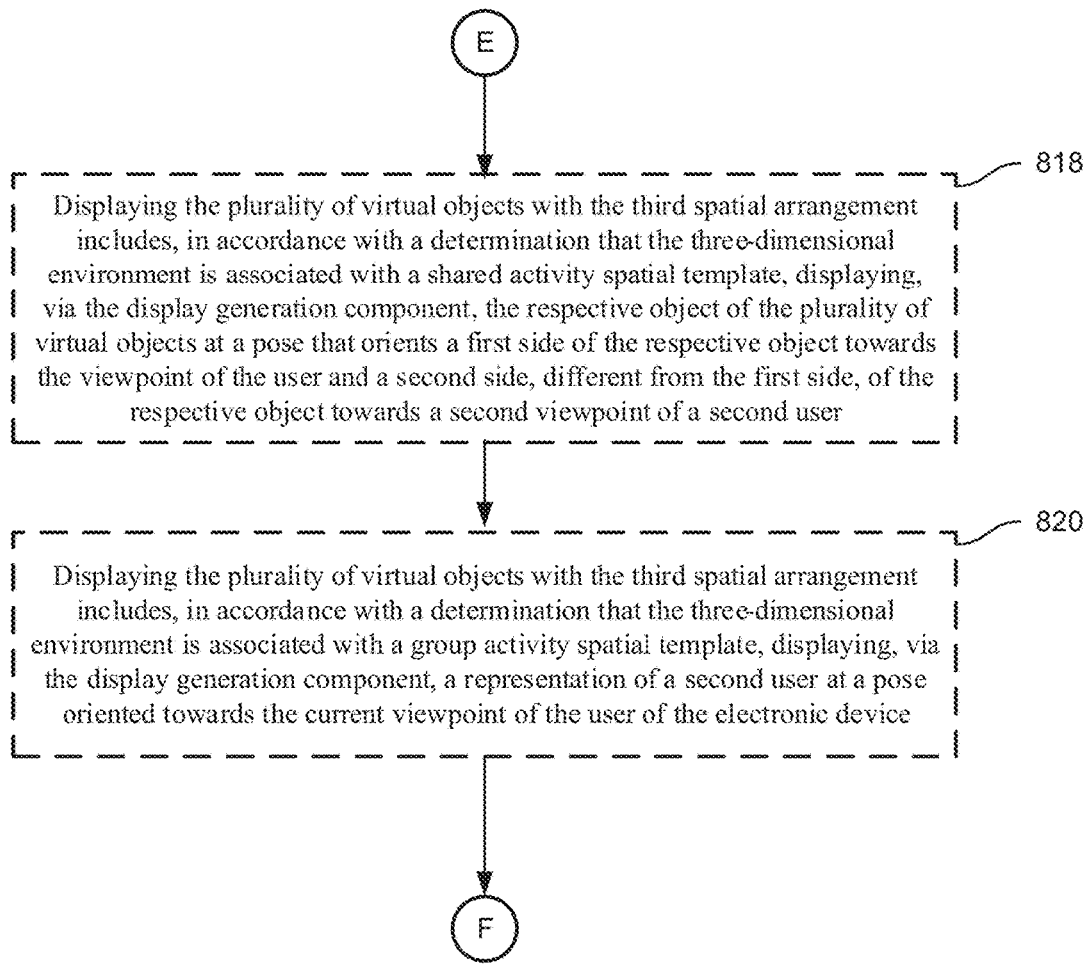
Figure 8G:
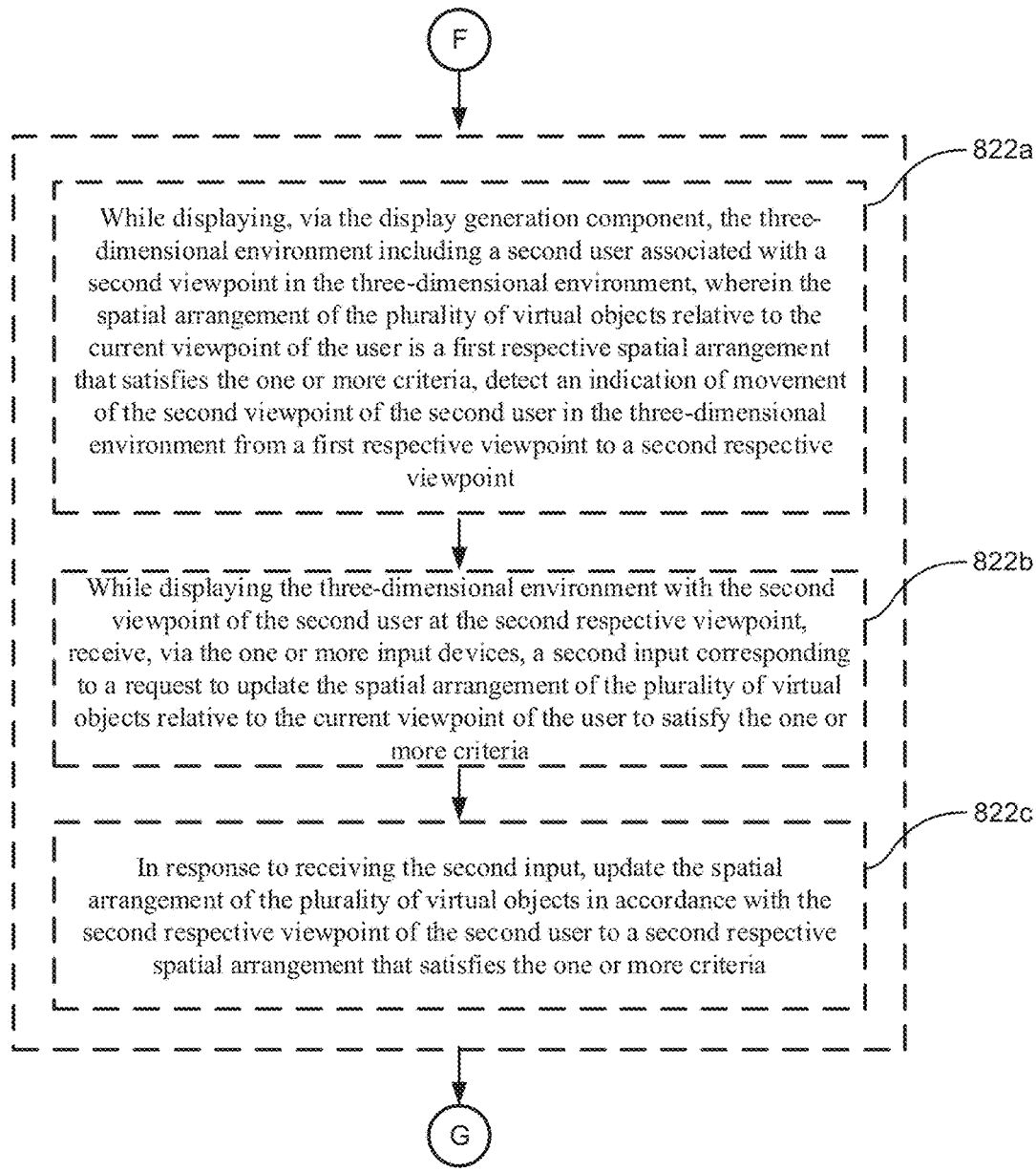
Figure 8H:
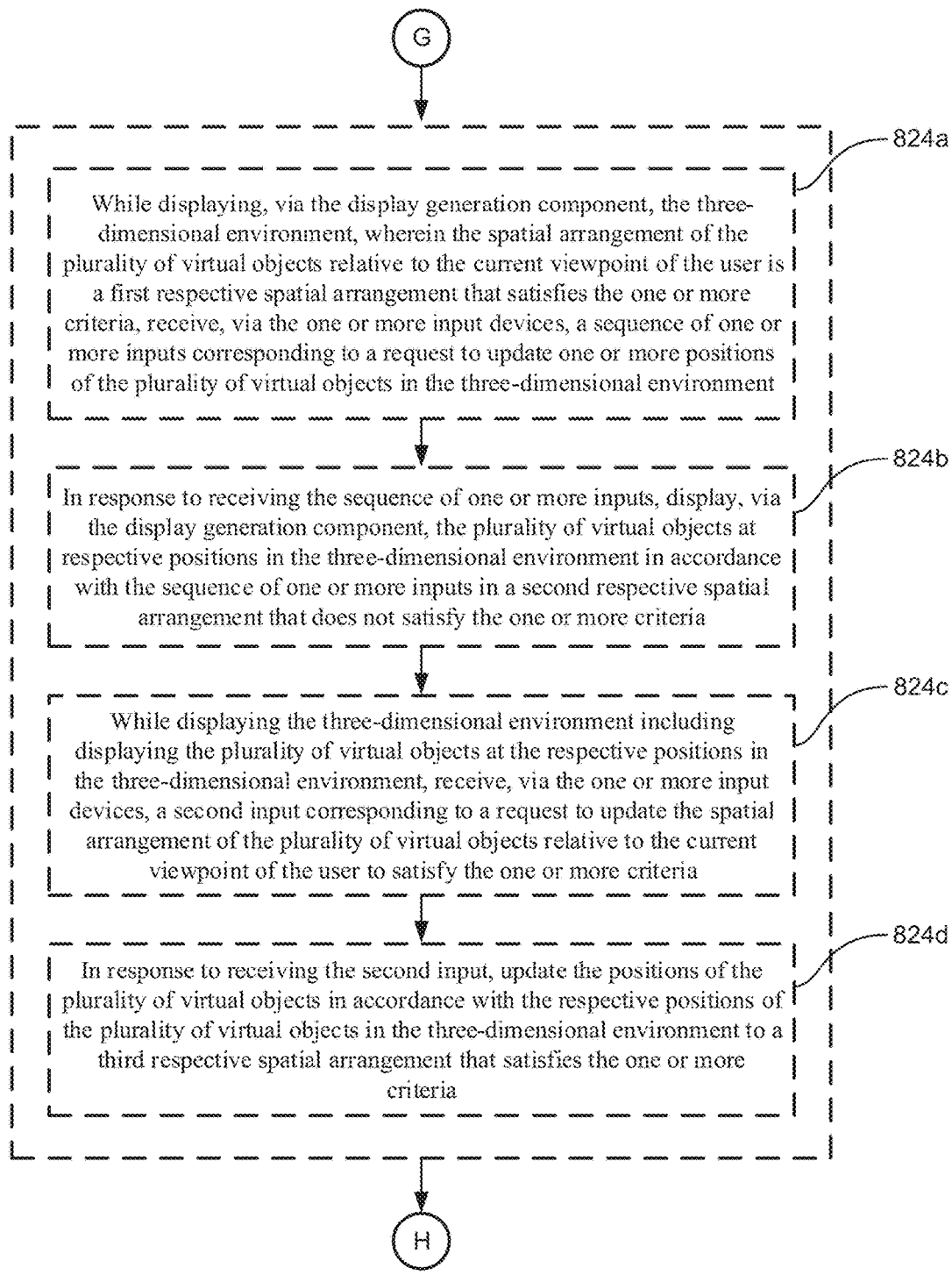
Figure 8I:
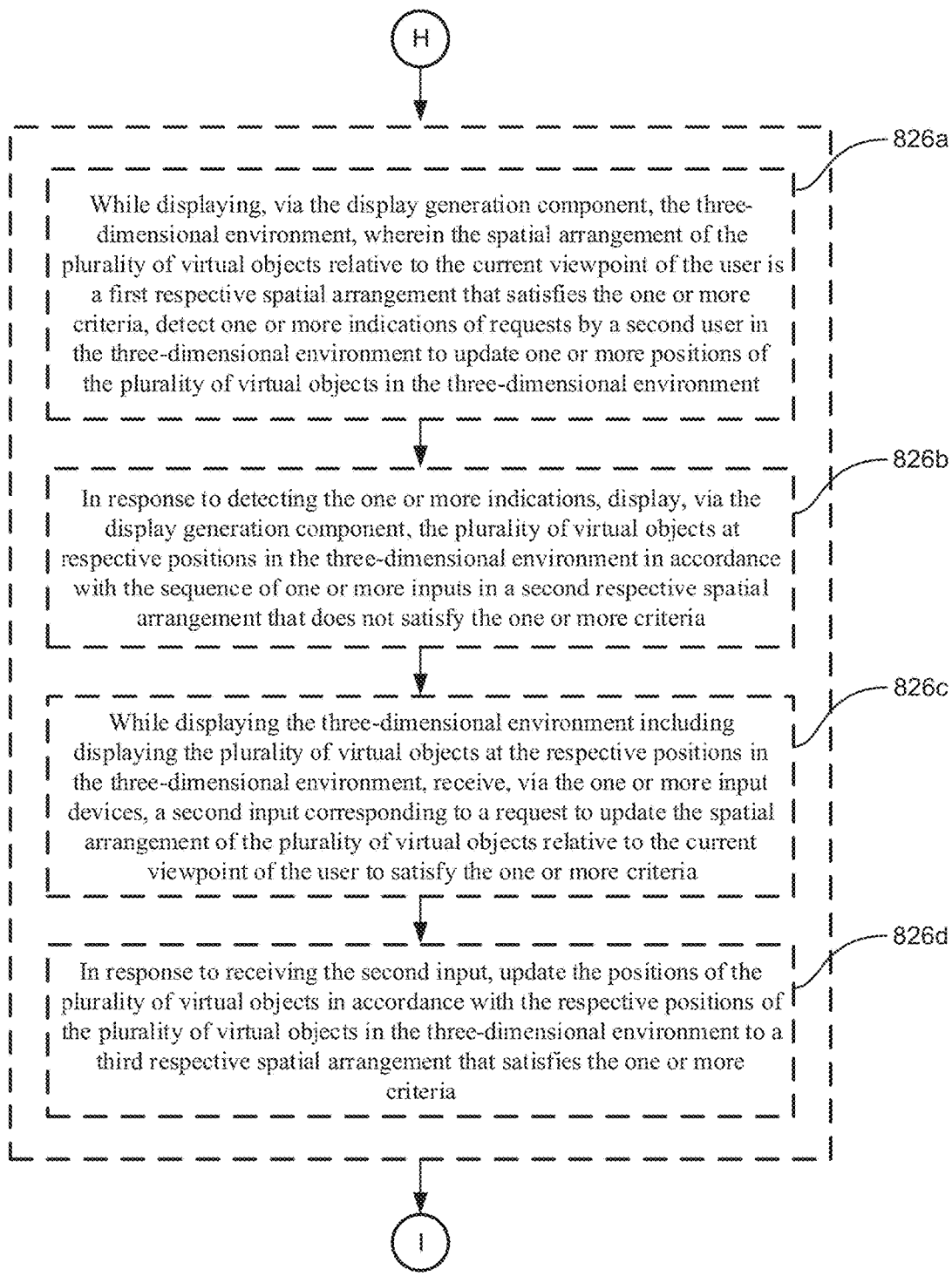
Figure 8J:
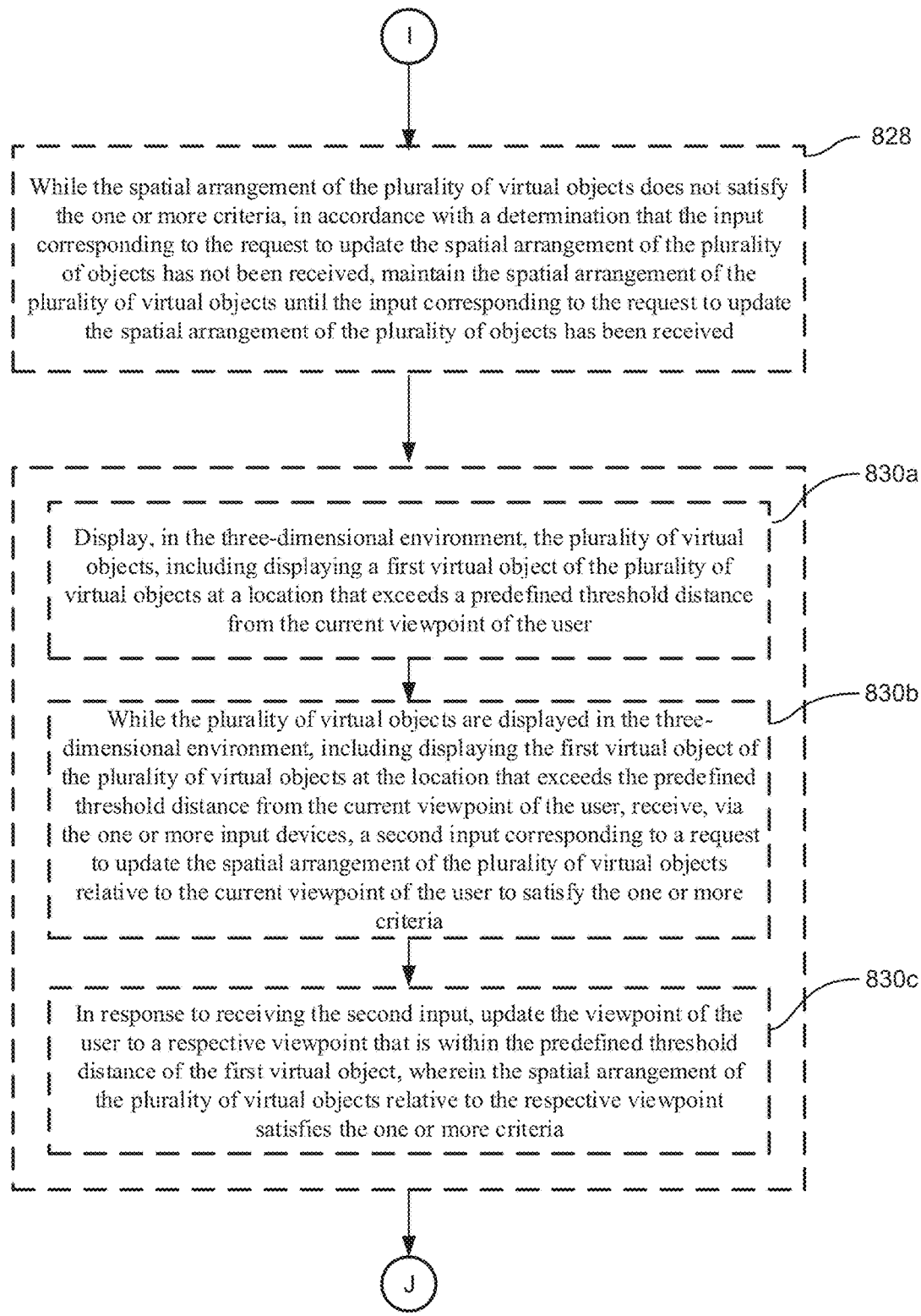
Figure 8K:
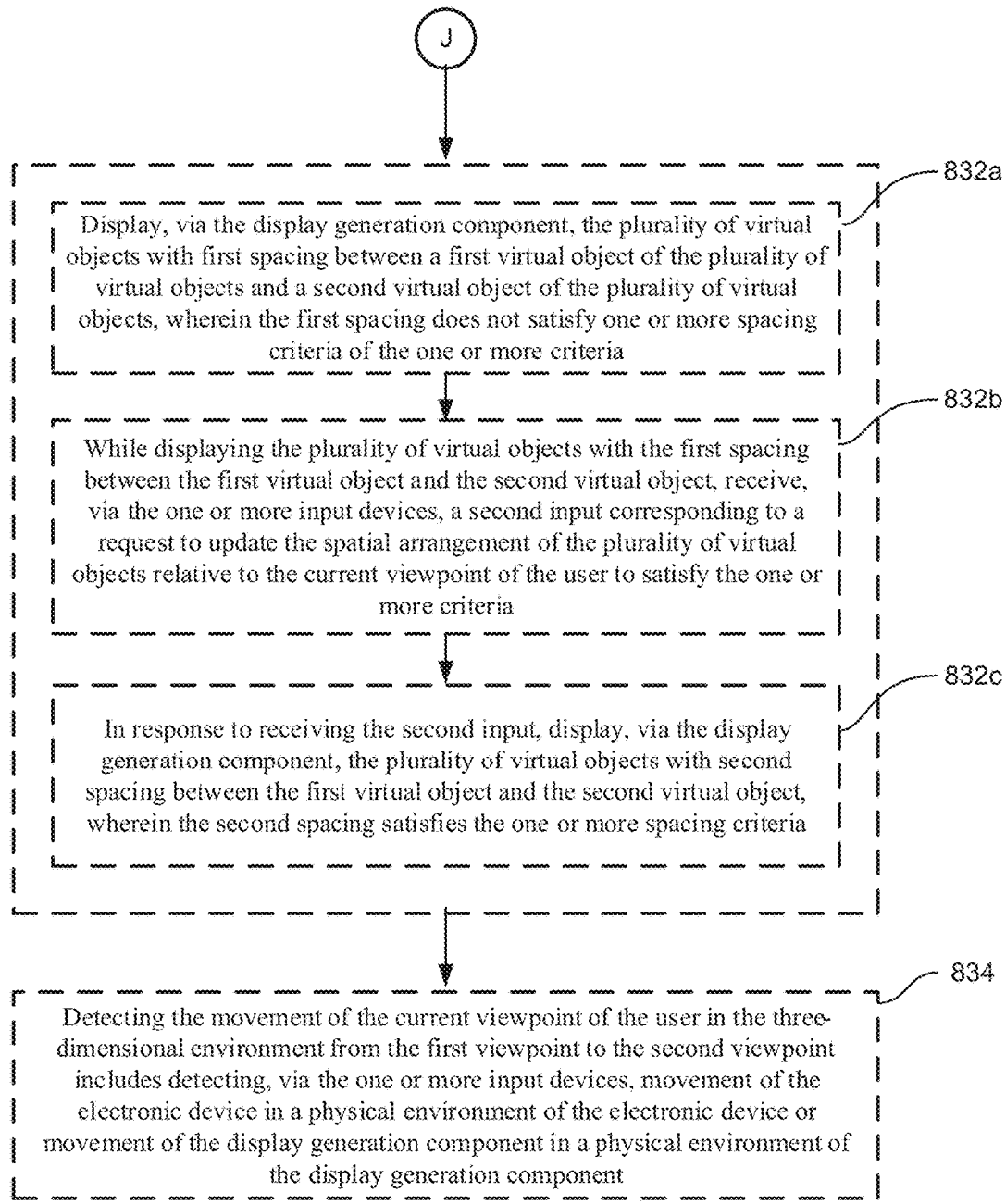

FIG. 7G illustrates an example of the electronic device 101 displaying the three-dimensional environment 702 in response to a recentering input described above with reference to FIG. 7F. In some embodiments, in response to the recentering input, the electronic device 101 updates the viewpoint of the user in the three-dimensional environment 702 so that the field of view of the electronic device 101 includes a representation 708 of the second user, the representation 710 of the second electronic device, and the user interface 714 of the third application.

In some embodiments, the electronic device 101 updates the three-dimensional environment 702 in accordance with a shared activity spatial template associated with the user interface 714 of the third application. For example, the user interface 714 of the third application includes a virtual board game or other content intended to be viewed by the users from different sides of the user interface 714 of the third application. Thus, in some embodiments, updating the three-dimensional environment 702 in response to the request to recenter includes updating the spatial arrangement of the viewpoint of the user, the user interface 714 of the third application, the representation 708 of the second user, and the representation 710 of the second electronic device to position the user interface 714 of the third application between the viewpoint of the user and the representation 708 of the second user.

In some embodiments, the electronic device 101 updates the three-dimensional environment 702 in accordance with other spatial templates depending on which spatial templates apply to the three-dimensional environment 702. For example, in some embodiments, the three-dimensional environment 702 is associated with a group activity spatial template that may not be associated with a particular user interface in the three-dimensional environment 702. For example, the group activity spatial template is used for (e.g., virtual) meetings between users. In some embodiments, the electronic device 101 applies the group activity spatial template by recentering the viewpoint of the user to a position where the viewpoints of the users are facing each other and a plurality of users are in the field of view of the user of the electronic device 101.

In some embodiments, in FIG. 7G, the three-dimensional environment 702 is updated in accordance with the position of and/or movement of the representation 708 of the second user. For example, recentering the three-dimensional environment 702 includes updating the three-dimensional environment 702 so that the users are across from each other with respect to the user interface 714 of the third application. In some embodiments, if the second user 708 had a different position in the three-dimensional environment 702 than the position illustrated in FIG. 7F when the recentering input was received, the electronic device 101 would recenter the three-dimensional environment 702 differently than the manner illustrated in FIG. 7G (e.g., in accordance with the position of the second user 708 in the three-dimensional environment 702) in response to the recentering input illustrated in FIG. 7F.

Additional or alternative details regarding the embodiments illustrated in FIGS. 7A-7G are provided below in description of method 800 described with reference to FIGS. 8A-8K.

FIGS. 8A-8K is a flowchart illustrating a method of updating the spatial arrangement of one or more virtual objects in a three-dimensional environment in accordance with some embodiments. In some embodiments, the method 800 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, method 800 is performed at an electronic device (e.g., 101) in communication with a display generation component and one or more input devices (e.g., a mobile device (e.g., a tablet, a smartphone, a media player, or a wearable device), or a computer). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc. In some embodiments, the electronic device is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, such as in FIG. 7A, while displaying, via the display generation component (e.g., 120), a three-dimensional environment (e.g., 702) including a plurality of virtual objects (e.g., 704, 706) with a first spatial arrangement relative to a current viewpoint of a user of the electronic device (e.g., 101), the electronic device (e.g., 101) detects (802a), via the one or more input devices (e.g., 314), movement of the current viewpoint of the user in the three-dimensional environment (e.g., 702) from a first viewpoint to a second viewpoint. In some embodiments, the three-dimensional environment includes virtual objects, such as application windows, operating system elements, representations of other users, and/or content items and/or representations of physical objects in the physical environment of the electronic device. In some embodiments, the representations of physical objects are displayed in the three-dimensional environment via the display generation component (e.g., virtual or video passthrough). In some embodiments, the representations of physical objects are views of the physical objects in the physical environment of the electronic device visible through a transparent portion of the display generation component (e.g., true or real passthrough). In some embodiments, the electronic device displays the three-dimensional environment from the viewpoint of the user at a location in the three-dimensional environment corresponding to the physical location of the electronic device in the physical environment of the electronic device. In some embodiments, the three-dimensional environment is generated, displayed, or otherwise caused to be viewable by the device (e.g., a computer-generated reality (XR) environment such as a virtual reality (VR) environment, a mixed reality (MR) environment, or an augmented reality (AR) environment, etc.). In some embodiments, detecting movement of the viewpoint of the user includes detecting movement of at least a portion of the user (e.g., the user's head, torso, hand, etc.). In some embodiments, detecting movement of the viewpoint of the user includes detecting movement of the electronic device or display generation component. In some embodiments, displaying the three-dimensional environment from the viewpoint of the user includes displaying the three-dimensional environment from a perspective associated with the location of the viewpoint of the user in the three-dimensional environment. In some embodiments, updating the viewpoint of the user causes the electronic device to display the plurality of virtual objects from a perspective associated with the location of the updated viewpoint of the user. For example, if the viewpoint of the user moves to the left, the electronic device updates the position of the plurality of virtual objects displayed via the display generation component to move to the right.

In some embodiments, such as in FIG. 7B, in response to detecting the movement corresponding to movement of the current viewpoint of the user from the first viewpoint to the second viewpoint, the electronic device (e.g., 101) displays (e.g., 802b), via the display generation component (e.g., 120), the three-dimensional environment (e.g., 702) from the second viewpoint including the plurality of virtual objects with a second spatial arrangement, different from the first spatial arrangement, relative to the current viewpoint of the user. In some embodiments, the locations of the plurality of virtual objects in the three-dimensional environment stay the same and the location of the viewpoint of the user in the three-dimensional environment changes, thereby changing the spatial arrangement of the plurality of objects relative to the viewpoint of the user. For example, if the viewpoint of the user moves away from the plurality of virtual objects, the electronic device displays the virtual objects at the same locations in the three-dimensional environment prior to movement of the viewpoint of the user and increases the amount of space between the viewpoint of the user and the virtual objects (e.g., by displaying the virtual objects at a smaller size, by increasing the stereoscopic depth of the objects, etc.).

In some embodiments, such as in FIG. 7B, while displaying the three-dimensional environment (e.g., 702) from the second viewpoint including the plurality of virtual objects (e.g., 704, 706) with the second spatial arrangement relative to the current viewpoint of the user, the electronic device (e.g., 101) receives (802c), via the one or more input devices (e.g., 314), an input corresponding to a request to update a spatial arrangement of the plurality of virtual objects relative to the current viewpoint of the user to satisfy one or more criteria that specify a range of distances or a range of orientations of virtual objects relative to the current viewpoint of the user (e.g., and not based on a prior viewpoint of the user). In some embodiments, the input and/or one or more inputs described with reference to method 800 are air gesture inputs. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

As will be described in more detail below, in some embodiments, the input corresponding to the request to update the spatial arrangement of the plurality of objects relative to the viewpoint of the user to satisfy the one or more criteria is an input directed to a hardware button, switch, etc. in communication with (e.g., incorporated with) the electronic device. As will be described in more detail below, in some embodiments, the input corresponding to the request to update the three-dimensional environment to satisfy the one or more criteria is an input directed to a selectable option displayed via the display generation component. In some embodiments, while the viewpoint of the user is the second viewpoint and the plurality of virtual objects are displayed with the second spatial arrangement relative to the viewpoint of the user, the spatial orientation of the plurality of virtual objects is not based on the current viewpoint of the user. For example, the spatial arrangement of the plurality of objects is based on the first viewpoint of the user or another viewpoint of the user prior to the second viewpoint. In some embodiments, the electronic device initially presents virtual objects at locations in the three-dimensional environment based on the viewpoint of the user at the time the virtual objects were initially displayed. In some embodiments, the virtual objects are initially placed according to one or more criteria including criteria satisfied when an interactive portion of the virtual objects are oriented towards the viewpoint of the user, the virtual objects do not obstruct the view of other virtual objects from the viewpoint of the user, the virtual objects are within a threshold distance (e.g., 10, 20, 30, 40, 50, 100, 200, 300, 400, 500, 1000, or 2000 centimeters) of the viewpoint of the user, the virtual objects are within a threshold distance (e.g., 1, 5, 10, 20, 30, 40, 50, 100, 200, 300, 400, 500, 1000, or 2000 centimeters) of each other, and the like. In some embodiments, the input is different from an input requesting to update the positions of one or more objects in the three-dimensional environment (e.g., relative to the viewpoint of the user), such as the inputs described herein with reference to method 1000.

In some embodiments, such as in FIG. 7C in response to the input corresponding to the request to update the three-dimensional environment (e.g., 702), the electronic device (e.g., 101) displays (e.g., 802b), via the display generation component (e.g., 120), the three-dimensional environment (e.g., 702) from the second viewpoint including displaying the plurality of virtual objects (e.g., 704, 706) with a third spatial arrangement, different from the second spatial arrangement, relative to the viewpoint of the user, wherein the third spatial arrangement of the plurality of virtual objects satisfies the one or more criteria. In some embodiments, the one or more criteria include criteria that are satisfied when an interactive portion of the virtual objects are oriented towards the viewpoint of the user, the virtual objects do not obstruct the view of other virtual objects from the viewpoint of the user, the virtual objects are within a threshold distance (e.g., 10, 20, 30, 40, 50, 100, 200, 300, 400, 500, 1000, or 2000 centimeters) of the viewpoint of the user, the virtual objects are within a threshold distance (e.g., 1, 5, 10, 20, 30, 40, 50, 100, 200, 300, 400, 500, 1000, or 2000 centimeters) of each other, and the like. In some embodiments, the third spatial arrangement is the same as the first spatial arrangement (e.g., the first spatial arrangement was based on the first viewpoint of the user). In some embodiments, the third spatial arrangement is different from the first spatial arrangement (e.g., the first spatial arrangement was not based on the first viewpoint of the user, real objects in the three-dimensional environment prevent placement of the virtual objects in the first spatial arrangement while the viewpoint of the user is the second viewpoint). In some embodiments, displaying the plurality of virtual objects with the third spatial arrangement includes updating the location (e.g., and/or pose) of one or more of the virtual objects while maintaining the second viewpoint of the user at a constant location in the three-dimensional environment. In some embodiments, in response to the input, the electronic device updates the positions of the virtual objects from locations not necessarily oriented around the viewpoint of the user to locations oriented around the viewpoint of the user.

Updating the three-dimensional environment to include displaying the plurality of virtual objects in the third spatial arrangement that satisfies the one or more criteria in response to the input enhances user interactions with the electronic device by providing an efficient way of displaying the virtual objects in a spatial arrangement based on the updated viewpoint of the user, thereby enabling the user to use the electronic device quickly and efficiently with enhanced placement of virtual objects in the three-dimensional environment.

In some embodiments, such as in FIG. 7B, receiving the input corresponding to the request to update the spatial arrangement of the plurality of virtual objects includes receiving the input via a hardware input device (e.g., 703) of the one or more input devices (804). In some embodiments, the hardware input device detects inputs by detecting physical manipulation of the mechanical input device by the user. In some embodiments, the mechanical input device is a button, switch, dial, or the like.

Updating the spatial arrangement of the plurality of virtual objects in response to an input received via a mechanical input device provides an efficient and consistent way of updating the spatial arrangement of the plurality of virtual objects in the three-dimensional environment, thereby enabling the user to use the electronic device quickly and efficiently with enhanced input mechanisms.

In some embodiments, such as in FIG. 7B, the input corresponding to the request to update the spatial arrangement of the plurality of virtual objects satisfies one or more first input criteria (806a). In some embodiments, the one or more first input criteria are associated with the input corresponding to the request to update the spatial arrangement of the plurality of virtual objects. In some embodiments, the electronic device is configured to accept a plurality of inputs corresponding to different respective operations via the mechanical input device that satisfy different sets of criteria in order to determine the operation to which the received input corresponds. For example, the mechanical input device is a button or dial that is configured to be pushed like a button and the one or more first criteria are satisfied when the electronic device detects that the mechanical input device is pressed for a time period that satisfies (e.g., is greater than or less than) a threshold time period (e.g., 0.1, 0.2, 0.3, 0.5, 1, 2, 3, 4, or 5 seconds).

In some embodiments, such as in FIG. 7B, the electronic device (e.g., 101) receives (806b), via the hardware input device (e.g., 703), a second input. In some embodiments, the second input does not satisfy the one or more first input criteria.

In some embodiments, in response to receiving the second input, in accordance with a determination that the second input satisfies one or more second input criteria different from the one or more first input criteria, the electronic device (e.g., 101) performs (806c) a respective operation corresponding to the second input without updating the spatial arrangement of the plurality of virtual objects (e.g., displaying, via the display generation component, a home user interface). For example, the one or more first input criteria are satisfied when the input includes detecting that the mechanical input device is pressed for more than the threshold time period and the one or more second input criteria are satisfied when the input includes detecting that the mechanical input device is pressed for less than the threshold time period. As another example, the one or more first input criteria are satisfied when the input includes detecting that the mechanical input device is pressed for less than the threshold time period and the one or more second input criteria are satisfied when the input includes detecting that the mechanical input device is pressed for more than the threshold time period. In some embodiments, in accordance with a determination that the second input satisfies one or more third input criteria different from the one or more first input criteria and the one or more second input criteria, the electronic device modifies an amount of visual emphasis with which the electronic device displays, via the display generation component, one or more representations of real objects in the three-dimensional environment. In some embodiments, the one or more third input criteria include a criterion that is satisfied when the input includes a directional aspect, such as turning of a dial, selection of a directional button, or movement of a contact on a touch sensitive surface. In response to the third input criteria being satisfied, the electronic device optionally modifies the relative visual emphasis of representations of the physical environment being displayed in the three-dimensional environment relative to other portions of the three-dimensional environment (e.g., without updating the spatial arrangement of the plurality of virtual objects and/or without performing the respective operation). In some embodiments, the electronic device modifies the amount of relative visual emphasis in accordance with a movement metric (e.g., a direction, speed, duration, distance, etc. of the movement or directional component of the input) of the input that satisfies the third input criteria.

Determining whether the input received via the mechanical input device corresponds to a request to update the spatial arrangement of the plurality of virtual objects based on one or more input criteria provides an efficient way of performing multiple operations in response to inputs received via one mechanical input device, thereby enhancing user interactions with the electronic device by providing a streamlined human-machine interface.

In some embodiments, such as in FIG. 7B, receiving the input corresponding to the request to update the spatial arrangement of the plurality of virtual objects (e.g., 704, 706) includes detecting selection of a user interface element (e.g., 712) displayed in the three-dimensional environment (e.g., 702) via the display generation component (e.g., 120) (808). In some embodiments, selection of the user interface element is detected via an input device (e.g., keyboard, trackpad, stylus, hand tracking device, eye tracking device) that manipulates a cursor and detects selection of a user interface element at a location at which the cursor is displayed. In some embodiments, selection of the user interface element is detected via an input device (e.g., touch sensitive surface, hand tracking device) that tracks a location corresponding to a respective portion (e.g., a hand) of the user and detects selection when a selection gesture (e.g., a respective hand shape, a three-dimensional gesture made with the hand, a touch gesture detected via a touch sensitive surface) is performed at a location corresponding to a selectable user interface element. In some embodiments, detecting selection of the user interface element includes detecting the attention (e.g., gaze) of the user directed to the user interface element while detecting a predetermined gesture of a respective portion (e.g., hand) of the user. For example, the gesture is a pinch gesture in which the thumb touches another finger of the hand. As another example, the gesture is a pressing gesture in which an extended finger of the hand presses the user interface element in the three-dimensional environment (e.g., while one or more other fingers are curled towards the palm).

Receiving the input corresponding to the request to update the spatial arrangement of the plurality of virtual objects by detecting selection of a user interface element provides an efficient way of indicating to the user how to update the spatial arrangement of the plurality of virtual objects, thereby enhancing the user's interactions with the electronic device with improved visual feedback, enabling the user to use the device more quickly and efficiently.

In some embodiments, such as in FIG. 7B, displaying the plurality of virtual objects (e.g., 704, 706) with the second spatial arrangement includes displaying, via the display generation component (e.g., 120), the plurality of virtual objects (e.g., 704, 706) at first positions in the three-dimensional environment (e.g., 702) (810a) (e.g., relative to a respective reference point in the three-dimensional environment) (810a). In some embodiments, the electronic device displays the plurality of virtual objects with the second spatial arrangement in response to detecting movement of the viewpoint of the user.

In some embodiments, such as in FIG. 7C, in response to receiving the input, the electronic device (e.g., 101) moves (810a) the plurality of virtual objects from the first positions to second positions in the three-dimensional environment (e.g., relative to the respective reference point in the three-dimensional environment) (810b). In some embodiments, the electronic device updates the positions of the plurality of virtual objects in the three-dimensional environment (e.g., rather than updating the position of the viewpoint of the user in the three-dimensional environment) to satisfy the one or more criteria in response to receiving the input. In some embodiments, the electronic device updates the positions of the plurality of virtual objects and updates the position of the viewpoint of the user to satisfy the one or more criteria in response to receiving the input.

Satisfying the one or more criteria by updating the positions of the plurality of virtual objects in response to receiving the input after detecting movement of the viewpoint of the user provides an efficient way of presenting the plurality of virtual objects in a manner that is comfortable to the user, thereby enhancing user interactions with the electronic device by reducing the cognitive burden, time, and inputs needed to interact with the plurality of virtual objects.

In some embodiments, such as in FIG. 7C, while displaying, via the display generation component (e.g., 120), the three-dimensional environment (e.g., 702) including a respective virtual object (e.g., 704) of the plurality of virtual objects (e.g., 704, 706) at a first position in the three-dimensional environment (e.g., 702), wherein the spatial arrangement of the plurality of virtual objects relative to the current viewpoint of the user is a first respective spatial arrangement that satisfies the one or more criteria, the electronic device (e.g., 101) receives (812a), via the one or more input devices, an input corresponding to a request to update a position of the respective virtual object (e.g., 704) in the three-dimensional environment (e.g., 702) (e.g., similar to object movement inputs described with reference to methods 1000 and/or 1400). In some embodiments, the input is directed to a user interface element displayed proximate to the respective virtual object that, when selected, causes the electronic device to initiate a process to move the respective virtual object in the three-dimensional environment.

In some embodiments, such as in FIG. 7D, in response to the input corresponding to the request to update the position of the respective virtual object (e.g., 704) in the three-dimensional environment (e.g., 702), the electronic device (e.g., 101) displays (812b), via the display generation component (e.g., 120), the plurality of virtual objects (e.g., 704, 706) with a second respective spatial arrangement that does not satisfy the one or more criteria, including displaying the respective virtual object (e.g., 704) at a second position, different from the first position, in the three-dimensional environment (e.g., 702). In some embodiments, the electronic device does not detect additional inputs corresponding to requests to update the positions of other virtual objects in the three-dimensional environment. In some embodiments, the electronic device receives one or more additional inputs corresponding to requests to update the positions of one or more other virtual objects in manners that continue to satisfy the one or more criteria.

In some embodiments, such as in FIG. 7D, while displaying the three-dimensional environment (e.g., 702) including displaying the respective virtual object (e.g., 704) at the second position in the three-dimensional environment, the electronic device (e.g., 101) receives (812c), via the one or more input devices, a second input corresponding to a request to update the spatial arrangement of the plurality of virtual objects (e.g., 704, 706) relative to the current viewpoint of the user to satisfy the one or more criteria.

In some embodiments, such as in FIG. 7E, in response to receiving the second input, the electronic device (e.g., 101) updates (812b) the position of the respective virtual object (e.g., 704) to satisfy the one or more criteria without updating positions of one or more other virtual objects (e.g., 706) in the plurality of virtual objects (e.g., and without updating the position and/or orientation of the viewpoint of the user in the three-dimensional environment). In some embodiments, if movement of a second virtual object in the three-dimensional environment causes the one or more criteria not to be satisfied, in response to the second input, the electronic device updates the position of the second virtual object to satisfy the one or more criteria without updating the positions of one or more other virtual objects.

Updating the position of the respective virtual object without updating the positions of the one or more other virtual objects in response to the second input provides enhanced access to the respective virtual object while maintaining display of the other virtual objects at their respective positions, thereby reducing the cognitive burden, time, and inputs needed to interact with the plurality of virtual objects.

In some embodiments, such as in FIG. 7C, displaying the plurality of virtual objects (e.g., 704, 706) with the third spatial arrangement includes (814), in accordance with a determination that the three-dimensional environment (e.g., 702) is associated with a first spatial template, displaying, via the display generation component (e.g., 120), the plurality of virtual objects (e.g., 704, 706) with the third spatial arrangement includes displaying, via the display generation component (e.g., 120), a respective virtual object (e.g., 706) of the plurality of virtual objects with an orientation relative to the current viewpoint of the user that satisfies one or more criteria associated with the first spatial template (814b). In some embodiments, a spatial template identifies one or more criteria used by the electronic device to select positions and orientations of the virtual objects and/or viewpoints of one or more users in the three-dimensional environment. In some embodiments, the spatial template is set based on the virtual objects included in the three-dimensional environment (e.g., spatial templates associated with respective virtual objects) and/or set based on a user-defined setting. Exemplary spatial templates according to some embodiments are described in more detail below. For example, if the spatial template is a shared content spatial template and the respective virtual object is a content item to be consumed by multiple users in the three-dimensional environment, the electronic device displays the respective virtual object with a position and orientation that orients a respective side of the content item including the content towards the viewpoints of the users in the three-dimensional environment.

In some embodiments, such as in FIG. 7G, displaying the plurality of virtual objects (e.g., 714) with the third spatial arrangement includes (814), in accordance with a determination that the three-dimensional environment (e.g., 702) is associated with a second spatial template, displaying, via the display generation component (e.g., 120), the plurality of virtual objects with the third spatial arrangement includes displaying, via the display generation component (e.g., 120), the respective object (e.g., 714) of the plurality of virtual objects with an orientation relative to the current viewpoint of the user that satisfies one or more criteria associated with the second spatial template (814c). For example, if the spatial template is a shared activity spatial template and the respective virtual object is a virtual board game being played by a plurality of users in the three-dimensional environment, the electronic device displays the respective virtual object between the viewpoints of the users in the three-dimensional environment so that the viewpoints of the users are facing different sides of the respective virtual object.

Displaying the respective virtual object with different orientations to satisfy different criteria associated with different spatial templates in response to the input corresponding to the request to update the spatial arrangement of the plurality of virtual objects provides an efficient and versatile way of presenting virtual objects with locations and orientations in the three-dimensional environment that facilitate user interaction with the virtual objects for a variety of functions, thereby enabling the user to user the electronic device quickly and efficiently.

In some embodiments, such as in FIG. 7C, displaying the plurality of virtual objects (e.g., 704, 706) with the third spatial arrangement includes, in accordance with a determination that the three-dimensional environment (e.g., 702) is associated with a shared content spatial template, displaying, via the display generation component (e.g., 120), the respective object (e.g., 706) of the plurality of virtual objects at a pose that orients a respective side of the respective object (e.g., 706) towards the viewpoint of the user and a second viewpoint of a second user (or more users) in the three-dimensional environment (e.g., 702) (816). In some embodiments, the shared content spatial template is associated with a virtual object that includes content or a user interface of a content (e.g., delivery, playback, streaming, etc.) application. In some embodiments, the respective side of the respective virtual object includes (e.g., visual content of) a content item (e.g., is displaying the content of a movie, television show, etc.). In some embodiments, the shared content spatial template enables multiple users to consume an item of content together from the same side of the item of content by orienting the content towards the viewpoints of both (or more) users.

Positioning the respective side of the respective virtual object oriented towards the viewpoints of the users provides an efficient way of facilitating shared consumption of a content item associated with the respective virtual object, thereby enabling the user to quickly and efficiently configure the three-dimensional environment for shared consumption of the content item.

In some embodiments, such as in FIG. 7G, displaying the plurality of virtual objects (e.g., 714, 708) with the third spatial arrangement includes in accordance with a determination that the three-dimensional environment (e.g., 702) is associated with a shared activity spatial template, displaying, via the display generation component (e.g., 120), the respective object (e.g., 714) of the plurality of virtual objects at a pose that orients a first side of the respective object (e.g., 714) towards the viewpoint of the user and a second side, different from the first side, of the respective object towards a second viewpoint of a second user (818). In some embodiments, the shared activity spatial template is associated with a respective virtual object configured for interaction by multiple users from multiple sides of the virtual object. For example, the respective virtual object is a virtual board game for play by multiple users or a virtual table around which the viewpoints of multiple users are arranged. In some embodiments, the shared activity spatial template enables the users to view the respective virtual object concurrently with representations of other users in the three-dimensional environment displayed at locations of the viewpoints of the other users in the three-dimensional environment.

Positioning different sides of the respective virtual object towards different users in the three-dimensional environment provides an efficient way of facilitating interaction between the users and/or with the respective virtual object, thereby enabling the user to quickly and efficiently configure the three-dimensional environment for shared activity associated with the respective virtual object.

In some embodiments, such as in FIG. 7G, displaying the plurality of virtual objects (e.g., 708, 710) with the third spatial arrangement includes, in accordance with a determination that the three-dimensional environment (e.g., 702) is associated with a group activity spatial template, displaying, via the display generation component (e.g., 120), a representation of a second user (e.g., 708) at a pose oriented towards the current viewpoint of the user of the electronic device (820). In some embodiments, the group activity spatial template is associated with a user-defined setting for interacting with one or more other users in the three-dimensional environment, optionally in a manner unrelated to a respective virtual object other than representations of the one or more other users (e.g., a virtual meeting between the users). In some embodiments, the group activity spatial template causes the electronic device to position the viewpoint of the user in the three-dimensional environment (e.g., and corresponding representations of the users in the three-dimensional environment) at a location such that the viewpoint of the user is oriented towards representations and/or viewpoints of one or more other users in the three-dimensional environment (e.g., without updating the positions of the representations and/or viewpoints of the other users).

Orienting the viewpoint of the user towards the representation of the second user in the three-dimensional environment provides an efficient way of facilitating interaction between the users, thereby enabling the user to quickly and efficiently configure the three-dimensional environment for group activity.

In some embodiments, such as in FIG. 7B, while displaying, via the display generation component (e.g., 120), the three-dimensional environment (e.g., 702) including a second user associated with a second viewpoint in the three-dimensional environment (e.g., 702), wherein the spatial arrangement of the plurality of virtual objects (e.g., 704, 706) relative to the current viewpoint of the user (e.g., and the second viewpoint of the second user) is a first respective spatial arrangement that satisfies the one or more criteria, the electronic device (e.g., 101) detects (822*a*) an indication of movement of the second viewpoint of the second user in the three-dimensional environment from a first respective viewpoint to a second respective viewpoint. In some embodiments, the movement of the second viewpoint of the second user causes the one or more criteria not to be satisfied at the electronic device. In some embodiments, the movement of the second viewpoint of the second user causes the one or more criteria not to be satisfied at the second electronic device being used by the user. In some embodiments, the electronic device detects the indication of movement of the second viewpoint of the second user without receiving one or more inputs corresponding to requests to update the viewpoint of the user and/or poses of the plurality of virtual objects. In some embodiments, the electronic device additionally detects movement of the viewpoint of the user and/or movement of one or more of the virtual objects in manners that continue to satisfy the one or more criteria at the electronic device and/or at the second electronic device being used by the second user.

In some embodiments, such as in FIG. 7B, while displaying the three-dimensional environment with the second viewpoint of the second user at the second respective viewpoint, the electronic device (e.g., 101) receives (822*b*), via the one or more input devices (e.g., 314), a second input corresponding to a request to update the spatial arrangement of the plurality of virtual objects (e.g., 704, 706) relative to the current viewpoint of the user to satisfy the one or more criteria.

In some embodiments, such as in FIG. 7C, in response to receiving the second input, the electronic device (e.g., 101) updates (822*c*) the spatial arrangement of the plurality of virtual objects (e.g., 704, 706) in accordance with the second respective viewpoint of the second user to a second respective spatial arrangement that satisfies the one or more criteria. In some embodiments, the electronic device updates the spatial arrangement of the plurality of virtual objects so that the one or more criteria are satisfied with respect to the viewpoint of the user and with respect to the second viewpoint of the second user. For example, if the second viewpoint of the second user moves to the left of the viewpoint of the user, updating the spatial arrangement of the plurality of virtual objects includes moving or orienting one or more of the virtual objects towards the left relative to the viewpoint of the user (e.g., to orientations based on the viewpoint of the user and the new viewpoint of the second user). As another example, if the second viewpoint of the second user moves to the right of the viewpoint of the user, updating the spatial arrangement of the plurality of virtual objects includes moving or orienting one or more of the virtual objects towards the right relative to the viewpoint of the user.

Updating the spatial arrangement in accordance with the second respective viewpoint of the second user provides an efficient way of satisfying the one or more criteria at the electronic device and at a second electronic device of the second user in response to one input, thereby reducing the number of inputs, time, and cognitive burden needed to configure the three-dimensional environment in a comfortable manner for the user and second user.

In some embodiments, such as in FIG. 7C, while displaying, via the display generation component (e.g., 120), the three-dimensional environment (e.g., 702), wherein the spatial arrangement of the plurality of virtual objects (e.g., 704, 706) relative to the current viewpoint of the user is a first respective spatial arrangement that satisfies the one or more criteria, the electronic device (e.g., 101) receives (824*a*), via the one or more input devices, a sequence of one or more inputs corresponding to a request to update one or more positions of the plurality of virtual objects (e.g., 704) in the three-dimensional environment (e.g., 702). In some embodiments, the sequence of inputs are inputs directed to user interface elements for repositioning respective virtual objects in the three-dimensional environment, such as described with reference to method 1400. In some embodiments, the sequence of inputs are an input corresponding to a request to reposition a plurality of virtual objects together in accordance with one or more steps of method 1000 described in more detail below.

In some embodiments, such as in FIG. 7D, in response to receiving the sequence of one or more inputs, the electronic device (e.g., 101) displays (824*b*), via the display generation component (e.g., 120), the plurality of virtual objects (e.g., 704, 706) at respective positions in the three-dimensional environment (e.g., 702) in accordance with the sequence of one or more inputs in a second respective spatial arrangement that does not satisfy the one or more criteria. In some embodiments, the electronic device does not receive an input corresponding to a request to update the viewpoint of the user. In some embodiments, the electronic device receives an input corresponding to a request to update the viewpoint of the user in a manner that does not cause the one or more criteria not to be satisfied.

In some embodiments, such as in FIG. 7D, while displaying the three-dimensional environment (e.g., 702) including displaying the plurality of virtual objects (e.g., 704, 706) at the respective positions in the three-dimensional environment (e.g., 702), the electronic device (e.g., 101) receives (824*c*), via the one or more input devices (e.g., 314), a second input corresponding to a request to update the spatial arrangement of the plurality of virtual objects (e.g., 704, 706) relative to the current viewpoint of the user to satisfy the one or more criteria.

In some embodiments, such as in FIG. 7E, in response to receiving the second input, the electronic device (e.g., 101) updates (824*d*) the positions of the plurality of virtual objects (e.g., 704, 706) in accordance with the respective positions of the plurality of virtual objects (e.g., 704, 706) in the three-dimensional environment (e.g., 702) to a third respective spatial arrangement that satisfies the one or more criteria. In some embodiments, the third respective spatial arrangement is the same as the first respective spatial arrangement. In some embodiments, the third respective spatial arrangement is different from the first respective spatial arrangement. In some embodiments, the third respective spatial arrangement involves minimum movement and/or re-orientation of the plurality of virtual objects (e.g., from the respective positions and/or orientations with which the virtual objects are displayed in response to the sequence of inputs corresponding to the request to update the one or more positions of the plurality of virtual objects in the three-dimensional environment) in the three-dimensional environment needed to satisfy the one or more criteria.

Updating the positions of the plurality of virtual objects in accordance with the respective positions of the plurality of virtual objects in the three-dimensional environment to satisfy the one or more criteria after the plurality of virtual objects were repositioned provides an efficient way of facilitating user interaction with the plurality of virtual objects, thereby reducing the cognitive burden, time, and inputs needed for convenient user interaction with the plurality of virtual objects.

In some embodiments, while displaying, via the display generation component (e.g., 120), the three-dimensional environment (e.g., 120), wherein the spatial arrangement of the plurality of virtual objects (e.g., 704, 706) relative to the current viewpoint of the user is a first respective spatial arrangement that satisfies the one or more criteria, such as in FIG. 7A, the electronic device (e.g., 101) detects (826*a*) one or more indications of requests by a second user in the three-dimensional environment (e.g., 702) to update one or more positions of the plurality of virtual objects (e.g., 704, 706) in the three-dimensional environment (e.g., 702). In some embodiments, the requests by the second user in the three-dimensional environment include a one or more requests to update the positions of one or more virtual objects (e.g., individually). In some embodiments, the requests by the second user in the three-dimensional environment do not include a request by the second user to update the second viewpoint of the second user in the three-dimensional environment.

In some embodiments, in response to detecting the one or more indications, the electronic device (e.g., 101) displays (826*b*), via the display generation component (e.g., 120), the plurality of virtual objects (e.g., 704, 706) at respective positions in the three-dimensional environment (e.g., 702) in accordance with the sequence of one or more inputs in a second respective spatial arrangement that does not satisfy the one or more criteria, such as in FIG. 7B. In some embodiments, the electronic device does not receive inputs corresponding to requests to update the poses of virtual objects or the viewpoint of the user and does not detect an indication of a request by the second user to update a position of the second viewpoint of the second user. In some embodiments, the electronic device receives inputs corresponding to requests to update poses of the virtual objects and/or the viewpoint of the user and/or detects an indication of a request by the second user to update the position of the second viewpoint of the user, but these updates do not cause the one or more criteria not to be satisfied.

In some embodiments, while displaying the three-dimensional environment (e.g., 702) including displaying the plurality of virtual objects (e.g., 704, 706) at the respective positions in the three-dimensional environment (e.g., 702), the electronic device (e.g., 101) receives (826*c*), via the one or more input devices (e.g., 314), a second input corresponding to a request to update the spatial arrangement of the plurality of virtual objects (e.g., 704, 706) relative to the current viewpoint of the user to satisfy the one or more criteria, such as in FIG. 7B.

In some embodiments, in response to receiving the second input, the electronic device (e.g., 101) updates (826*d*) the positions of the plurality of virtual objects (e.g., 704, 706) in accordance with the respective positions of the plurality of virtual objects (e.g., 704, 706) in the three-dimensional environment (e.g., 702) to a third respective spatial arrangement that satisfies the one or more criteria, such as in FIG. 7C. In some embodiments, the third respective spatial arrangement is the same as the first respective spatial arrangement. In some embodiments, the third respective spatial arrangement is different from the first respective spatial arrangement. In some embodiments, the third respective spatial arrangement involves minimum movement and/or re-orientation of the plurality of virtual objects in the three-dimensional environment (e.g., from the respective positions and/or orientations with which the virtual objects are displayed in response to the indications corresponding to the request to update the one or more positions of the plurality of virtual objects in the three-dimensional environment) needed to satisfy the one or more criteria.

Updating the positions of the plurality of virtual objects in accordance with the respective positions of the plurality of virtual objects in the three-dimensional environment to satisfy the one or more criteria after the plurality of virtual objects were repositioned by the second user provides an efficient way of facilitating user interaction with the plurality of virtual objects, thereby reducing the cognitive burden, time, and inputs needed for convenient user interaction with the plurality of virtual objects.

In some embodiments, while the spatial arrangement of the plurality of virtual objects (e.g., 704, 706) does not satisfy the one or more criteria, such as in FIG. 7B, in accordance with a determination that the input corresponding to the request to update the spatial arrangement of the plurality of objects has not been received, the electronic device (e.g., 101) maintains (828) the spatial arrangement of the plurality of virtual objects (e.g., 704, 706) until the input corresponding to the request to update the spatial arrangement of the plurality of objects (e.g., 704, 706) has been received. In some embodiments, the electronic device does not update the spatial arrangement of the plurality of objects to satisfy the one or more criteria unless and until the input corresponding to the request to update the spatial arrangement of the plurality of objects has been received. In some embodiments, the electronic device does not update the spatial arrangement of the one or more virtual objects to satisfy the one or more criteria automatically.

Maintaining the spatial arrangement of the plurality of virtual objects until the input has been received provides an efficient way of displaying the virtual objects at familiar locations and/or orientations in the three-dimensional environment, thereby enhancing user interactions with the electronic device by enabling the user to locate the virtual objects in the three-dimensional environment quickly and efficiently for interaction.

In some embodiments, the electronic device (e.g., 101) displays (830*a*), in the three-dimensional environment (e.g., 702), the plurality of virtual objects (e.g., 704, 706), including displaying a first virtual object (e.g., 704, 706) of the plurality of virtual objects at a location that exceeds a predefined threshold distance (e.g., 1, 2, 3, 4, 5, 10, 15, 30, or 50 meters) from the current viewpoint of the user, such as in FIG. 7B. In some embodiments, a second virtual object is positioned at a location exceeding the predefined threshold distance from the viewpoint of the user. In some embodiments, multiple (e.g., all) virtual objects are positioned at locations exceeding the predefined threshold distance from the viewpoint of the user. In some embodiments, the one or more criteria include a criterion that is satisfied when multiple (e.g., all) virtual objects are positioned withing the predefined threshold distance from the current viewpoint of the user.

In some embodiments, such as in FIG. 7B, while the plurality of virtual objects (e.g., 704, 706) are displayed in the three-dimensional environment (e.g., 702), including displaying the first virtual object of the plurality of virtual objects (e.g., 704, 706) at the location that exceeds the predefined threshold distance from the current viewpoint of the user, the electronic device (e.g., 101) receives (830*b*), via the one or more input devices, a second input corresponding to a request to update the spatial arrangement of the plurality of virtual objects (e.g., 704, 706) relative to the current viewpoint of the user to satisfy the one or more criteria.

In some embodiments, such as in FIG. 7C, in response to receiving the second input, the electronic device (e.g., 101) updates (830*c*) the viewpoint of the user to a respective viewpoint that is within the predefined threshold distance of the first virtual object (e.g., 704, 706), wherein the spatial arrangement of the plurality of virtual objects (e.g., 704, 706) relative to the respective viewpoint satisfies the one or more criteria. In some embodiments, the electronic device updates the viewpoint of the user without updating the locations and/or orientations of the virtual objects. In some embodiments, the electronic device updates the viewpoint of the user and updates locations and/or orientations of virtual objects. In some embodiments, if it is possible to satisfy the one or more criteria by updating the viewpoint of the user without updating the positions and or orientations of the virtual objects, the electronic device updates the viewpoint of the user without updating the positions and/or orientations of the virtual objects in response to the second input.

Updating the viewpoint of the user to satisfy the one or more criteria in response to the second viewpoint when the first virtual object is positioned further than the predefined threshold distance from the viewpoint of the user provides an efficient way of accessing the virtual objects for interaction, thereby reducing the cognitive burden, time, and inputs needed to interact with the virtual objects.

In some embodiments, such as in FIG. 7D, the electronic device (e.g., 101) displays (832*a*), via the display generation component (e.g., 120), the plurality of virtual objects (e.g., 704, 706) with first spacing between a first virtual object (e.g., 704) of the plurality of virtual objects and a second virtual object (e.g., 704) of the plurality of virtual objects, wherein the first spacing does not satisfy one or more spacing criteria of the one or more criteria. In some embodiments, the one or more spacing criteria include criteria that are satisfied when distances between respective (e.g., pairs of) virtual objects are between a first predefined threshold distance (e.g., 1, 2, 3, 5, 10, 15, 30, 50, or 100 centimeters) and a second predefined threshold distance (e.g., 1, 2, 3, 5, 10, 15, 30, or 50 meters).

In some embodiments, such as in FIG. 7D, while displaying the plurality of virtual objects (e.g., 704, 706) with the first spacing between the first virtual object (e.g., 704) and the second virtual object (e.g., 706), the electronic device (e.g., 101) receives (832*b*), via the one or more input devices (e.g., 314), a second input corresponding to a request to update the spatial arrangement of the plurality of virtual objects (e.g., 704, 706) relative to the current viewpoint of the user to satisfy the one or more criteria (e.g., including the one or more spacing criteria).

In some embodiments, such as in FIG. 7E, in response to receiving the second input, the electronic device (e.g., 101) displays (832*c*), via the display generation component (e.g., 120), the plurality of virtual objects (e.g., 704, 706) with second spacing between the first virtual object (e.g., 704) and the second virtual object (e.g., 706), wherein the second spacing satisfies the one or more spacing criteria. In some embodiments, displaying the plurality of virtual objects with the second spacing between the first virtual object and the second virtual object includes displaying the plurality of virtual objects with a spatial arrangement that satisfies the one or more criteria. In some embodiments, the electronic device updates the positions and/or orientations of one or more virtual objects other than the first and second virtual objects as needed to satisfy the one or more criteria. In some embodiments, the second spacing is less space than the first spacing. In some embodiments, displaying the plurality of virtual objects with second spacing between the first virtual object and the second virtual object includes changing the positions and/or orientations of the first and/or second objects, such as updating the positions (e.g., without updating the orientations) or updating both the positions and the orientations.

Displaying the plurality of virtual objects with the second spacing between the first virtual object and the second virtual object in response to the second input provides an efficient way of enabling the user to concurrently view and/or concurrently interact with the first and second virtual objects, thereby reducing the time, input, and cognitive burden needed to interact with the first and second virtual objects.

In some embodiments, such as in FIG. 7A, detecting the movement of the current viewpoint of the user in the three-dimensional environment from the first viewpoint to the second viewpoint includes detecting, via the one or more input devices (e.g., 314), movement of the electronic device (e.g., 101) in a physical environment of the electronic device (e.g., 101) or movement of the display generation component (e.g., 120) in a physical environment of the display generation component (e.g., 120) (834). In some embodiments, detecting movement of the electronic device or display generation component includes detecting movement of the user (e.g., if the electronic device or display generation component is a wearable device).

Updating the viewpoint of the user in response to detecting the movement of the electronic device or display generation component provides an efficient and intuitive way of traversing the three-dimensional environment, thereby enhancing user interactions with the three-dimensional environment.

FIGS. 9A-9G illustrate examples of how an electronic device updates the positions of multiple virtual objects together in accordance with some embodiments.

Figure 9A:
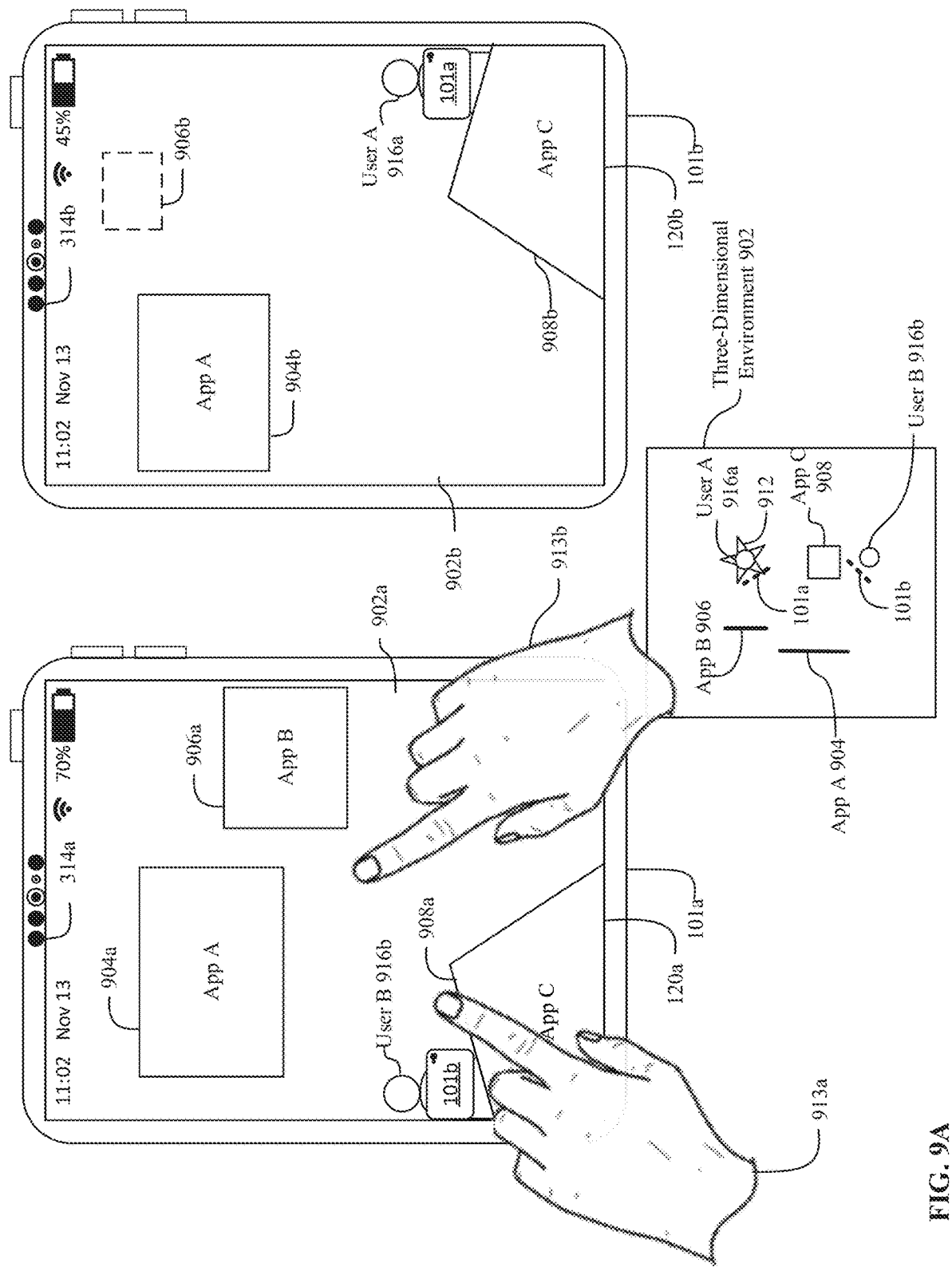
FIGS. 9A-9G illustrate examples of how an electronic device updates the positions of multiple virtual objects together in accordance with some embodiments.

FIG. 9A illustrates an electronic device 101*a* displaying, via a display generation component 120*a*, a three-dimensional environment 902*a*. It should be understood that, in some embodiments, electronic device 101*a* utilizes one or more techniques described with reference to FIGS. 9A-9G in a two-dimensional environment without departing from the scope of the disclosure. As described above with reference to FIGS. 1-6, the electronic device 101*a* optionally includes a display generation component 120*a* (e.g., a touch screen) and a plurality of image sensors 314*a*. The image sensors optionally include one or more of a visible light camera, an infrared camera, a depth sensor, or any other sensor the electronic device 101*a* would be able to use to capture one or more images of a user or a part of the user while the user interacts with the electronic device 101*a*. In some embodiments, display generation component 120*a* is a touch screen that is able to detect gestures and movements of a user's hand. In some embodiments, the user interfaces shown below could also be implemented on a head-mounted display that includes a display generation component that displays the user interface to the user, and sensors to detect the physical environment and/or movements of the user's hands (e.g., external sensors facing outwards from the user), and/or gaze of the user (e.g., internal sensors facing inwards towards the face of the user).

In FIG. 9A, a first electronic device 101*a* and a second electronic device 101*b* have access to a three-dimensional environment 902 that includes a representation of the first electronic device 101*a*, a representation of the second electronic device 101*b*, a first user 916*a* of the first electronic device 101*a*, a second user 916*b* of the second electronic device 101*b*, a user interface 904 of a first application that is accessible to both electronic devices 101*a* and 101*b*, a user interface 906 of a second application that is accessible to the first electronic device 101a but not the second electronic device 101b, and a user interface 908 of a third application that is accessible to both electronic device 101a and 101b. In some embodiments, the first electronic device 101a and the second electronic device 101b are located in a shared physical environment and the spatial arrangement of the first electronic device 101a and the second electronic device 101b in the physical environment corresponds to (e.g., is the same as) the spatial arrangement of the first electronic device 101a and second electronic device 101b in the three-dimensional environment 902. In some embodiments, the first electronic device 101a and second electronic device 101b are located in different physical environments (e.g., different rooms, different buildings, different cities, etc.) and the spatial arrangement of the first electronic device 101a and the second electronic device 101b in the physical world is different from the spatial arrangement of the first electronic device 101a and the second electronic device 101b in the three-dimensional environment 902. In some embodiments, electronic device 101b has one or more of the characteristics of electronic device 101a.

FIGS. 9A-9G include a top-down view of three-dimensional environment 902, which is displayed by electronic devices 101a and 101b. The first electronic device 101a presents the three-dimensional environment 902a from the viewpoint of the first user 916a in the three-dimensional environment 902, including displaying the user interface 904a of the first application, the user interface 906a of the second application, the user interface 908a of the third application, a representations 916b of the second user, and a representation of the second electronic device 101b, for example. As another example, the second electronic device 101b presents the three-dimensional environment 902b from the viewpoint of the second user 916b in the three-dimensional environment 902, including displaying the user interface 904b of the first application, the user interface 908b of the third application, a representations 916a of the first user, and a representation of the first electronic device 101a. In some embodiments, because the second electronic device 101b does not have access to the user interface 906 of the second application, the second electronic device 101b does not display the user interface 906 of the second application, but FIG. 9A indicates the location 906b in the three-dimensional environment 902b at which the user interface 906 of the second application would be displayed if the second electronic device 101b had access to the user interface 906 of the second application.

In some embodiments, the first electronic device 101a is associated with a digital origin 912 in the three-dimensional environment 902. In some embodiments, the second electronic device 101b is associated with a different digital origin (not shown) in the three-dimensional environment 902. In some embodiments, the digital origin 912 is a location in the three-dimensional environment 902 that the electronic device 101a uses to select locations and/or orientations for virtual objects (e.g., user interfaces 904, 906, 908) and/or the viewpoint of the first user 101a in response to a request to recenter the three-dimensional environment 902a according to one or more steps of method 800. For example, in response to the request to recenter the three-dimensional environment 902a, the electronic device 101a evaluates one or more criteria for the spatial arrangement of the virtual objects and/or the viewpoint of the user 916a relative to the digital origin 912 and updates the position and/or orientation of one or more virtual objects and/or the viewpoint of the user 916a to satisfy the one or more criteria. In some embodiments, the electronic device 101a updates the viewpoint of the first user 916a to be at the location of the digital origin 912 in response to the request to recenter. In some embodiments, the electronic device 101a updates the positions and/or orientations of the user interfaces 904a, 904b, and 904c relative to the digital origin 912 to select positions and/or orientations that facilitate user interaction with the user interface 904a, 904b, and 904c. For example, the one or more criteria include criteria specifying a range of distances from the digital origin 912 and/or a range of orientations relative to the digital origin 912 as described with reference to methods 800 and/or 1000.

In some embodiments, the electronic device 101a selects the digital origin 912 at the start of an AR/VR session. For example, the digital origin 912 is selected based on a position and/or orientation of the electronic device 101a in the physical environment and the position and/or orientation of the electronic device 101a in the three-dimensional environment 902. In some embodiments, the electronic device 101a sets or resets the digital origin 912 in response to detecting the display generation component 120a transition to a predetermined pose relative to the first user from not being in the predetermined pose for a threshold amount of time (e.g., 10, 20, 30, or 45 seconds or 1, 2, 3, 5, 10, or 15 minutes). In some embodiments, the predetermined pose is a range of distances and/or orientations relative to the user. For example, if the display generation component 120a is a wearable device, the display generation component 120a is in the predetermined pose when the user is wearing the display generation component 120a.

As will be described in more detail below in FIGS. 9B-9F and with respect to method 1000, in some embodiments, there are a number of situations in which the digital origin becomes invalidated. In some embodiments, the digital origin is invalidated when one or more invalidation criteria are satisfied. For example, the invalidation criteria are related to the number of objects (e.g., user interfaces 904a, 904b, 904c, and the viewpoint of the user 916a) with spatial relationships to the digital origin 912 that do not satisfy the one or more spatial criteria described with reference to methods 1000 and/or 800. As another example, the invalidation criteria are related to the degree to which objects do not satisfy the one or more spatial criteria, and/or the spatial relationships between the objects themselves. For example, the digital origin 912 is invalid when one or more spatial criteria are not satisfied, and updating the location of the digital origin 912 will satisfy the one or more spatial criteria with less or minimal updating of positions and/or orientations of virtual objects than would be required if the digital origin remained in its current location. In some embodiments, the electronic device 101a immediately updates the location of the digital origin 912 when it becomes invalidated. In some embodiments, the electronic device 101a does not update the location of the digital origin 912 unless and until a request to recenter the three-dimensional environment 902a is received.

In some embodiments, the electronic device 101a updates the positions of user interfaces 904a, 906a, and 908a in response to various user inputs. In some embodiments, the user interfaces 904a, 906a, and 908a are displayed in association with respective selectable options that, when selected, cause the electronic device 101a to initiate a process to update the position and/or orientation of a respective user interface 904a, 906a, or 908a as described above with reference to method 800. Additionally, in some embodiments, in response to a request to update the positions and/or orientations of the virtual objects (e.g., user interfaces 904a, 906a, and 908a, the representation of the second user 916*b*, and the representation of the second electronic device 101*b*) in the three-dimensional environment 902*a* together, the electronic device 101*a* updates the positions and/or orientations of the virtual objects relative to the viewpoint of the user 916*a* without updating the spatial arrangements of the virtual objects relative to the other virtual objects. For example, the electronic device 101*a* moves the virtual objects together as a group. In some embodiments, the electronic device 101*a* displays a selectable option that, when selected, causes the electronic device 101*a* to initiate a process to update the positions and/or orientations of the virtual objects as a group. As another example, as shown in FIG. 9A, in response to detecting a two-handed selection input (e.g., with hands 913*a* and 913*b*), the electronic device 101*a* initiates the process to update the positions and/or orientations of the virtual objects together as a group. For example, as shown in FIG. 9A, the electronic device 101*a* detects the user make pinch hand shapes (e.g., a hand shape in which the thumb touches another finger of the same hand) with both hands 913*a* and 913*b* (e.g., for at least a threshold time (e.g., 0.1, 0.2, 0.5, 1, 2, or 3 seconds)). In some embodiments, in response to detecting the pinch hand shapes with both hands 913*a* and 913*b*, the electronic device 101*a* initiates a process to update the positions and/or orientations of the virtual objects in accordance with movement of the hands 913*a* and 913*b* while the pinch hand shapes are maintained.

Figure 9B:
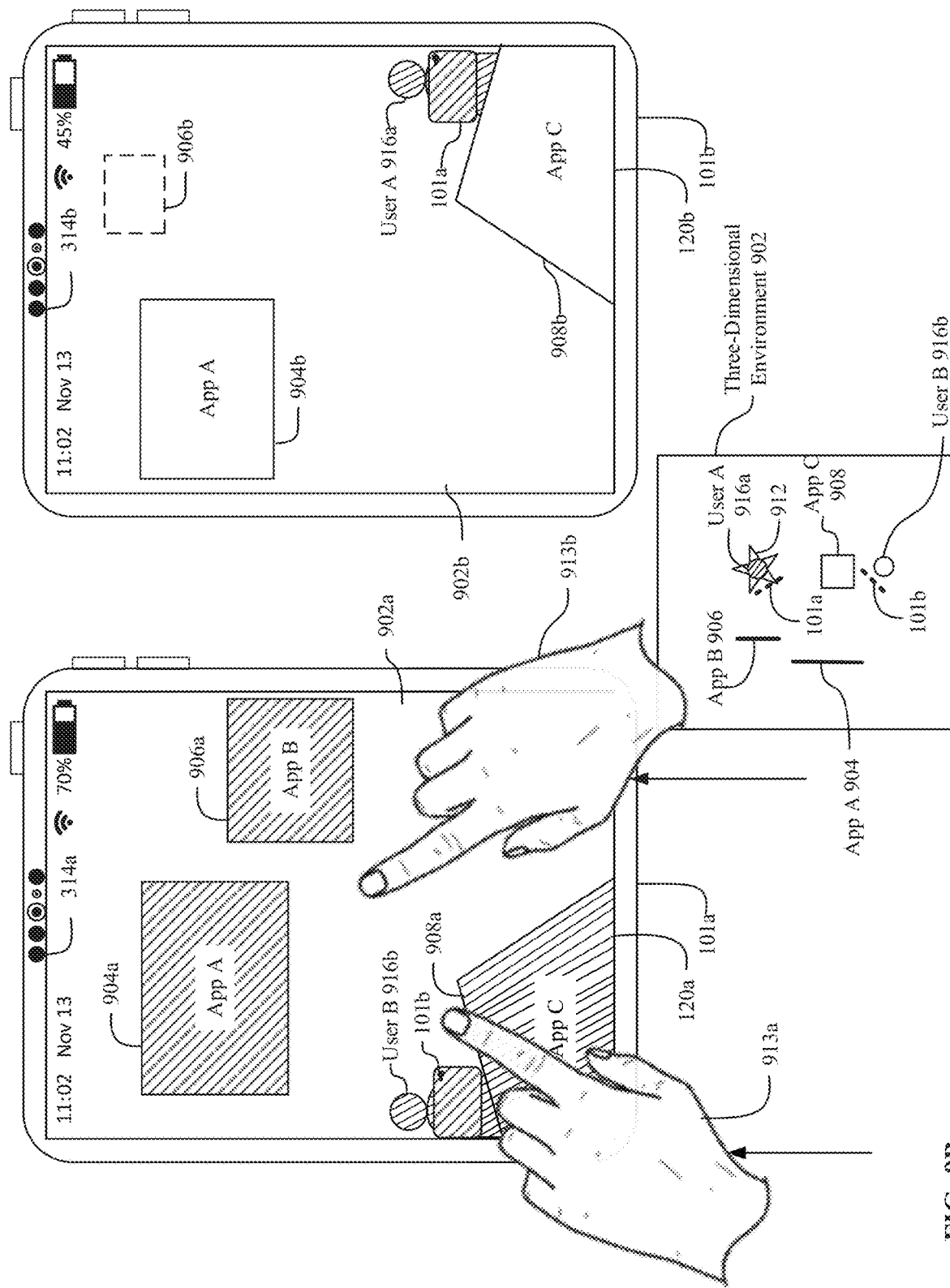

FIG. 9B illustrates an example of the electronic device 101*a* detecting the beginning of movement of hands 913*a* and 913*b* while the hands are in the pinch hand shape. In some embodiments, in response to detecting the beginning of the movement of the hands 913*a* and 913*b* in the pinch hand shape (or, in some embodiments, in response to detecting the pinch hand shapes of hands 913*a* and 913*b* without yet detecting movement of the hands 913*a* and 913*b*), the electronic device 101*a* updates the display of the virtual objects (e.g., user interfaces 904*a*, 906*a*, and 908*a*, the representation of the second user 916*b*, and the representation of the electronic device 101*b*) to change a visual characteristic of the virtual objects to indicate that further input will cause the electronic device 101*a* to update the positions and/or orientations of the virtual objects in the three-dimensional environment 902*a*. For example, the electronic device 101*a* increases an amount of translucency and/or dimness of the user interfaces 904*a*, 906*a*, and 908*a* and the representations of the second user 916*b* and the second electronic device 101*b* in response to detecting the two-handed pinch hand shape and/or movement of the hands 913*a* and 913*b* in the two-handed pinch hand shape relative to the amount of translucency and/or dimness of the user interfaces 904*a*, 906*a*, and 908*a* and the representations of the second user 916*b* and the second electronic device 101*b* in FIG. 9A, for example. In some embodiments, the electronic device 101*a* increases an amount of visual emphasis of user interfaces 904*a*, 906*a*, and 908*a* and the representations of the second user 916*b* and the second electronic device 101*b* while the input in FIG. 9B is being received, such as by blurring and/or dimming and/or darkening areas of the three-dimensional environment 902*a* other than user interfaces 904*a*, 906*a*, and 908*a* and the representations of the second user 916*b* and the second electronic device 101*b*. In some embodiments, while the electronic device 101*a* updates the positions of the user interfaces 904*a*, 906*a*, and 908*a* and the representations of the second user 916*b* and the second electronic device 101*b* in accordance with movement of the hands 913*a* and 913*b* in the pinch hand shapes, the electronic device 101*a* maintains the increased translucency and/or dimness of user interfaces 904*a*, 906*a*, and 908*a* and the representations of the second user 916*b* and the second electronic device 101*b*. In some embodiments, while the first electronic device 101*a* detects the two-handed pinch hand shape, the second electronic device 101*b* displays the representation of the first user 916*a* and the representation of the first electronic device 101*a* with increased translucency and/or dimness relative to the amounts of translucency and/or dimness with which the second electronic device 101*b* displayed the representation of the first user 916*a* and the representation of the first electronic device 101*a* in FIG. 9A.

As shown in FIG. 9B, the first electronic device 101*a* detects movement of hands 913*a* and 913*b* in a direction away from the body of the first user 916*a*, corresponding to movement away from the viewpoint of the first user 916*a* in the three-dimensional environment 902*a*. In response to the input illustrated in FIG. 9B, the electronic device 101*a* updates the positions and/or orientations of the user interfaces 904*a*, 906*a*, and 908*a* and the representations of the second user 916*b* and the second electronic device 101*b* relative to the viewpoint of the first user 916*a* without changing spatial relationships between two or more of the user interfaces 904*a*, 906*a*, and 908*a* and the representations of the second user 916*b* and the second electronic device 101*b*, as shown in FIG. 9C.

Figure 9C:
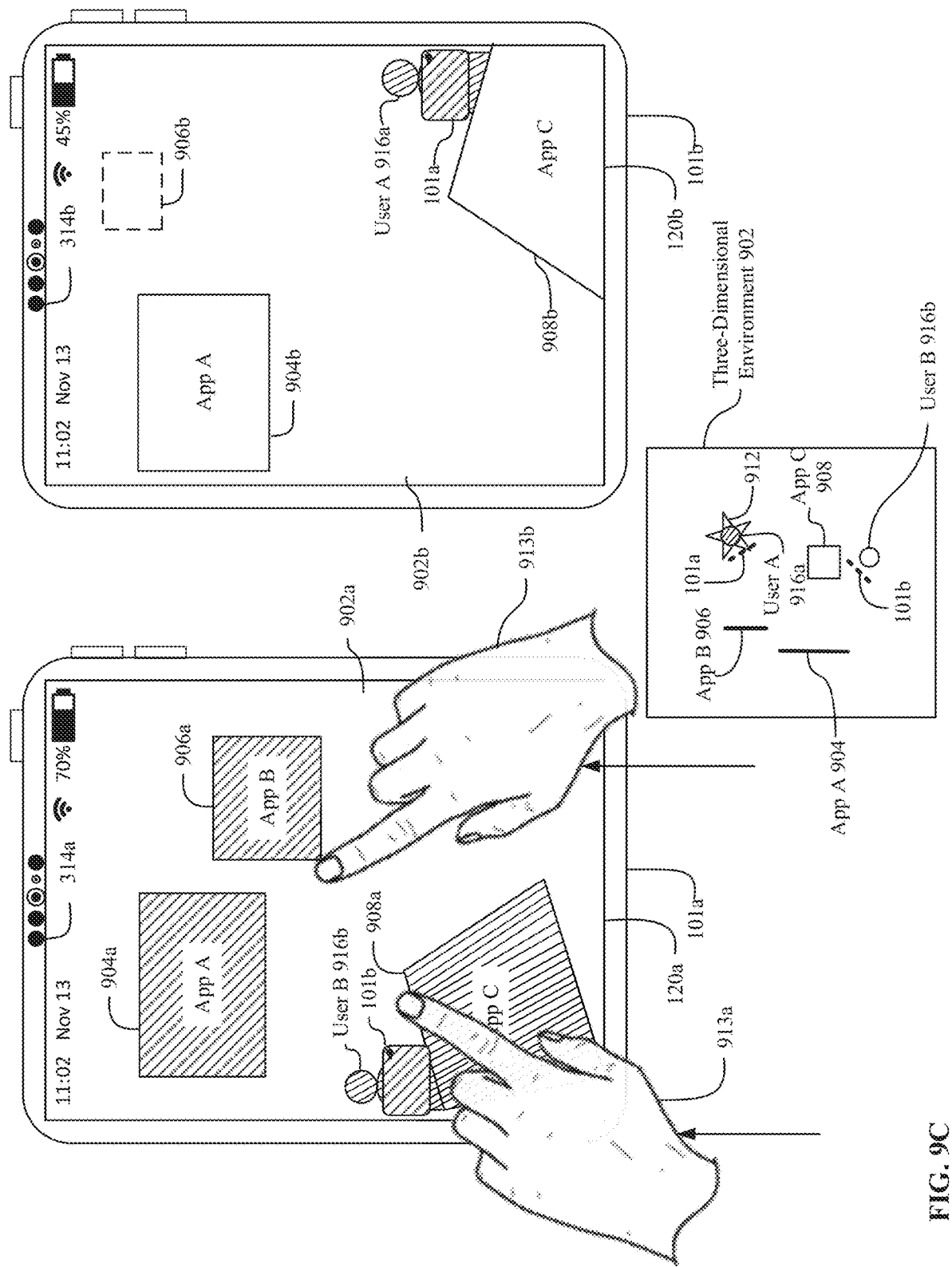

FIG. 9C illustrates how the first electronic device 101*a* updates the three-dimensional environment 902*a* displayed by the first electronic device 101*a* while moving the user interfaces 904*a*, 906*a*, and 908*a* and the representations of the second user 916*b* and the second electronic device 101*b* in accordance with movement of hands 913*a* and 913*b* while in the pinch hand shape. For example, the first electronic device 101*a* updates the positions of the user interfaces 904*a*, 906*a*, and 908*a* and the representations of the second user 916*b* and the second electronic device 101*b* to be further from the viewpoint of the user while maintaining the spatial relationships among user interfaces 904*a*, 906*a*, and 908*a* and the representations of the second user 916*b* and the second electronic device 101*b*. In some embodiments, the amount by which the user interfaces 904*a*, 906*a*, and 908*a* and the representations of the second user 916*b* and the second electronic device 101*b* move relative to the viewpoint of the first user 916*a* corresponds to an amount of movement of hands 913*a* and 913*b*. Although the user interfaces 904*a*, 906*a*, and 908*a* and the representations of the second user 916*b* and the second electronic device 101*b* appear to move from the viewpoint of the first user 916*a*, as shown in the top-down view of the three-dimensional environment 906, the viewpoint of the user 916*a* moves away from the user interfaces 904, 906, and 908 and the representations of the second user 916*b* and the second electronic device 101*b* and the user interfaces 904, 906, and 908 and the representations of the second user 916*b* and the second electronic device 101*b* remain at their respective locations in the three-dimensional environment 906 in response to the input illustrated in FIG. 9B. In some embodiments, the second electronic device 101*b* continues to display the user interface 904*b* and 908*b* at the same locations in the three-dimensional environment 902*b* from the viewpoint of the second user 916*b* in FIG. 9C as in FIG. 9B in response to the first electronic device 101*a* receiving the input illustrated in FIG. 9B.

In some embodiments, in response to the input to update the positions and/or orientations of user interfaces 904*a*, 906*a*, and 908*a* and the representations of the second user 916*b* and the second electronic device 101*b* relative to the viewpoint of the first user 916a, the first electronic device 101a updates the location of the digital origin 912. In some embodiments, the first electronic device 101a updates the location of the digital origin 912 in response to the input illustrated in FIG. 9B in accordance with a determination that the one or more spatial criteria will be satisfied at the updated location of the digital origin. For example, as shown in FIG. 9C, the first electronic device 101a updates the digital origin 912 to be the location of the viewpoint of the first user 916a in the three-dimensional environment 902. In some embodiments, the updated location of the digital origin 912 satisfies the one or more spatial criteria with respect to the user interfaces 904a, 906a, and 908a and the representations of the second user 916b and the second electronic device 101b.

While the first electronic device 101a detects the two-handed input corresponding to the request to update the positions and/or orientations of user interfaces 904a, 906a, and 908a and the representations of the second user 916b and the second electronic device 101b together, the second electronic device 101b continues to display the representations of the first user 916a and the first electronic device 101a with the increased translucency and/or dimness, for example. In some embodiments, the second electronic device 101b does not update the location at which the second electronic device 101b displays the representation of the first user 916a and the representation of the first electronic device 101a until the first electronic device 101a detects an end of the input to update the locations of the user interfaces 904a, 906a, and 908a and the representations of the second user 916b and the second electronic device 101b together. For example, detecting the end of the input includes detecting the user stop making the pinch hand shape with one or more of hands 913a and 913b. As shown in FIG. 9C, the first electronic device 101a detects continuation of the two-handed pinch input provided by hands 913a and 913b. In response to the continuation of the input illustrated in FIG. 9C, the electronic device 101a updates the spatial relationship between user interfaces 904a, 906a, and 908a and the representations of the second user 916b and the second electronic device 101b and the viewpoint of the first user 916a in accordance with continued movement of the hands 913a and 913b in the pinch hand shape.

Figure 9D:
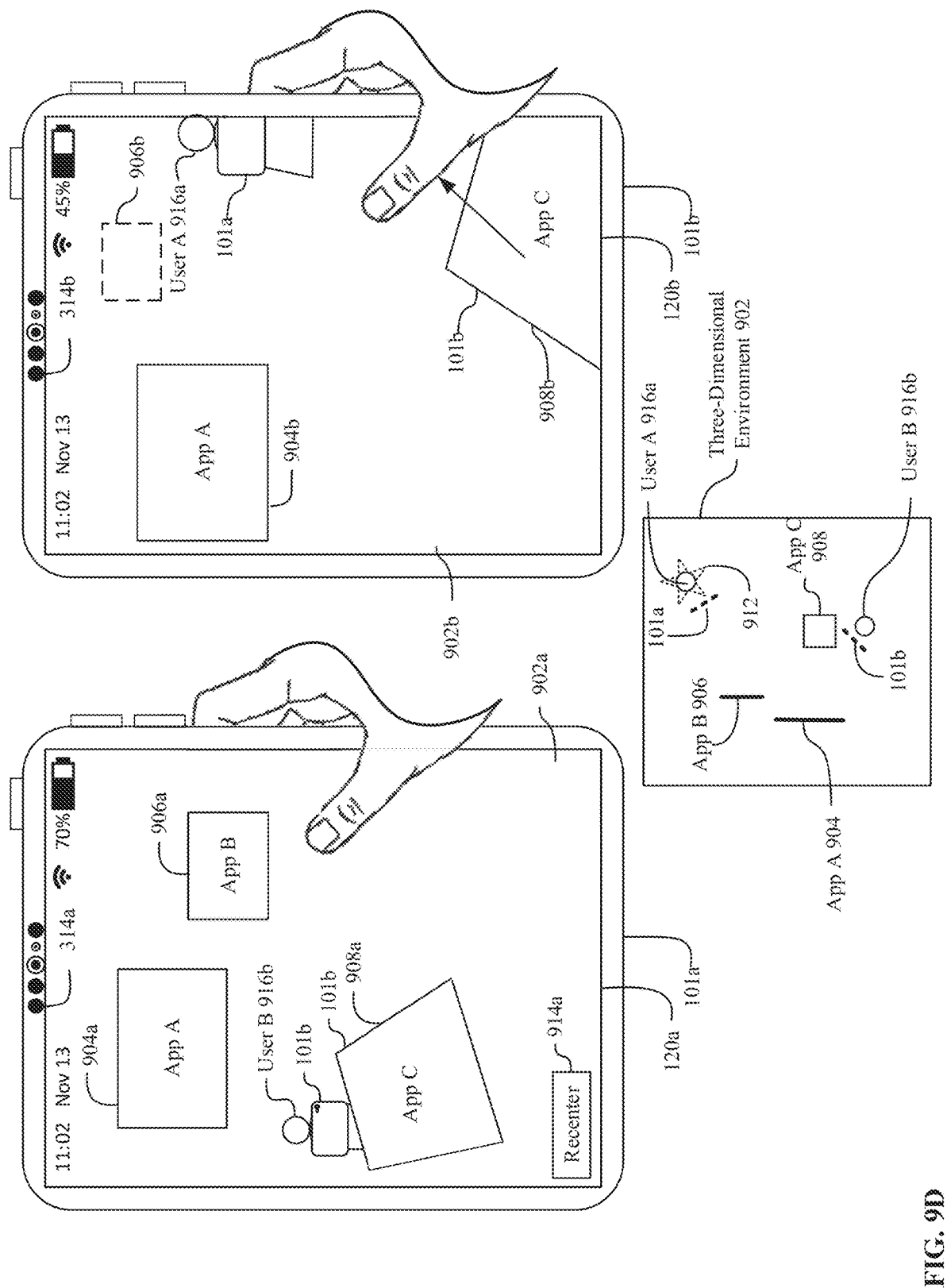

FIG. 9D illustrates an example of how the first electronic device 101a updates the three-dimensional environment 902a in accordance with the continuation of the input illustrated in FIG. 9C. In some embodiments, the electronic device 101a updates the positions of the user interfaces 904a, 906a, and 908a and the representations of the second user 916b and the second electronic device 101b relative to the viewpoint of the user 916a in the three-dimensional environment 902 in accordance with the direction and amount of movement of hands 913a and 913b in FIG. 9C. For example, the electronic device 101a updates the three-dimensional environment 902a to display the user interfaces 904a, 906a, and 908a and the representations of the second user 916b and the second electronic device 101b further from the viewpoint of the user. As shown in the top-down view of the three-dimensional environment 902, the electronic device 101a updates the viewpoint of the first user 916a in the three-dimensional environment 902 without updating the positions and/or orientations of user interfaces 904, 906, and 908 and the representations of the second user 916b and the second electronic device 101b in the three-dimensional environment 902. Thus, the second electronic device 101b optionally continues to display the user interfaces 904b and 908b at the locations at which the user interfaces 904b and 908b were displayed in FIG. 9C.

In some embodiments, the second electronic device 101b updates the position of the representation of the first user 916a and the representation of the first electronic device 101a in response to the first electronic device 101a detecting the end of the input to update the positions and/or orientations of user interfaces 904a, 906a, and 908a and the representations of the second user 916b and the second electronic device 101b relative to the viewpoint of the first user 101a. As shown in FIG. 9D, the second electronic device 101b displays the representations of the first user 916a and the representation of the first electronic device 101a at updated locations and with reduced translucency and/or dimness relative to the translucency and/or dimness with which the representations of the first electronic device 101a and the first user 916a were displayed in FIG. 9C, for example. In some embodiments, in response to the first electronic device 101a detecting the end of the input illustrated in FIG. 9C, the second electronic device 101b displays an animation updating the position of the representations of the first user 916a and the first electronic device 101a. In some embodiments, in response to the first electronic device 101a detecting the end of the input illustrated in FIG. 9C, the second electronic device 101b ceases display of the representations of the first user 916a and the first electronic device 101a at the locations shown in FIG. 9C and initiates display of the representations of the first user 916a and the first electronic device 101a at the locations in FIG. 9D (e.g., via a "teleporting" effect).

In some embodiments, the digital origin 912 becomes invalidated when the first user 916a is more than a threshold distance (e.g., 1, 2, 3, 5, 10, or 15 meters) from one or more of user interfaces 904a, 906a, and 908a and the representations of the second user 916b and the second electronic device 101b. In FIG. 9D, for example, the digital origin 912 is illustrated in dashed lines to indicate that it is invalidated due to the first user 916a updating the positions of user interfaces 904a, 906a, and 908a and the representations of the second user 916b and the second electronic device 101b relative to the viewpoint of the first user 916a so that one or more of the virtual objects are greater than the threshold distance from the viewpoint of the first user 916a. In some embodiments, the digital origin 912 becomes invalidated when one or more of user interfaces 904a, 906a, and 908a and the representations of the second user 916b and the second electronic device 101b are further than the threshold distance from the viewpoint of the first user 916a in response to the second user 916b moving one or more of user interfaces 904a, and 908a and the representations of the second user 916b and the second electronic device 101b away from the viewpoint of the user in the three-dimensional environment 902 (e.g., by moving one or more applications individually).

In some embodiments, moving user interfaces 904a, 906a, and 908a and the representations of the second user 916b and the second electronic device 101b away from the viewpoint of the first user 101a as shown in FIG. 9D causes the one or more spatial criteria described above with reference to method 800 to no longer be satisfied. In some embodiments, in response to the one or more spatial criteria no longer being satisfied, the first electronic device 101a displays a selectable option 914a that, when selected, causes the first electronic device 101a to recenter the three-dimensional environment 902a according to one or more steps of method 800. In some embodiments, because the digital origin 912 is invalid, in response to detecting selection of option 914a, the electronic device 101a updates the digital origin 912 and recenters the three-dimensional environment 902a based on the updated digital origin 912. In some embodiments, the first electronic device 101a selects a new location for the digital origin 912 based on the positions and/or orientations of the objects in the three-dimensional environment 902 and the one or more spatial criteria described with reference to methods 800 and/or 1000.

Figure 9E:
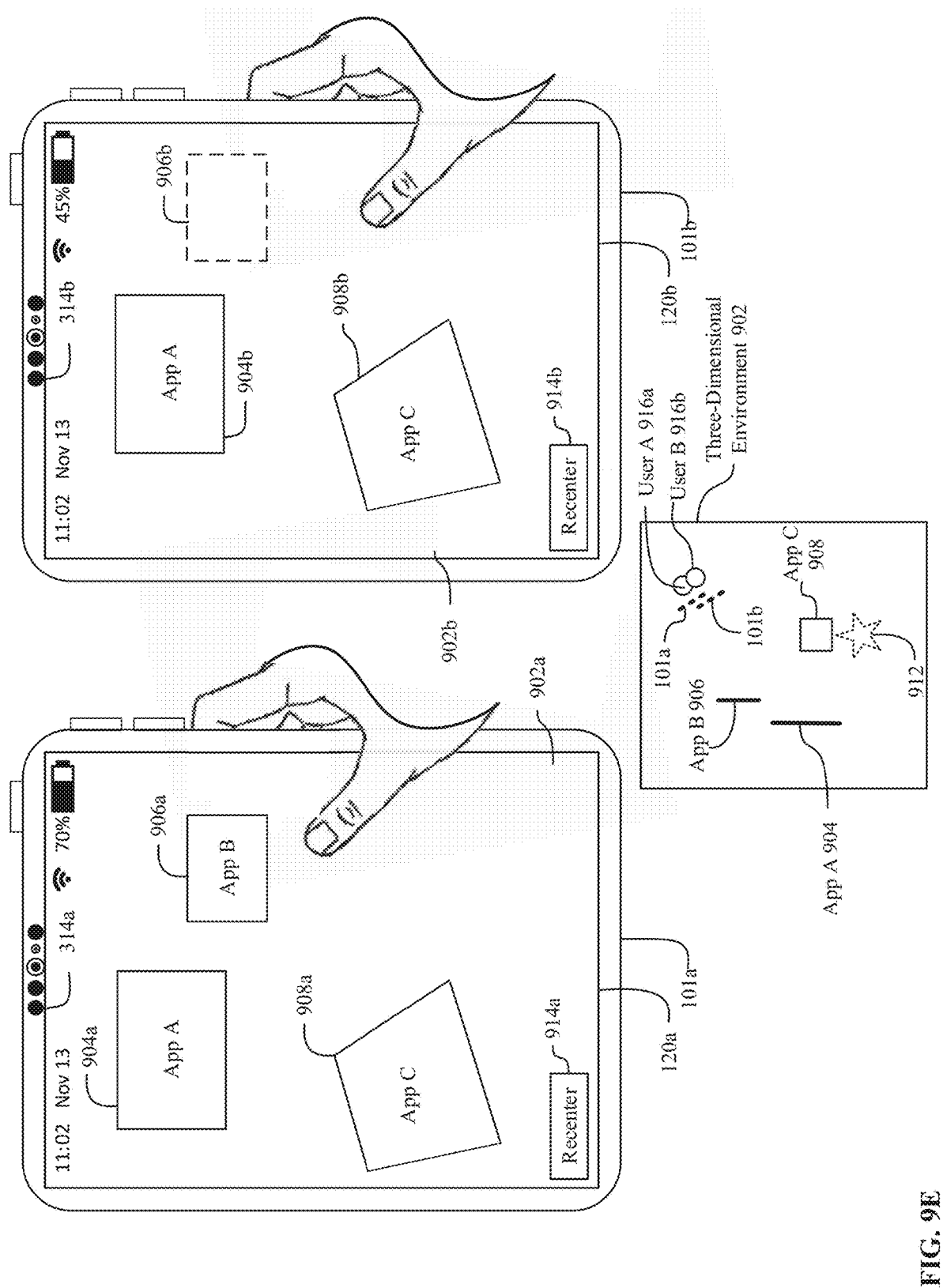

In some embodiments, the digital origin 912 becomes invalidated in response to one or more users moving by more than a threshold amount (e.g., 1, 2, 3, 5, 10, 15, or 25 meters) in the three-dimensional environment 902. For example, in FIG. 9D, the second user 916b moves themself and/or electronic device 101b, resulting in the location of the second user 916b in the three-dimensional environment 902 being updated as shown in FIG. 9E. In response to the second user 916b updating their position in the three-dimensional environment 902 in this way, the digital origin 912 becomes invalidated. FIG. 9E illustrates how, in some embodiments, in response to the digital origin 912 becoming invalidated, the electronic device 101a automatically selects a new location for the digital origin 912 without receiving a user input requesting that the electronic device 101a updates the digital origin 912 (e.g., selection of option 914a). For example, the updated digital origin 912 is located at a location so that if the first user 916a recenters the three-dimensional environment 902a to update their viewpoint of the digital origin 912, both users 916a and 916b will be on the same side of the user interface 904 of the first application (e.g., a shared content application as described above with reference to method 800) and on opposite sides of the user interface 908 of the third application (e.g., a shared activity application as described above with reference to method 800).

As shown in FIG. 9E, in response to the second user 916b updating their viewpoint in the three-dimensional environment 902b, the second electronic device 101b updates the positions and/or orientations of user interfaces 904b and 908b relative to the viewpoint of the second user 916b and the first electronic device 101a ceases display of the representations of the second user 916b and the second electronic device 101b because the second user 916b is no longer in the field of view of the first electronic device 101a.

Figure 9F:
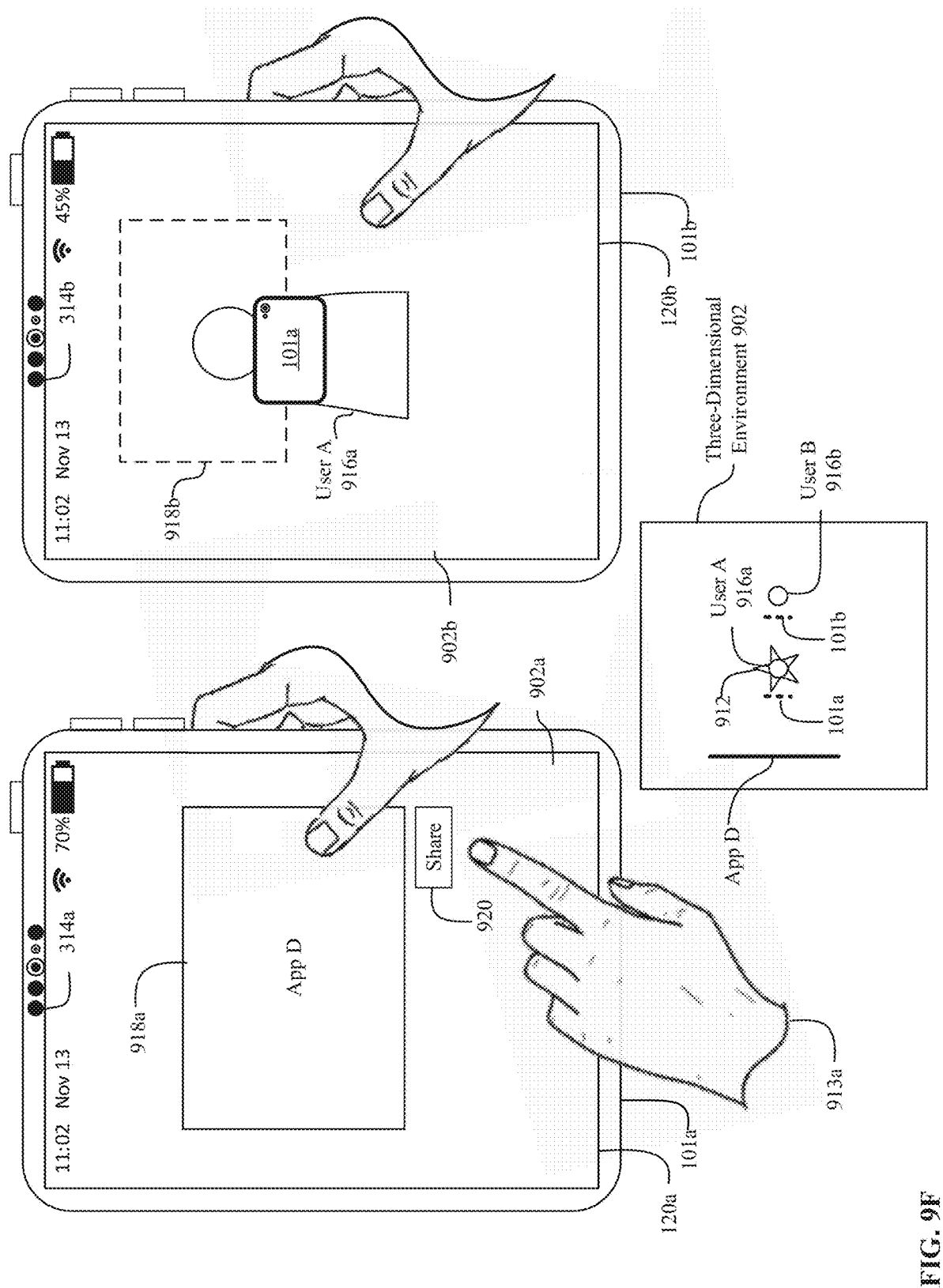

In some embodiments, as will be described below with reference to FIGS. 9F-9G, the first electronic device 101a invalidates the digital origin 912 in response to a request to share an application with the second electronic device 101b. In FIG. 9F, the first electronic device 101a displays the three-dimensional environment 902a including a user interface 918a of a fourth application that is accessible to the first electronic device 101a but not accessible to the second electronic device 101b. Because the user interface 918 of the fourth application is not accessible to the second electronic device 101b, the second electronic device 101b displays the representations of the first user 916a and the first electronic device 101a without displaying the user interface 918 of the fourth application, though FIG. 9F illustrates the location 918b at which the user interface 918 of the fourth application would be displayed if the fourth application was accessible to the second electronic device 101b. FIG. 9F also illustrates the digital origin 912 associated with the first electronic device 101a. In some embodiments, the location of the digital origin 912 in FIG. 9F is valid because the user interface 918a of the fourth application and the representation of the second user 916b are at locations and orientations that satisfy the one or more spatial criteria. In some embodiments, the spatial criteria do not require that the second user 916b has an unobstructed view of the user interface 918 of the fourth application because the second electronic device 101b does not have access to the fourth application.

As shown in FIG. 9F, the first electronic device 101a detects selection (e.g., via hand 913a) of a selectable option 920 that, when selected, causes the first electronic device 101a to share the fourth application with the second electronic device 101b. In some embodiments, the selection input is one of a direct selection input, an indirect selection input, an air gesture selection input, or a selection input using an input device, as described above with reference to method 800. In response to the input, the first electronic device 101a makes the user interface 918 of the fourth application accessible to the second electronic device 101b, as shown in FIG. 9G.

Figure 9G:
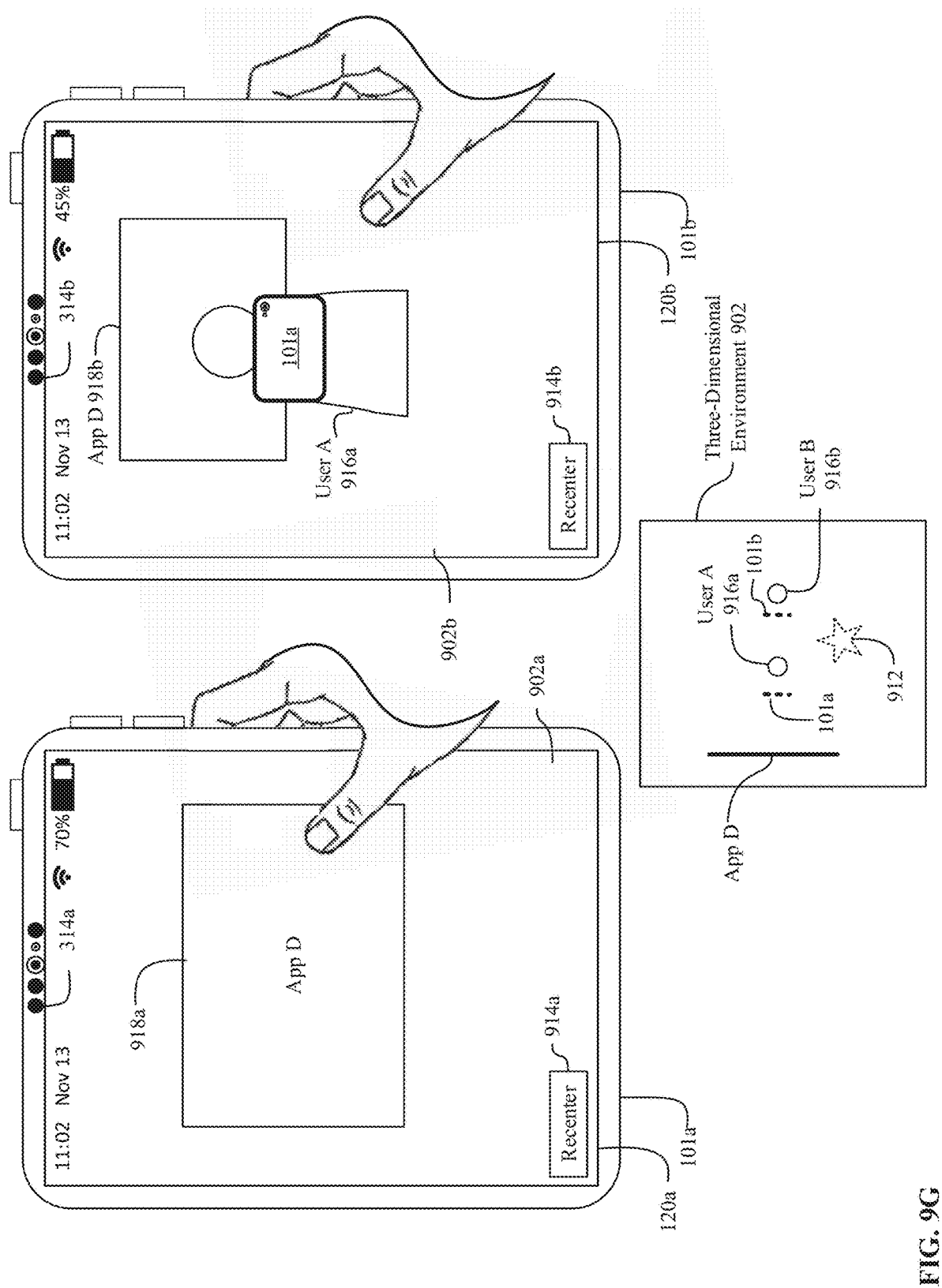
Figure 10A:
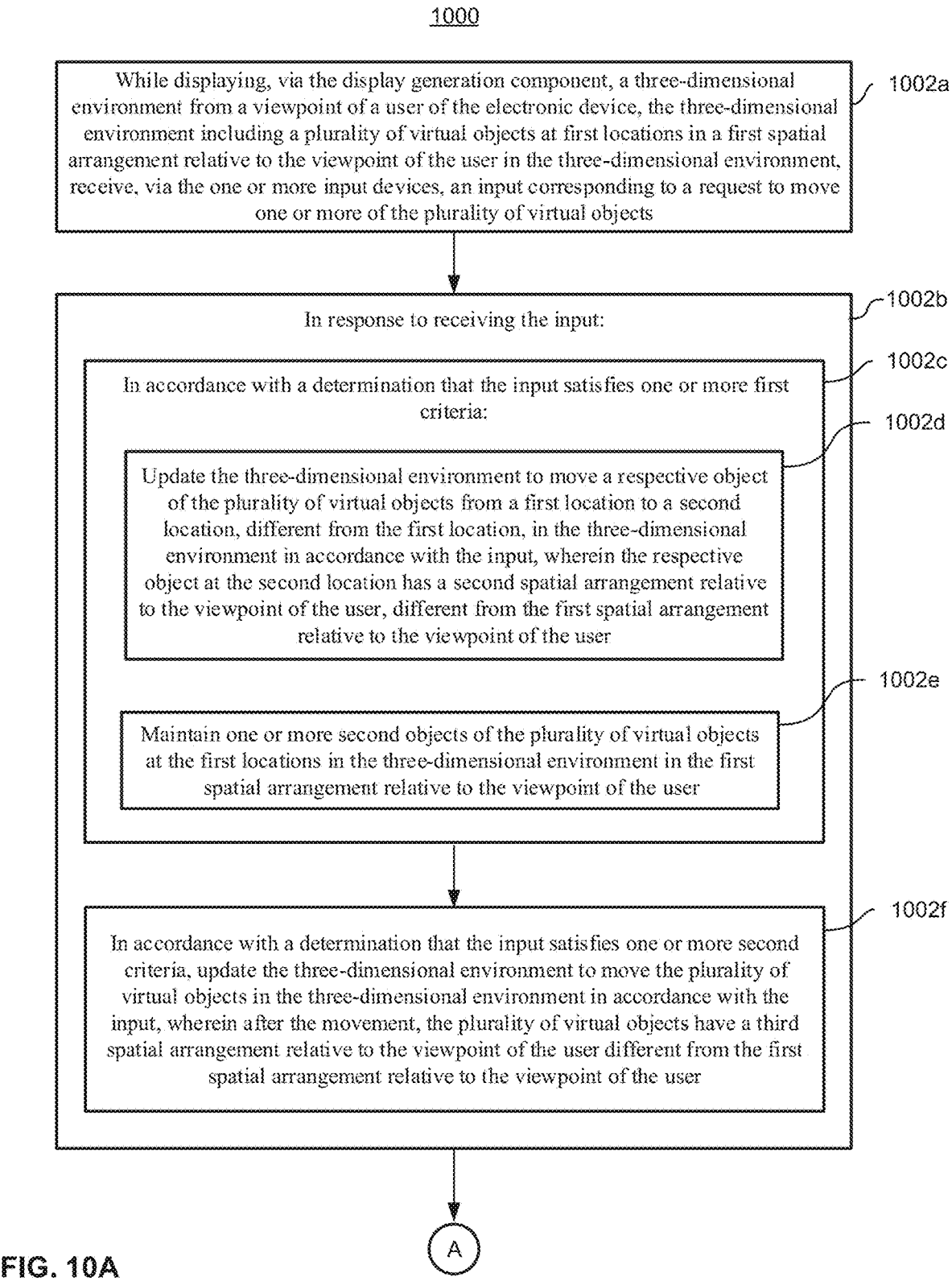
FIGS. 10A-10K is a flow chart illustrating a method of updating the positions of multiple virtual objects together in accordance with some embodiments.
Figure 10B:
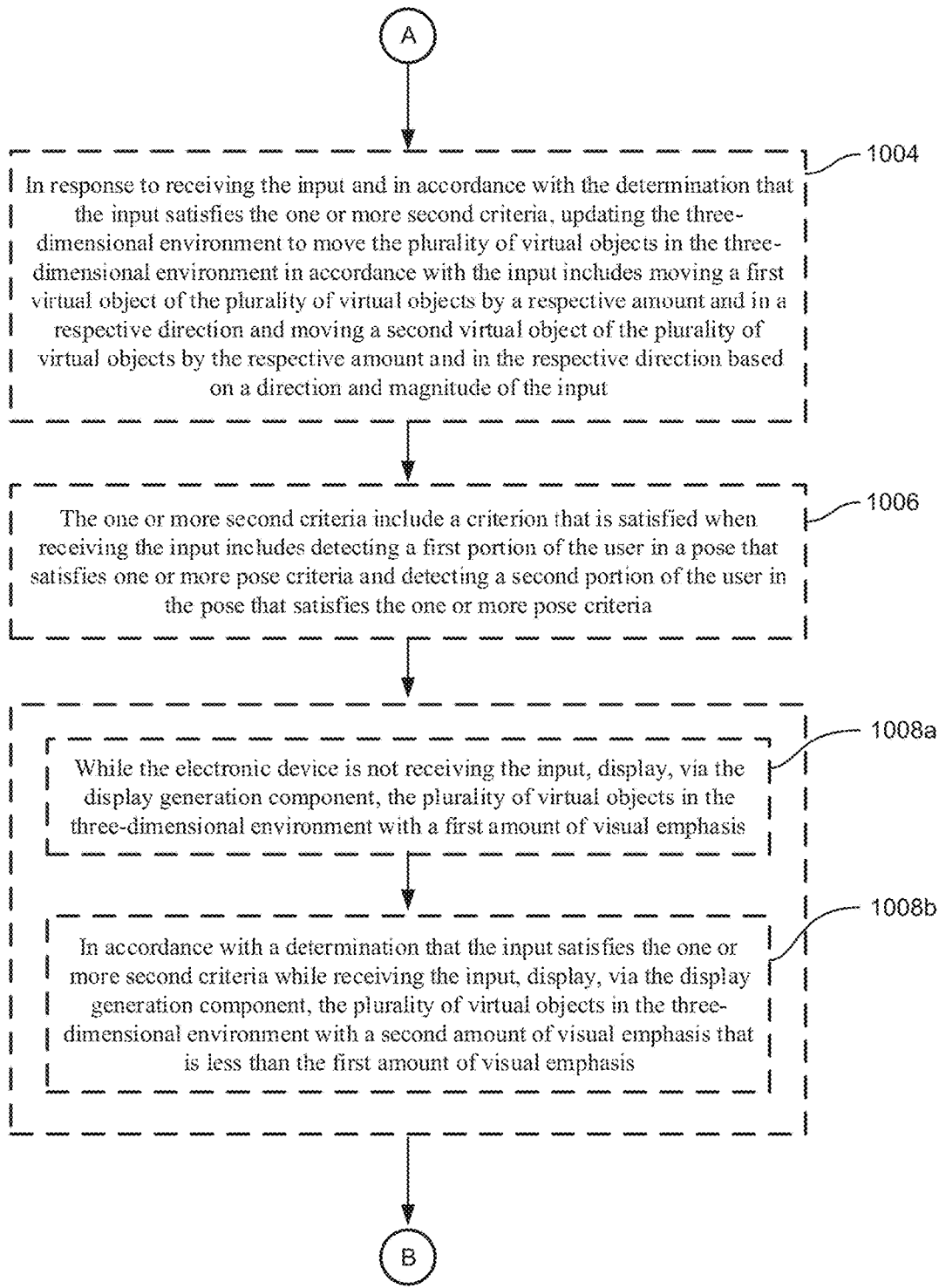
Figure 10C:
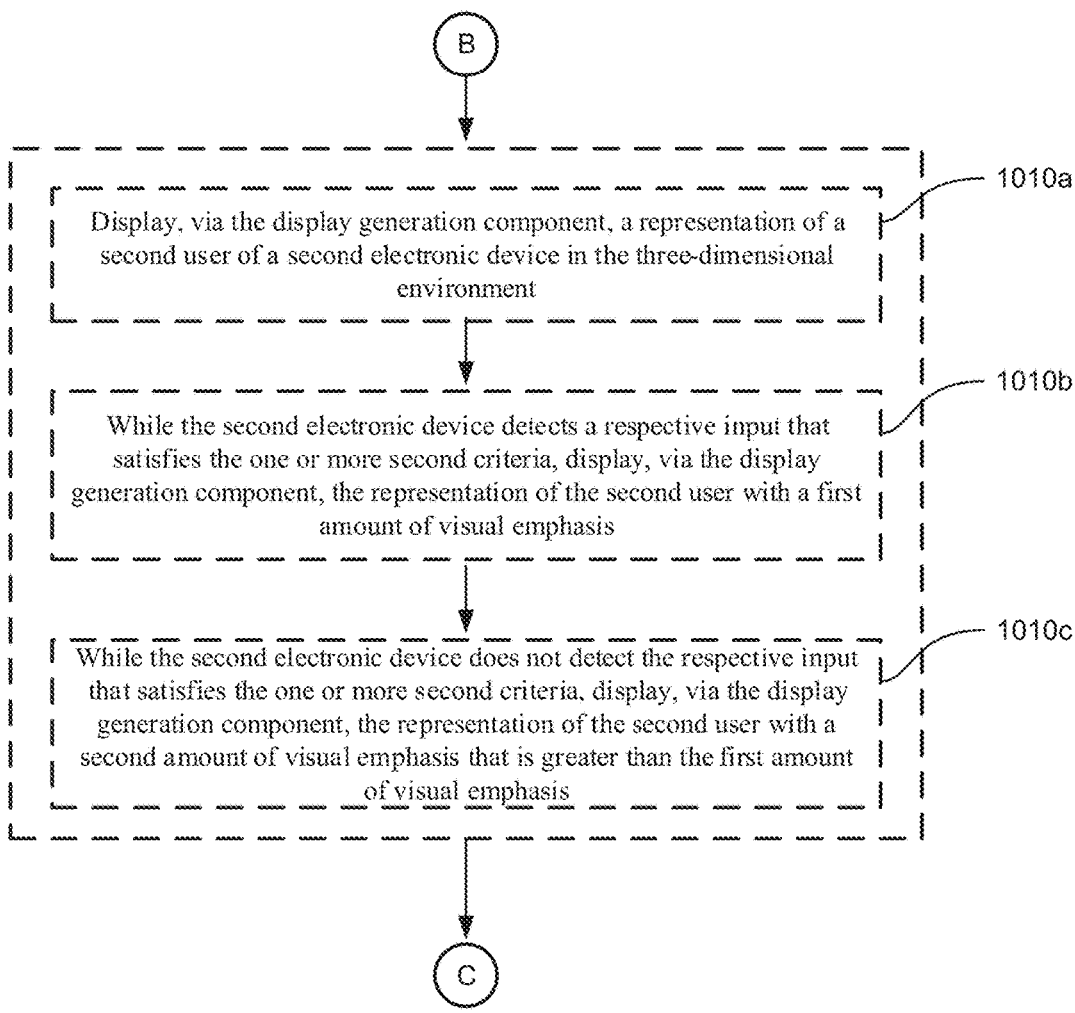
Figure 10D:
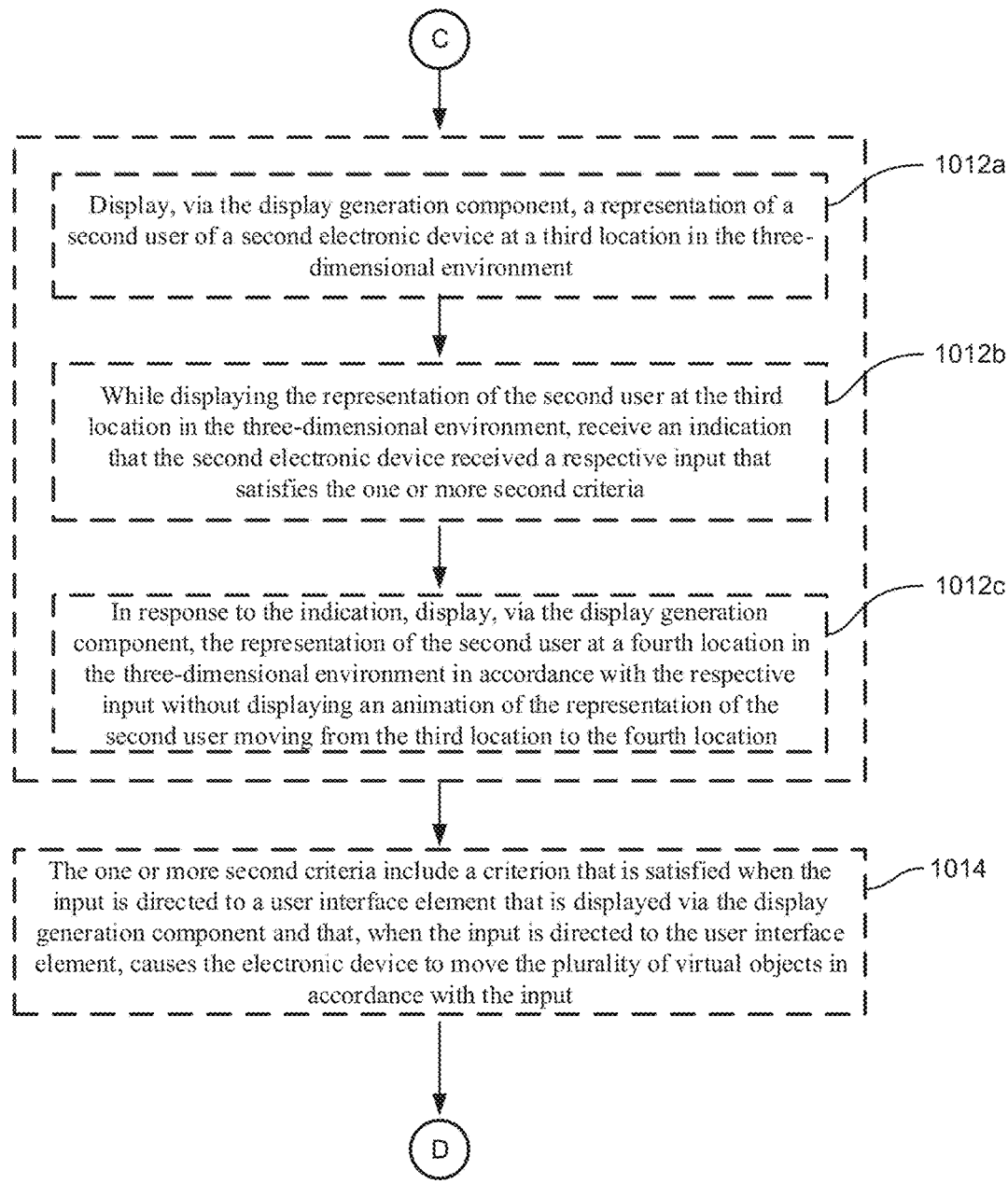
Figure 10E:
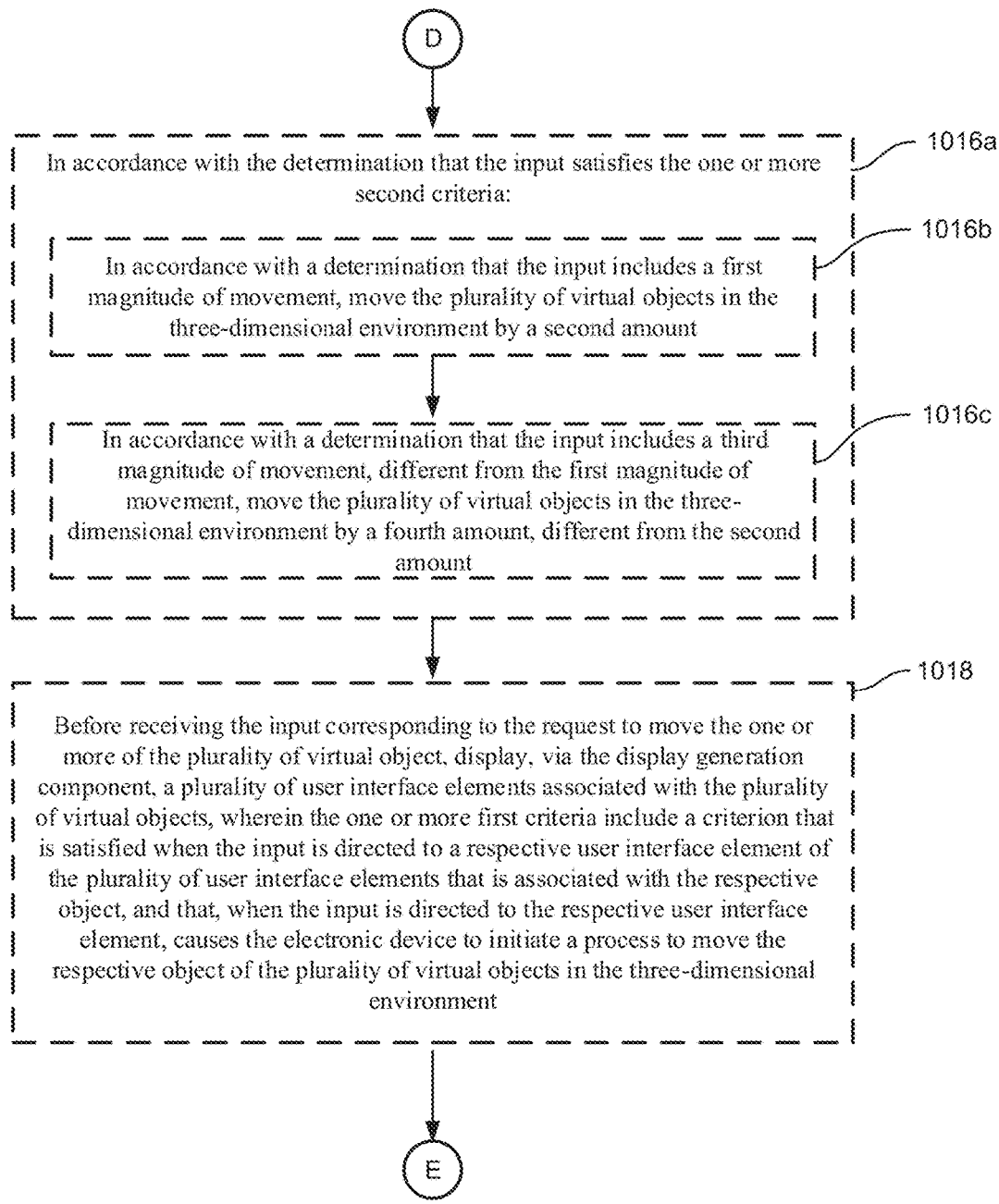
Figure 10F:
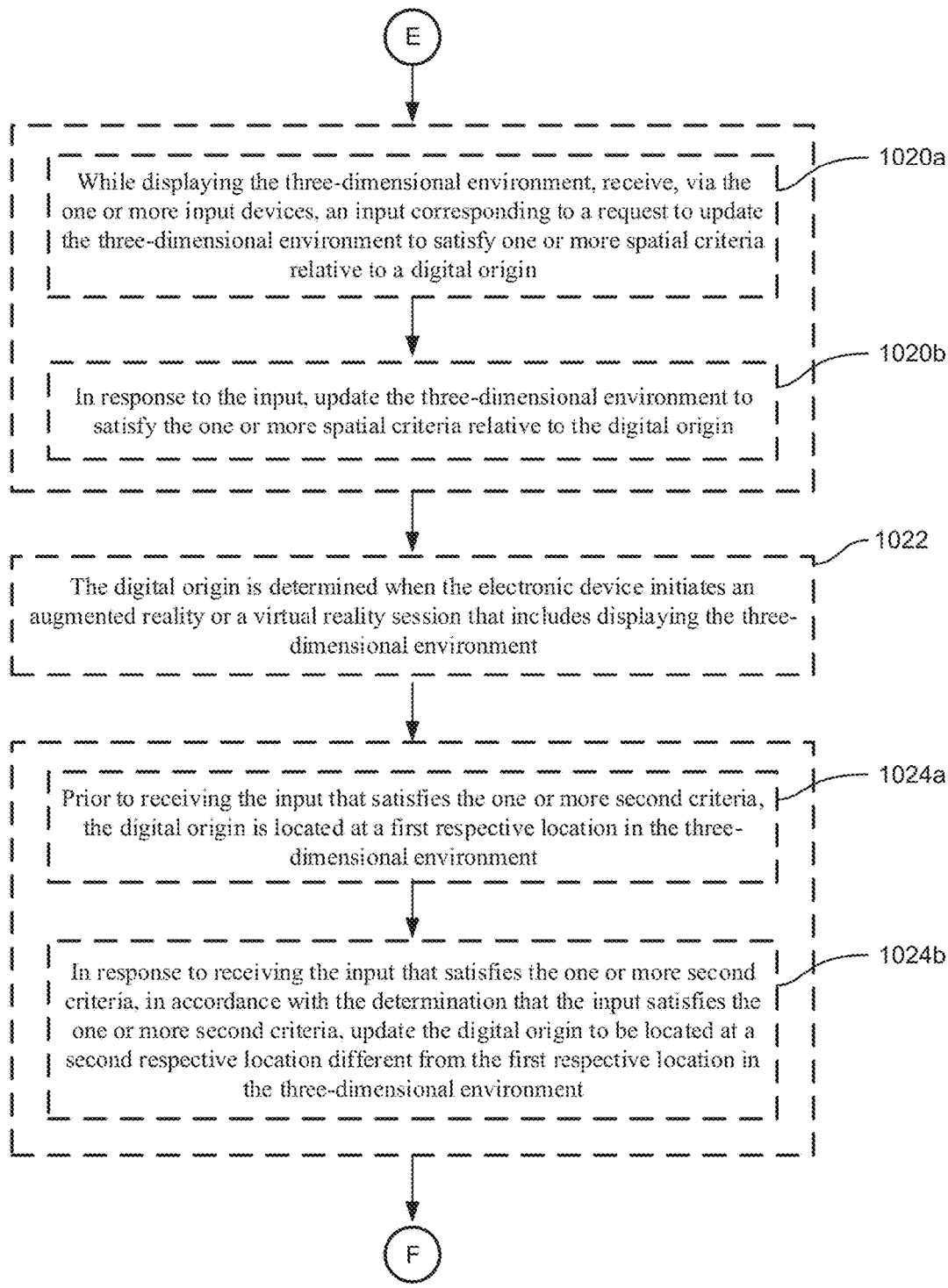
Figure 10G:
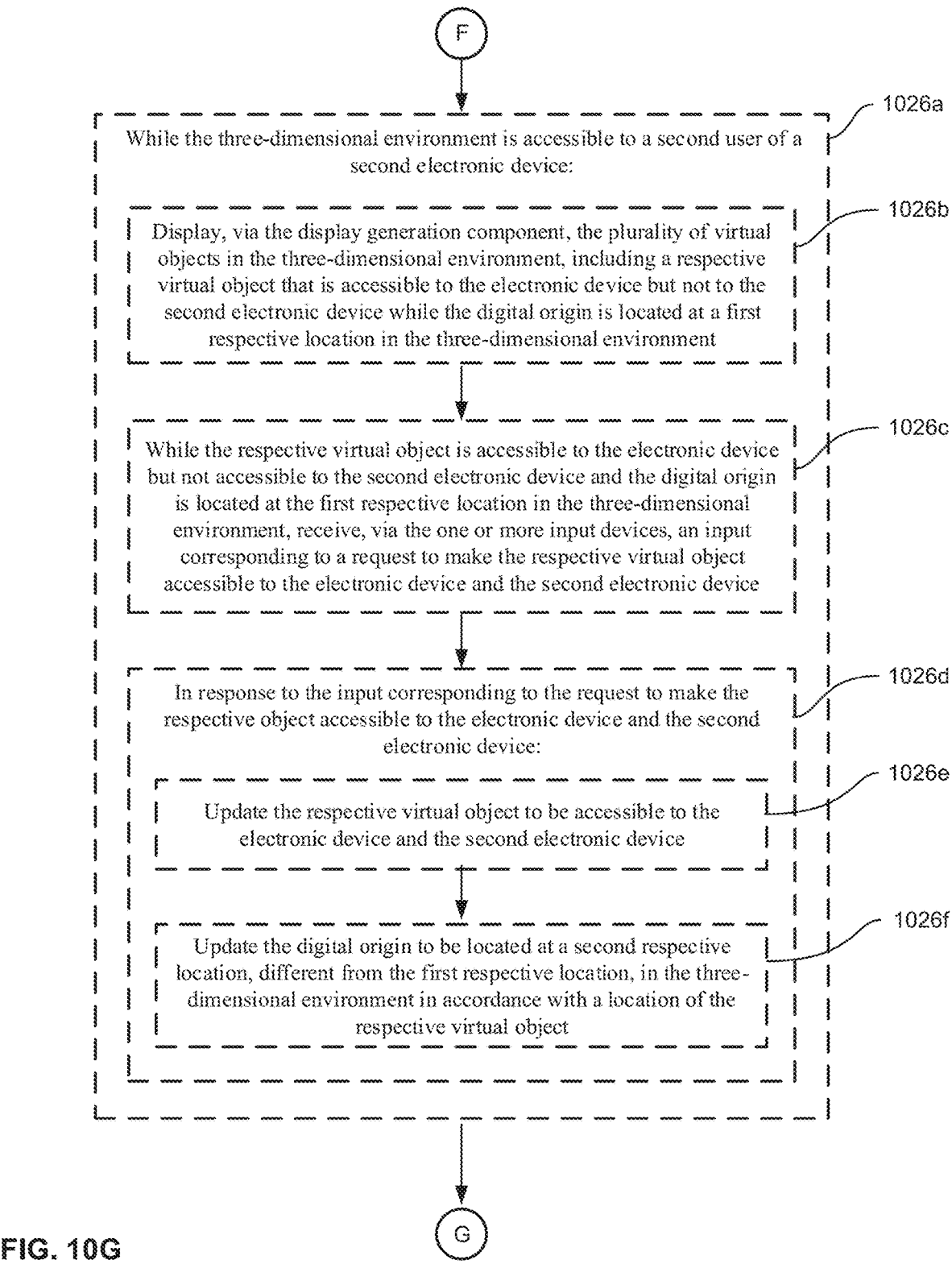
Figure 10H:
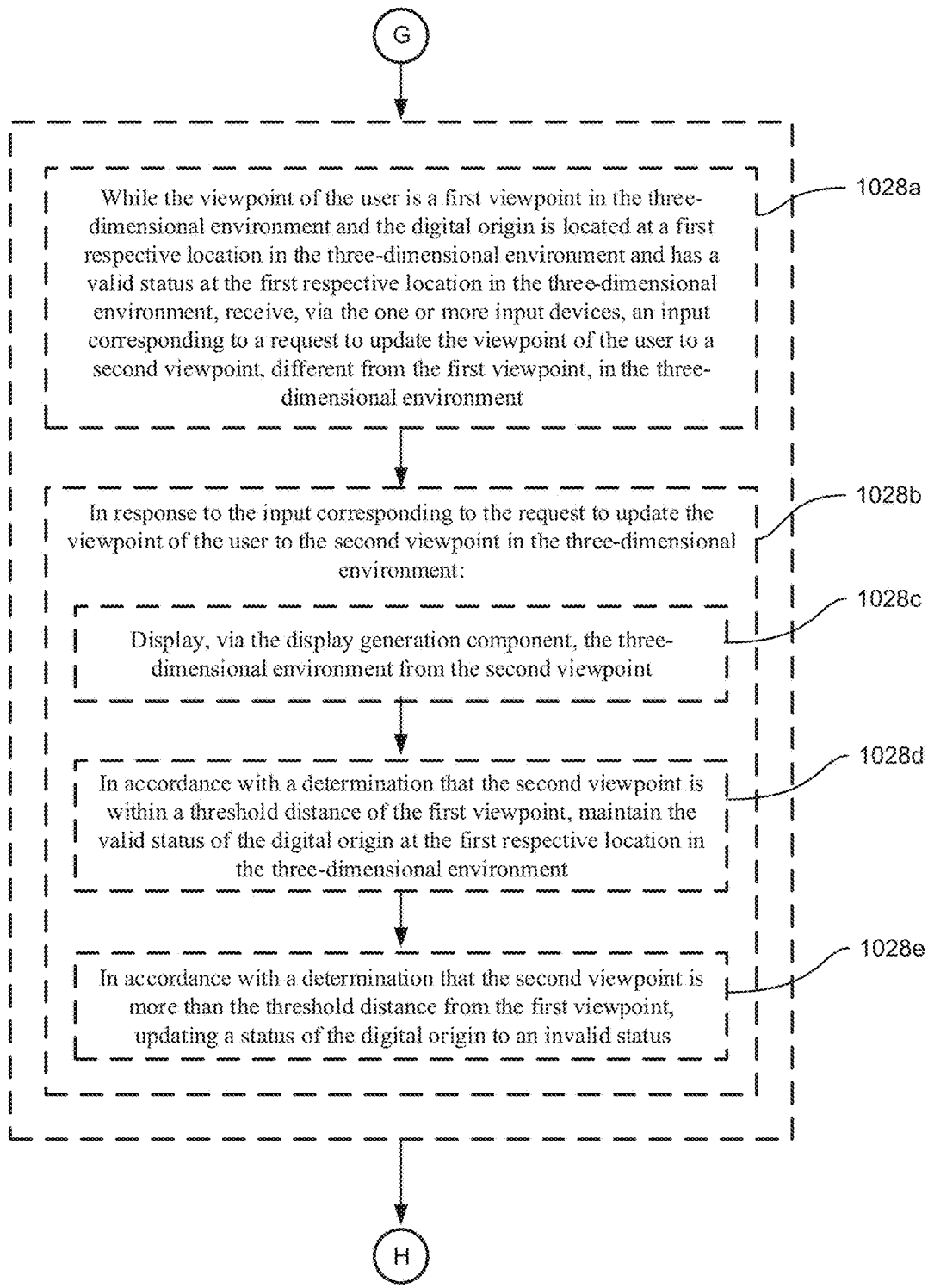
Figure 10I:
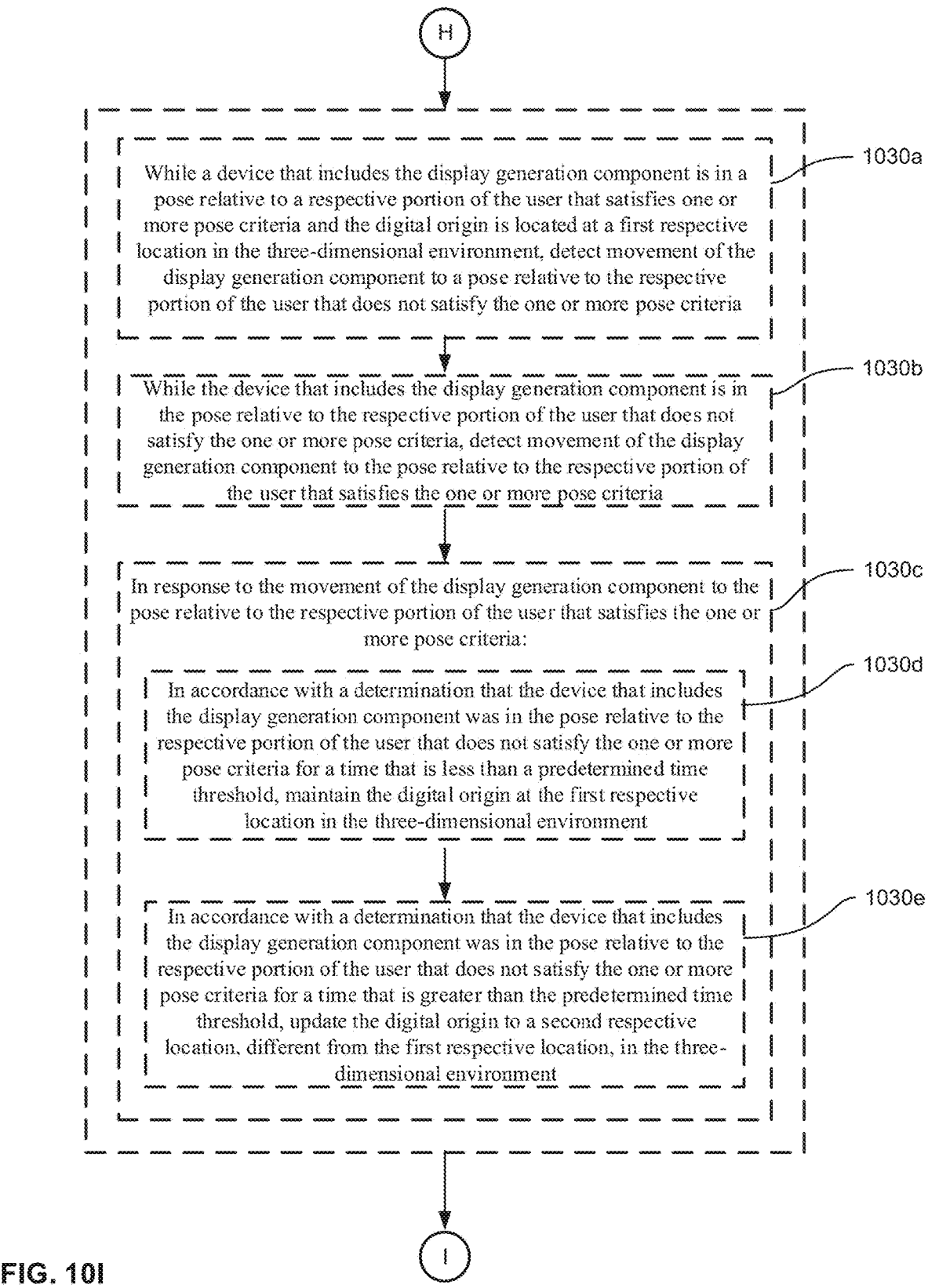
Figure 10J:
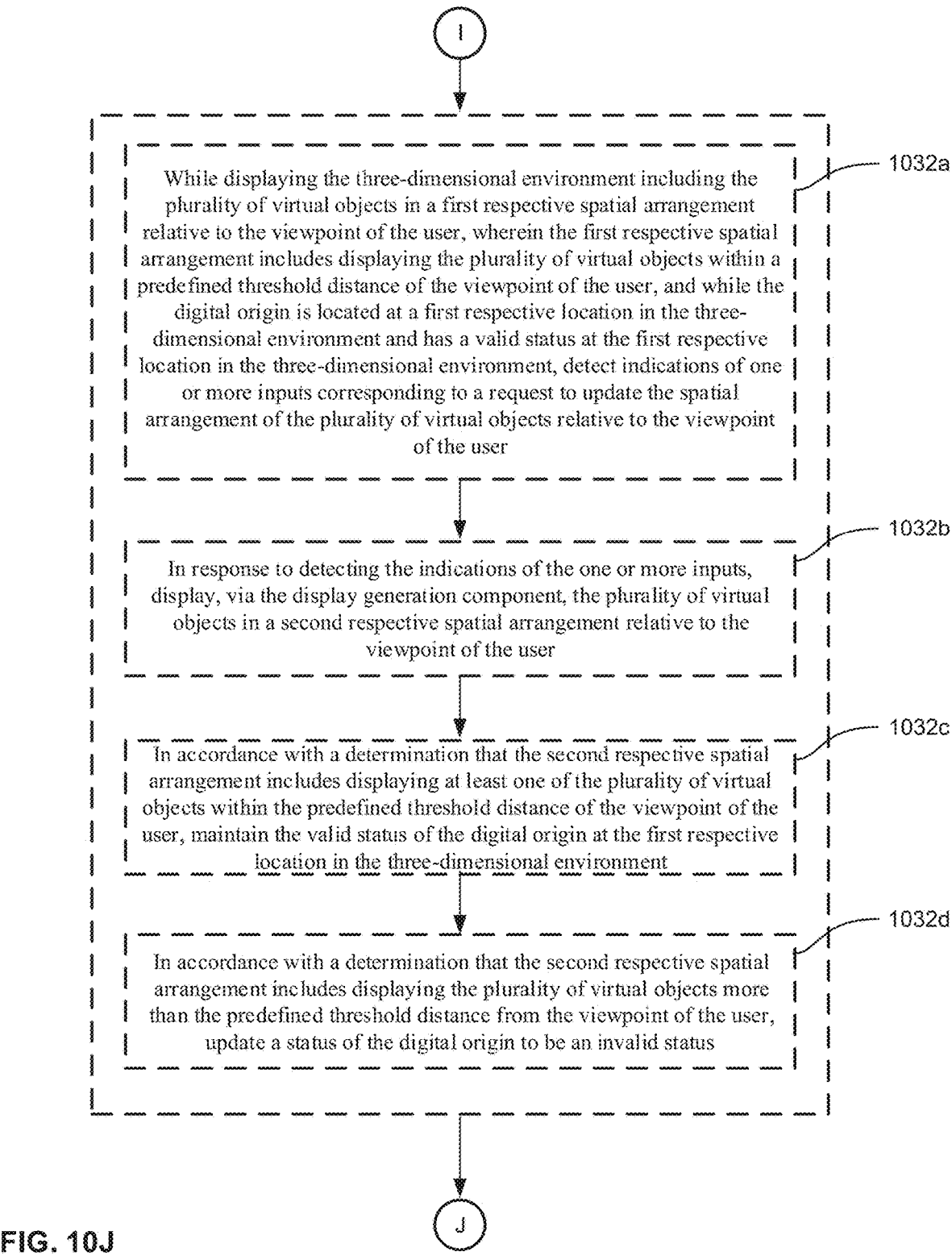
Figure 10K:
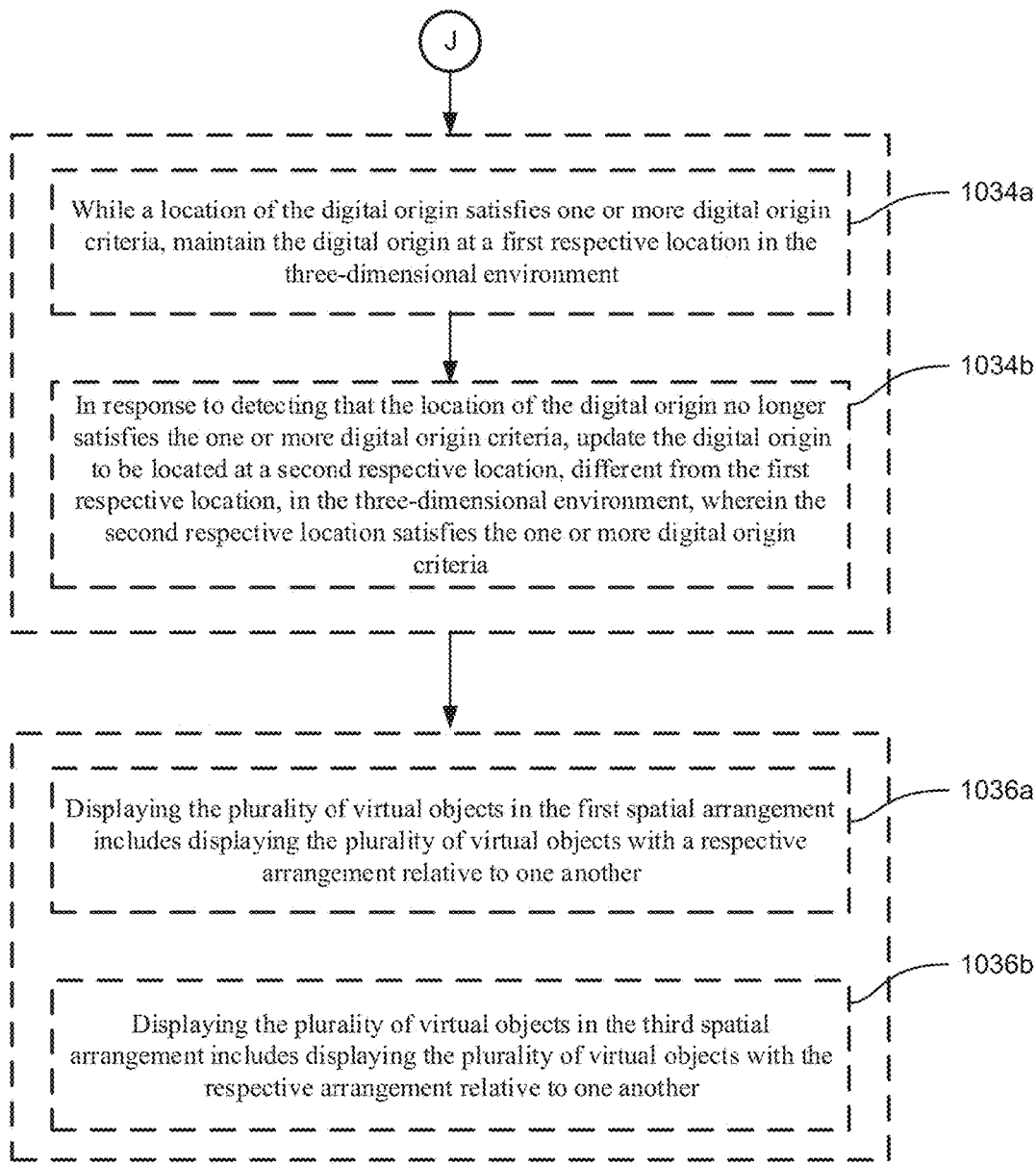

FIG. 9G illustrates the second electronic device 101b displaying the user interface 918b of the fourth application in response to the input to share the fourth application detected by the first electronic device 101a in FIG. 9F. In response to the input illustrated in FIG. 9F, the first electronic device 101a invalidates the digital origin 912. FIG. 9G illustrates an updated location of the digital origin 912 to which, if the first electronic device 101a were to recenter the three-dimensional environment 902a, the first electronic device 101a would move the viewpoint of the first user 101a. In some embodiments, the digital origin 912 associated with the first electronic device 101a is invalided in response to the request to share the user interface 918 of the fourth application because the representations 916a of the first user occludes the user interface 918b of the fourth application from the view of the second user 916b.

Additional or alternative details regarding the embodiments illustrated in FIGS. 9A-9G are provided below in description of method 1000 described with reference to FIGS. 10A-10K.

FIGS. 10A-10K is a flowchart illustrating a method of updating the positions of multiple virtual objects together in accordance with some embodiments. In some embodiments, the method 1000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In some embodiments, method 1000 is performed at an electronic device in communication with a display generation component and one or more input devices (e.g., a mobile device (e.g., a tablet, a smartphone, a media player, or a wearable device), or a computer). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc. In some embodiments, the electronic device is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, such as in FIG. 9B, while displaying, via the display generation component (e.g., 120*a*), a three-dimensional environment (e.g., 902*a*) from a viewpoint of a user (e.g., 916*a*) of the electronic device (e.g., 101*a*), the three-dimensional environment (e.g., 902*a*) including a plurality of virtual objects (e.g., 904*a*, 906*a*) at first locations in a first spatial arrangement relative to the viewpoint of the user in the three-dimensional environment (e.g., 902*a*), the electronic device (e.g., 101) receives (1002*a*), via the one or more input devices, an input corresponding to a request to move one or more of the plurality of virtual objects (e.g., 904*a*, 906*a*). In some embodiments, the input and/or one or more inputs described with reference to method 1000 are air gesture inputs, such as described with reference to method 800. In some embodiments, the three-dimensional environment includes virtual objects, such as application windows, operating system elements, representations of other users, and/or content items and/or representations of physical objects in the physical environment of the electronic device. In some embodiments, the representations of physical objects are displayed in the three-dimensional environment via the display generation component (e.g., virtual or video passthrough). In some embodiments, the representations of physical objects are views of the physical objects in the physical environment of the electronic device visible through a transparent portion of the display generation component (e.g., true or real passthrough). In some embodiments, the electronic device displays the three-dimensional environment from the viewpoint of the user at a location in the three-dimensional environment corresponding to the physical location of the electronic device in the physical environment of the electronic device. In some embodiments, the three-dimensional environment is generated, displayed, or otherwise caused to be viewable by the device (e.g., a computer-generated reality (XR) environment such as a virtual reality (VR) environment, a mixed reality (MR) environment, or an augmented reality (AR) environment, etc.). In some embodiments, receiving the input includes detecting a predefined gesture performed by a predefined portion (e.g., hand(s)) of the user. In some embodiments, the predefined gesture is a pinch gesture in which the user touches a finger with a thumb and moves the finger and thumb apart, performed by one or more hands of the user. For example, the input includes the user making the pinch hand shape with both hands and moving both hands to cause the electronic device to update the positions of the plurality of virtual objects in accordance with movement of the user's hands. In some embodiments, the predefined gesture is a press gesture in which the user moves their hand(s) to a predefined location (e.g., a location corresponding to the one or more user interface elements to be moved, a location corresponding to an air gesture user interface element different from the one or more user interface elements to which the input is directed) while making a pointing hand shape with one or more fingers extended and one or more fingers curled to the palms. In some embodiments, the input to move the one or more of the plurality of virtual objects has one or more of the characteristics of the object movement inputs described with reference to method 1400.

In some embodiments, such as in FIG. 9C, in response to receiving the input (1002*b*), in accordance with a determination that the input satisfies one or more first criteria (1002*c*) (e.g., the input is directed to a respective object of the plurality of virtual objects without being directed to the rest of the plurality of virtual objects), the electronic device (e.g., 101) updates (1002*d*) the three-dimensional environment (e.g., 902*a*) to move a respective object (e.g., 904*a*) of the plurality of virtual objects from a first location to a second location, different from the first location, in the three-dimensional environment (e.g., 902*a*) in accordance with the input, wherein the respective object (e.g., 904*a*) at the second location has a second spatial arrangement relative to the viewpoint of the user (e.g., 916*a*), different from the first spatial arrangement relative to the viewpoint of the user (e.g., 916*a*). In some embodiments, the input changes the location of the respective object in the three-dimensional environment. In some embodiments, the input changes the location of the respective object relative to the other virtual objects in the three-dimensional environment. In some embodiments, the input changes the location of the respective object in the three-dimensional environment relative to the viewpoint of the user. In some embodiments, updating the location of the respective object includes changing the distance of the virtual object from the viewpoint of the user. In some embodiments, the second respective location is based on the (e.g., speed, duration, distance, etc. of the) movement of a predefined portion (e.g., hand(s)) of the user that provides the input. In some embodiments, the one or more first criteria include a criterion that is satisfied when the electronic device detects a predefined gesture performed with one of the user's hands but not with both hands. In some embodiments, the one or more first criteria include a criterion that is satisfied when the input is directed to a user interface element that, in response to an input directed to the user interface element, causes the electronic device to initiate a process to move a respective virtual object without moving the other virtual objects in the three-dimensional environment.

In some embodiments, in response to receiving the input (1002*b*), in accordance with a determination that the input satisfies one or more first criteria (1002*c*) (e.g., the input is directed to a respective object of the plurality of virtual objects without being directed to the rest of the plurality of virtual objects), the electronic device (e.g., 101) maintains (1002*e*) one or more second objects (e.g., 906*a* in FIG. 9C) of the plurality of virtual objects at the first locations in the three-dimensional environment in the first spatial arrangement relative to the viewpoint of the user. In some embodiments, the input causes the electronic device to maintain the locations of the other virtual objects in the three-dimensional environment. In some embodiments, the input causes the electronic device to maintain the locations of the other virtual objects with respect to the viewpoint of the user. In some embodiments, the input causes the electronic device to maintain the locations of each second object relative to the other second objects.

In some embodiments, such as in FIG. 9C, in response to receiving the input (1002b), in accordance with a determination that the input satisfies one or more second criteria (e.g., the input is directed to the plurality of virtual objects), the electronic device (e.g., 101) updates (10020 the three-dimensional environment (e.g., 902a) to move the plurality of virtual objects (e.g., 904a, 906a) in the three-dimensional environment (e.g., 902a) in accordance with the input, wherein after the movement, the plurality of virtual objects (e.g., 904a, 904b) have a third spatial arrangement relative to the viewpoint of the user (e.g., 916a) different from the first spatial arrangement relative to the viewpoint of the user (e.g., 916a). In some embodiments, the one or more second criteria include a criterion that is satisfied when the electronic device detects a predefined gesture performed with both of the user's hands. In some embodiments, the one or more second criteria include a criterion that is satisfied when the input is directed to a user interface element that, in response to an input directed to the user interface element, causes the electronic device to initiate a process to move the plurality of virtual objects in the three-dimensional environment. In some embodiments, the input causes the electronic device to update the locations of the plurality of virtual objects in the three-dimensional environment. In some embodiments, the input causes the electronic device to update the locations of the virtual objects with respect to the viewpoint of the user. In some embodiments, during and/or in response to the input (e.g., while and/or after the plurality of elements are moving together based on the input) one or more (e.g., all) of the virtual objects maintain spatial relationships with respect to each other and/or the other virtual objects. In some embodiments, if the electronic device is in communication with a second electronic device having and/or associated with a second user, the electronic device maintains the locations of the virtual objects in the three-dimensional environment and updates the location of the viewpoint of the user in the three-dimensional environment so the spatial orientation of the virtual objects relative to the viewpoint of the user is updated without changing the locations of the virtual objects relative to the viewpoint of the second user.

Updating the three-dimensional environment to move the plurality of objects in accordance with a determination that the input satisfies the one or more second criteria enhances user interactions with the electronic device by reducing the inputs needed to move multiple virtual objects in response to one input, thereby enabling the user to use the electronic device quickly and efficiently.

In some embodiments, such as in FIG. 9C, in response to receiving the input and in accordance with the determination that the input satisfies the one or more second criteria, updating the three-dimensional environment (e.g., 902a) to move the plurality of virtual objects (e.g., 904a, 904b) in the three-dimensional environment (e.g., 902a) in accordance with the input includes moving a first virtual object (e.g., 904a) of the plurality of virtual objects by a respective (e.g., lateral, angular) amount and in a respective (e.g., lateral, angular) direction and moving a second virtual object (e.g., 906a) of the plurality of virtual objects by the respective amount and in the respective direction based on a direction and magnitude of the input (1004). In some embodiments, when moving the plurality of virtual objects, the virtual objects maintain a respective spatial orientation relative to the other virtual objects and are displayed with a different spatial arrangement relative to the viewpoint of the user. For example, in response to an input to move the plurality of virtual objects by a first amount in a first direction, the electronic device moves the first virtual object and the second virtual object by the first amount in the first direction in the three-dimensional environment. As another example, in response to an input to rotate the plurality of objects by a second amount in a second direction, the electronic device moves the first virtual object and the second virtual to rotate the first virtual object and the second virtual object by the second amount in the second direction (e.g., around a respective reference point in the three-dimensional environment).

Moving the first and second virtual objects by the respective amount in the respective direction in response to receiving the input provides an efficient way of maintaining a respective spatial arrangement of the plurality of virtual objects while adjusting the position and/or orientation of the plurality of virtual objects (e.g., collectively), thereby enabling the user to use the device quickly and efficiently with fewer inputs.

In some embodiments, such as in FIG. 9C, the one or more second criteria include a criterion that is satisfied when receiving the input includes detecting a first portion (e.g., a first hand) of the user (e.g., 913a) in a pose that satisfies one or more pose criteria and detecting a second portion (e.g., a second hand) of the user (e.g., 913b) in the pose that satisfies the one or more pose criteria (1006). In some embodiments, the one or more second criteria include a criterion that is satisfied when the electronic device detects, via the one or more input devices (e.g., a hand tracking device) that the user makes pinch hand shapes (e.g., touching the thumb to another finger of the same hand) with both hands. In some embodiments, in response to detecting the user make pinch hand shapes with both hands, the electronic device initiates a process to move the plurality of virtual objects and, in response to detecting movement of the hands while the pinch hand shapes are maintained, the electronic device moves the plurality of objects in accordance with the (e.g., direction, speed, duration, distance, etc. of the) movement of one or more of the hands. In some embodiments, in response to detecting an input directed to a user interface element for moving a respective virtual object that includes detecting a pinch gesture with one hand (e.g., and not both hands), the electronic device initiates a process to move the respective virtual object (e.g., without moving the plurality of virtual objects).

Moving the plurality of objects in response to detecting the first and second portions of the user in the poses that satisfy the one or more pose criteria provides an efficient way of updating the position of multiple virtual objects at once, thereby enabling the user to use the electronic device quickly and efficiently.

In some embodiments, such as in FIG. 9A, while the electronic device (e.g., 101a) is not receiving the input, the electronic device (e.g., 101) displays (1008a), via the display generation component (e.g., 120a), the plurality of virtual objects (e.g., 904a, 906a) in the three-dimensional environment (e.g., 101a) with a first amount of visual emphasis (e.g., opacity, sharpness, color contrast, size, etc.). In some embodiments, while the electronic device is not receiving the input, the electronic device displays the plurality of virtual objects with full color, opacity, and sharpness. In some embodiments, while the electronic device is not receiving the input, the electronic device displays the plurality of virtual objects with a first amount of visual emphasis relative to the rest of the three-dimensional environment.

In some embodiments, such as in FIG. 9B, in accordance with a determination that the input satisfies the one or more second criteria, while receiving the input, the electronic device (e.g., 101) displays (1008db), via the display generation component (e.g., 120a), the plurality of virtual objects (e.g., 904a, 906a) in the three-dimensional environment (e.g., 902a) with a second amount of visual emphasis (e.g., opacity, sharpness, color contrast, size, etc.) that is less than the first amount of visual emphasis. In some embodiments, while the electronic device is receiving the input, the electronic device displays the plurality of virtual objects with reduced opacity and/or sharpness and/or displays the plurality of virtual objects with modified colors, such as lighter colors, dimmer colors, colors with less saturation/contrast, or the like. In some embodiments, while the electronic device is receiving the input, the electronic device displays the plurality of virtual objects with a second amount of visual emphasis relative to the rest of the three-dimensional environment that is less than the first amount of visual emphasis.

Reducing the visual emphasis of the plurality of objects while the input is received provides an efficient way of presenting portions of the three-dimensional environment proximate to and/or overlapped by the plurality of virtual objects while receiving an input to update the positions of the virtual objects, which enhances user interactions with the electronic device by providing enhanced visual feedback while the input to update the position of the plurality of virtual objects is received, thereby enabling the user to user the electronic device quickly and efficiently with enhanced visual feedback.

In some embodiments, such as in FIG. 9B, the electronic device (e.g., 101b) displays (1010a), via the display generation component (e.g., 120b), a representation of a second user (e.g., 916a) of a second electronic device (e.g., 101a) in the three-dimensional environment (e.g., 902b). In some embodiments, the electronic device and second electronic device are in communication with each other (e.g., via a network connection). In some embodiments, the electronic device and the second electronic device have access to the three-dimensional environment. In some embodiments, the electronic device displays a representation of the second user at a location in the three-dimensional environment corresponding to the viewpoint of the second user. In some embodiments, the second electronic device displays a representation of the user of the electronic device at a location in the three-dimensional environment corresponding to the viewpoint of the user of the electronic device.

In some embodiments, such as in FIG. 9B, while the second electronic device (e.g., 101a) detects a respective input that satisfies the one or more second criteria (e.g., an input for updating the positions of the plurality of virtual objects relative to the perspective of the viewpoint of the second user), the electronic device (e.g., 101) displays (1010b), via the display generation component (e.g., 120a), the representation of the second user (e.g., 916a) with a first amount of visual emphasis (e.g., opacity, sharpness, color contrast, size, visual emphasis relative to the rest of the three-dimensional environment etc.). In some embodiments, while the second electronic device detects the respective input, the electronic device displays the representation of the second user with reduced visual emphasis relative to the visual emphasis with which the representation of the second user is displayed while the second electronic device does not detect the respective input. For example, while the second electronic device detects the respective input, the electronic device displays the representation of the second user with decreased opacity and/or sharpness and/or with colors that are lightened, faded, darkened, and/or with reduced contrast and/or saturation compared to the manner in which the electronic device displays the representation of the second user while the second electronic device does not detect the respective input. In some embodiments, the electronic device maintains display of the representation of the second user at a respective location in the three-dimensional environment while the second electronic device detects the respective input. In some embodiments, the electronic device displays the representation of the second user with the first amount of visual emphasis while moving the representation of the second user in accordance with the respective input detected by the second electronic device. For example, while the second electronic device detects an input corresponding to a request to move the plurality of virtual objects closer to the viewpoint of the second user, the electronic device displays the representation of the second user with the first amount of visual emphasis moving towards the plurality of virtual objects without displaying movement of the virtual objects relative to the viewpoint of the user, though the virtual objects move relative to the viewpoint of the second user. In some embodiments, the electronic device receives an indication of the respective input from the second electronic device.

In some embodiments, such as in FIG. 9A, while the second electronic device (e.g., 101a) does not detect the respective input that satisfies the one or more second criteria, the electronic device (e.g., 101b) displays (1010c), via the display generation component (e.g., 120b), the representation of the second user (e.g., 916a) with a second amount of visual emphasis that is greater than the first amount of visual emphasis (e.g., visual emphasis relative to the rest of the three-dimensional environment). In some embodiments, while the second electronic device is not detecting the respective input, the electronic device displays the representation of the second user with greater (or full) opacity and/or sharpness and/or with an increased degree of saturation.

Displaying the representation of the second user while the second electronic device detects the respective input provides an efficient way of indicating to the user that the second user is engaged with providing the respective input, thereby improving communication between the users and enabling the user to use the electronic device quickly and efficiently.

In some embodiments, such as in FIG. 9A, the electronic device (e.g., 101b) displays (1012a), via the display generation component (e.g., 120b), a representation of a second user (e.g., 916a) of a second electronic device at a third location in the three-dimensional environment (e.g., 902b). In some embodiments, the electronic device and second electronic device are in communication with each other (e.g., via a network connection). In some embodiments, the electronic device and the second electronic device have access to the three-dimensional environment. In some embodiments, the third location is the location in the three-dimensional environment of the viewpoint of the second user. In some embodiments, the second electronic device displays a representation of the user of the electronic device at a location in the three-dimensional environment of the viewpoint of the user of the electronic device. In some embodiments, the electronic device displays additional representations of other users with access to the three-dimensional environment at locations in the three-dimensional environment of the viewpoints of the other users.

In some embodiments, such as in FIG. 9B, while displaying the representation of the second user (e.g., 916a) at the third location in the three-dimensional environment (e.g., 902b), the electronic device (e.g., 101b) receives (1012b) an indication that the second electronic device (e.g., 101a) received a respective input that satisfies the one or more second criteria. In some embodiments, the respective input is an input received at the second electronic device corresponding to a request to update the positions of the virtual objects with respect to the viewpoint of the second user in the three-dimensional environment.

In some embodiments, such as in FIG. 9D, in response to the indication, the electronic device (e.g., 101b) displays (1012c), via the display generation component (e.g., 120b), the representation of the second user (e.g., 916a) at a fourth location in the three-dimensional environment (e.g., 902b) in accordance with the respective input without displaying an animation of the representation of the second user moving from the third location to the fourth location. In some embodiments, the electronic device displays the representation of the second user "jumping" or "teleporting" from the third location to the fourth location. In some embodiments, the fourth location is based on the respective input received by the second electronic device. For example, in response to the respective input to rotate the plurality of virtual objects clockwise relative to a reference point (e.g., inside a boundary around the plurality of virtual objects), in response to the indication of the respective input, the electronic device updates the location of the representation of the second user to the fourth location counterclockwise around the plurality of virtual objects from the third location. In some embodiments, the electronic device displays the representation of the second user at the third location in the three-dimensional environment until the second electronic device detects an end of the input that satisfies the one or more second criteria.

Displaying the representation of the second user at the fourth location without displaying an animation of the representation of the second user moving from the third location to the fourth location provides an efficient way of updating the representation of the second user in accordance with the viewpoint of the second user with reduced distraction, thereby enhancing user interactions with the electronic device and enabling the user to use the electronic device quickly and efficiently.

In some embodiments, the one or more second criteria include a criterion that is satisfied when the input is directed to a user interface element that is displayed via the display generation component (e.g., 120a) and that, when the input is directed to the user interface element, causes the electronic device (e.g., 101a) to move the plurality of virtual objects (e.g., 904a, 906a in FIG. 9A) in accordance with the input (1014). In some embodiments, the electronic device also displays respective user interface elements associated with respective ones of the plurality of virtual objects that, when the input satisfying the one or more first criteria is directed to a respective user interface element, causes the electronic device to move the respective virtual object (e.g., without moving the plurality of virtual objects). In some embodiments, in response to detecting selection of the user interface element that causes the electronic device to move the plurality of virtual objects, the electronic device initiates a process to move the plurality of virtual objects and, in response to further input including movement (e.g., of a respective portion of the user, another directional input, such as interaction with a directional button or key, manipulation of a joystick, etc.), the electronic device moves the plurality of objects in accordance with the movement. In some embodiments, detecting selection of the user interface element includes detecting the attention (e.g., gaze) of the user directed to the user interface element and detecting (e.g., via a hand tracking device) the user perform a predefined gesture with a respective portion of the user (e.g., the hand of the user), such as making the pinch hand shape described above. In some embodiments, after detecting selection of the user interface element, the electronic device moves the plurality of virtual objects in accordance with movement of the respective portion of the user (e.g., the hand of the user) while the respective portion of the user maintains the pinch hand shape. In some embodiments, detecting the input directed to the user interface element includes detecting an input provided by one hand of the user (and not two hands).

Moving the plurality of virtual objects in response to an input directed to a respective user interface element provides an efficient way of teaching the user how to move the plurality of virtual objects, thereby enabling the user to use the electronic device quickly and efficiently.

In some embodiments, in accordance with the determination that the input satisfies the one or more second criteria (1016a), in accordance with a determination that the input includes a first magnitude of movement, such as in FIG. 9B, the electronic device (e.g., 101) moves (1016b) the plurality of virtual objects (e.g., 904a, 906a) in the three-dimensional environment (e.g., 902a) by a second amount. In some embodiments, the second amount of movement (e.g., speed, duration, distance) corresponds to the first magnitude of movement (e.g., speed, duration, distance).

In some embodiments, in accordance with the determination that the input satisfies the one or more second criteria (1016a), in accordance with a determination that the input includes a third magnitude of movement, such as in FIG. 9C, different from the first magnitude of movement, the electronic device (e.g., 101) moves (1016c) the plurality of virtual objects (e.g., 904a, 906a) in the three-dimensional environment (e.g., 902a) by a fourth amount, different from the second amount. In some embodiments, the fourth amount of movement (e.g., speed, duration, distance) corresponds to the third magnitude of movement (e.g., speed, duration, distance). In some embodiments, if the first magnitude of movement is greater than the third magnitude of movement, the second amount is greater than the fourth amount. In some embodiments, if the first magnitude of movement is less than the third magnitude of movement, the second amount is less than the fourth amount. For example, if the first magnitude of movement (e.g., of the hand(s) of the user) includes faster movement or movement with a greater distance and/or duration than the third magnitude of movement (e.g., of the hand(s) of the user), the second amount is greater than the fourth amount. As another example, if the first magnitude of movement (e.g., of the hand(s) of the user) includes slower movement or movement with less distance and/or duration than the third magnitude of movement (e.g., of the hand(s) of the user), the second amount is less than the fourth amount.

Moving the plurality of virtual objects by an amount corresponding to the magnitude of movement of the input provides an efficient way of enabling the user to control the amount of movement of the plurality of objects with enhanced control, thereby enabling the user to use the electronic device quickly and efficiently.

In some embodiments, before receiving the input corresponding to the request to move the one or more of the plurality of virtual objects (e.g., 904a, 906a in FIG. 9A), the electronic device (e.g., 101*a*) displays (1018), via the display generation component (e.g., 120*a*), a plurality of user interface elements associated with the plurality of virtual objects (e.g., 904*a*, 906*a*), wherein the one or more first criteria include a criterion that is satisfied when the input is directed to a respective user interface element of the plurality of user interface elements that is associated with the respective object, and that, when the input is directed to the respective user interface element, causes the electronic device to initiate a process to move the respective object of the plurality of virtual objects in the three-dimensional environment (e.g., 902*a*). In some embodiments, the plurality of virtual objects includes a first virtual object and a second virtual object. In some embodiments, the electronic device displays a first selectable element proximate to the first virtual object that, when selected, causes the electronic device to initiate a process to move the first virtual object in the three-dimensional environment. In some embodiments, the electronic device displays a second selectable element proximate to the second virtual object that, when selected, causes the electronic device to initiate a process to move the second virtual object in the three-dimensional environment. In some embodiments, the electronic device displays the first selectable element in response to detecting the attention (e.g., gaze) of the user directed to the first virtual object, optionally while detecting a respective portion of the user (e.g., hand) in a predefined shape, such as a pre-pinch hand shape in which the thumb is within a predefined threshold distance (e.g., 0.5, 1, 2, 3, 4, or 5 centimeters) of another finger of the hand or a pointing hand shape in which one or more fingers are extended and one or more fingers are curled towards the palm, optionally while the hand is within a predefined threshold distance (e.g., 1, 2, 3, 5, 10, 15, 30, 50, or 100 centimeters) of the first object. In some embodiments, the electronic device displays the second selectable element in response to detecting the attention (e.g., gaze) of the user directed to the second virtual object, optionally while detecting a respective portion of the user (e.g., hand) in a predefined shape, such as the pre-pinch hand shape or the pointing hand shape, optionally while the hand is within a predefined threshold distance (e.g., 1, 2, 3, 5, 10, 15, 30, 50, or 100 centimeters) of the second object.

Moving a respective virtual object (e.g., without moving the plurality of virtual objects) in response to an input directed to a respective user interface element that causes the electronic device to initiate the process to move the respective virtual object enhances user interactions with the electronic device by providing an efficient way of selecting which virtual object to move, thereby enabling the user to use the electronic device quickly and efficiently.

In some embodiments, while displaying the three-dimensional environment (e.g., 902*a*), the electronic device (e.g., 101*a*) receives (1020*a*), via the one or more input devices, an input corresponding to a request to update the three-dimensional environment (e.g., 902*a*) to satisfy one or more spatial criteria relative to a digital origin (e.g., 912 in FIG. 9D) (e.g., such as the inputs described with reference to method 800). In some embodiments, the request corresponds to (e.g., is, includes) a request to update the spatial arrangement of the plurality of virtual objects relative to the current viewpoint of the user to satisfy the one or more criteria that specify a range of distances and/or a range of orientations of virtual objects relative to the current viewpoint and/or digital origin of the user according to one or more steps of method 800. In some embodiments, the digital origin is located at a location in the three-dimensional environment that the electronic device uses to evaluate one or more location and/or orientation criteria with respect to the plurality of virtual objects and/or with respect to the viewpoint of the user when updating the three-dimensional environment in response to the request to update the spatial arrangement of the plurality of virtual objects relative to the current viewpoint of the user to satisfy the one or more spatial criteria that specify a range of distances and/or a range of orientations of virtual objects relative to the current viewpoint and/or digital origin of the user according to one or more steps of method 800. In some embodiments, the digital origin and the viewpoint of the user are located at the same location in the three-dimensional environment. In some embodiments, the digital origin and the viewpoint of the user are located at different locations in the three-dimensional environment.

In some embodiments, in response to the input, the electronic device (e.g., 101*a*) updates (1020*b*) the three-dimensional environment (e.g., 902*a*) to satisfy the one or more spatial criteria relative to the digital origin. In some embodiments, updating the three-dimensional environment to satisfy the one or more spatial criteria relative to the digital origin corresponds to (e.g., is, includes) updating the spatial arrangement of the one or more virtual objects and/or updating the viewpoint of the user according to one or more steps of method 800. In some embodiments, if the virtual objects satisfy one or more criteria relative to the digital origin but the viewpoint of the user does not satisfy one or more criteria relative to the digital origin, the electronic device updates the viewpoint of the user in response to the input. In some embodiments, if the viewpoint of the user satisfies one or more criteria relative to the digital origin but one or more virtual objects do not satisfy one or more criteria relative to the digital origin, the electronic device updates the location and/or orientation of the one or more virtual objects in response to the input.

Updating the three-dimensional environment to satisfy the one or more spatial criteria relative to the digital origin enhances user interactions with the electronic device by providing a consistent experience when the user makes a request to update the three-dimensional environment, thereby enabling the user to use the electronic device quickly and efficiently.

In some embodiments, such as in FIG. 9A, the digital origin (e.g., 912) is determined when the electronic device (e.g., 101*a*) initiates an augmented reality or a virtual reality session that includes displaying the three-dimensional environment (e.g., 902*a*) (1022). In some embodiments, the digital origin is determined when the electronic device detects that a spatial orientation of the electronic device or display generation component relative to the user becomes a predetermined spatial orientation. For example, the electronic device and/or display generation component is a wearable device and the predetermined spatial location is when the user puts on and/or is wearing the electronic device and/or display generation component. In some embodiments, the digital origin is initially at the location in the three-dimensional environment of the viewpoint of the user (e.g., when the AR or VR session starts or when the spatial orientation of the electronic device or display generation component relative to the user initially becomes the predetermined spatial orientation).

Determining the digital origin when the AR or VR session starts enhances user interactions with the electronic device by establishing a reference point at the start of the session, thereby providing a consistent experience to the user, enabling the user to use the electronic device quickly and efficiently with reduced user errors.

In some embodiments, such as in FIG. 9A, prior to receiving the input that satisfies the one or more second criteria, the digital origin (e.g., 912) is located at a first respective location in the three-dimensional environment (e.g., 902a) (1024a). In some embodiments, the first respective location of the digital origin is selected at the start of a VR or AR session. In some embodiments, the first respective location of the digital origin is a location selected in response to a request to update the three-dimensional environment to satisfy one or more spatial criteria that is received while the digital origin has an invalid state, as described in more detail below. In some embodiments, the first respective location of the digital origin is a location selected in response to a previous input that satisfies the one or more second criteria, as described below.

In some embodiments, such as in FIG. 9C, in response to receiving the input that satisfies the one or more second criteria, in accordance with the determination that the input satisfies the one or more second criteria, the electronic device (e.g., 101a) updates (1024b) the digital origin (e.g., 912) to be located at a second respective location different from the first respective location in the three-dimensional environment (e.g., 902a). In some embodiments, the electronic device updates the digital origin to maintain a spatial relationship between the digital origin and the plurality of virtual objects that existed when the input was received. In some embodiments, the electronic device updates the digital origin in a manner that changes a spatial relationship between the digital origin and the plurality of virtual objects that existed when the input was received. In some embodiments, the viewpoint of the user does not move in response to receiving the input that satisfies the one or more criteria. In some embodiments, the electronic device updates the digital origin to be located at the location of the viewpoint of the user in the three-dimensional environment. In some embodiments, after updating the location of the digital origin, in response to receiving an input corresponding to a request to satisfy the one or more spatial criteria relative to the digital origin and/or viewpoint of the user according to one or more steps of method 800, the electronic device updates the viewpoint of the user (e.g., to be located at the location of the digital origin).

Updating the digital origin in response to the input that satisfies the one or more second criteria enhances user interactions with the electronic device by updating the location in the three-dimensional environment used to evaluate the spatial orientation of the virtual objects and viewpoint of the user in accordance with the updated spatial arrangement of the plurality of objects requested by the user, thereby enabling the user to use the electronic device quickly and efficiently.

In some embodiments, such as in FIG. 9F, while the three-dimensional environment (e.g., 902) is accessible to a second user of a second electronic device (e.g., 101b) (1026a), the electronic device (e.g., 101a) displays (1026b), via the display generation component (e.g., 120a), the plurality of virtual objects (e.g., 918a) in the three-dimensional environment (e.g., 101a), including a respective virtual object (e.g., 918a) that is accessible to the electronic device (e.g., 101a) but not to the second electronic device (e.g., 101b) while the digital origin (e.g., 912) is located at a first respective location in the three-dimensional environment. In some embodiments, the second electronic device does not display the respective virtual object while the respective virtual object is not accessible to the second electronic device. In some embodiments, the spatial relationships between two or more of the respective virtual objects, the viewpoint of the user, and the digital origin satisfies one or more spatial criteria while the respective virtual object is not accessible to the second electronic device. In some embodiments, if the respective virtual object was accessible to the second electronic device, one or more spatial relationships between two or more of the respective virtual objects, the viewpoint of the user, the digital origin, and the viewpoint of the second user of the second electronic device would not satisfy the one or more spatial criteria. In some embodiments, while the respective virtual object is accessible to the electronic device but not the second electronic device, the respective virtual object is a "private" object (e.g., of the user).

In some embodiments, such as in FIG. 9F, while the three-dimensional environment (e.g., 902) is accessible to a second user of a second electronic device (e.g., 101b) (1026a), while the respective virtual object (e.g., 918a) is accessible to the electronic device (e.g., 101a) but not accessible to the second electronic device (e.g., 101b) and the digital origin (e.g., 912) is located at the first respective location in the three-dimensional environment (e.g., 902), the electronic device (e.g., 101) receives (1026c), via the one or more input devices (e.g., 314), an input corresponding to a request to make the respective virtual object (e.g., 918a) accessible to the electronic device (e.g., 101a) and the second electronic device (e.g., 101b).

In some embodiments, such as in FIG. 9G, while the three-dimensional environment (e.g., 902) is accessible to a second user of a second electronic device (1026a), in response to the input corresponding to the request to make the respective object (e.g., 918a) accessible to the electronic device (e.g., 101a) and the second electronic device (e.g., 101b) (1026d), the electronic device (e.g., 101a) updates (1026e) the respective virtual object (e.g., 918a) to be accessible to the electronic device (e.g., 101a) and the second electronic device (e.g., 101b). In some embodiments, while the respective virtual object is accessible to the electronic device and the second electronic device, the electronic device displays, via the display generation component, the virtual object in the three-dimensional environment and the second electronic device displays, via a second display generation component in communication with the second electronic device, the virtual object in the three-dimensional environment. In some embodiments, while the respective virtual object is accessible to the electronic device and the second electronic device, the respective virtual object is a "shared" object.

In some embodiments, such as in FIG. 9G, while the three-dimensional environment (e.g., 902) is accessible to a second user of a second electronic device (e.g., 101b) (1026a), in response to the input corresponding to the request to make the respective object (e.g., 918) accessible to the electronic device (e.g., 101a) and the second electronic device (e.g., 101b) (1026d), the electronic device (e.g., 101) updates (1026f) the digital origin (e.g., 912) to be located at a second respective location, different from the first respective location, in the three-dimensional environment (e.g., 902) in accordance with a location of the respective virtual object (e.g., 918a) (and/or a location of a second viewpoint of the three-dimensional environment associated with the second electronic device). In some embodiments, the one or more spatial relationships between two or more of the respective virtual objects, the viewpoint of the user, the digital origin, and the viewpoint of the second user of the second electronic device satisfy the one or more spatial criteria while the digital origin is located at the second respective location. In some embodiments, the digital origin is associated with the viewpoint of the user of the electronic device and the viewpoint of the second user is associated with a second digital origin different from the digital origin. In some embodiments, the digital origin is associated with the three-dimensional environment, the viewpoint of the first user, and the viewpoint of the second user. In some embodiments, the electronic device does not update the viewpoint of the use in response to the input corresponding to the request to make the respective object accessible to the electronic device and the second electronic device. In some embodiments, while the digital origin is at the second respective location, in response to receiving an input corresponding to a request to update the spatial arrangement of the plurality of virtual objects, the viewpoint of the user, and the digital origin in accordance with one or more steps of method 800, the electronic device would update the viewpoint of the user (e.g., to be located at the second respective location). In some embodiments, if both the first electronic device and the second electronic device received inputs corresponding to a request to update the spatial arrangement of the plurality of virtual objects, the viewpoint of the user, and the digital origin in accordance with one or more steps of method 800, the viewpoints of both users would be updated to satisfy the one or more spatial criteria, thereby positioning the viewpoints of the user and the respective virtual object in a manner that facilitates interaction with and viewing of the respective virtual object by both users.

Updating the digital origin in response to the input to make the respective virtual object accessible to the second electronic device provides an efficient way of establishing a reference point in the three-dimensional environment that is compatible with sharing the respective virtual object with the second electronic device, thereby enabling the user to use the electronic device quickly and efficiently.

In some embodiments, such as in FIG. 9D, while the viewpoint of the user is a first viewpoint in the three-dimensional environment (e.g., 902) and the digital origin (e.g., 912) is located at a first respective location in the three-dimensional environment (e.g., 902) and has a valid status (e.g., the digital origin is valid) at the first respective location in the three-dimensional environment (e.g., 902), the electronic device (e.g., 101b) receives (1028a), via the one or more input devices, an input corresponding to a request to update the viewpoint of the user to a second viewpoint, different from the first viewpoint, in the three-dimensional environment. In some embodiments, the digital origin has a valid status when the spatial arrangement(s) between two or more of the digital origin, one or more virtual objects, and the viewpoint of the user satisfy one or more spatial criteria. In some embodiments, the one or more spatial criteria include a criterion that is satisfied when a threshold number (e.g., 1, 2, or 3 and/or 25%, 50%, or 75%) of the spatial relationships between the digital origin and the virtual objects and/or the viewpoint of the user satisfy the one or more criteria that specify a range of distances or a range of orientations of virtual objects described above with reference to method 800. For example, the criteria for determining whether the digital origin is valid includes a criterion that is satisfied when 50% of the spatial relationships satisfy the criteria. In some embodiments, while the digital origin is valid, in response to an input corresponding to a request to update the three-dimensional environment to satisfy the one or more criteria that specify a range of distances or a range of orientations of virtual objects relative to the current viewpoint of the user described above with reference to method 800, the electronic device maintains the location of the digital origin and updates the spatial relationship of the virtual objects and viewpoint of the user according to the digital origin.

In some embodiments, such as in FIG. 9E, in response to the input corresponding to the request to update the viewpoint of the user to the second viewpoint in the three-dimensional environment (e.g., 902b) (1028b), the electronic device (e.g., 101b) displays (1028c), via the display generation component (e.g., 120b), the three-dimensional environment (902b) from the second viewpoint.

In some embodiments, such as in FIG. 9E, in response to the input corresponding to the request to update the viewpoint of the user to the second viewpoint in the three-dimensional environment (e.g., 902b) (1028b), in accordance with a determination that the second viewpoint is within a threshold distance of the first viewpoint, the electronic device (e.g., 101) maintains (1028d) the valid status of the digital origin (e.g., 912) at the first respective location in the three-dimensional environment (e.g., 902b).

In some embodiments, such as in FIG. 9E, in response to the input corresponding to the request to update the viewpoint of the user to the second viewpoint in the three-dimensional environment (1028b), in accordance with a determination that the second viewpoint is more than the threshold distance from the first viewpoint, the electronic device (e.g., 101b) updates (1028e) a status of the digital origin (e.g., 912) to an invalid status (e.g., determine that the digital origin is not valid). In some embodiments, in response to updating the valid status of the digital origin to an invalid status, the electronic device selects a new location in the three-dimensional environment (e.g., according to one or more criteria relative to the spatial relationships between the digital origin and the virtual objects and/or viewpoint of the user) for the digital origin. In some embodiments, while the digital origin is not valid, the electronic device does not update the location of the digital origin until receiving an input corresponding to a request to update the three-dimensional environment to satisfy the one or more criteria that specify a range of distances or a range of orientations of virtual objects relative to the current viewpoint of the user described above with reference to method 800, and then the electronic device updates the location of the digital origin and optionally updates the spatial relationship of the virtual objects and viewpoint of the user according to the updated digital origin. In some embodiments, criteria for a valid status of the digital origin include a criterion that is satisfied when the viewpoint of the user remains within the threshold distance and is not satisfied when the viewpoint of the user moves beyond the threshold distance. In some embodiments, the electronic device does not update the viewpoint of the user in accordance with the determination that the second viewpoint is not valid or when updating the location of the digital origin. In some embodiments, in response to an input corresponding to a request to update the spatial arrangement of the virtual objects and viewpoint of the user according to the one or more spatial criteria according to one or more steps of method 800, the electronic device updates the viewpoint of the user in accordance with the updated digital origin.

Invalidating the digital origin in response to movement of the viewpoint of the user that exceeds the threshold distance provides an efficient way of updating the user interface in accordance with the updated viewpoint of the user, which enhances user interactions with the electronic device by enabling the user to select the viewpoint in the three-dimensional environment, thereby enabling the user to use the electronic device quickly and efficiently.

In some embodiments, while a device that includes the display generation component (e.g., 120a) (e.g., and/or electronic device) is in a pose relative to a respective portion of the user (e.g., the user's head) that satisfies one or more pose criteria (e.g., the user is wearing the display generation component on their head in a predetermined manner) and the digital origin (e.g., 912, such as in FIG. 9A) is located at a first respective location in the three-dimensional environment (e.g., 902), the electronic device (e.g., 101a) detects (1030a) movement of the display generation component (e.g., 120a) to a pose relative to the respective portion of the user that does not satisfy the one or more pose criteria. In some embodiments, the display generation component (e.g., and/or electronic device) is a wearable device and the one or more pose criteria are satisfied when the user is wearing the display generation component (e.g., and/or electronic device) on their head. In some embodiments, the one or more pose criteria are not satisfied when the user is not wearing the display generation component (e.g., and/or electronic device) on their head, or the user is wearing the display generation component (e.g., and/or electronic device) on their head but not in front of their face in a predetermined pose.

In some embodiments, while the device that includes the display generation component (e.g., 120a) is in the pose relative to the respective portion of the user that does not satisfy the one or more pose criteria, the electronic device (e.g., 101) detects (1030b) movement of the display generation component (e.g., 120a) to the pose relative to the respective portion of the user that satisfies the one or more pose criteria. In some embodiments, after not wearing the display generation component (e.g., and/or electronic device), the user begins wearing the display generation component (e.g., and/or electronic device) in the pose that satisfies the one or more pose criteria.

In some embodiments, in response to the movement of the display generation component (e.g., 120) to the pose relative to the respective portion of the user that satisfies the one or more pose criteria (1030c), in accordance with a determination that the device that includes the display generation component (e.g., 120a) was in the pose relative to the respective portion of the user that does not satisfy the one or more pose criteria for a time that is less than a predetermined time threshold (e.g., 1, 2, 3, 5, 30, or 45 seconds or 1, 2, 3, 5, or 10 minutes), the electronic device (e.g., 101a) maintains (1030d) the digital origin (e.g., 912, such as in FIG. 9A) at the first respective location in the three-dimensional environment (e.g., 902). In some embodiments, the electronic device does not reset the digital origin if the pose does not satisfy the one or more pose criteria for less than the predetermined time threshold and does not update the viewpoint of the user.

In some embodiments, in response to the movement of the display generation component (e.g., 120a) to the pose relative to the respective portion of the user that satisfies the one or more pose criteria (1030c), in accordance with a determination that the device that includes the display generation component (e.g., 120a) was in the pose relative to the respective portion of the user that does not satisfy the one or more pose criteria for a time that is greater than the predetermined time threshold, the electronic device (e.g., 101a) updates (1030e) the digital origin (e.g., 912 such as in FIG. 9A) to a second respective location, different from the first respective location, in the three-dimensional environment (e.g., 902). In some embodiments, the second respective location is associated with (e.g., is) the location of the viewpoint of the user in the three-dimensional environment based on the physical location of the user and/or display generation component (e.g., and/or electronic device). In some embodiments, if the digital origin is still valid at the first respective location when the movement of the display generation component to the pose relative to the respective portion of the user satisfies one or more criteria after the threshold period of time has passed, the electronic device maintains the digital origin at the first respective location. In some embodiments, updating the digital origin does not include updating the viewpoint of the user. In some embodiments, in response to an input corresponding to a request to update the spatial arrangement of the virtual objects and viewpoint of the user according to the one or more spatial criteria according to one or more steps of method 800, the electronic device updates the viewpoint of the user in accordance with the updated digital origin.

Updating the digital origin in response to the movement of the display generation component to the pose that satisfies the pose criteria when the pose criteria were not satisfied for the predetermined time threshold enhances user interactions with the electronic device by enabling the user to update the three-dimensional environment once the pose of the display generation component (e.g., and/or electronic device) satisfies the one or more pose criteria, thereby enabling the user to use the electronic device quickly and efficiently.

In some embodiments, such as in FIG. 9A, while displaying the three-dimensional environment (e.g., 902a) including the plurality of virtual objects (e.g., 904a, 906a) in a first respective spatial arrangement relative to the viewpoint of the user, wherein the first respective spatial arrangement includes displaying the plurality of virtual objects (e.g., 904a, 906a) within a predefined threshold distance of the viewpoint of the user, and while the digital origin (e.g., 912) is located at a first respective location in the three-dimensional environment (e.g., 902a) and has a valid status at the first respective location in the three-dimensional environment (e.g., 902a), the electronic device (e.g., 101) detects (1032a) indications of one or more inputs corresponding to a request to update the spatial arrangement of the plurality of virtual objects (e.g., 904a, 906a) relative to the viewpoint of the user. In some embodiments, the one or more inputs satisfy the one or more first criteria and do not satisfy the one or more second criteria (e.g., the one or more inputs correspond to requests to update the positions of virtual objects individually), such as inputs described with reference to method 1400.

In some embodiments, such as in FIG. 9D, in response to detecting the indications of the one or more inputs, the electronic device (e.g., 101) displays (1032b), via the display generation component (e.g., 120a), the plurality of virtual objects (e.g., 904a, 904b) in a second respective spatial arrangement relative to the viewpoint of the user.

In some embodiments, such as in FIG. 9C, in accordance with a determination that the second respective spatial arrangement includes displaying at least one of the plurality of virtual objects (e.g., 904a, 906a) within the predefined threshold distance (e.g., 1, 2, 3, 5, 10, 15, or 30 meters) of the viewpoint of the user, the electronic device (e.g., 101) maintains (1032c) the valid status of the digital origin at the first respective location in the three-dimensional environment. In some embodiments, while the digital origin has the valid status, in response to a request to update the spatial arrangement of the virtual objects to satisfy the one or more criteria described above with reference to method 800, the electronic device updates the three-dimensional environment in accordance with the first respective location of the digital origin. In some embodiments, the electronic device does not update the viewpoint of the user when maintaining the digital origin at the first respective location.

In some embodiments, such as in FIG. 9D, in accordance with a determination that the second respective spatial arrangement includes displaying the plurality of virtual objects (e.g., 904*a*, 906*a*) more than the predefined threshold distance from the viewpoint of the user, the electronic device (e.g., 101) updates (1032*d*) a status of the digital origin to be an invalid status. In some embodiments, while the digital origin has the invalid status, in response to a request to update the spatial arrangement of the virtual objects to satisfy the one or more criteria described above with reference to method 800, the electronic device updates the three-dimensional environment in accordance with a second respective location of the digital origin. In some embodiments, the second respective location is determined in response to updating the valid status of the digital origin to the invalid status. In some embodiments, the second respective location is determined in response to the request to update the spatial arrangement of the virtual objects to satisfy the one or more criteria described above with reference to method 800.

Invalidating the digital origin when the plurality of objects are more than the predefined threshold distance from the user enhances user interactions with the electronic device by providing an efficient way to update the three-dimensional environment to display the virtual objects closer to the viewpoint of the user using an updated digital origin, thereby enabling the use to use the electronic device quickly and efficiently.

In some embodiments, such as in FIG. 9F, while a location of the digital origin (e.g., 912) satisfies one or more digital origin criteria, the electronic device (e.g., 101) maintains (1034*a*) the digital origin (e.g., 912) at a first respective location in the three-dimensional environment. In some embodiments, the digital origin criteria include one or more of the criteria described above, such as the viewpoint of the user not moving more than a threshold distance, the viewpoint of the user being within a threshold distance of the one or more virtual objects, and/or other criteria related to the spatial arrangements between two or more of the virtual objects, viewpoint of the user, and digital origin. In some embodiments, in response to a request to update the spatial arrangement relative to the viewpoint of the user according to one or more steps of method 800 while the digital origin is located at the first respective location, the electronic device updates the three-dimensional environment to satisfy one or more criteria relative to the digital origin located at the first respective location.

In some embodiments, such as in FIG. 9G, in response to detecting that the location of the digital origin (e.g., 912) no longer satisfies the one or more digital origin criteria, the electronic device (e.g., 101) updates (1034*b*) the digital origin (e.g., 912) to be located at a second respective location, different from the first respective location, in the three-dimensional environment (e.g., 902), wherein the second respective location satisfies the one or more digital origin criteria. In some embodiments, in response to a request to update the spatial arrangement relative to the viewpoint of the user according to one or more steps of method 800 while the digital origin is located at the second respective location, the electronic device updates the three-dimensional environment to satisfy one or more criteria relative to the updated digital origin located at the second respective location. In some embodiments, the electronic device updates the digital origin automatically in response to determining that the digital origin is invalid (e.g., without receiving an input corresponding to a request to update the digital origin). In some embodiments, updating the digital origin does not include updating the viewpoint of the user. In some embodiments, in response to an input corresponding to a request to update the spatial arrangement of the virtual objects and viewpoint of the user according to the one or more spatial criteria according to one or more steps of method 800, the electronic device updates the viewpoint of the user in accordance with the updated digital origin.

Updating the digital origin in response to determining that the digital origin is invalid enhances user interactions with the electronic device by quickly updating the three dimensional environment using a valid digital origin, thereby enabling the user to use the electronic device quickly and efficiently.

In some embodiments, such as in FIG. 9A, displaying the plurality of virtual objects (e.g., 904*a*, 906*a*) in the first spatial arrangement includes displaying the plurality of virtual objects (e.g., 904*a*, 906*a*) with a respective arrangement (e.g., orientations and/or positions and/or distances) relative to one another (1036*a*).

In some embodiments, such as in FIG. 9C, displaying the plurality of virtual objects (e.g., 904*a*, 906*a*) in the third spatial arrangement includes displaying the plurality of virtual objects (904*a*, 906*a*) with the respective arrangement relative to one another (1036*b*). In some embodiments, the positions and orientations of the virtual objects with respect to each other are maintained in response to updating the three-dimensional environment in response to the input that satisfies the one or more second criteria. In some embodiments, while moving the virtual objects together, the electronic device displays the virtual objects together while maintaining the respective arrangement of the virtual objects relative to one another.

Maintaining the respective spatial arrangement of the virtual objects relative to one another in response to the input that satisfies the one or more second criteria enhances user interactions with the electronic device by enabling the user to move the plurality of virtual objects together quickly and efficiently.

FIGS. 11A-11E illustrate exemplary ways of displaying objects in a three-dimensional environment based on an estimated location of a floor for the three-dimensional environment in accordance with some embodiments of the disclosure.

Figure 11E:
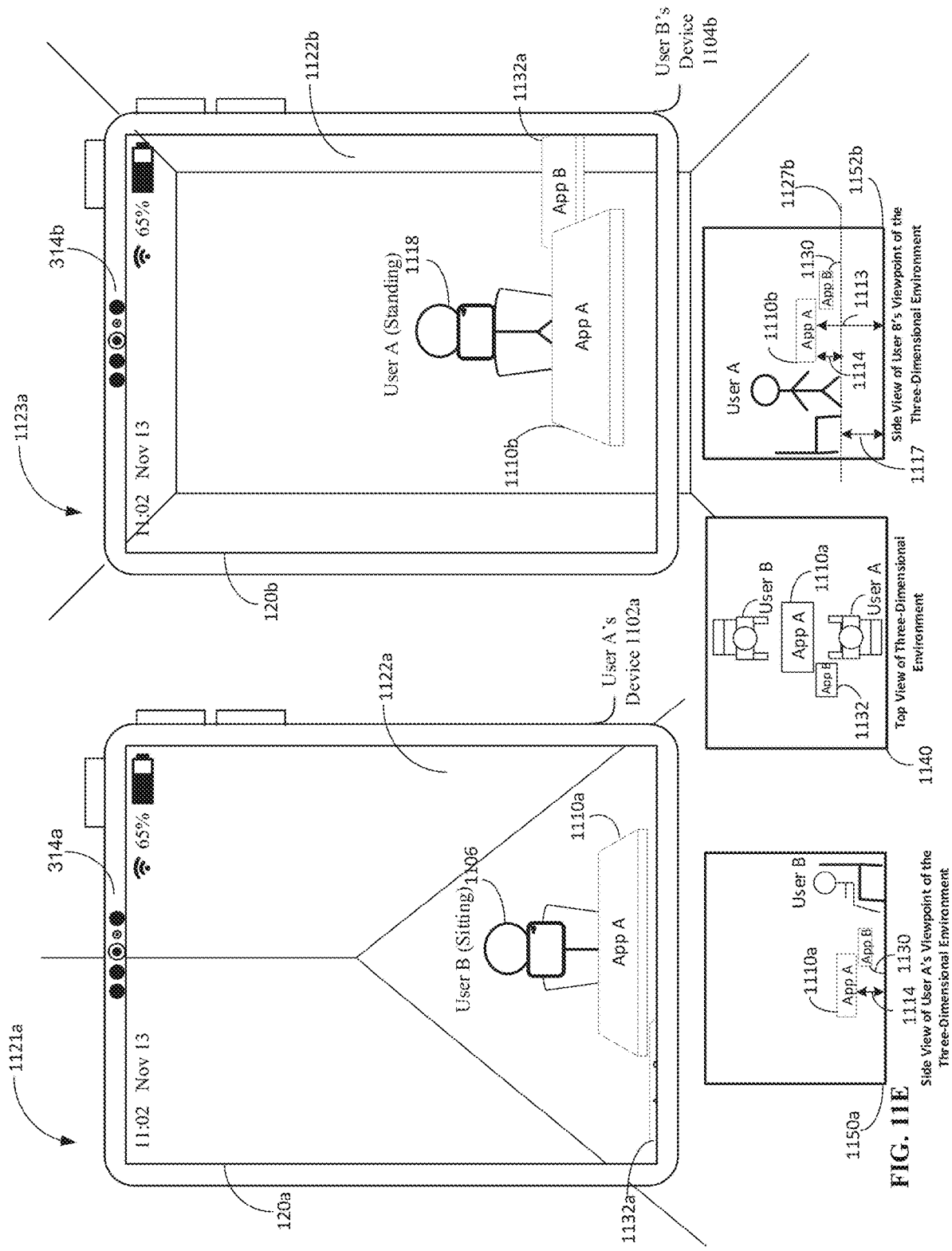
Figure 12B:
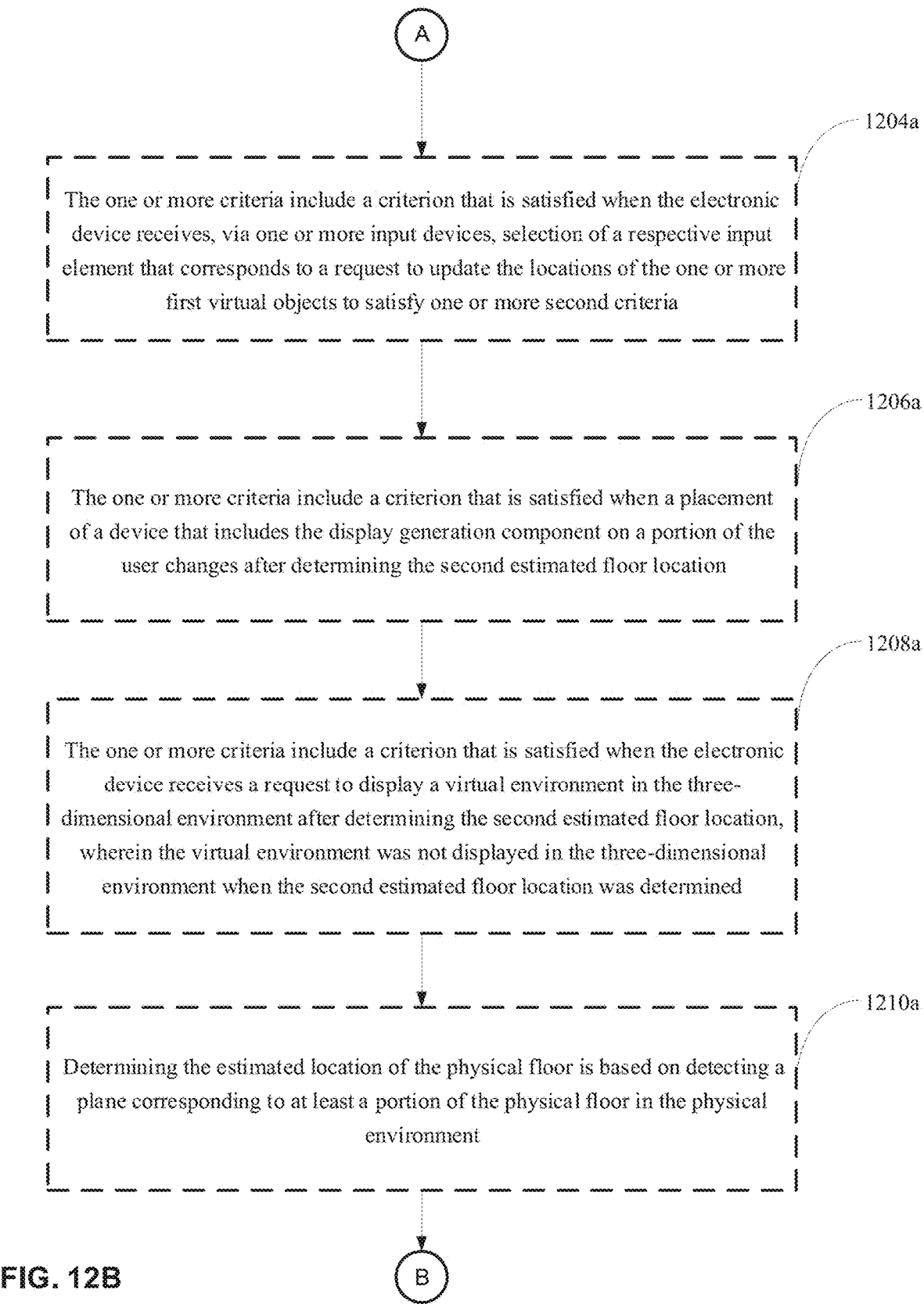
Figure 12C:
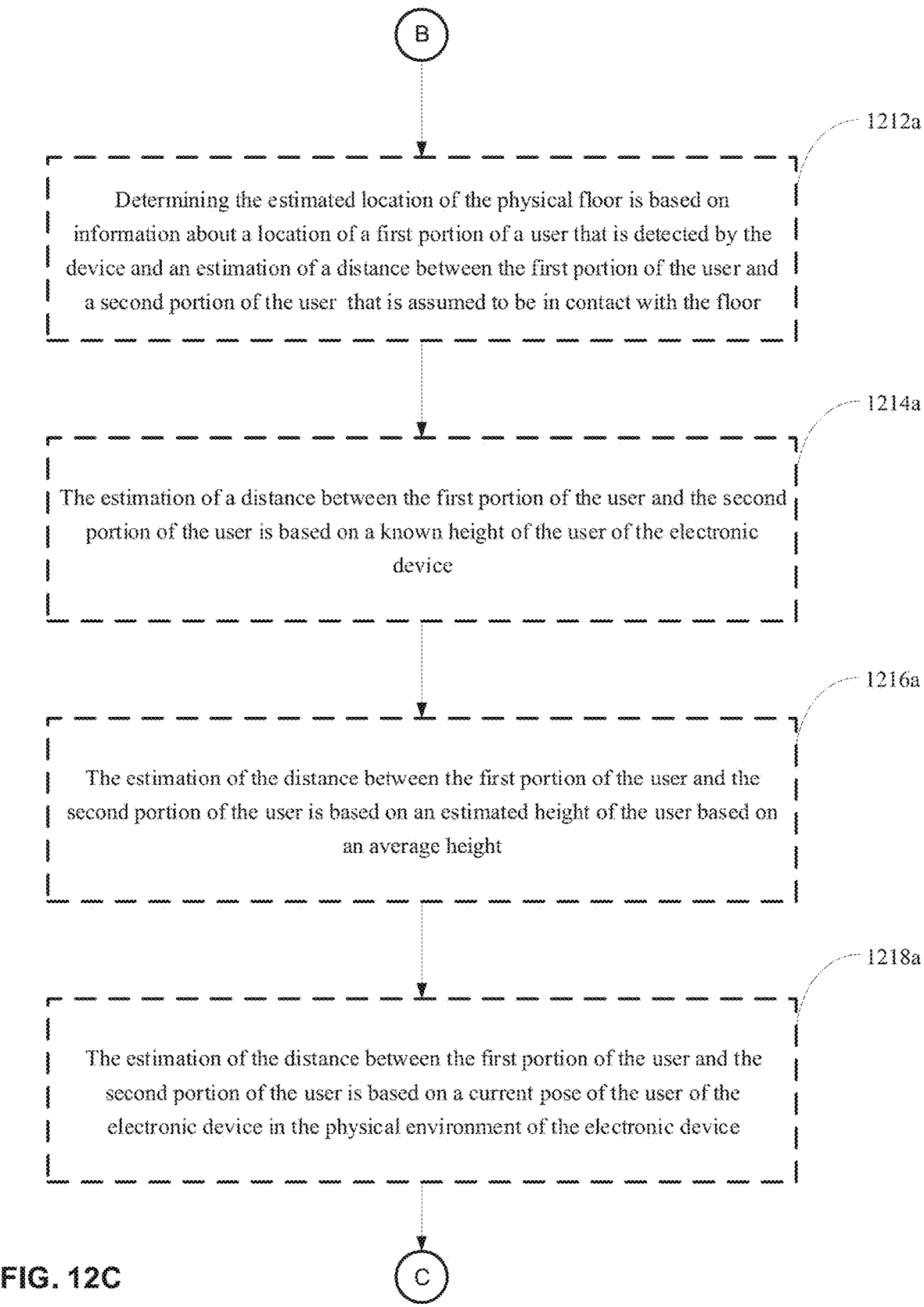
Figure 12D:
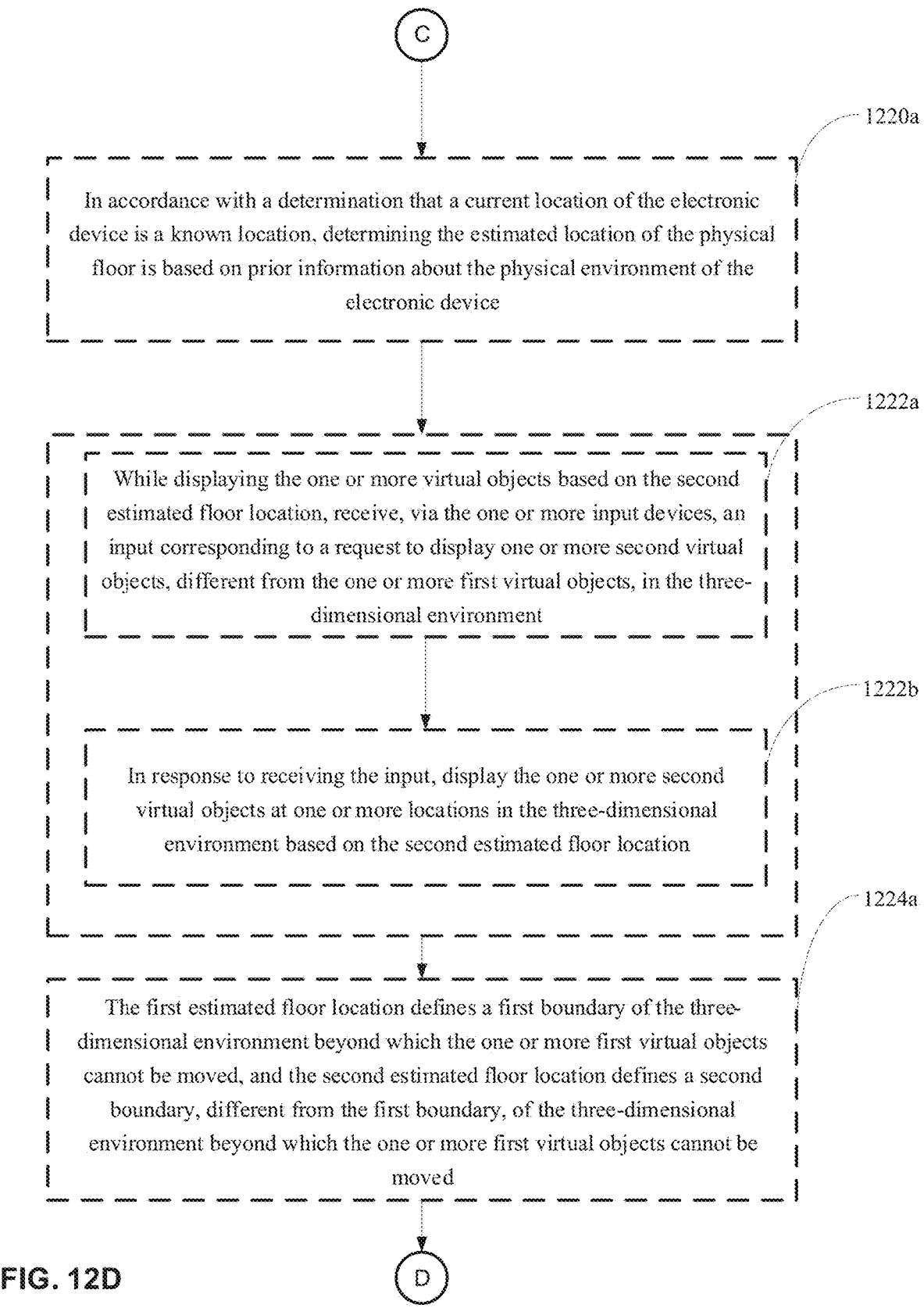
Figure 12E:
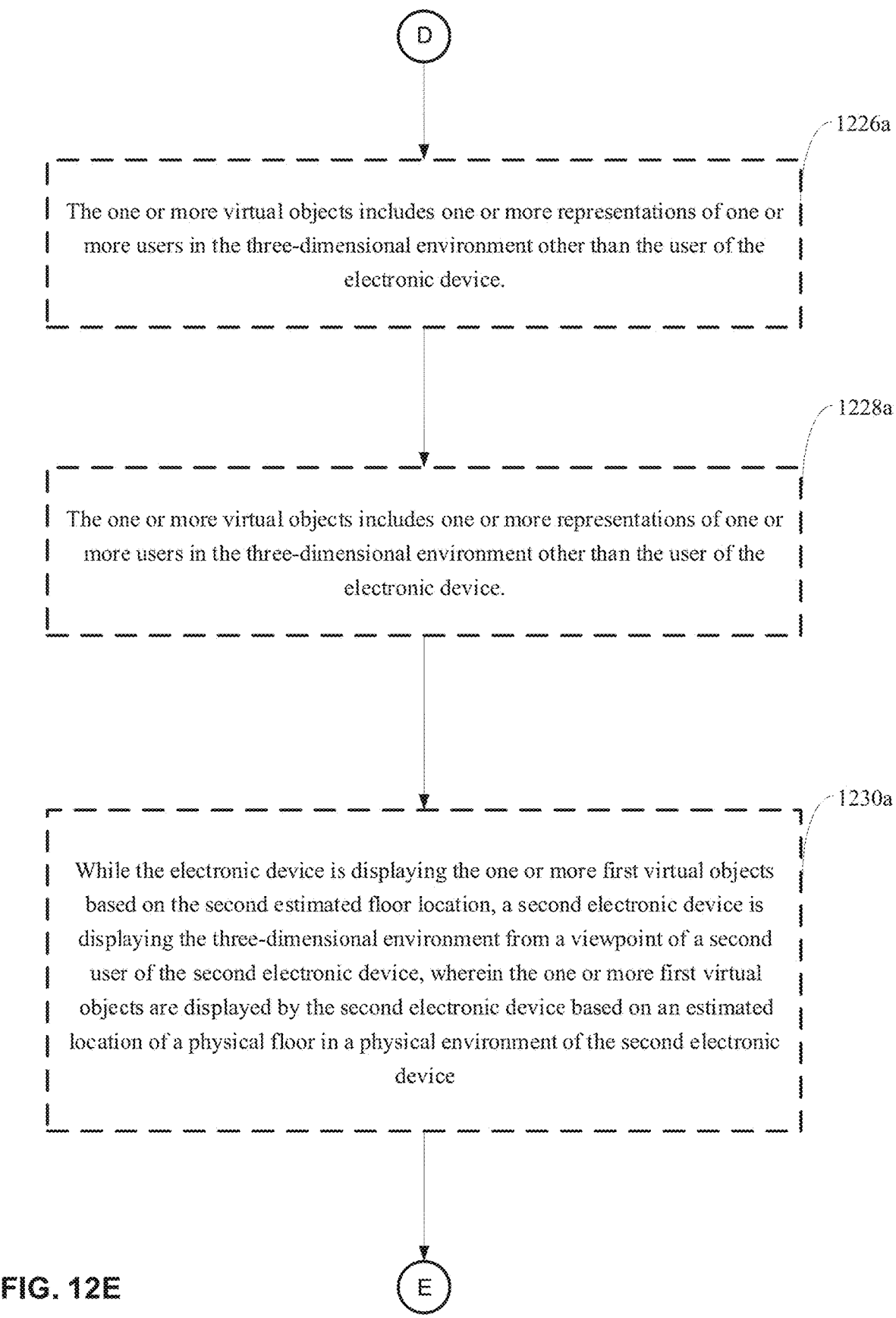
Figure 12F:
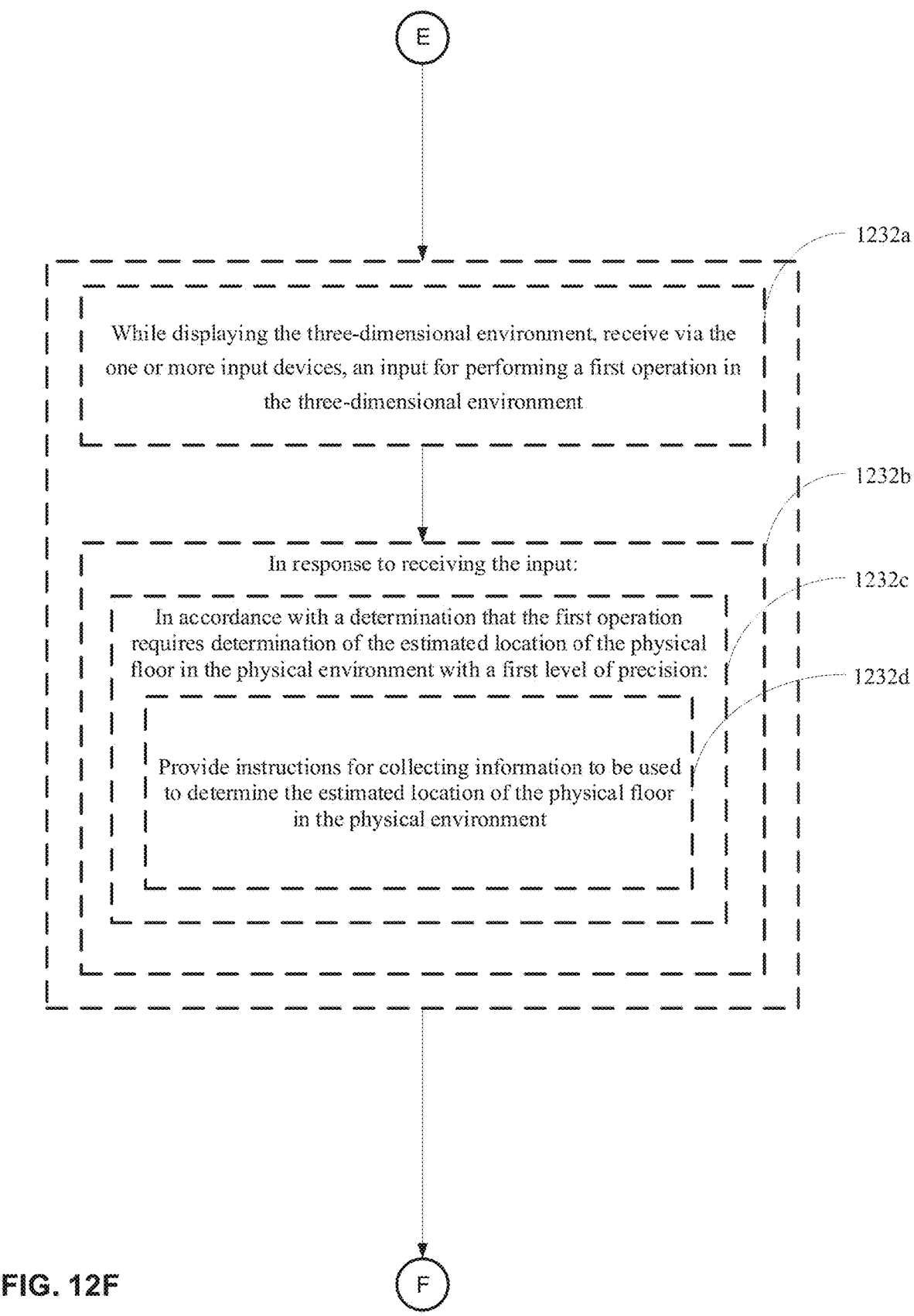
Figure 12G:
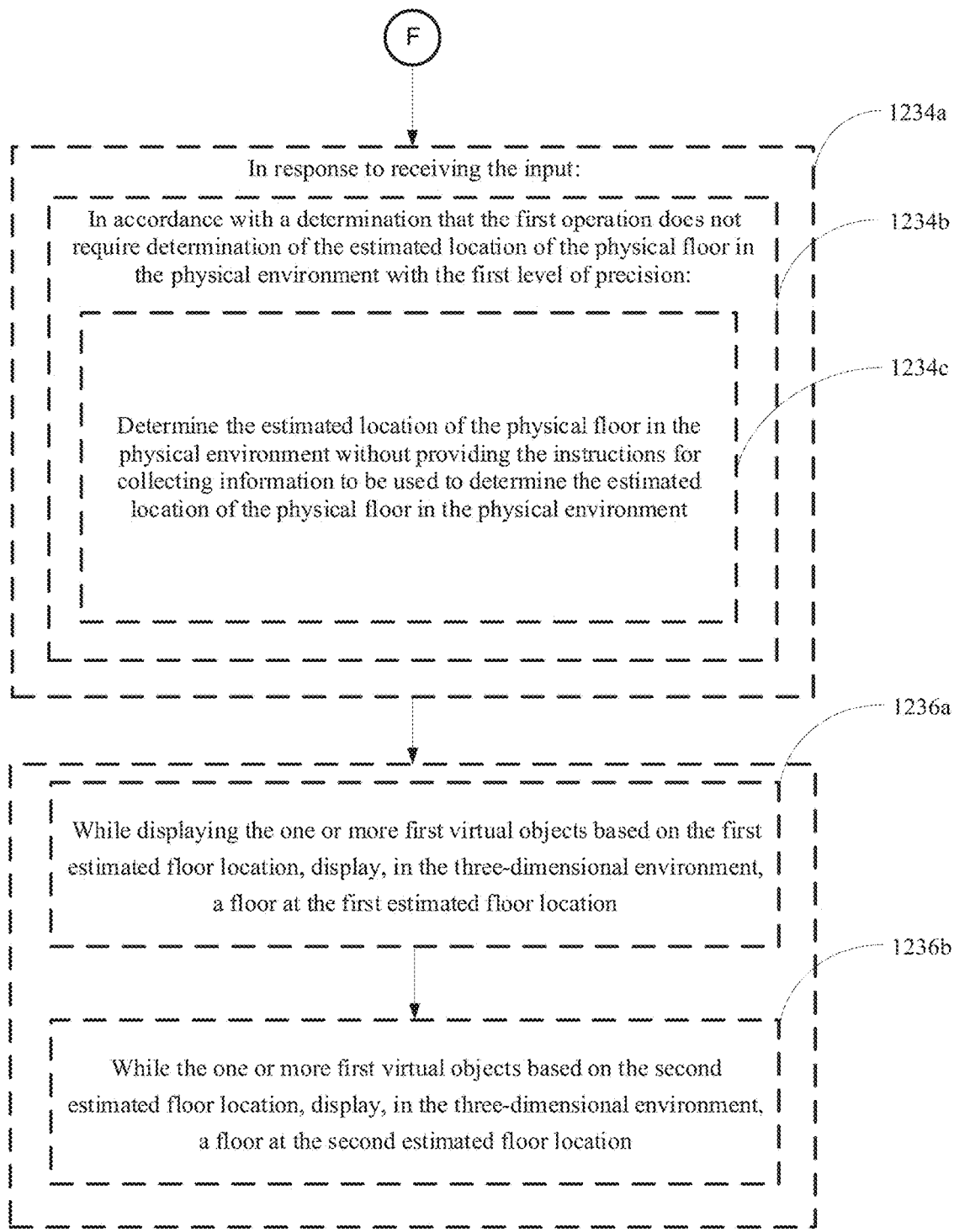

FIG. 11A illustrates a three-dimensional environment 1122 that is being displayed by display generation components 120*a* and 120*b* of User A's electronic device 1102*a* and User B's electronic device 1104*b*, respectively. It should be understood that, in some embodiments, electronic devices 1102*a* and 1104*b* utilize one or more techniques described with reference to FIGS. 11A-11E in a two-dimensional environment without departing from the scope of the disclosure. As described above with reference to FIGS. 1-6, the electronic devices 1102*a* and 1104*b* (e.g., each corresponding to a device 101) optionally include a display generation component 120*a* and 120*b* (e.g., a touch screen) and a plurality of image sensors 314*a* and 314*b*, respectively. The image sensors 314*a* and 314*b* optionally include one or more of a visible light camera, an infrared camera, a depth sensor, or any other sensors of the electronic devices 1102*a* and 1104*b* that would be able to be used to capture one or more images of a user or part of the user while the users interact with electronic devices 1102*a* and 1104*b*. In some embodiments, the user interfaces shown below could also be implemented on a head-mounted display that includes a display generation component that displays the user interface to the user, and sensors to detect the physical environment and/or movements of the user's hands (e.g., external sensors facing outwards from the user), and/or gaze of the user (e.g., internal sensors facing inwards towards the face of the user).

As shown in FIG. 11A, the electronic device 1102a is currently displaying a representation 1106 of User B that is sitting in a virtual chair 1107 (e.g., a virtual object) and a user interface 1110 of Application A. In some embodiments, Application A is a single user gaming application, a multi-user gaming application (e.g., that both User A and User B optionally interact with), a media application, a social application, a navigation application, a streaming application, etc. In some embodiments, the electronic device 1102a is displaying the representation 1106, the virtual chair 1107, and the user interface 1110 because these objects are in a field of view from User A's current viewpoint of the three-dimensional environment 1122. For example, as indicated in overhead view 1140, User A is currently viewing the three-dimensional environment 1122 from a back portion of the three-dimensional environment 1122 and with a pose that is oriented towards the front portion of the three-dimensional environment 1122. Thus, the electronic device 1102a associated with User A is displaying the user interface 1110, the virtual chair 1107, and the representation 1106 of User B because these objects are in the field of view from the current viewpoint of User A. Similarly, in the example of FIG. 11A, the electronic device 1104b associated with User B is presenting user interface 1110 and the representation 1118 of User A sitting in a virtual chair 1111 because these objects are in the field of view from User B's current viewpoint of the three-dimensional environment 1122, as indicated in overhead view 1140 in FIG. 11A.

In some embodiments, the three-dimensional environment 1122 is displayed relative to an electronic device's estimated location of a physical floor in the physical environment of the electronic device (e.g., operating environment 100). For example, in FIG. 11A, the electronic device 1102a has estimated that the physical floor in the physical environment 1121a of the electronic device 1102a is at location 1120a (and not at location 1150a which corresponds to the true/actual location of the floor in the physical environment of the electronic device 1102a). In some embodiments, the electronic device 1102a estimates the location of the physical floor in the physical environment 1121a based on information about User A (e.g., the user associated with the electronic device 1102a), as will be described below.

In some embodiments, the electronic device 1102a associated with User A optionally estimates that the location of the physical floor in the physical environment 1121a is at location 1120a based on a known height of User A. For example, the electronic device 1102 optionally accesses/obtains information (e.g., from a user profile stored in memory on the electronic device 1102a or from a server that the electronic device 1102a optionally communicates with) indicating that User A is 60, 70, 80, 100, 140, 200, 220, or 240 centimeters tall, and based on the obtained height of User A, the electronic device 1102a optionally estimates that the location of the physical floor in the physical environment 1121a is at location 1120a because location 1120a corresponds to a location that is 60, 70, 80, 100, 140, 200, 220, or 240 centimeters below where User A is currently holding or wearing electronic device 1102a (e.g., if electronic device 1102a is a head-mounted device). The above-described technique is optionally used when the electronic device 1102a determines that User A is in a standing pose. In some embodiments, if the electronic device 1102a determines that User A is not in a standing pose but rather in a different pose, such as a sitting pose, kneeling pose, crouching pose, etc., the electronic device 1102a optionally estimates that the location of the physical floor in the physical environment 1121a is (e.g., 6, 15, 30, 45, 60, 70, or 130 centimeters) closer to the electronic device 1102a than if User A was in a standing pose.

In some embodiments, the electronic device 1102a estimates that the physical floor of the physical environment 1121a is at location 1120a based on average information about one or more other users (e.g., in addition, or as an alternative, to the height information about User A). For example, the electronic device 1102a optionally has access to/obtains (e.g., from memory, a server, a database, etc.) average height information about one or more users associated with the three-dimensional environment 1122 and/or about one or more users that are not associated with the three-dimensional environment 1122 (e.g., such as a general population of users). In some embodiments, the electronic device 1102a uses the average height information obtained for the one or more users to estimate the location of the physical floor in the physical environment 1122 in similar ways as previously described. Additional techniques/methods electronic device 1102a optionally uses to estimate the location of the physical floor of physical environment 1121a are further described in method 1200.

Additionally, as shown in FIG. 11A, electronic device 1104b (associated with User B) has estimated that the physical floor in the physical environment 1123b of the electronic device 1104b is at location 1127b (and not at location 1152b which is the true/actual location of the physical floor in physical environment 1123b). In some embodiments, physical environments 1121a and 1123b correspond to the same physical environment if Users A and B (and the electronic devices 1102a and 1104b associated with Users A and B, respectively) are located in the same physical environment or correspond to different physical environments if Users A and B are located in different physical environments. The electronic device 1104b optionally estimated that the location of the physical floor in the physical environment 1123b is at location 1127b in similar ways to the manner in which the electronic device 1102a estimated the location of the physical floor in its respective physical environment 1121a. For ease of description in the remaining portions of the disclosure, a respective electronic device's estimated location of a floor in its respective physical environment will be referred to herein as an estimated physical floor location, such as estimated physical floor location 1120a or estimated physical floor location 1127b.

In some embodiments, an electronic device displays objects in the three-dimensional environment 1122 at locations relative to the electronic device's estimated location of a physical floor in its respective physical environment, because the locations of objects in the three-dimensional environment 1122 are optionally defined as relative to the estimated floor location. For example, as shown in FIG. 11A, the electronic device 1102a has estimated that physical floor in the physical environment 1121a is at location 1120a. As a result of this estimation, the electronic device 1102a displays the user interface 1110 at a relative location in the three-dimensional environment 1122 that corresponds to a location that is a distance 1114 (e.g., 15, 30, 60, 150, 304, or 610 centimeters) from the estimated physical floor location 1120a, displays the virtual object 1107 at a location in the three-dimensional environment 1122 that corresponds to the estimated physical floor location 1120a, and displays the representation 1106 of User B at a respective distance (e.g., 15, 30, 60, 150, 300, or 600 centimeters) above the estimated physical floor location 1120*a* such that the representation 1106 is sitting in the virtual chair 1111. It is understood that in some embodiments, all objects in the three-dimensional environment 1122 (and not just the objects in the field of view from the User A's viewpoint) are optionally displayed relative to estimated physical floor location 1120*a*.

Similarly, the electronic device 1104*b* is presenting objects in the three-dimensional environment 1122 at locations relative to its estimated physical floor location 1127*b*. Specifically, because electronic device 1104*b* has estimated that the physical floor in the physical environment 1123*b* is at the location 1127*b*, the electronic device 1104*b* is displaying the user interface 1110 at a relative location in the three-dimensional environment 1122 that corresponds to a location that is the distance 1114 from the estimated physical floor location 1127*b*, displays the virtual chair 1111 at a relative location in the three-dimensional environment 1122 that corresponds to the estimated physical floor location 1127*b*, and displays the representation 1118 of User A at a location/respective distance (e.g., 15, 30, 60, 150, 300, or 600 centimeters) above the estimated physical floor location 1127*b* such that the representation 1118 is sitting in the virtual chair 1111.

In some embodiments, the relative distances at which virtual objects in the three-dimensional environment 1122 are displayed from an estimated location of a physical floor remains constant regardless of a device's current estimated location of a physical floor in a physical environment. For example, even though the electronic devices 1102*a* and 1104*b* are displaying objects relative to different estimated locations of physical floors in their respective physical environments (e.g., locations 1120*a* and 1127*b*, respectively), user interface 1110 is still displayed a distance 1114 from both respective estimated physical floor locations 1120*a* and 1127*b*.

In FIG. 11B, while the electronic device 1102*a* is displaying the objects in the three-dimensional environment 1122 at locations relative to estimated physical floor location 1120*a*, the electronic device 1102*a* has detected that User A's viewpoint of the three-dimensional environment 1122 has moved down from the viewpoint of User A in the three-dimensional environment 1122. In some embodiments, User A's viewpoint in the three-dimensional environment 1122 moved in the downward direction because User A moved to a corresponding pose in the physical environment 1121*a* (e.g., User A started looking in the downward direction and/or the electronic device 1102*a* was oriented downward compared to its orientation in FIG. 11A).

In some embodiments, in response to the electronic device 1102*a* detecting movement of User A's viewpoint in the three-dimensional environment 1122, the electronic device 1102*a* optionally displays the three-dimensional environment 1122 from User A's new/updated viewpoint of the three-dimensional environment 1122. For example, in FIG. 11B, in response to device 1102*a* detecting the downward movement of User A's viewpoint, the electronic device 1102*a* displays new portions of the three-dimensional environment 1122 that were not in the field of view when User A's viewpoint corresponded to the viewpoint illustrated in FIG. 11A, and displays user interface 1110, the virtual chair 1107, and the representation 1106 of User B at higher locations in the field of view of User A as compared to FIG. 11A (e.g., because User A's viewpoint of the three-dimensional environment 1122 moved in a downward direction). In FIG. 11B, the electronic device 1104*b* continues to display the three-dimensional 1122 from the same viewpoint of User B described in FIG. 11A because User B's viewpoint of the three-dimensional environment has not changed from FIG. 11A to FIG. 11B.

Additionally, in FIG. 11B, the electronic device 1102*a* has updated its estimated location of the physical floor in the physical environment 1121*a* from the location 1120*a* (as described in FIG. 11A) to the location 1150*a* (e.g., the actual/true location of the physical floor in the physical environment 1121*a*). The electronic device's 1102*a* estimated location of the physical floor in physical environment 1121*a* optionally changed to the location 1150*a* because one or more sensors 314*a* of device 1102*a* became oriented towards the physical floor in the physical environment 1121*a* as the viewpoint of User A moved from the viewpoint illustrated in FIG. 11A to the viewpoint illustrated in FIG. 11B such that the electronic device 1102 was able to detect a plane corresponding to a portion (e.g., 5%, 20%, 50%, 80%, or 100%) of the physical floor in the physical environment 1121*a*—as described in more detail in method 1200. Alternatively, in some embodiments, the electronic device 1102*a* updated its estimated location of the physical floor in the physical environment 1121*a* because the electronic device 1102*a* received updated height information for User A, updated height information about one or more users other than User A, etc. Although in FIG. 11B, the electronic device 1104*b* did not update its estimated location of the physical floor in physical environment 1123*b*, it should be understood that in some embodiments electronic device 1104*b* optionally updates its estimated location of the physical floor in physical environment 1123*b* for reasons similar to electronic device 1102*a*.

In some embodiments, after a respective electronic device updates its estimated location of a physical floor in the physical environment of the electronic device, the electronic device continues to display objects relative to a previous estimated location of a physical floor until certain criteria/conditions are satisfied, as described in greater detail below and in method 1200. For example, in FIG. 11B, even though electronic device 1102*a* is now estimating that the physical floor in the physical environment 1121*a* is location 1150*a*, the electronic device 1102*a* is still displaying the objects in the three-dimensional environment 1122 (e.g., such as user interface 1110, virtual chair 1107, and the representation 1106 of User B) relative to device's 1102 previous estimated physical floor location 1120*a* (as described in FIG. 11A) and not relative to location 1150*a* because the one or more criteria described in method 1200 have not yet been satisfied. In some embodiments, the electronic device 1102*a* starts displaying the objects in the three-dimensional environment 1122 relative to its updated/most recent estimated location of a physical floor without first satisfying the one or more criteria.

In FIG. 11C, the electronic device 1102*a* has detected that the user's viewpoint of the three-dimensional environment 1122 has moved from the viewpoint of User A indicated in overhead view 1140 in FIG. 11B to the viewpoint indicated in overhead view 1140 in FIG. 11C (e.g., the position of User A in the three-dimensional environment 1122 has moved to be oriented towards the back corner of the three-dimensional environment 1122). In some embodiments, User A's viewpoint of the three-dimensional 1122 moved to the viewpoint indicated in FIG. 11C because User A moved to a corresponding pose in the physical environment 1121*a*.

In response to detecting movement of User A's viewpoint in the three-dimensional environment 1122 from the viewpoint indicated in overhead view 1140 in FIG. 11B to the viewpoint indicated in FIG. 11C, the electronic device 1102*a* optionally displays the three-dimensional environment 1122 from the user's new viewpoint of the three-dimensional environment 1122, as illustrated in FIG. 11C. In particular, the display generation component 120*a* of device 101 is now displaying a back corner of the three-dimensional environment 1122 because that portion of the three-dimensional environment 1122 is in the field of view from User A's new viewpoint of the three-dimensional environment 1122 and is no longer displaying user interface 1110, virtual chair 1107, and the representation 1106 of User B because these objects are no longer in the field of view from User A's new viewpoint of the three-dimensional environment 1122. Additionally, the electronic device 1104*b* is no longer presenting the representation 1118 of User A (as previously shown in FIG. 11B) because the representation 1118 of User A is no longer in the field of view from User B's current viewpoint of the three-dimensional environment 1122 after the movement of User A's position/viewpoint in the three-dimensional environment 1122—as indicated in overhead view 1140 in FIG. 11C.

It should be understood that even though the user interface 1110, the virtual chair 1107, and the representation 1106 are no longer in the field of view of User A's viewpoint as indicated in overhead view 1140, these objects are still optionally at locations in the three-dimensional environment 1122 relative to estimated physical floor location 1120*a*, as described previously in FIG. 11B (e.g., because the one or more criteria as will be described in detail below have not yet been satisfied). In FIG. 11C, device 1102*a* is also displaying selectable user interface option 1124*a*. In some embodiments, selectable user interface option 1124*a* is similar to selectable recentering option 712 described in FIGS. 7A-7G, and is optionally displayed by device 1102*a* for similar reasons. In some embodiments, the electronic device 1102*a* is displaying the selectable user interface option 1124*a* because the positions/locations of one or more objects in the three-dimensional environment 1122 do not satisfy spatial criteria relative to User A's new viewpoint of the three-dimensional environment 1122, as described in more detail in FIGS. 7A-7G and method 800. For example, the electronic device 1102*a* optionally displays selectable user interface option 1124*a* because one or more objects in the three-dimensional environment 1122 are now more than a threshold distance (e.g., 10, 20, 30, 40, 50, 100, 200, 300, 400, 500, 1000, or 2000 centimeters) from the User A's new viewpoint of the three-dimensional environment 1122 and/or because one or more objects in the three-dimensional environment 1122 are no longer in the field of view from User A's new viewpoint of the three-dimensional environment 1122 (e.g., that were optionally in the field of view from a previous viewpoint of User A in the three-dimensional environment 1122).

In some embodiments, the electronic device 1102*a* detects selection of selectable user interface option 1124*a* when the electronic device 1102*a* detects that User A's hand 1101 is in a "pointing" pose (e.g., one or more fingers of hand 1101 are extended and one or more fingers of hand 1101 are curled towards the palm of hand 1101) and/or in a "pinching" pose (e.g., the thumb and index finger of hand 1101 converge at or within a threshold distance (e.g., 0.2, 0.5, 1, 1.5, 2, or 2.5, centimeters) of each other) while User A's gaze is optionally directed towards user selectable user interface object 1124*a*. For example, as illustrated in FIG. 11C, the electronic device 1102*a* detects the selection of selectable user interface option 1124*a* because User A's hand 1101 is in a "pointing" pose that makes contact with option 1124*a*.

In some embodiments, the electronic device 1102*a* displays objects in the three-dimensional environment 1122 at locations relative to its current (e.g., newest/updated/most recent) estimated physical floor location in response to the electronic device 101 detecting the request to recenter the objects in the three-dimensional environment 1122. For example, as shown in FIG. 11D, in response to the electronic device 1102*a* detecting the selection of selectable option 1124*a*, the electronic device 1102*a* "recenters" the objects in the three-dimensional environment 1122 in accordance with method 800. Additionally, in response to the electronic device 1102*a* detecting the selection of selectable user interface option 1124*a* in FIG. 11C, the electronic device 1102*a* has updated the relative locations of the objects in the three-dimensional environment 1122 (e.g., user interface 1110, virtual chair 1107, the representation 1106 of User B) to be displayed at locations relative to the estimated physical floor location 1150*a* (e.g., the newest/most recent estimated location of the physical floor in physical environment 1121*a*) and is no longer displaying the objects in the three-dimensional environment 1122 relative to device's previously estimated physical floor location 1120*a* detected in FIG. 11A. Additionally, in FIG. 11D, the electronic device 1104*b* associated with User B continues to display the objects in the three-dimensional environment 1122 at locations relative to the estimated physical floor location 1127*b* as device 1104*b* has not yet determined a new/updated estimated physical floor location. In FIG. 11D, device 1104*b* is also displaying the representation of User A 1118 because the representation of User A 1118 is now in the field of view from User B's current viewpoint of the three-dimensional environment 1122.

In some embodiments, the relative distances at which objects in the three-dimensional environment 1122 are displayed from an estimated location of a physical floor remains constant regardless of a device's estimated location of a physical floor. For example, in FIGS. 11B and 11D, even though the electronic device 1102*a* was displaying the virtual objects in the three-dimensional environment 1122 relative to two different estimated physical floor locations—location 1120*a* in FIG. 11B and location 1150*a* in FIG. 11D—the user interface 1110 is displayed a constant distance 1114 relative to location 1120*a* and also relative to location 1150*a*, respectively. The relative distances of other objects in the three-dimensional environment 1122 optionally are displayed at constant distances from a respective device's estimated physical floor in analogous ways described with reference to user interface 1110. It should be understood that although electronic device 1102*a* started displaying the virtual objects in the three-dimensional environment 1122*a* relative to location 1150*a* (e.g., the device's most recent/updated estimated location of the physical floor) after the device 1102*a* received a request to recenter the three-dimensional environment 1122, the electronic device 1102*a* optionally updates the virtual objects to be displayed relative to location 1150*a* when other criteria are satisfied, such as the criteria described in method 1200.

In some embodiments, a respective electronic device (e.g., device 1102*a* or 1104*b*) receives a request to launch one or more new applications in the three-dimensional environment 1122 (e.g., applications that are not yet being displayed in the three-dimensional environment 1122). For example, in FIG. 11D, user interface 1132 of Application B is optionally displayed in the three-dimensional environment 1122 in response to electronic device 1102*a* and/or device 1102*b* receiving a request to launch Application B in the three-dimensional environment 1122. In some embodiments, a new application that is launched in the three-dimensional environment 1122 is displayed relative to the same estimated physical floor that other objects in three-dimensional environment 1122 are being displayed. For example, user interface 1132 of Application B is displayed relative to the estimated physical floor location 1150*a* because electronic device 1102*a* is currently displaying objects in the three-dimensional environment relative to location 1150*a*. Similarly, device 1104*b* is displaying the user interface 1132 of Application B relative to estimated physical floor location 1127*b* because electronic device 1104*b* is currently displaying objects in the three-dimensional environment 1122 relative to location 1127*b*. In some embodiments, the user interface 1132 is being displayed a distance 1130 (e.g., 15, 30, 60, 90, 200, or 400 centimeters) from the estimated physical floor locations 1150*a* and 1127*b* because one or more settings/characteristics of Application B define a default display height from an estimated location of a physical floor.

In some embodiments, the objects in the three-dimensional environment 1122 continue to be displayed relative to an estimated location of a physical floor as a user's viewpoint in the three-dimensional environment 1122 changes. For example, in FIG. 11E, the pose of User A in the physical environment 1121*a* has changed from a sitting pose to a standing pose. In some embodiments, in response to the electronic device 1102*a* detecting movement of User A in the physical environment 1121*a*, the electronic device 1102*a* optionally displays the three-dimensional environment 1122 from a new/updated viewpoint corresponding to User A's new pose in the physical environment 1121*a*. For example, in FIG. 11E, in response to device 1102*a* detecting movement of User A in the physical environment 1121*a* (e.g., User A moving from the sitting pose to the standing pose), the electronic device 1102*a* displays new portions of the three-dimensional environment 1122 and displays user interface 1110, the virtual chair 1107, and the representation 1106 of User B at lower locations in the field of view of User A as compared to FIG. 11D (e.g., because User A's viewpoint of the three-dimensional environment 1122 moved in an upward direction). Thus, as shown in FIG. 11E, even though User A's viewpoint of the three-dimensional environment 1122 changed in response to User A's movement in the physical environment 1121*a*, the electronic device 1102*a* continues to display the objects in the three-dimensional environment 1122 relative to the estimated floor location 1150*a*. Additionally, as shown at device 1104*b* in FIG. 11E, the representation 1118 of User A has moved up in the field of view of User B (as compared to FIG. 11D) because User A's pose in the physical environment 1121*a* changed from a sitting pose to a standing pose.

Additional or alternative details regarding the embodiments illustrated in FIGS. 11A-11E are provided below in description of method 1200 described with reference to FIGS. 12A-12G.

FIGS. 12A-12G is a flowchart illustrating a method 1200 of displaying objects in a three-dimensional environment based on an estimated location of a floor for the three-dimensional environment in accordance with some embodiments. In some embodiments, the method 1200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1200 are, optionally, combined and/or the order of some operations is, optionally, changed.

In some embodiments, method 1200 is performed at an electronic device (e.g., 101) in communication with a display generation component (e.g., 120) and one or more input devices (e.g., 314). For example, a mobile device (e.g., a tablet, a smartphone, a media player, or a wearable device), or a computer. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc. In some embodiments, the electronic device is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, the electronic device displays (1202*a*), via the display generation component, a three-dimensional environment (e.g., three-dimensional environment 1122) from a viewpoint of a user (e.g., the three-dimensional environment is a computer-generated reality (XR) environment, such as a virtual reality (VR) environment, a mixed reality (MR) environment, or an augmented reality (AR) environment, etc.), including one or more first virtual objects (e.g., in some embodiments, the one or more virtual objects correspond to one or more application user interfaces and/or windows, operating system elements, representations of other users in the three-dimensional environment, representations of physical objects in the physical environment of the electronic device, etc.) in the three-dimensional environment at locations determined based at least in part on a first estimated floor location in the three-dimensional environment (1202*b*) (e.g., that corresponds to an estimated location of a physical floor in the physical environment of the electronic device). For example, user interface 1110, the virtual chair 1107, and the representation 1106 of User B are being displayed based on the estimated physical floor location 1120*a* in FIG. 11A. For example, the one or more virtual objects in the three-dimensional environment are displayed at locations based on the first estimated floor location in the three-dimensional environment (e.g., a first virtual object of the one or more virtual objects is displayed 0, 15, 30, 60, 90, 180, or 200 centimeters from (e.g., above) the location of the first estimated floor location, a second virtual object of the one or more virtual objects is displayed 0, 1, 1.5, 3, 6, 9, or 12 centimeters from (e.g., above) the first estimated floor location, etc.). In some embodiments, the one or more virtual objects cannot be displayed at a location below the first estimated floor location in the three-dimensional environment. In some embodiments, if the user's viewpoint of the three-dimensional environment changes, the electronic device displays the three-dimensional environment from the user's new viewpoint of the three-dimensional environment, but the one or more virtual objects remain at the one or more locations relative to the first estimated floor (e.g., the distance at which the one or more virtual objects are being displayed from the floor in the three-dimensional environment does not change when a user's viewpoint of the three-dimensional environment changes). In some embodiments, the electronic device detects a change in the user's viewpoint of the three-dimensional environment when rotation of the user's head/body is detected (e.g., concurrently with the rotation of the device) and/or as described with reference to method 800.

In some embodiments, while displaying the three-dimensional environment from the viewpoint of the user based on the first estimated floor location, the electronic device determines (1202*c*) a second estimated floor location, different from the first estimated floor location, corresponding to an estimated location of a physical floor in the physical environment of the electronic device. For example, in FIG. 11B, the electronic device 1102*a* updates the estimated physical floor location from location 1120*a* in FIG. 11A to location 1150*a* in FIG. 11B. In some embodiments, the estimated location of the floor in the physical environment is updated as the electronic device acquires/collects/detects additional information about the physical environment of the electronic device, as will be described in more detail later. In some embodiments, the electronic device determines that the floor of the three-dimensional should be updated to the second estimated location because the second estimated location corresponds to the new estimated location of the physical floor in the physical environment. In some embodiments, when the estimated location of the physical floor in the physical environment changes, the first estimated floor location in the three-dimensional environment no longer corresponds with the estimated location of the floor in the physical environment.

In some embodiments, after determining the second estimated floor location corresponding to the estimated location of the physical floor in the physical environment of the electronic device (1202*d*), in accordance with a determination that one or more criteria are satisfied (1202*e*) (e.g., if the objects in the three-dimensional environment should be displayed relative to the second estimated floor location (e.g., the most recently determined floor), as will be described in more detail later), the electronic device displays (1202*f*) the one or more first virtual objects at updated locations in the three-dimensional environment based on the second estimated floor location. For example, in FIG. 11D, the electronic device 1102*a* starts displaying objects in the three-dimensional environment 1122 based on the estimated physical floor location 1150*a* (and no longer the estimated physical floor location 1120*a*). For example, the locations of the one or more virtual objects are displayed relative the new location of the floor—the second estimated location (e.g., the one or more virtual objects are displayed based on the second estimated floor location and not based on the first estimated floor location). In some embodiments, a same relative spacing between the floor in the three-dimensional environment and the one or more virtual objects is maintained regardless of whether the floor in the three-dimensional environment corresponds to the first estimated floor location or the second estimated floor location. For example, if a first virtual object of the one or more virtual objects was being displayed 60 centimeters above the first estimated floor location, the location of the first virtual object would be updated such that the first virtual object is displayed 60 centimeters above the second estimated floor location. In some embodiments, the one or more virtual objects cannot be displayed at a location below the second estimated floor location in the three-dimensional environment. In some embodiments, if the user's viewpoint of the three-dimensional environment changes while the floor in the three-dimensional environment is at the second estimated floor location, the electronic device displays the three-dimensional environment from the user's new viewpoint of the three-dimensional environment, but the one or more virtual objects remain at the one or more second locations in the three-dimensional environment (e.g., the distance at which the one or more virtual objects are being displayed from the floor does not change when a user's viewpoint of the three-dimensional environment changes).

In some embodiments, in accordance with a determination that the one or more criteria are not satisfied (1202*g*) (e.g., if the objects in the three-dimensional environment should not be displayed relative to the second estimated floor location (e.g., the most recently determined floor) but rather relative to the first estimated floor location), the electronic device maintains (1202*h*) the one or more first virtual objects at their locations in the three-dimensional environment based on the first estimated floor location (e.g., even after the first estimated floor location has been determined to be inaccurate and a second estimated floor location has determined to be more accurate). For example, in FIG. 11B, even though the electronic device 1102*a* has updated its estimated location of the physical floor in the physical environment 1121*a* of the electronic device 1102*a* from the location 1120*a* to the location 1150*a*, the electronic device 1102*a* continues to display the objects in the three-dimensional environment relative to location 1120*a* (because the above one or more criteria has not been satisfied). For example, if the one or more criteria are not satisfied, the one or more virtual objects remain located at locations relative to the first estimated floor location (e.g., and are not moved to the one or more second locations because the floor in the three-dimensional environment has not yet been updated to the second estimated floor location).

Updating the estimated floor in the three-dimensional environment when a new floor location has been determined and when the one or more criteria have been satisfied provides an efficient way of only moving objects in the three-dimensional environment when certain criteria are met, thereby reducing disorientation and cognitive burden on the user when engaging with the three-dimensional environment.

In some embodiments, the one or more criteria include a criterion that is satisfied when the electronic device receives, via the one or more input devices, selection of a respective input element (e.g., displayed via the display generation component, a mechanical input element included on the electronic device, etc.) that corresponds to a request to update the locations of the one or more first virtual objects to satisfy one or more second criteria (1204*a*). In some embodiments, the input selecting the respective input element and/or one or more inputs described with reference to method 1200 are air gesture inputs, such as described with reference to method 800. For example, when the electronic device 1102*a* detects a request to recenter the objects in the three-dimensional environment 1122—such as in FIG. 11C—the electronic device 1102*a* stops displaying the objects in the three-dimensional environment 1122 based on the estimated physical floor location 1120*a* and starts displaying the objects in the three-dimensional environment 1122 based on the estimated physical floor location 1150*a*. In some embodiments, in response to the selection of the respective input element, the locations of the one or more first virtual objects are updated to satisfy the one or more second criteria in a similar manner as described in method 800. In some embodiments, the respective input element is displayed via the display generation component when the user's viewpoint of the three-dimensional environment moves more than a threshold distance (e.g., 10, 20, 30, 40, 50, 100, 200, 300, 400, 500, 1000, or 2000 centimeters) from the one or more first virtual objects, when the one or more first virtual objects are no longer oriented towards the user's new viewpoint of the three-dimensional environment, and/or when the one or more first virtual objects are no longer in the field of view from the user's new viewpoint of the three-dimensional environment, etc. (e.g., and/or any other manner described with reference to method 800). In some embodiments, the respective input element is displayed via the display generation component when the user's viewpoint of the three-dimensional environment changes/moves to a second viewpoint of the three-dimensional environment, but the one or more first virtual objects are being displayed at poses (e.g., positions/orientations) in the three-dimensional environment based on the user's previous viewpoint of the three-dimensional environment. In some embodiments, the electronic device detects a selection of the respective user interface element when a user performs a pinching gesture using the index finger and thumb of a hand of the user while the user's gaze is directed towards the respective user interface element (e.g., if the respective input element is displayed via the display generation component). In some embodiments, the electronic device detects a selection of the respective user interface element when a user taps on a location of a touch screen of the electronic device that corresponds to the location of the respective user interface element (e.g., if the respective input element is display via the display generation component). In some embodiments the respective user interface element is selected when a click operation on a mouse or touchpad is performed while the respective user interface element has focus (e.g., if the respective input element is display via the display generation component). In some embodiments, the respective input element is a physical button, switch, dial, etc.

Delaying the display of the one or more first virtual objects at updated locations in the three-dimensional environment based on a new estimated floor location (e.g., the second estimated floor location) until selection of a respective input element is detected provides an efficient way of continuing to display the one or more first virtual objects at a previous estimated floor location until user input is received for doing so, thereby reducing disorientation and cognitive burden on the user when engaging with the three-dimensional environment.

In some embodiments, the one or more criteria include a criterion that is satisfied when a placement of a device that includes the display generation component on a portion of the user changes after determining the second estimated floor location (1206*a*) (e.g., and is not satisfied when the placement of the display generation component on the portion of the user does not change after determining the second estimated floor location). For example, after detecting the new estimated physical floor location 1150*a*, the electronic device 1102*a* continues to display the objects in the three-dimensional environment 1102 relative to location 1120*a* until the user of device 1102*a* takes device 1102*a* off/on. For example, after the electronic device determines a new estimated floor location (e.g., the second estimated floor location) for the three-dimensional environment, the one or more virtual objects continue to be displayed at the locations based on the first estimated floor location (e.g., the previous estimated floor location) until the placement of the display generation component on the user changes. In some embodiments, if the display generation component is a head-mounted display, the electronic device detects that the placement of the display generation component changes when the electronic device detects that the user is no longer wearing the head-mounted display (e.g., the display generation component is no longer placed on the user's head). In some embodiments, the electronic device detects that the placement of the display generation component changes when the electronic device detects that the user is no longer holding the display generation component. In some embodiments, after the second estimated floor location is detected, the locations of the one or more first virtual objects are displayed at updated locations based on the second estimated floor location in response to the electronic device being placed on the user (e.g., placed on the user's head) after the electronic device was previously taken off (e.g., taken off after the second estimated floor location was determined).

Delaying the display of the one or more first virtual objects at updated locations in the three-dimensional environment based on a new estimated floor location (e.g., the second estimated floor location) until the placement of the display generation component changes provides an efficient way of continuing to display the one or more first virtual objects at a previous estimated floor location until certain criteria/conditions are satisfied, thereby reducing disorientation and cognitive burden on the user when engaging with the three-dimensional environment.

In some embodiments, the one or more criteria include a criterion that is satisfied when the electronic device receives a request to display a virtual environment in the three-dimensional environment after determining the second estimated floor location, wherein the virtual environment was not displayed in the three-dimensional environment when the second estimated floor location was determined (1208*a*) (e.g., and is not satisfied when the electronic device does not receive the request to display the virtual environment in the three-dimensional environment after determining the second estimated floor location). For example, after detecting the new estimated physical floor location 1150*a*, the electronic device 1102*a* continues to display the objects in the three-dimensional environment 1102 relative to location 1120*a* until device 1102*a* detects a request to display a virtual environment. For example, even after the electronic device has determined a more appropriate estimated location of a physical floor in the physical environment of the electronic device, the one or more first virtual objects continue to be displayed in the three-dimensional environment based on the first estimated floor location (e.g., a previous estimated floor location) and not the newly determined floor location (the second estimated floor location) until a new virtual environment is displayed in the three-dimensional environment. In some embodiments, when the request to display the virtual environment in the three-dimensional was received, the three-dimensional environment was not displaying any virtual environment or was displaying a different virtual environment. In some embodiments, the three-dimensional environment includes one or more affordances that corresponds to one or more virtual environments. In some embodiments, the virtual environment is displayed when an affordance corresponding to the virtual environment is selected. In some embodiments, the virtual environment is a simulated three-dimensional environment that can be displayed in three-dimensional environment, optionally, instead of the representations of the physical environment or, optionally, concurrently with the representation of the physical environment. Some examples of a virtual environment include a lake environment, a mountain environment, a sunset scene, a sunrise scene, a nighttime environment, a grassland environment, a concert scene, a sports game, etc.

Delaying the display of the one or more first virtual objects at updated locations in the three-dimensional environment based on a new estimated floor location (e.g., the second estimated floor location) until the electronic device receives a request to display a virtual environment provides an efficient way of continuing to display the one or more first virtual objects at a previous estimated floor location until certain criteria/conditions are satisfied, thereby reducing disorientation and cognitive burden on the user when engaging with the three-dimensional environment.

In some embodiments, determining the estimated location of the physical floor is based on detecting a plane corresponding to at least a portion of the physical floor in the physical environment (1210a). For example, in FIG. 11B, the device 1102a detected a new estimated location of the physical floor in the physical environment 1121a—location 1150a—because device 1102a detected a plane corresponding to a portion of the floor in the physical environment 1121a. In some embodiments, the plane corresponding to at least a portion of the physical floor in the physical environment is detected via one or more (e.g., image, radar, lidar, depth, ultrasonic, etc.) sensors of the electronic device. In some embodiments, the electronic device uses the plane to estimate the location physical floor by determining a height difference between the plane in the physical environment and the electronic device (e.g., how far in the Y-direction is the detected plane from the electronic device). In some embodiments, the electronic device detects the plane when the portion of the physical floor is in the field of view of user/electronic device (e.g., image sensor(s) are positioned relative to the user to define a field of view).

Determining an estimated location of a physical floor based on plane detection provides an efficient way of automatically estimating a location of a physical floor in a physical environment, thereby enabling the user to use the electronic device quickly, efficiently, and without the user of the electronic device having to manually set the location of the physical floor in the physical environment.

In some embodiments, determining the estimated location of the physical floor is based on information about a location of a first portion of a user that is detected by the device (e.g., a head of the user) and an estimation of a distance between the first portion of the user and a second portion of the user (e.g., the user's feet) that is assumed to be in contact with the floor (1212a). For example, in FIG. 11A, the electronic device 1102a optionally estimated that the location of the physical floor in the physical environment 1121a is at location 1120a based on height information about the user of the electronic device 1102a (User A). In some embodiments, if the electronic device does not detect a plane corresponding to at least a portion of the physical floor in the physical environment, the electronic device estimates the location of the physical floor based on information about one or more users. In some embodiments, the information about the one or more users includes information about the user of the electronic device and/or information about user(s) other than the user of the electronic device. For example, if the electronic device has access to the age and/or gender of the user of the electronic device (e.g., has access to a user profile containing such information), the location of the physical floor is optionally estimated based on a known, average standing height for users of similar ages and/or genders to the user of the electronic device. In some embodiments, to better estimate the location of the physical floor in the physical floor, the information about the one or more users is used in addition to the plane detection technique described above. In some embodiments, height information of one or more users is used to estimate the location of the physical floor in the physical environment. For example, if user is five 150 centimeters tall, the electronic device optionally estimates the floor to be five below the electronic device.

Determining an estimated location of a physical floor based on user information provides an efficient way of automatically estimating a location of a physical floor in a physical environment, thereby enabling the user to use the electronic device quickly, efficiently, and without the user of the electronic device having to manually set the location of the physical floor in the physical environment.

In some embodiments, the estimation of a distance between the first portion of the user and the second portion of the user is based on a known height of the user of the electronic device (1214a). For example, in FIG. 11A, the electronic device 1102a optionally estimated that the location of the physical floor in the physical environment 1121a is at location 1120a based on height information about the user of the electronic device 1102a (User A). For example, if the electronic device has access to (e.g., a user profile that includes) information about the height of the user, the electronic device estimates the location of the physical floor based on the height of the user of the electronic device. For example, if the user is currently wearing the electronic device (e.g., if the electronic device is a head-mounted device) and the electronic device has access to information indicating that the user of the electronic device is 180 centimeters tall, the electronic device optionally estimates that the physical floor is currently located 182 centimeters below (or 0.5, 5, 10, 15, 20, or 30 centimeters above or below) where the electronic device is currently being worn. In some embodiments, the electronic device estimates the location of the physical floor with height information of the user when the physical floor is not in the field of view of the user (e.g., when a plane of at least a portion of the physical floor cannot be detected by the electronic device).

Determining an estimated location of a physical floor based height information of the user of the electronic device provides an efficient way of automatically estimating a location of a physical floor in a physical environment, thereby enabling the user to use the electronic device quickly, efficiently, and without the user of the electronic device having to manually set the location of the physical floor in the physical environment.

In some embodiments, the estimation of the distance between the first portion of the user and the second portion of the user is based on an estimated height of the user based on an average height (1216a) (e.g., an average height of potential users or an average height of users with demographic characteristics similar to the user of the device). For example, in FIG. 11A, the electronic device 1102a optionally estimated that the location of the physical floor in the physical environment 1121a is at location 1120a based on average height information for a plurality of users. Additionally, or alternatively, to the using information about the height of the user of the electronic device, the electronic device optionally estimates the location of the physical floor in the physical environment of the electronic device based on an average height information of other users. For example, if a user profile of the electronic does not currently include height information about the user of the electronic device and if the electronic device is a head-mounted device, the electronic device optionally estimates that the physical floor is currently located a respective distance below the average height of the plurality of users. For example, if the user is currently wearing the electronic device (e.g., if the electronic device is a head-mounted device) and the electronic device has access to information indicating that that the average height of a plurality of users is 180 centimeters tall, the electronic device optionally estimates that the physical floor is currently located 180 centimeters below (or 0.5, 5, 10, 15, 20, 25, or 30 centimeters above or below) where the electronic device is currently being worn. In some embodiments, the electronic device estimates the location of the physical floor when the physical floor is not in the field of view of the user/electronic device (e.g., image sensor(s) are positioned relative to the user to define a field of view). In some embodiments, the plurality of users are users that are included in the three-dimensional environment, users in the general public, users that are not included in the three-dimensional environment, etc. Determining an estimated location of a physical floor based average height information for a plurality of users provides an efficient way of automatically estimating a location of a physical floor in a physical environment, thereby enabling the user to use the electronic device quickly, efficiently, and without the user of the electronic device having to manually set the location of the physical floor in the physical environment.

In some embodiments, the estimation of the distance between the first portion of the user and the second portion of the user is based on a current pose of the user of the electronic device in the physical environment of the electronic device (1218a). For example, in FIG. 11A, the electronic device 1102a optionally estimated that the location of the physical floor in the physical environment 1121a is at location 1120a based on the pose of the user of the electronic device 1102a (User A) in the physical environment 1121a. For example, the electronic device estimates the location of the physical floor in the physical environment based on a current pose of the user of the electronic device. For example, if the user of the electronic device is holding or wearing the electronic device while in a "sitting" pose, the electronic device optionally determines that the physical floor is closer to the electronic device than if the user were standing. Similarly, if the electronic device determines that the user of the electronic device is in a "standing" pose, the electronic device optionally determines that the physical floor is further from the electronic device than if the user was sitting. In some embodiments, other poses of the user can also be detected by the electronic device such as a kneeling pose, a crouching pose, etc., which may also be used by the electronic device to estimate how close or far the electronic device is from the physical floor in the physical environment. In some embodiments, the electronic device a user's pose using one or more activity sensors. In some embodiments, the electronic device optionally determines that the user is sitting if the electronic device detects that the device is at or within a first respective height from a physical object in the physical environment, and optionally determines that the user is standing if the device is not at least the first respective height from the physical object. In some embodiments, the electronic device updates the estimated location of the physical floor in the physical environment when the pose of the user changes.

Determining an estimated location of a physical floor based a current pose of the user of the electronic device provides an efficient way of automatically estimating a location of a physical floor in a physical environment, thereby enabling the user to use the electronic device quickly, efficiently, and without the user of the electronic device having to manually set the location of the physical floor in the physical environment.

In some embodiments, in accordance with a determination that a current location of the electronic device is a known location, determining the estimated location of the physical floor is based on prior information about the physical environment of the electronic device (1220a) (e.g., that was previously detected/observed by the electronic device). For example, in FIG. 11A, the electronic device 1102a optionally estimated that the location of the physical floor in the physical environment 1121a is at location 1120a because the electronic device 1102a detected that the device's 1102a current location is a known location. In some embodiments, the electronic device saves information about where it has been operated (e.g., location information of one or more physical environments). For example, if the electronic device has previously been operated at the location where the electronic device is currently located, the electronic device uses information that was saved in previous operating sessions to estimate the location of the physical floor. In some embodiments, information that was saved during the previous operating sessions includes information about the location of the physical floor, information about where the floor is not physically located, location information about a plane that was previously detected that corresponds to a portion of the physical floor, information about the distance of physical objects to the physical floor, etc. In some embodiments, if the current location of the electronic is not a known location (e.g., the electronic device has never previously been operated at the current location), the electronic device uses one or more of the techniques previously described above.

Determining an estimated location of a physical floor based on prior information that was detected about the current location of the electronic device provides an efficient way of automatically estimating a location of a physical floor in a physical environment, thereby enabling the user to use the electronic device quickly, efficiently, and without the user of the electronic device having to manually set the location of the physical floor in the physical environment.

In some embodiments, while displaying the one or more virtual objects based on the second estimated floor location, the electronic device receives (1222a), via the one or more input devices, an input corresponding to a request to display one or more second virtual objects (e.g., a request to display one or more second application windows, one or more second operating system elements, one or more second representations of one or more second users, one or more second content items, etc.), different from the one or more first virtual objects, in the three-dimensional environment. In some embodiments, in response to receiving the input, the electronic device displays (1222b) the one or more second virtual objects at one or more locations in the three-dimensional environment based on the second estimated floor location. For example, in FIG. 11D, the electronic device 1102a displays the user interface 1132 of Application B relative to the estimated physical floor location 1150a because other objects in the three-dimensional environment 1122 are being displayed relative to estimated physical floor location 1150a. For example, after the electronic device updates the one or more first virtual objects to be displayed at updated locations based on the second estimated floor location (e.g., the most recently determined estimated floor location), future displayed virtual objects are also displayed based on the second estimated floor location and not the first estimated floor location (e.g., the previously estimated location of the physical floor in the physical environment). In some embodiments, if a virtual object is added to the three-dimensional environment before the one or more criteria—described above—is satisfied, the virtual object is displayed at a location based on the first estimated floor location. In some embodiments, the one or more second objects are placed at a default height from the second estimated floor location (e.g., 15, 30, 45, 2, 60, 150, or 200 centimeters).

Displaying new virtual objects at locations based on the same estimated floor location that locations of virtual objects that are currently being displayed in the three-dimensional environment are based on provides an efficient way displaying new and current virtual objects in the three-dimensional environment based on the same estimated floor location, thereby reducing disorientation and cognitive burden on the user when engaging with the three-dimensional environment.

In some embodiments, the first estimated floor location defines a first boundary of the three-dimensional environment beyond which the one or more first virtual objects cannot be moved, and the second estimated floor location defines a second boundary, different from the first boundary, of the three-dimensional environment beyond which the one or more first virtual objects cannot be moved (1224a). For example, in FIG. 11D, while the electronic device 1102a is displaying objects in the three-dimensional environment 1122 relative to location 1150a, the electronic device 101 does not respond to input which would cause the objects in the three-dimensional environment 1304 to move below location 1150a. For example, while the one or more first virtual objects are being displayed at locations determined based on the first estimated floor location, the one or first virtual objects cannot be displayed/moved below the first estimated floor location. Similarly, while the one or more first virtual objects are being displayed at locations determined based on the second estimated floor location, the one or first virtual objects cannot be displayed/moved below the second estimated floor location.

Changing the boundary of the three-dimensional environment as the estimated floor location in the three-dimensional environment changes provides an efficient way of restricting movement of virtual objects in the three-dimensional environment beyond the current estimated floor location in the three-dimensional environment, thereby reducing disorientation and cognitive burden on the user when engaging with the three-dimensional environment.

In some embodiments, the one or more virtual objects includes one or more representations of one or more users in the three-dimensional environment other than the user of the electronic device (1226a), such as the representation 1106 of User B in FIG. 11A. For example, in some embodiments, the three-dimensional environment includes two or more users, including the user of the electronic device and one or other users. In some embodiments, the electronic device associated with the user displays an avatar of the one or more other users in the three-dimensional environment at the locations of the viewpoints of those other users in the three-dimensional environment. In some embodiments, the locations of the one or more representations of the one or more users in the three-dimensional environment are updated as the estimated location of the floor in the three-dimensional environment changes. For example, while the location of the floor in the three-dimensional environment corresponds to the first estimated floor location, the representations of the one or more users are optionally displayed at locations based on the first estimated floor location. Similarly, while the location of the floor in the three-dimensional environment corresponds to the second estimated floor location, the representations of the one or more users are optionally displayed at locations based on the second estimated floor location (e.g., if the one or more criteria described above are satisfied). Displaying, in the three-dimensional environment, representations of users at locations based on the current estimated floor location in the three-dimensional environment provides an efficient way of displaying such virtual objects relative to an estimated floor location in the three-dimensional environment, thereby reducing disorientation and cognitive burden on the user when engaging with the three-dimensional environment.

In some embodiments, while the electronic device is displaying the one or more first virtual objects based on the second estimated floor location, a second electronic device is displaying the three-dimensional environment from a viewpoint of a second user of the second electronic device (e.g., the second electronic device is displaying the same three-dimensional environment as the electronic device but from the viewpoint of the second user (and not from the viewpoint of the user of the electronic device). In some embodiments, the second electronic device is displaying the three-dimensional environment from the viewpoint of the second user because the second electronic device is at a location and/or orientation in the physical environment of the second electronic device that corresponds to the viewpoint of the second user.), wherein the one or more first virtual objects are displayed by the second electronic device based on an estimated location of a physical floor in a physical environment of the second electronic device (1230a). For example, the electronic device 1102a is displaying objects in the three-dimensional environment 1122 relative to its estimated physical floor location 1120a, and electronic device 1104b is displaying the objects in the three-dimensional environment 1122 relative to its estimated physical floor location 1127b. For example, the second electronic device is displaying the three-dimensional environment relative to an estimated location of the physical floor in the physical environment of the second electronic device while the electronic device is displaying the three-dimensional environment relative to an estimated location of the physical floor in the physical environment of the first electronic device. Thus, because the three-dimensional environment is displayed relative to an estimated floor location for respective users, virtual objects are also displayed relative to the estimated floor location for those respective users. For example, if electronic device is displaying, in the three-dimensional environment, a respective virtual object of the one or more first virtual objects at a respective distance (e.g., 0, 15, 30, 45, 60, 90, 180, or 200 centimeters) above the second estimated floor location, the second electronic device is also displaying, in the three-dimensional environment, the respective virtual object at the respective distance (e.g., 0, 15, 30, 45, 60, 90, 180, or 200 centimeters) above the estimated location of the physical floor in the physical environment of the second electronic device. In some embodiments, estimated location of the physical floor in the physical environment of the electronic device and the estimated location of the physical floor in the physical environment of the second electronic device are different distances from the actual location of the respective physical floors (e.g., the estimated location of the physical floor in physical of the electronic device may be 0, 15, 40, or 90 centimeters away from the actual physical floor while the estimated location of the physical in the physical floor may be 100, 200, 300, or 400 centimeters away from the actual physical floor).

Displaying the three-dimensional environment (and objects of the three-dimensional environment) relative to the estimated location of the physical floor for the one or more users in the three-dimensional environment provides an efficient way of displaying the three-dimensional environment relative to multiple users of the three-dimensional environment, thereby reducing disorientation and cognitive burden on the user when engaging with the three-dimensional environment.

In some embodiments, while displaying the three-dimensional environment, the electronic device receives (1232a), via the one or more input devices, an input for performing a first operation in the three-dimensional environment (e.g., for launching an application in the three-dimensional environment). In some embodiments, in response to receiving the input (1232b), in accordance with a determination that the first operation requires determination of the estimated location of the physical floor in the physical environment with a first level of precision (1232c) (e.g., if the application being launched requires the estimated location of the physical floor to be estimated with a first amount of accuracy. In some embodiments, operations/applications that require the location of the physical floor to be estimated with the first level of precision include operations/applications that require the user to define the boundaries in which user interfaces/elements associated with the first operation can be displayed. In some such examples, the applications that require boundaries include gaming applications and/or applications that require regular user movement (e.g., the user cannot interact with application while remaining stationary or sitting)), the electronic device provides (1232d) instructions for collecting information to be used to determine the estimated location of the physical floor in the physical environment. For example, if operations associated with user interface 1110 in FIG. 11A require the first level of precision, the electronic device 1102a optionally provides instructions to the user of device 1102a to look at the physical floor in the physical environment 1121a to enable device 1102a to detect a plane corresponding to the physical floor, as described above. For example, the electronic device provides visual and/or audio indications that indicate one or more actions that the user needs to perform to allow the electronic device to estimate the location of the physical floor with the first level of precision. In some embodiments, such an action could include requiring the user to look at and/or orient the electronic device towards a portion of the physical floor, such that the electronic device can estimate the location of the physical floor by detecting a plane corresponding to at least the portion of the physical floor.

Providing the indication to allow for the electronic device to determine the estimated location of the physical floor with a first amount of precision ensures that such a floor is determined when needed, thereby enabling the user to use the electronic device quickly and efficiently.

In some embodiments, in response to receiving the input (1234a), in accordance with a determination that the first operation does not require determination of the estimated location of the physical floor in the physical environment with the first level of precision (1234b) (e.g., if the application being launched does not require the estimated location of the physical floor to be estimated with a first amount of accuracy. In some embodiments, operations/applications that do not require the location of the physical floor to be estimated with the first level of precision include operations/applications that allow the user to sitting or be stationary while interacting with the application/operation.), the electronic device determines (1234c) the estimated location of the physical floor in the physical environment without providing the instructions for collecting information to be used to determine the estimated location of the physical floor in the physical environment. For example, if operations associated with user interface 1110 in FIG. 11A do not require the first level of precision, the electronic device 1102a does not provide instructions to the user to look at the physical floor in the physical environment 1121a of the electronic device 1102a. For example, if the operation can function without requiring the estimated location of the physical floor to be estimated with the first level of precision, any technique for estimating the location of the physical floor may be used, including techniques that may result in a lower level of precision than the first level of precision, such as one or more of the techniques previously described. In some embodiments, determining the estimated location of the physical floor without providing the indication includes determining estimated location of the physical floor while the application/operation is being used, without requiring action from the user that is explicitly for estimating the location of the physical floor. Determining the estimated location of the physical floor without providing the indication provides an efficient way for proceeding with the first operation when a certain amount of precision is not required, thereby enabling the user to use the electronic device quickly and efficiently.

In some embodiments, while displaying the one or more first virtual objects based on the first estimated floor location, the electronic device displays (1236a), in the three-dimensional environment, a floor at the first estimated floor location. For example, the electronic device 1102a displays a virtual floor in the three-dimensional environment 1122 that corresponds to location 1120a in FIG. 11A. In some embodiments, the floor of the three-dimensional environment is displayed at the first estimated floor location because the first estimated floor location corresponds to an estimated location of the physical floor in the physical environment of the electronic device. For example, if the estimated location of the physical floor is estimated to be at a location that is 30, 60, 90, 120, 150, 200, or 400 centimeters below the electronic device, the floor of the three-dimensional environment is optionally displayed at a corresponding location in the three-dimensional environment (e.g., the floor in the three-dimensional environment is displayed at a location in the three-dimensional environment that corresponds to a physical location that is 30, 60, 90, 120, 150, 200, or 400 centimeters below the electronic device). In some embodiments, the floor in the three-dimensional environment is not displayed via the display generation component of the electronic device if the floor is not currently in the field of view from the user's viewpoint of the three-dimensional environment. In some embodiments, the floor in the three-dimensional environment is a virtual representation of the floor (e.g., photorealistic representation, simplified representation, cartoon, caricature, etc.). In some embodiments, the floor in the three-dimensional environment is a logical object that is not displayed or included in the three-dimensional environment but acts as reference for the placement of virtual and/or physical objects in the three-dimensional environment. In embodiments, the floor is not displayed in the three-dimensional environment but is visible through a transparent portion of the display generation component (e.g., true or real passthrough).

In some embodiments, while the one or more first virtual objects based on the second estimated floor location, the electronic device displays (1236b), in the three-dimensional environment, a floor at the second estimated floor location. For example, the electronic device 1102a displays a virtual floor in the three-dimensional environment 1122 that corresponds to location 1150a in FIG. 11D. In some embodiments, displaying the floor at the second estimated location is analogous to displaying the floor at the first estimated floor location. Displaying the floor in the three-dimensional environment provides an efficient way for indicating the position of the floor on which the locations of virtual objects are based, thereby enabling the user to use the electronic device quickly and efficiently.

FIGS. 13A-13D illustrate exemplary ways of moving objects in a three-dimensional environment in accordance with some embodiments of the disclosure.

Figure 13A:
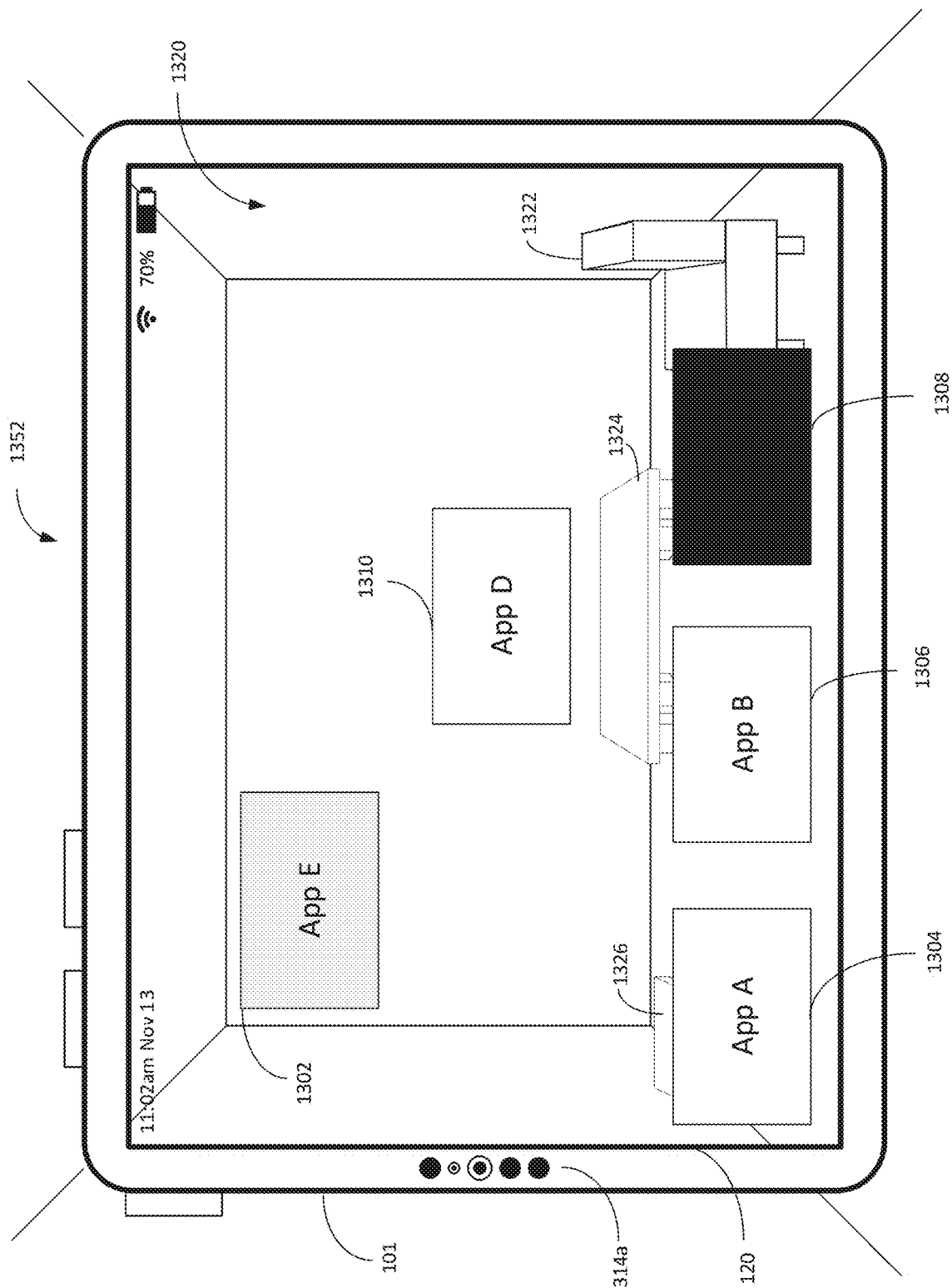

FIG. 13A illustrates a three-dimensional environment 1320 that is being displayed by display generation component 120 of electronic device 101. As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, the user interfaces shown below could also be implemented on a head-mounted display that includes a display generation component that displays the user interface to the user and sensors to detect the physical environment, movements of the user's hands (e.g., external sensors facing outwards from the user), and/or gaze of the user (e.g., internal sensors facing inwards towards the face of the user).

In FIG. 13A, the electronic device 101 is displaying a three-dimensional environment 1320 that includes a user interface 1302 of Application E, a user interface 1304 of Application A, a user interface 1306 of Application B, a user interface 1308 of Application C, a user interface 1310 of Application D. In some embodiments, Applications A-E are media applications, social applications, navigation applications, streaming applications, internet browsing applications, or the like. In some embodiments, the electronic device 101 is displaying the user interfaces 1302-1310 of Applications A-E in response to the electronic device 101 detecting one or more requests to launch Applications A-E in the three-dimensional environment 1320. As shown in FIG. 13A, the three-dimensional environment 1320 also includes representations of real objects in a physical environment 1352 of the electronic device, including a representation 1322 of a sofa, a representation 1324 of a table, a representation 1326 of a corner table.

In FIG. 13A, the electronic device 101 is displaying the user interfaces 1302-1310 with a default visual appearance. In some embodiments, the user interfaces 1302-1310 are being displayed with a default visual appearance because the user interfaces 1302-1310 have not been selected for movement in the three-dimensional environment 1320. In some embodiments, the default visual appearance indicates that the user interfaces 1302-1310 currently correspond to an "unselected" state (e.g., user interfaces 1302-1310 are not currently selected for movement in the three-dimensional environment 1320). In some embodiments, while the interfaces 1302-1310 are being displayed with a default visual appearance, the user interfaces 1302-1310 optionally have an opacity that causes portions of the three-dimensional environment 1320 to be (e.g., fully) obscured/occluded by those user interfaces, as illustrated in FIG. 13A.

In some embodiments, the user interfaces 1302-1310 and the representations 1322-1326 are being displayed by the display generation component 120 because these objects are in a field of view from a user's current viewpoint of the three-dimensional environment 1320 (e.g., the user of electronic device 101). In some embodiments, the electronic device 101 is displaying the three-dimensional environment 1320 from the viewpoint indicated in FIG. 13A because the user of electronic device 101 is in a corresponding pose/position in the physical environment (e.g., operating environment 100) of the electronic device 101. While FIGS. 13A-13D illustrate multiple user interfaces being displayed by device 101, and multiple manners of changing display of those user interfaces during movement of those user interfaces, it is understood that in some embodiments device 101 displays those user interfaces independently and/or responds in the manners described below independently in response to independent movement inputs.

In FIG. 13B, while the electronic device 101 is displaying the user interfaces 1302-1310 in the three-dimensional environment 1320, the electronic device 101 detects an input to select one of the user interfaces 1302-1310 for movement in the three-dimensional environment 1320. In some embodiments, when a user interface is selected for movement in the three-dimensional environment 1320, the electronic device 101 optionally modifies the display of the selected user interface in various ways, as will be described below and as described in more detail with reference to method 1400. Conversely, in some embodiments, when a user interface is selected for movement in the three-dimensional environment 1320, the electronic device continues to display the user interfaces with the default visual appearance described in FIG. 13A (e.g., with the same visual appearance/visual emphasis the respective user interface is displayed with in the unselected state).

It will be apparent from the remaining portions of the disclosure that the various ways of modifying a user interface described herein provide many technical benefits, including a technical benefit of indicating to a user of the electronic device a current location of the user interface in the three-dimensional environment 1320. Providing an indication of a current location of a user interface in the three-dimensional environment 1320 can especially be beneficial in circumstances where an electronic device automatically/dynamically scales the size of a user interface as the user interface moves closer to or further from the user's viewpoint of the three-dimensional environment (e.g., to ensure continued interactability of that user interface at different distances/locations in the three-dimensional environment). In some circumstances where the user interfaces in a three-dimensional environment are not modified in the manners described herein, it can be difficult for a user of the electronic device to understand that movement input directed towards a user interface actually causes the user interface to move further or closer to the user's current viewpoint of the three-dimensional environment 1320. For example, if a user interface being moved in the three-dimensional environment 1320 is being dynamically scaled such that the amount of space occupied by the user interface in the user's field of view remains constant as the user interface is being moved in the three-dimensional environment 1320, it can be confusing for a user to understand that the user interface is actually moving further (or closer) to the user's viewpoint of the three-dimensional environment 1320, because the user interface is not being displayed at a smaller size as the user interface moves away from the user's viewpoint (or at a larger size as the user interface moves closer to the user's viewpoint).

In some embodiments, the electronic device 101 detects a request to select one of the user interfaces 1302-1310 for movement in the three-dimensional environment 1320 when the electronic device 101 detects that the user's hand 1318 is in a "pointing" pose (e.g., one or more fingers of hand 1318 are extended and one or more fingers of hand 1318 are curled towards the palm of hand 1318) or in a "pinching" pose (e.g., the thumb and index of the user's hand 1318 converge at or within a threshold distance (e.g., 0.2, 0.5, 1, 1.5, 2, or 2.5 centimeters) of each other) while the gaze 1330 of the user is optionally directed towards one of the user interfaces 1302-1320 (e.g., if device 101 is head-mounted device). In some embodiments, the electronic device detects a request to select one of the user interfaces for movement in the three-dimensional environment 1320 when the electronic device detects that a finger of hand 1318 has touched down at a location on the display generation component 120 (e.g., if display generation component 120 is a touch screen) that corresponds to one of the user interfaces 1302-1310 for more than a threshold amount of time (0.5, 1, 1.1, 1.5, 2, 2.5, 5, or 10 seconds). For example, the electronic device 101 optionally detects the request to select user interface 1302 for movement in the three-dimensional environment 1320 when the hand 1318 is in the pointing pose (as illustrated in FIG. 13B) and touches user interface 1302.

In some embodiments, the electronic device 101 visually deemphasizes a respective user interface relative to the three-dimensional environment 1320 when that user interface is selected for movement. In some embodiments, visually deemphasizing the respective user interface relative to the three-dimensional environment 1320 includes modifying a transparency of the respective user interface that has been selected for movement in the three-dimensional environment 1320. For example, in FIG. 13B, the electronic device 101 has increased the transparency of user interface 1302 when compared to user interface 1302 in FIG. 13A. In some embodiments, the electronic device 101 modified the transparency of user interface 1302 in response to electronic device 101 detecting a request to select user interface 1302 for movement in the three-dimensional environment 1320, as described above. In some embodiments, the electronic device 101 does not modify the transparency of the user interface 1302 in response to the electronic device 101 receiving a request to select user interface 1302 for movement in the three-dimensional environment 1320.

In the example shown in FIG. 13B, the electronic device 101 increased the transparency of all portions of the user interface 1302. However, in some embodiments, in response to the electronic device 101 detecting a request to select user interface 1302 for movement in the three-dimensional environment 1320, the electronic device 101 optionally modifies (e.g., increases) a transparency of a respective portion of the user interface 1302 (e.g., 10%, 20%, 40%, 60%, or 80% of the total size of the user interface 1302) while the transparencies of the remaining portion of the user interface 1302 is not modified.

In some embodiments, when a user interface is selected for movement in the three-dimensional environment 1320 the electronic device 101 modifies the transparency of multiple portions of the selected user interface. For example, in response to the electronic device 101 detecting a selection of the user interface 1302 for movement in the three-dimensional environment 1320, the electronic device 101 optionally modifies a transparency of multiple portions of the user interface 1302. In some embodiments, the amount in which the electronic device 101 modifies the transparency of multiple portions of the user interface 1302 is a function of a distance between the center of the user interface 1302 and a respective portion of the user interface 1302. For example, if a first portion of the user interface 1302 is closer to the center of the user interface 1302 than a second portion of the user interface 1302, the first portion of the user interface 1302 is optionally less transparent than the second portion of the user interface 1302. Conversely, if the first portion of the user interface 1302 is further from the center of the user interface 1302 than the second portion of the user interface 1302, the first portion of the user interface 1302 is optionally more transparent than the second portion of user interface 1302.

In some embodiments, the electronic device 101 displays an indication indicating the location of a respective user interface in the three-dimensional environment when the respective user interface is selected for movement. For example, in FIG. 13B, the electronic device 101 is displaying a virtual shadow 1332 (e.g., a drop shadow) in association with user interface 1310. In some embodiments, the drop shadow is displayed on a surface of three-dimensional environment 1320 that is (optionally directly) below user interface 1310 in three-dimensional environment 1320, and the location of the drop shadow on that surface relative to the viewpoint of the user indicates the distance of user interface 1310 from the viewpoint. In some embodiments, the electronic device 101 is displaying the virtual shadow 1332 in response to the electronic device 101 receiving a request to select the user interface 1310 for movement in the three-dimensional environment 1320. As shown in FIG. 13B, the virtual shadow 1332 is being displayed on the representation 1324 of the table because the user interface 1310 is currently hovering above a portion of the representation 1324 of the table in the three-dimensional environment 1320. In some embodiments, a size of the virtual shadow 1332 increases as the user interface 1310 moves closer to the representation 1324 of the table (e.g., in the Y-direction) and decreases as the user interface 1310 moves further from the representation 1324 of the table (e.g., in the Y-direction). In some embodiments, the electronic device 101 does not display the virtual shadow 1332 in response to receiving a request to select user interface 1310 for movement in the three-dimensional environment 1332. It should be understood that the various ways described herein in which the electronic device 101 responds when a respective user interface has been selected for movement in the three-dimensional environment 1320 optionally occur independently of or concurrently with each other. For example, electronic device 101 optionally modifies the transparency of user interface 1310 in a manner similar to user interface 1302 and displays a drop shadow (e.g., similar to drop shadow 1332) in response to the electronic device 101 receiving a request to select user interface 1310 for movement in the three-dimensional environment 1320.

In some embodiments, the electronic device 101 visually deemphasizes one or more portions a respective user interface in the three-dimensional environment 1320 based on a gaze of the user when the respective user interface is selected for movement. For example, in FIG. 13B, the electronic device 101 is modifying the transparency of the user interface 1308 based on the distance between the user's gaze 1330 and one or more portions of the user interface 1308. In some embodiments, the transparency of the one or more portions of the user interface 1308 are modified based on the user's gaze 1330 in response to the electronic device 101 detecting a request to select user interface 1308 for movement in the three-dimensional environment 1320.

In some embodiments, portions of the user interface 1308 that are closer to the user's current gaze location 1330 are less transparent than the portions that are further from the user's current gaze location 1330. For example, as illustrated in FIG. 13B, a top left portion of the user interface 1308 is less transparent than a lower right portion of the user interface 1308 because the top left portion is closer to the gaze of the user than the lower right portion of the user interface 1308. In some embodiments, electronic device 101 does not modify the transparency of portions of the user interface 1308 that are at or within a threshold distance (e.g., 1, 5 10, 20, 30, 40, 50, 100, 200, 300, 400, 500, 1000, or 2000 centimeters) of the user's current gaze location 1330 but rather modifies the transparency of portions of the user interface 1308 that are further than the threshold distance from the user's current gaze location. For example, in FIG. 13B, the portions of the user interface 1308 that are at or within the above mentioned threshold distance and the portions of the user interface 1308 that are outside the above mentioned threshold distance is illustrated by indication 1316 (which is optionally not displayed in the three-dimensional environment 1320). In the example of FIG. 13B, the electronic device 101 has not modified the transparency of portions of the user interface 1308 that are within the above mentioned threshold distance—indicated by indication 1316—as compared to FIG. 13A, but has increased the transparency of portions of the user interface 1308 that are not within the above threshold distance indicated by indication 1316. In some embodiments, indication 1316 corresponds to a boundary between the user's central and peripheral vision zones. In some embodiments, in response to the electronic device 101 receiving a request to select user interface 1308 for movement in the three-dimensional environment 1320, the electronic device 101 optionally does not modify the transparency of portions of the user interface 1308 based on the gaze of the user In some embodiments, the electronic device 101 displays, in association with a respective user interface in the three-dimensional environment 1320, a visual indication whose size in the three-dimensional environment 1320 causes the indication to indicate the amount of space the respective user interface will occupy in the user's field of view of the three-dimensional environment 1320 if the respective user interface is moved to a particular location in the three-dimensional environment 1320, as will be described in more detail below. For example, in FIG. 13B, the electronic device 101 is displaying a visual indication 1334 in association with user interface 1304. Indication 1334 is optionally an outline of an area/volume in three-dimensional environment 1320 as will be described in more detail with reference to FIG. 13C. In some embodiments, the visual indication 1334 is being displayed in the three-dimensional environment 1320 in response to the electronic device 101 receiving a request to select user interface 1304 for movement in the three-dimensional environment 1320. As shown in FIG. 13B, the visual indication 1334 has a size in the three-dimensional environment 1320 that causes the electronic device 101 to indicate that the size of the user interface 1304 in the three-dimensional environment 1320 will not change if the electronic device 101 detects an input to deselect user interface 1304 while the user interface 1304 is at the location indicated in FIG. 13B. In some embodiments, the electronic device 101 detects an input to deselect the user interface 1304 when the thumb of hand 1318 moves a threshold distance away from another finger of hand 1318 (e.g., 0.1, 0.2, 0.3, 0.5, 1, 2, 3, or 5 centimeters) after having been within the above mentioned threshold distance and/or when the electronic device 101 detects that hand 1318 is no longer in the "pointing" pose after having previously been in the "pointing" pose. In some embodiments, in response to the electronic device 101 receiving a request to select user interface 1304 for movement in the three-dimensional environment 1320, the electronic device 101 optionally does not display the indication 1304.

In some embodiments, when a respective user interface is selected for movement in the three-dimensional environment 1320, the visual appearance of the respective user interface in three-dimensional environment does not change. For example, the visual appearance of user interface 1306 in FIGS. 13A and 13B is the same even though user interface 1306 has been selected for movement in the three-dimensional environment 1320 (as indicated in FIG. 13B).

Figure 13C:
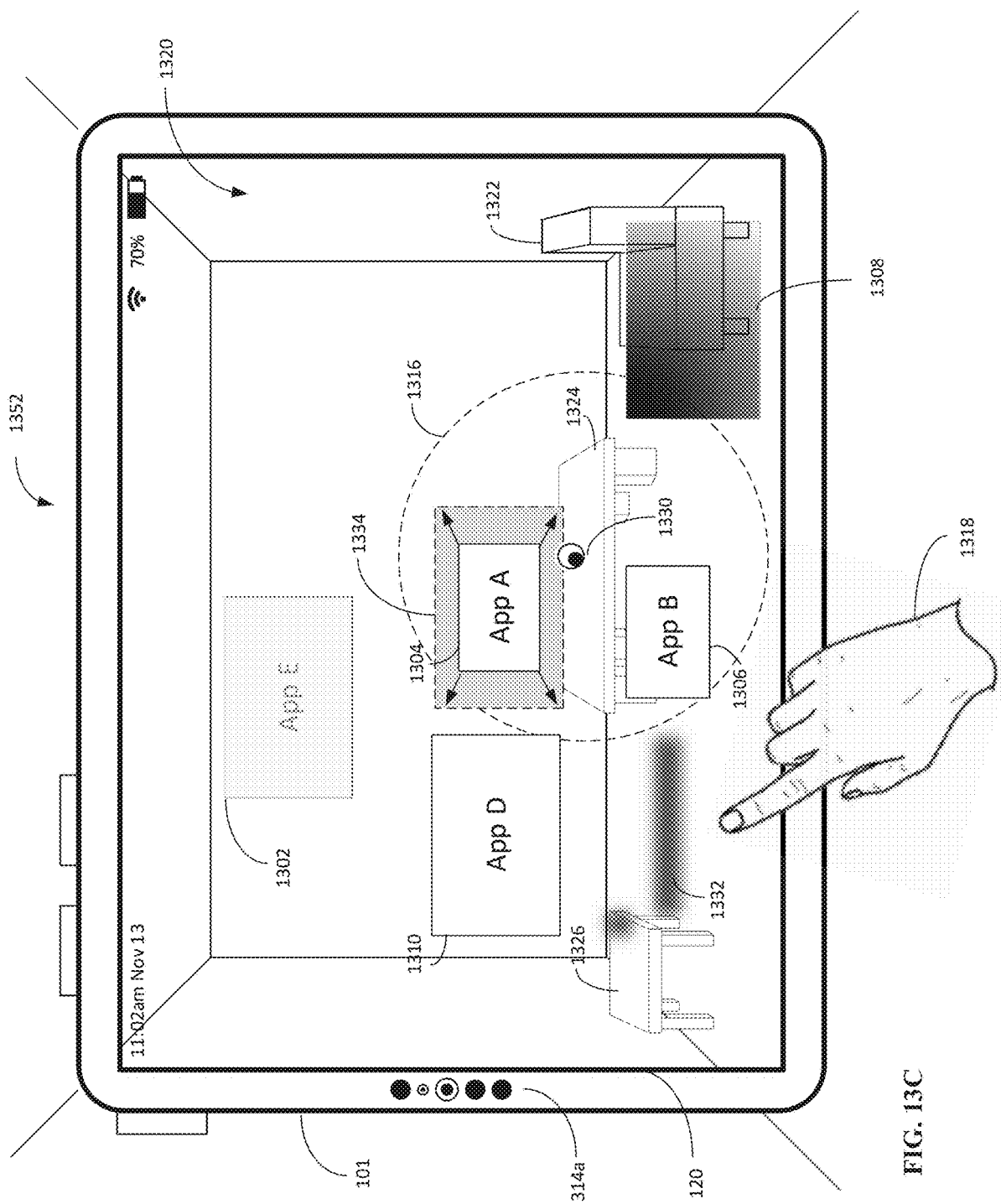

FIG. 13C illustrates movement of the user interfaces 1302-1310 to different locations in three-dimensional environment 1320. In FIG. 13C, the user interface 1302 has moved from the location in the three-dimensional environment 1320 indicated in FIG. 13B to the location in three-dimensional environment 1320 indicated in FIG. 13C. In some embodiments, the user interface 1302 moved to the location indicated in FIG. 13C because after selecting the user interface 1302 as described in FIG. 13B, the electronic device 101 detected that the user's hand 1318 moved to a corresponding location in the physical environment 1352 of the electronic device 101. In some embodiments, while the user interface 1302 is moving from the location indicated in FIG. 13B to the location indicated in FIG. 13C, the electronic device 101 continues to display the user interface 1302 with the same modified amount of transparency during movement of the user interface 1302 to the new location in the three-dimensional environment 1320. For example, as illustrated in FIG. 13C, the transparency of user interface 1302 in FIGS. 13B and 13C remained the same while the user interface 1302 was moving from the location indicated in FIG. 13B to FIG. 13C. In some embodiments, as the user interface 1302 moves to different locations in the three-dimensional environment 1320, the electronic device 101 optionally increases transparency of the user interface 1302 (or optionally decreases) compared to the transparency with which the user interface 1302 is displayed with after the user interface 1302 has been selected for movement in the three-dimensional environment 1320 based on the speed of the movement, for example.

In some embodiments, the electronic device 101 optionally does not modify the transparency of a respective user interface in the three-dimensional environment 1320 until the electronic device 101 detects movement of the respective user interface. Thus, in FIG. 13C, the electronic device 101 optionally displays the user interface 1302 with the modified transparency illustrated in FIG. 13C only after the electronic device 101 detected movement of the user interface 1302 following the selection of user interface 1302 in FIG. 13B.

In some embodiments, the electronic device 101 modifies (e.g., increases transparency of) a portion of the user interface 1302 spanning 10%, 20%, 40%, 60%, 80%, or 100% of the user interface 1302.

In some embodiments, while the user interface 1302 is moving from the location in the three-dimensional environment 1320 indicated in FIG. 13B to the location in the three-dimensional environment indicated in FIG. 13C, the amount by which the electronic device 101 visually deemphasizes the user interface 1302 relative to the three-dimensional environment 1320 is based on movement characteristics of the user interface 1302. For example, if the user interface has moved more than a threshold amount (e.g., 1, 2, 10, 50, 100, 400, or 1000 centimeters) while the user interface 1302 is moving to the location indicated in FIG. 13C, the electronic device 101 optionally modifies the transparency of the user interface 1302 by a first amount of transparency. Conversely, if the user interface 1302 has not moved more than the threshold amount while the user interface 1302 is moving to the location indicated in FIG. 13C, the electronic device 101 optionally modifies the transparency of the user interface 1302 by a lesser amount than if the user interface 1302 had moved more than the above-mentioned threshold amount of movement. Other examples in which the electronic device 101 visually deemphasizes the user interface 1302 based on movement characteristics of the user interface 1302 are described in method 1400.

In some embodiments, if the electronic device 101 receives an input for deselecting user interface 1302 after the movement of the user interface 1302 to the location indicated in FIG. 13C, the electronic device 101 optionally displays the user interface 1302 with its default visual appearance as described in FIG. 13A and no longer visually deemphasizes the user interface 1302. In some embodiments, after moving the user interface 1302 to the location indicated in FIG. 13C, the electronic device 101 at least partially reverses the visual deemphasis applied to the user interface 1302 (while the user interface 1302 is optionally still selected for movement in the three-dimensional environment 1320). For example, after moving the user interface 1302 to the location in the three-dimensional environment indicated in FIG. 13C and while the user interface 1302 is still selected for movement in the three-dimensional environment 1320, the electronic device 101 optionally reduces the transparency of user interface 1302 (as compared to the transparency of the user interface 1302 while the user interface 1302 was being moved the location in FIG. 13C) if the user interface 1302 has not moved in the three-dimensional environment 1320 more than a threshold amount (e.g. 1, 2, 10, 50, 100, 400, or 1000 centimeters) during a respective amount of time (e.g., 0.5, 1, 2, 4, 10, 20, or 40 seconds).

Additionally, in FIG. 13C, the user interface 1310 has moved from the location in the three-dimensional environment 1320 indicated in FIG. 13B to the location in the three-dimensional environment 1320 indicated in FIG. 13C. In some embodiments, the user interface 1310 moved to the location indicated in FIG. 13C because after selecting the user interface 1310 as described in FIG. 13B, the electronic device 101 detected that the user's hand 1318 moved to a corresponding location in the physical environment 1352 of the electronic device 101. As shown in FIG. 13C, as a result of the movement of user interface 1310, the virtual shadow 1332 has moved in the three-dimensional environment 1320 to indicate that user interface 1310 is now hovering above a portion of the representation 1326 of the corner table and a portion of the floor in the three-dimensional environment 1320 (e.g., similar to the floor in the three-dimensional environment in method 1200). In some embodiments, as the user interface 1310 is moving to the location in the three-dimensional environment 1320 indicated in FIG. 13C, the virtual shadow 1332 continuously moves with the user interface 1310 (e.g., in real time) to indicate which portion(s) of the three-dimensional environment 1320 the user interface 1310 is currently hovering over. In some embodiments, the electronic device 101 does not display the virtual shadow 1332 until the electronic device 101 detects movement of the user interface 1310 from the location in the three-dimensional environment 1320 at which the user interface 1310 was selected (e.g., movement from the location of user interface 1310 in FIG. 13B).

In some embodiments, after moving the user interface 1310 to the location indicated in FIG. 13C, the electronic device 101 ceases display of the virtual shadow 1332 in the three-dimensional environment 1320 if the electronic device 101 has detected the user interface 1310 has not moved more than a threshold amount (e.g., 1, 2, 10, 50, 100, 400, or 1000 centimeters) during a respective amount of time (e.g., 0.5, 1, 2, 4, 10, 20, or 40 seconds).

Additionally, as shown in FIG. 13C, the user interface 1304 has moved from the location in the three-dimensional environment 1320 in FIG. 13B to the location in the three-dimensional environment 1320 indicated in FIG. 13C. In some embodiments, the user interface 1304 moved from the location indicated in FIG. 13B to the location indicated in FIG. 13C because after selecting the user interface 1310 as described in FIG. 13B, the electronic device 101 detected that the user's hand 1318 moved to a corresponding location in the physical environment 1352 of the electronic device 101.

In some embodiments, as a respective user interface in the three-dimensional environment 1320 moves further away from the user's viewpoint in the three-dimensional environment 1320, the amount of space that respective user interface occupies in the user's field of view correspondingly decreases. Conversely, in some embodiments, as the respective user interface in the three-dimensional environment 1320 moves closer to the user's viewpoint of the three-dimensional environment 1320, the amount of space that respective user interface occupies in the user's field of view correspondingly increases. For example, in FIG. 13C, the user interface 1304 has moved further away from the user's viewpoint of the three-dimensional environment 1320 than in FIG. 13B. As a result, the user interface 1304 is occupying a smaller amount of space in the user's field of view as compared to when the user interface was at the location in the three-dimensional environment 1320 indicated in FIG. 13B. It should be understood that in some embodiments as the user interface 1310 is moving to the location in the three-dimensional environment 1320 indicated in FIG. 13C, the amount of space that the user interface 1304 occupies in the user's field of view continuously decreases because the user interface 1304 is moving further away from the user's viewpoint of the three-dimensional environment 1320.

As also illustrated in FIG. 13C, the electronic device 101 is displaying the visual indication 1334. In some embodiments, the electronic device 101 does not display the visual indication 1334 until the electronic device 101 detects movement of the user interface from the location in the three-dimensional environment 1320 at which the user interface 1302 was selected for movement (e.g., movement from the location of user interface 1302 in FIG. 13B). As shown in FIG. 13C, the visual indication 1334 has a size in the three-dimensional environment 1320 that is larger than its associated user interface—user interface 1304. The visual indication 1334 optionally has a size larger than user interface 1304 in the three-dimensional environment 1320 because the visual indication is indicating the size to which the electronic device 101 will scale user interface 1304 when movement of user interface 1304 is complete (e.g., to ensure the content of user interface 1304 continues to be interactable at its current location in the three-dimensional environment 1320). In some embodiments, the size of the visual indication 1334 is based on a distance between the user interface 1304 and the position of the user's current viewpoint in the three-dimensional environment 1320 (e.g., user interface 1304 will be displayed at a larger size as the user interface 1304 moves further from the viewpoint of the user and will be displayed at a smaller size as the user interface 1304 moves closer to the viewpoint of the user, and indication 1334 is an outline that indicates the size to which user interface 1304 will be scaled by device 101 upon completion of the movement input directed to user interface 1304).

In some embodiments, as the user interface 1304 is moving from the location in the three-dimensional environment 1320 indicated in FIG. 13B to the location in the three-dimensional environment 1320 indicated in FIG. 13C, the visual indication 1334 moves with the user interface 1304 to continuously indicate the size at which the electronic device 101 will display user interface 1304 upon completion of the movement input in order for the content of user interface 1304 to be interactable at its current location in the three-dimensional environment 1320. Thus, in some embodiments, as the user interface 1304 is (e.g., dynamically) moving from the location in the three-dimensional environment 1320 indicated in FIG. 13B to the location in the three-dimensional environment 1320 indicated in FIG. 13C, the size of the visual indication 1334 optionally continuously increases—while the amount of space the user interface 1304 is occupying in the user's field of view is continuously decreasing—because the user interface 1304 is moving further from the user's viewpoint of the three-dimensional environment 1320. In some embodiments, the electronic device 101 updates the user interface 1304 to have a size indicated by visual indication 1334 when the electronic device 101 is no longer detecting movement of the user interface 1304 in the three-dimensional environment 1320 (while optionally still being selected for movement in the three-dimensional environment 1320).

Additionally, as shown in FIG. 13C, the user interface 1308 has moved from the location in the three-dimensional environment 1320 indicated in FIG. 13B to the location in the three-dimensional environment 1320 indicated in FIG. 13C. In some embodiments, the user interface 1308 moved from the location indicated in FIG. 13B to the location indicated in FIG. 13C because after selecting the user interface 1308 as described in FIG. 13B, the electronic device 101 detected that the user's hand 1318 moved to a corresponding location in the physical environment 1352 of the electronic device 101. As shown in FIG. 13C, the electronic device 101 is deemphasizing portions (e.g., modifying the transparency of multiple portions) of the user interface 1308 based on the distance between the user's gaze 1330 and the portions of the user interface 1308. In some embodiments, the electronic device 101 did not modify the transparency of the user interface 1308 until the electronic device 101 detected movement of the user interface from the location in the three-dimensional environment 1320 at which the user interface 1302 was selected for movement in the three-dimensional environment 1320 (e.g., the location of user interface 1308 in FIG. 13B).

In some embodiments, portions of the user interface 1308 that are closer to the user's current gaze location 1330 are less transparent than the portions that are further from the user's current gaze location 1330. For example, as illustrated in FIG. 13C, a top left portion of the user interface 1308 is less transparent than a lower right portion of the user interface 1308. In some embodiments, the electronic device 101 does not modify the transparency of portions of the user interface 1308 that are at or within the threshold distance of the user's current gaze location 1330 but rather modifies the transparencies of portions of the user interface 1308 that are further than the threshold distance from the user's current gaze location 1330. For example, in FIG. 13C, the portions of the user interface 1308 that are at or within the above mentioned threshold distance and the portions of the user interface 1308 that are outside the above mentioned threshold distance is illustrated by indication 1316 (which is optionally not displayed in the three-dimensional environment 1320), and have changed relative to FIG. 13B due to the movement of user interface 1308. In the example of FIG. 13C, the electronic device 101 has not modified the transparency of portions of the user interface 1308 that are within the above mentioned threshold distance—indicated by indication 1316—as compared to FIG. 13B, but has increased the transparency of portions of the user interface 1308 that are not within the above threshold distance indicated by indication 1316. In some embodiments, as the user interface 1308 is (e.g., dynamically) moving from the location in the three-dimensional environment 1320 indicated in FIG. 13B to the location in the three-dimensional environment 1320 in FIG. 13C, the electronic device 101 optionally continuously modifies the transparency of the portions of the user interface based on the distance between the current location of the user interface 1308 with respect to the user's gaze location 1330 and/or their locations within or outside of indication 1316.

Additionally, as shown in FIG. 13C, the user interface 1306 has moved from the location in the three-dimensional environment 1320 indicated in FIG. 13B to the location in the three-dimensional environment 1320 indicated in FIG. 13C. In some embodiments, the user interface 1306 moved from the location indicated in FIG. 13B to the location indicated in FIG. 13C because after selecting the user interface 1306 as described in FIG. 13B, the electronic device 101 detected that the user's hand 1318 moved to a corresponding location in the physical environment 1352 of the electronic device 101.

In some embodiments, as a respective user interface is being moved in the three-dimensional environment 1320 (e.g., further from or closer to the viewpoint of the user), the size of the respective user interface objects in the three-dimensional environment 1320 does not change. Accordingly, in some embodiments, as the respective user interface in the three-dimensional environment 1320 moves further away from the user's viewpoint in the three-dimensional environment 1320, the amount of space that respective user interface occupies in the user's field of view correspondingly decreases. Conversely, in some embodiments, as the respective user interface in the three-dimensional environment 1320 moves closer to the user's viewpoint of the three-dimensional environment 1320, the amount of space that respective user interface occupies in the user's field of view correspondingly increases. For example, in FIG. 13C, the user interface 1306 has moved further away from the user's viewpoint of the three-dimensional environment 1320 than in FIG. 13B. As a result, the user interface 1306 is occupying a smaller amount of space in the user's field of view as compared to when the user interface was at the location in the three-dimensional environment 1320 indicated in FIG. 13B. It should understood that in some embodiments, as the user interface 1306 is (e.g., dynamically) moving to the location in the three-dimensional environment 1320 indicated in FIG. 13C, the amount of space that the user interface 1306 occupies in the user's field of view continuously decreases because the user interface 1306 is moving further away from the user's viewpoint of the three-dimensional environment 1320.

In some embodiments, when the electronic device 101 detects that the user interface 1306 is no longer being moved in the three-dimensional environment 1320, the electronic device 101 updates the size of the user interface 1306 to a size based on the distance of user interface 1306 from the viewpoint of the user (e.g., to a size that ensures continued interactability with user interface 1306 at its current distance). For example, in FIG. 13D, the electronic device 101 has detected that the user interface 1306 is no longer being moved in the three-dimensional environment 1320. As a result, the electronic device 101 increases the size of the user interface 1306 in the three-dimensional environment 1320. In some embodiments, the electronic device 101 detects that the user interface 1306 is no longer being moved in the three-dimensional environment 1320 if the user interface 1306 has moved less than a threshold amount (e.g., 0, 0.5, 1, 3, 5, 10, 20, 40, 60, or 200 centimeters) during a respective amount of time (e.g., 0.1, 0.2, 2, 3, 4, 5, or 10 seconds). In some embodiments, the amount of time to which the movement of the user interface 1306 is compared is based on the speed at which the user interface 1306 moved from the location indicated in FIG. 13C to the location indicated in FIG. 13D (e.g., faster movement speeds of user interface 1306 require the user interface 1306 to move less than the above-mentioned threshold amount for a longer amount of time than compared to slower movement speeds of user interface 1306). In some embodiments, the electronic device 101 increases the size of the user interface 1306 to the size indicated in FIG. 13D because this size allows the content of user interface 1306 to be interactable at its current location in the three-dimensional environment 1320.

Figure 13D:
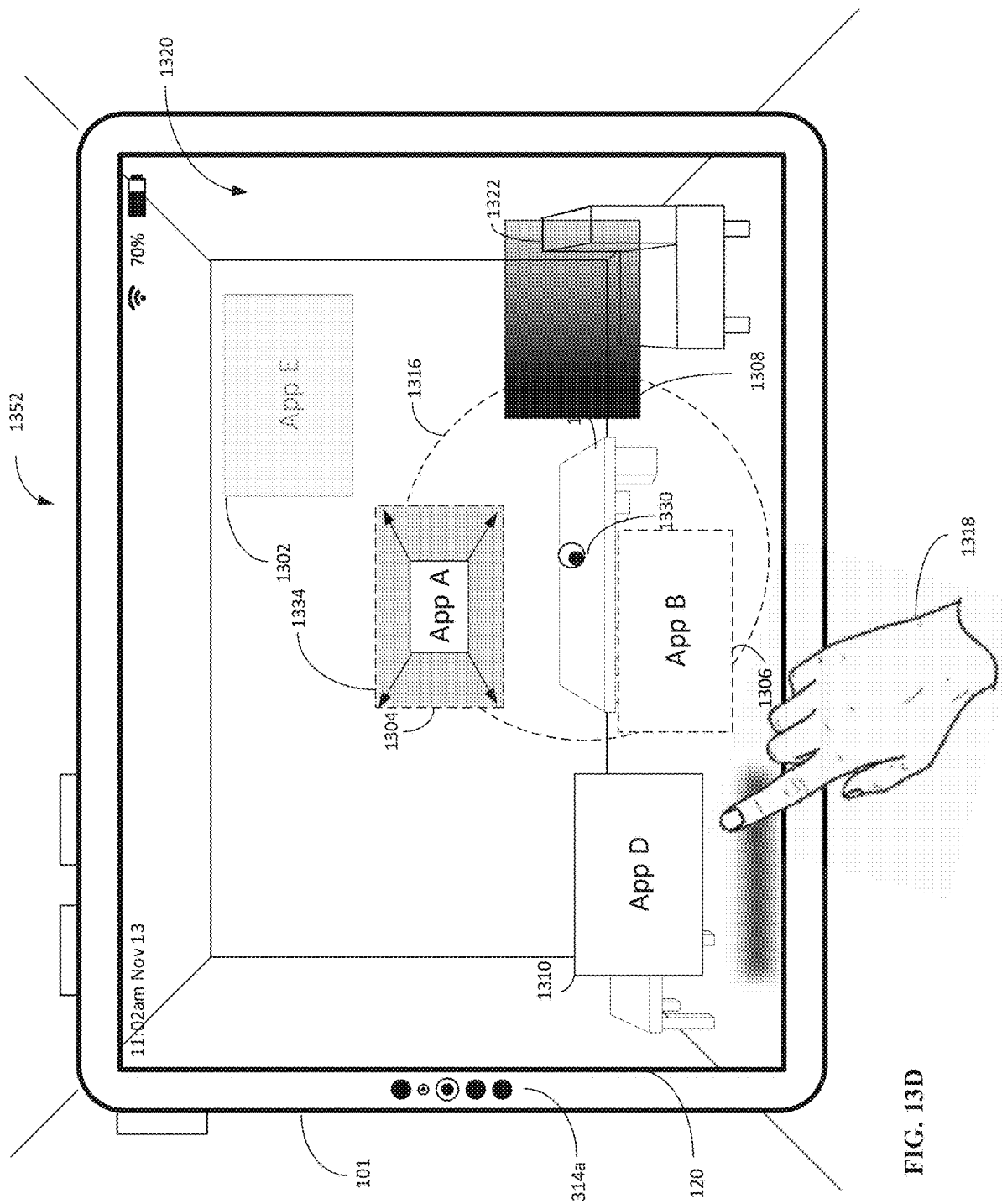
Figure 14A:
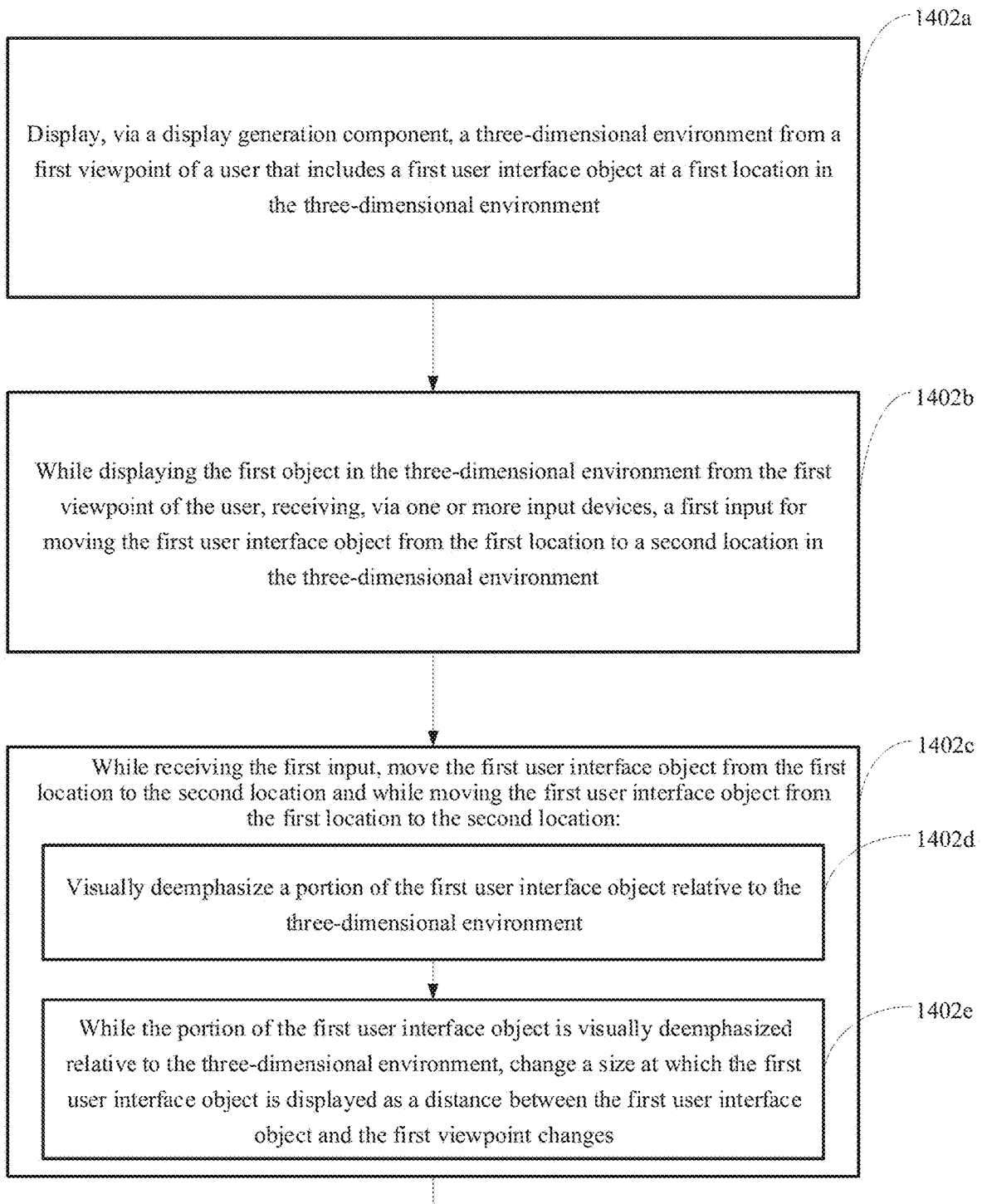
FIGS. 14A-14G is a flowchart illustrating a method of moving objects in a three-dimensional environment in accordance with some embodiments.
Figure 14B:
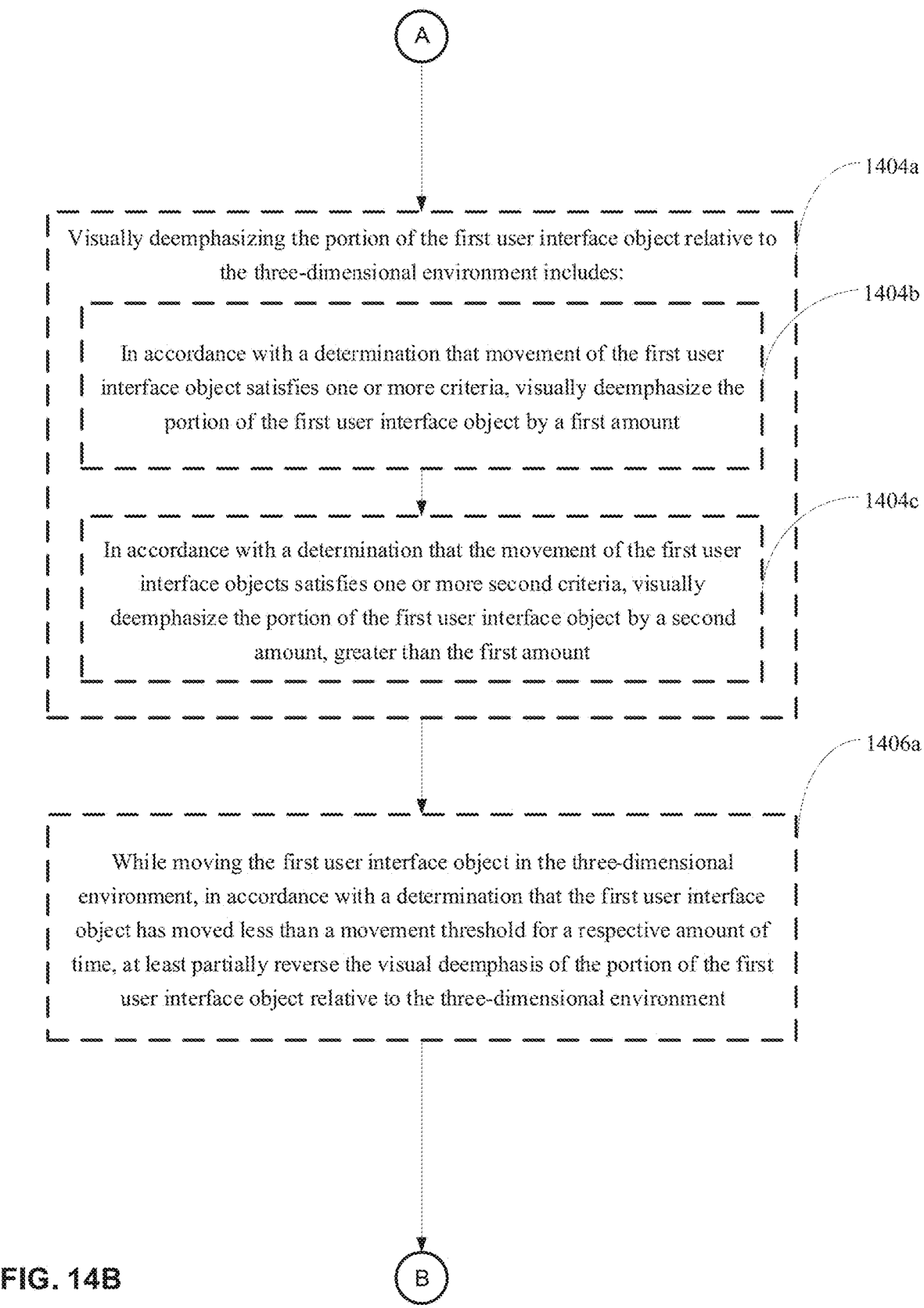
Figure 14C:
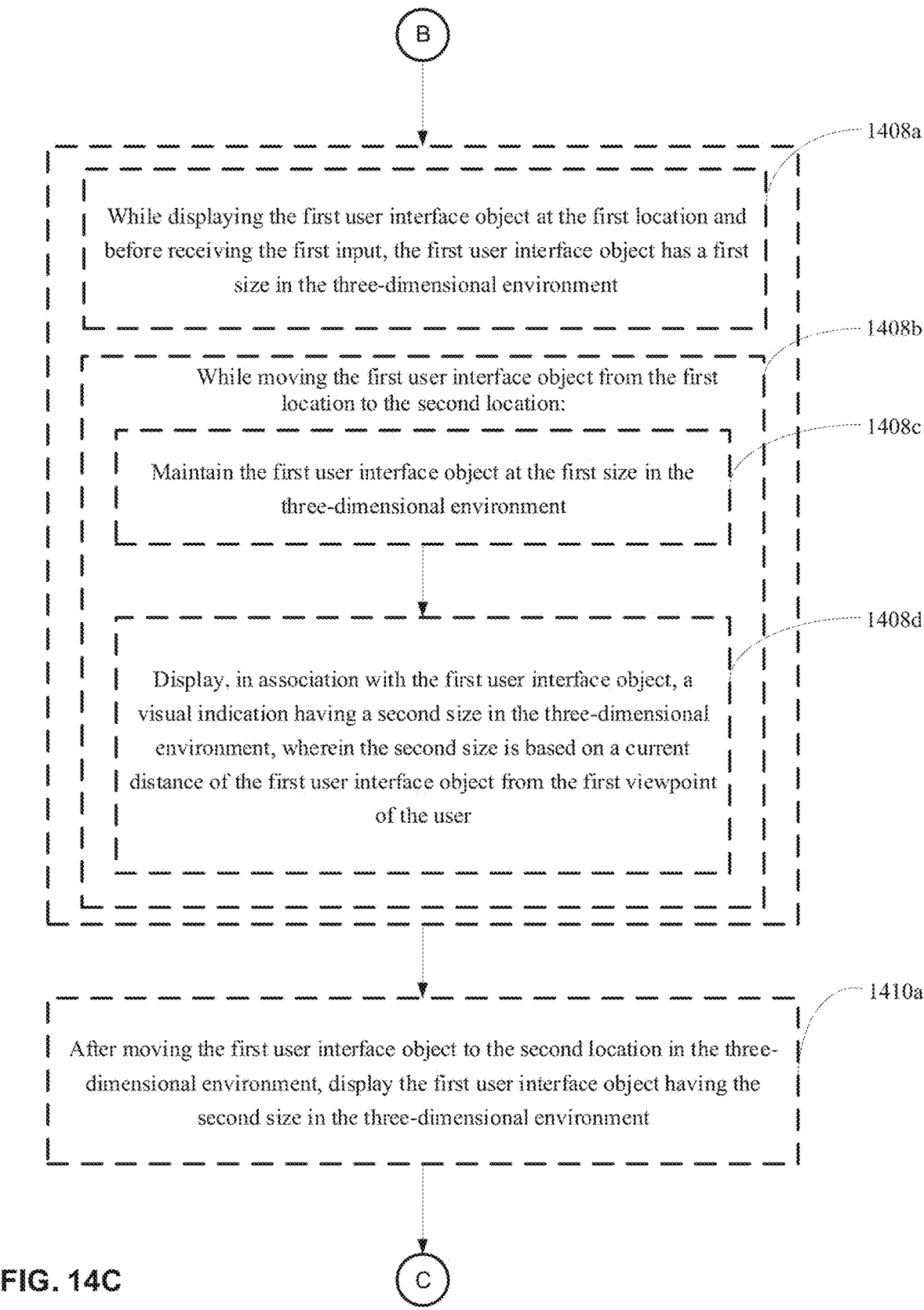
Figure 14D:
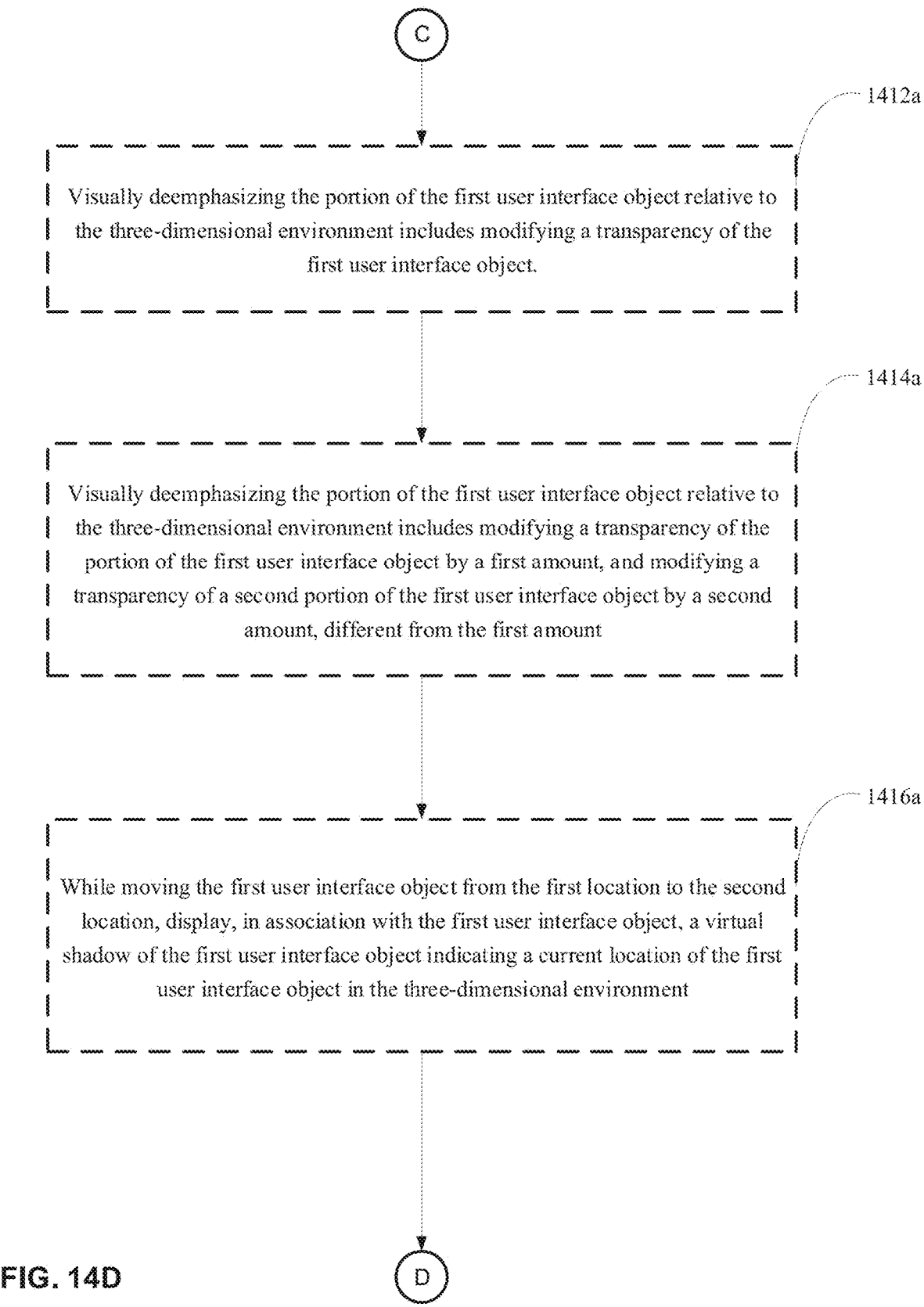
Figure 14E:
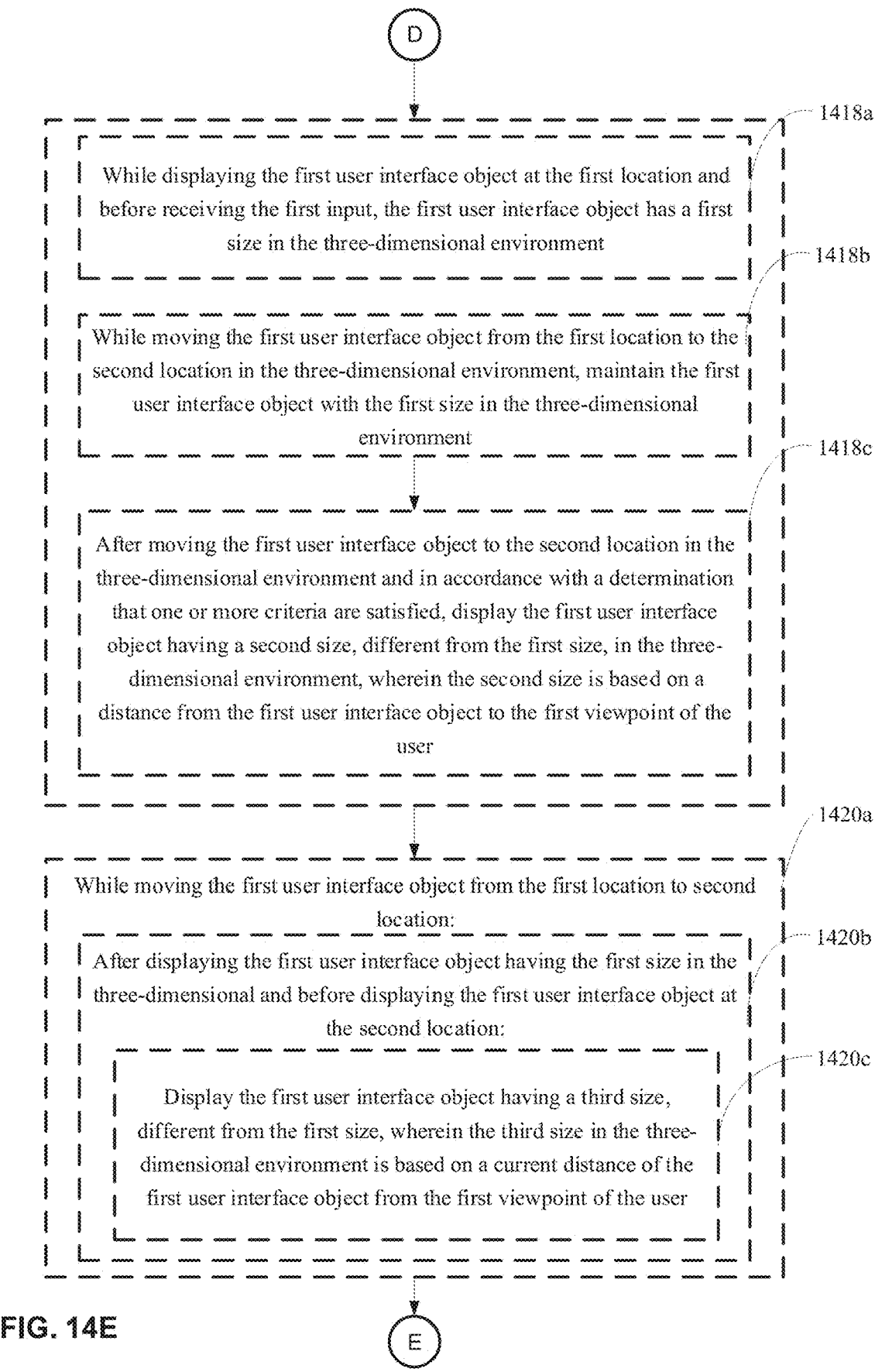
Figure 14F:
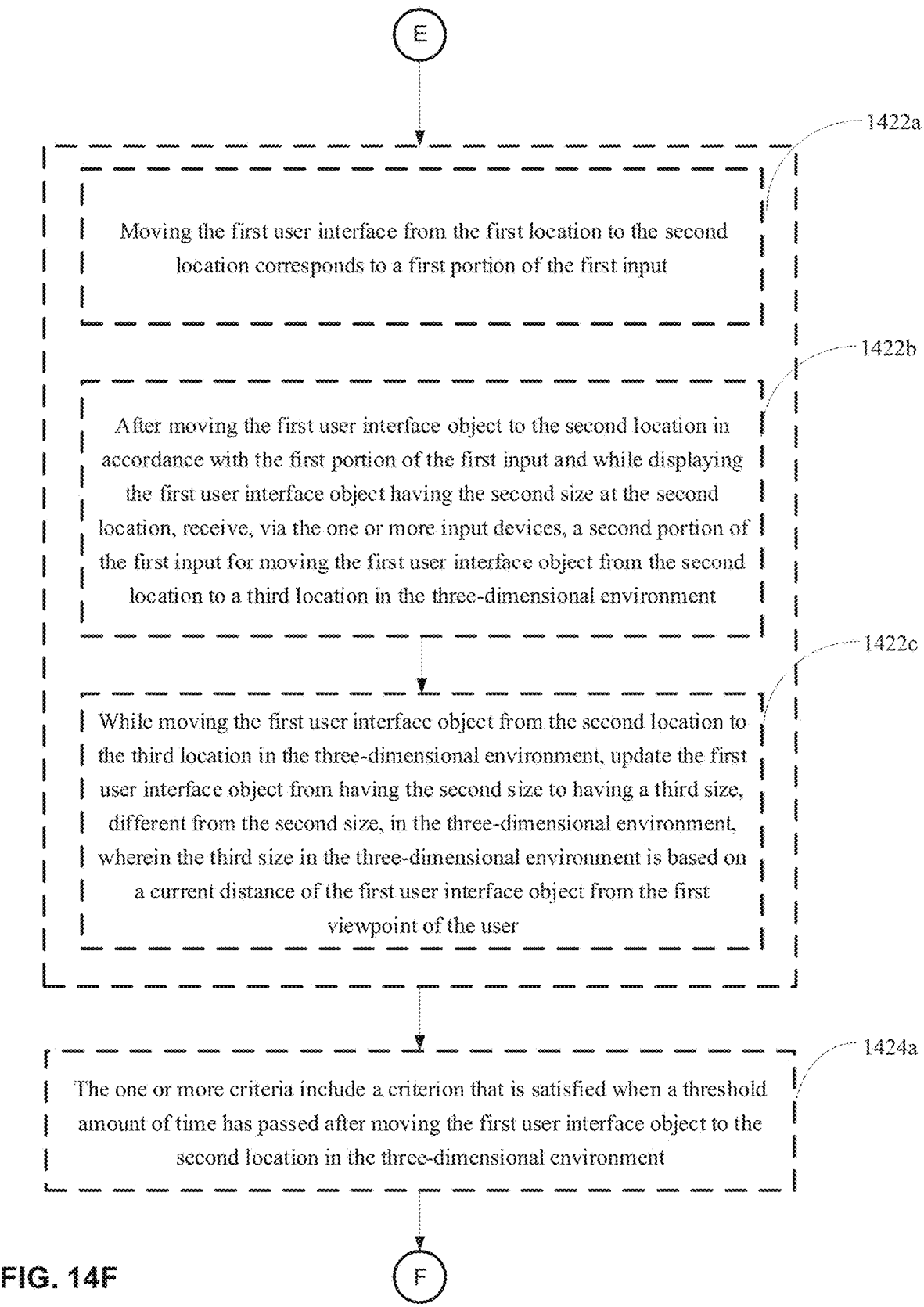
Figure 14G:
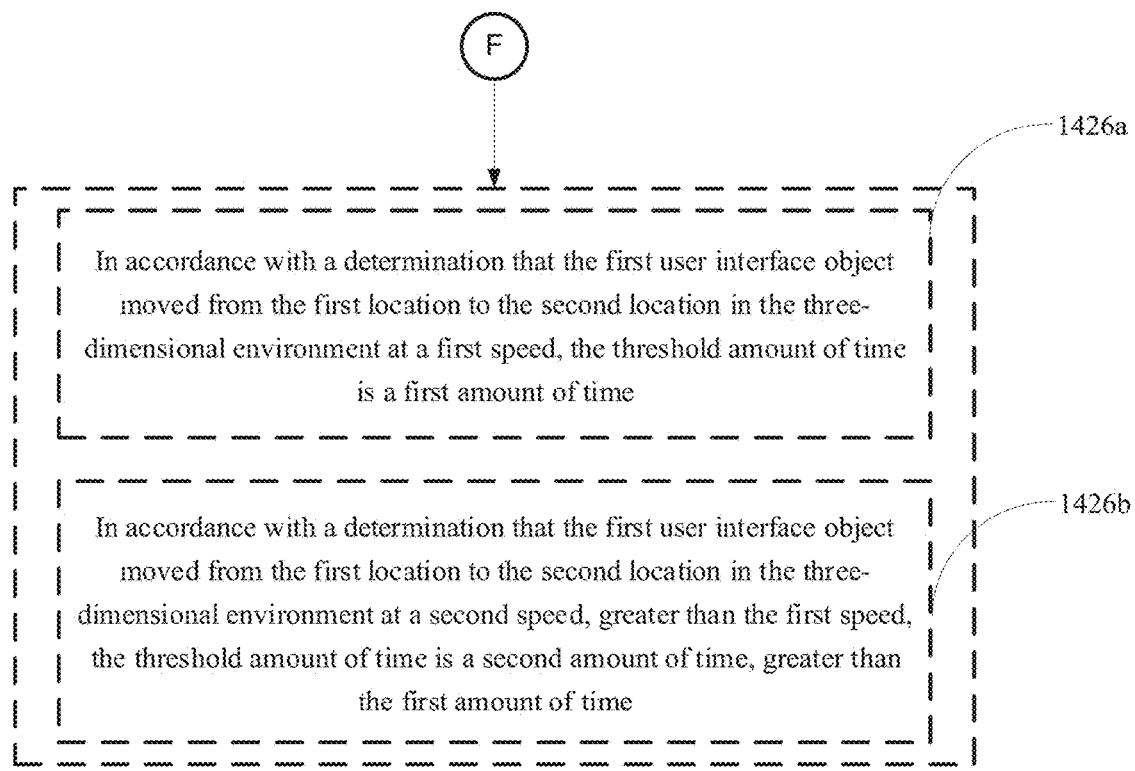

Additionally, as shown in FIG. 13D, user interfaces 1302, 1308, and 1310 have moved from the locations indicated in FIG. 13C to the locations indicated in FIG. 13D. In some embodiments, the user interfaces 1302, 1306, 1308, and 1310 moved to the locations indicated in FIG. 13D because the electronic device 101 detected that the user's hand 1318 moved to a corresponding location in the physical environment 1352 of the electronic device 101 after having caused the user interfaces 1302, 1306, 1308, and 1310 to move to the locations indicated in FIG. 13C, as previously described. Additionally, as shown in FIG. 13D, as a result of the movement of the user interfaces 1302, 1306, 1308, and 1310, the electronic device 101 updated these user interfaces (and associated user interface elements) in analogous ways to when these user interfaces moved from the locations in the three-dimensional environment 1320 indicated in FIG. 13B to the locations in the three-dimensional environment indicated in FIG. 13C.

Additional or alternative details regarding the embodiments illustrated in FIGS. 13A-13D are provided below in description of method 1400 described with reference to FIGS. 14A-14G.

FIGS. 14A-14G is a flowchart illustrating a method 1400 of moving objects in a three-dimensional environment in accordance with some embodiments. In some embodiments, the method 1400 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1400 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1400 are, optionally, combined and/or the order of some operations is, optionally, changed.

In some embodiments, method 1400 is performed at an electronic device (e.g., 101) in communication with a display generation component (e.g., 120) and one or more input devices (e.g., 314). For example, a mobile device (e.g., a tablet, a smartphone, a media player, or a wearable device), or a computer. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc. In some embodiments, the electronic device is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, the electronic device displays (1402a), via the display generation component, a three-dimensional environment (e.g., three-dimensional environment 1320) (e.g., the three-dimensional environment is a computer-generated reality (XR) environment, such as a virtual reality (VR) environment, a mixed reality (MR) environment, or an augmented reality (AR) environment, etc.) from a first viewpoint of a user that includes a first user interface object at a first location in the three-dimensional environment. In some embodiments, the first object is a virtual object, such as an application window, operating system element, content item, etc. In some embodiments, the three-dimensional environment additionally includes representations of physical objects in an environment where the electronic device is physically located. In some embodiments, the electronic device is displaying the three-dimensional environment from the first respective viewpoint because the electronic device is at a location and/or orientation in the physical environment that corresponds to the first respective viewpoint. In some embodiments, when the viewpoint of the user corresponds to the first respective viewpoint, the first object is located within the user's field of view.

In some embodiments, while displaying the first object in the three-dimensional environment from the first viewpoint of the user (e.g., in some embodiments, while the electronic device is displaying the first object in the three-dimensional environment from the first viewpoint of the user, the electronic device displays the first object with a first visual appearance. In some embodiments, the first visual appearance corresponds to a default visual appearance of the first object. In some embodiments, when the first object is being displayed with the first visual appearance, the first object is fully (or partially) opaque. In some embodiments, the first object is displayed with a first visual appearance because the first object has not been selected by the user of the electronic device (e.g., the application state corresponds to an unselected state). In some embodiments, the first object is displayed with the first visual appearance because the user of the electronic is not currently interacting with the first object.), the electronic device receives (1402*b*), via the one or more input devices, a first input for moving the first user interface object from the first location to a second location in the three-dimensional environment, such as the input for moving user interface 1302 from the location in the three-dimensional environment 1320 indicated in FIG. 13B to the location in the three-dimensional environment 1320 indicated in FIG. 13C. In some embodiments, the first input and/or one or more inputs described with reference to method 1400 are air gesture inputs, such as described with reference to method 800. In some embodiments, the electronic device receives the first input when the user of the electronic device performs a pinching gesture using the index finger and thumb of a hand of the user while the user's gaze is directed towards the first object (e.g., if the electronic device is a head mounted device), followed by movement of the hand of the user while maintaining the pinch hand shape. In some embodiments, the first input is received when the electronic device detects that a hand of the user is moving the first object via a dragging/movement gesture on a touch screen of the electronic device (e.g., if the display generation component associated with the electronic device is a touch screen). In some embodiments, the first input for moving the first object has one or more of the characteristics of the input for moving the one or more objects described with reference to method 1000.

In some embodiments, while receiving the first input, the electronic device moves (1402*c*) the first user interface object from the first location to the second location and while moving the first user interface object from the first location to the second location, the electronic device visually deemphasizes (1402*d*) a portion of the first user interface object relative to the three-dimensional environment. For example, during movement of the user interface 1302 from the location indicated in FIG. 13B to the location indicated in FIG. 13C, the electronic device 101 increases the transparency of user interface 1302 compared to when the user interface 1302 was not being moved in the three-dimensional environment 1320. In some embodiments, the size of first object does not change during the movement of the first object. In some embodiments, the portion of the first user interface object that is visually deemphasized corresponds to 5%, 10%, 20%, 40%, 60%, 90%, or 100% of the total size of the first user interface object. In some embodiments, visually deemphasizing the portion of the first user interface object includes lowering the brightness of the portion of the first user interface object by 5%, 7%, 9%, 11%, 13%, or 20%. In some embodiments, visually deemphasizing the portion of the first user interface object by includes increasing the transparency of the portion of the first user interface object by 5%, 7%, 9%, 11%, 13%, or 20%. In some embodiments, visually deemphasizing the portion of the first user interface object includes reducing the occlusion of the portion of the first user interface object by 5%, 7%, 9%, 11%, 13%, or 20%.

In some embodiments, while the portion of the first user interface object is visually deemphasized relative to the three-dimensional environment, the electronic device changes (1402*e*) a size at which the first user interface object is displayed as a distance between the first user interface object and the first viewpoint changes. For example, in FIG. 13C, the amount of space user interface 1302 occupies in the field of view of the user decreases as the user interface 1302 moves further from the user's viewpoint of the three-dimensional environment 1320. Conversely, in FIG. 13C, the amount of space the user interface 1302 occupies in the field of view of the user increases as the user interface 1302 moves closer to the user's viewpoint of the three-dimensional environment 1320. In some embodiments, while moving the first user interface object from the first location to the second location, the size of the first user interface object in the three-dimensional environment does not change but rather the angular size of the object changes (e.g., the amount of space the first user interface object occupies in the user's field of view). For example, as the first user interface object moves further away from the viewpoint of the user (e.g., if the second location is further from the viewpoint of the user than the first location), the angular size of the first user interface object optionally decreases such that the first user interface object occupies less space in the user's field of view (but with the size of the first user interface object in the three-dimensional environment remaining the same). Conversely, if first user interface object moves closer to the viewpoint of the user (e.g., if the second location is closer to the viewpoint of the user than the first location), the angular size of the first user interface object optionally increases such that the first user interface object occupies more space in the user's field of view (but with the size of the first user interface object in the three-dimensional environment remaining the same). Visually deemphasizing at least a portion of an object when moving the object in the three-dimensional environment reduces potential disorientation that can lead to vertigo or motion sickness symptoms, thus providing a mechanism via which the user is able to safely interact with a three-dimensional environment, thereby reducing cognitive burden on the user when interacting with the three-dimensional environment.

In some embodiments, visually deemphasizing the portion of the first user interface object relative to the three-dimensional environment includes (1404*a*), in accordance with a determination that movement of the first user interface object satisfies one or more criteria (e.g., in some embodiments, the movement of the first user interface object satisfies the one or more criteria when the first user interface object has moved, in the three-dimensional environment, less than a first threshold amount of movement (e.g., less than 1, 2, 5, 10, 20, 40, or 60 centimeters). In some embodiments, the movement of the first user interface object satisfies the one or more criteria when the first user interface object is being moved at or below a first speed threshold (e.g., 1.1, 1.9, 2.1, 5, 5.5 10, 20, 40, or 60 centimeters per second). In some embodiments, the movement of the first user interface object satisfies the one or more criteria when the first user interface object is accelerating at or below a first acceleration threshold (e.g., 1.1, 1.9, 2.1, 5, 5.5 10, 20, 40, 60 centimeters per second.), visually deemphasizing the portion of the first user interface object by a first amount (1404*b*). For example, if the movement of the user interface 1302 satisfies the one or more criteria, the electronic device 101 modifies the transparency of user interface 1302 by the first amount. For example, the portion of the first user interface is visually de-emphasized by the first amount because the amount of movement and/or the speed at which the first user interface object is moving satisfies the one or more criteria. In some embodiments, visually deemphasizing the portion of the first user interface object by the first amount includes lowering the brightness of the portion of the first user interface object by 5%, 7%, 9%, 11%, 13%, or 20%. In some embodiments, visually deemphasizing the portion of the first user interface object by the first amount includes increasing the transparency of the portion of the first user interface object by 5%, 7%, 9%, 11%, 13%, or 20%. In some embodiments, visually deemphasizing the portion of the first user interface object by the first amount includes reducing the occlusion of the portion of the first user interface object by 5%, 7%, 9%, 11%, 13%, or 20%.

In some embodiments, in accordance with a determination that the movement of the first user interface objects satisfies one or more second criteria (e.g., in some embodiments, the movement of the first user interface object satisfies the one or more second criteria when the first user interface object has moved, in the three-dimensional environment, more than the first threshold amount of movement (e.g., more than 1, 2, 5, 10, 20, 40, or 60 centimeters) but optionally less than a second threshold amount of movement (e.g., less than 1.9, 2.5, 5.5, 10, 15, 30, or 70 centimeters). In some embodiments, the movement of the first user interface object satisfies the one or more second criteria when the first user interface object is moving at a speed greater than the first speed threshold (e.g., greater than 1.1, 1.9, 2.1, 5, 5.5 10, 20, 40, or 60 centimeters per second) but optionally less than a second speed threshold (e.g., 1.9, 2.5, 3.1, 7, 9.5 13, 25, 45, or 70 centimeters per second). In some embodiments, the movement of the first user interface object satisfies the one or more second criteria when the first user interface object is accelerating above a first acceleration threshold (e.g., 1.1, 1.9, 2.1, 5, 5.5 10, 20, 40, or 60 centimeters per second.), the electronic device visually deemphasizes the portion of the first user interface object by a second amount, greater than the first amount (1404*c*). For example, if the movement of the user interface 1302 satisfies the one or more second, the electronic device 101 modifies the transparency of user interface 1302 by the second amount. For example, the portion of the first user interface object is visually de-emphasized more when the (e.g., speed of and/or amount of and/or acceleration of) movement of the first user interface object satisfies the one or more second criteria. For example, if the movement of the first user interface object satisfies the one or more second criteria, the brightness portion of the first user interface object is optionally reduced further (e.g., by 10%, 20%, 30%, 40%, or 50%) than when the movement of the first user interface object satisfies the one or more criteria (and not the one or second criteria). In some embodiments, if the movement of the first user interface object satisfies the one or more second criteria, the transparency of the portion of the first user interface object is optionally increased further (e.g., by 10%, 20%, 30%, 40%, or 50%) than when the movement of the first user interface object satisfies the one or more criteria (and not the one or second criteria). In some embodiments, if the movement of the first user interface object satisfies the one or more second criteria, the occlusion of the portion of the first user interface object is reduced further (e.g., by 10%, 20%, 30%, 40%, or 50%) than when the movement of the first user interface object satisfies the one or more criteria (and not the one or second criteria).

Visually deemphasizing the portion of the first user interface object by different amounts based on one or more criteria associated with the movement of the first user interface object in the three-dimensional environment provides an efficient way for moving objects in the three-dimensional environment and reduces potential disorientation that can lead to vertigo or motion sickness symptoms, thus providing a mechanism via which the user is able to safely interact with a three-dimensional environment, thereby reducing cognitive burden on the user when interacting with the three-dimensional environment.

In some embodiments, while moving the first user interface object in the three-dimensional environment (e.g., from the first location in the three-dimensional environment to the second location in the three-dimensional environment), in accordance with a determination that the first user interface object has moved less than a movement threshold (e.g., 10, 20, 40, 60, 80, or 200 centimeters) for a respective amount of time (e.g., 0.5, 1, 2, 4, 10, or 20 seconds), the electronic device at least partially reverses (1406*a*) the visual deemphasis of the portion of the first user interface object relative to the three-dimensional environment. For example, after moving the user interface 1302 to the location indicated in FIG. 13C, the electronic device 101 optionally displays the user interface with the visual appearance of user interface 1302 illustrated in FIG. 13A when the object has moved less than the above threshold amount during the above-mentioned respective amount of time. For example, if first user interface object has not moved more than a threshold amount (e.g., 5, 10, 20, 30, or 40 centimeters) during a respective amount of time (e.g., 1, 2, 4, or 10 seconds), the portion of the first user interface is deemphasized by a lesser amount as compared to when the first user interface object moves more than the threshold amount during the respective amount of time. In some embodiments, the visual deemphasis of the portion of the first user interface object remains at least partially reversed until the first user interface object moves more than the above-described threshold amount of movement during the above-described respective amount of time. In some embodiments, at least partially reversing the visual deemphasis of the portion of the first user interface object includes increasing the brightness, reducing the transparency, increasing the occlusion, etc. of the portion of the first user interface object as compared to when the first user interface object is moving more than the threshold amount during the respective amount of time. For example, if the portion had been visually deemphasized by a first amount while moving the first user interface object in the three-dimensional environment, the portion of the first user interface object is visually deemphasized by a smaller amount than the first amount after the first user interface has moved less than the above-described threshold amount of movement during the above-described respective amount of time. In some embodiments, the visual deemphasis of the portion of the first user interface object is reversed by different amounts based on whether the first user interface object is still selected by the first input or if the first user interface object is no longer selected by the first input. In some embodiments, the visual deemphasis of the portion of the first user interface object further reverses the longer the first user interface object has not moved more than the threshold amount of movement, described above. In some embodiments, at least partially reversing the deemphasis includes fully reverting to the emphasis that the first user interface object had before being moved by the first input.

Reducing the visual deemphasis of the portion of the user interface object when movement of the first user interface object does not satisfy movement criteria provides an efficient way of reversing portions of the first user interface object that were previously deemphasized, thus providing a mechanism which allows the user to efficiently interact with the three-dimensional environment after moving the first user interface object in the three-dimensional environment, thereby reducing cognitive burden on the user when interacting with the three-dimensional environment.

In some embodiments, while displaying the first user interface object at the first location and before receiving the first input, the first user interface object has a first size in the three-dimensional environment (1408*a*) (e.g., the first size of the first user interface object corresponds to the actual size of the first user interface object in the three-dimensional environment). In some embodiments, while moving the first user interface object from the first location to the second location (1408*b*), the electronic device maintains (1408*c*) the first user interface object at the first size in the three-dimensional environment. For example, the first user interface object continues to have the same size in the three-dimensional environment as the first user interface object is moving from the first location to the second location. Thus, the first user interface continues to have the same (e.g., virtual) size regardless of the movement of the first user interface object in the three-dimensional environment. However, the amount of space the first user interface object occupies in the user's field of view may change as the first user interface object moves in the three-dimensional environment (e.g., the angular size (e.g., apparent size) of the first user interface). For example, as the first user interface object moves further away from the viewpoint of the user, the angular size of the first user interface object optionally decreases such that the first user interface object occupies less space in the user's field of view. Conversely, if the first user interface object moves closer to the viewpoint of the user, the angular size of the first user interface object optionally increases such that the first user interface object occupies more space in the user's field of view. In some embodiments, the electronic device displays (1408*d*), in association with the first user interface object, a visual indication having a second size (e.g., associated with the first user interface object) in the three-dimensional environment, wherein the second size is based on a current distance of the first user interface object from the first viewpoint of the user, such as visual indication 1334. For example, as the first user interface object is moving from the first location in the three-dimensional environment to the second location in the three-dimensional environment, an outline (e.g., the visual indication) is displayed in association with (e.g., surrounding) the first user interface object. In some embodiments, the second size indicates a target angular size of the first user interface object based on the current location of the first user interface object in the three-dimensional environment and/or the current distance of the first user interface object from the viewpoint of the user. In some embodiments, the target angular size allows the first user interface object to be interactable with respect to the user's current viewpoint of the three-dimensional environment. Thus, if the first user interface object is moving away from the user's viewpoint of the three-dimensional environment, the visual indication optionally has a size larger than the first user interface object to indicate the amount of space in the user's field of view that the first user interface object will occupy when the first input is no longer selecting or moving the first user interface object. Conversely, if the first user interface object is moving closer to the user's viewpoint of the three-dimensional environment, the visual indication optionally has a size smaller than the first user interface object to indicate the amount of space in the user's field of view that the first user interface object will occupy when the first input no longer selecting or moving the first user interface object. In some embodiments, the size of the visual indication is a function of the first user interface object's distance relative to the viewpoint of the user of the electronic device. For example, the size of the visual indication increases the further the first user interface object is from the viewpoint of the user. In some embodiments, the size of the visual indication decreases the closer the first user interface object is from the viewpoint of the user. In some embodiments, the visual indication moves along with the first user interface object as the first user interface object is moving from the first location to the second location. Thus, the visual indication optionally gets further from/closer to the viewpoint in the same manner as the first user interface object.

Displaying a visual indication in association with the first user interface object as the first user interface object is moving in the three-dimensional environment provides an efficient way of indicating the size the first user interface object will have after movement of the first user interface object to a desired location in the three-dimensional environment, thus providing a mechanism which allows the user to safely interact with the three-dimensional environment while moving the first user interface object and reduce potential disorientation that can lead to vertigo or motion sickness symptoms, thereby reducing cognitive burden on the user when interacting with the three-dimensional environment.

In some embodiments, after moving the first user interface object to the second location in the three-dimensional environment, the electronic device displays (1410*a*) the first user interface object having the second size in the three-dimensional environment. For example, the electronic device 101 resizes user interface 1304 to the size indicated by visual indication 1334 when the electronic device 101 detects the user interface 1304 is no longer being moved in the three-dimensional environment 1320. For example, after the first user interface object moves to the second location in the three-dimensional environment (e.g., an in response to detecting an end of the first input), the first user interface object is displayed with the size indicated by the visual indication. In some embodiments, the electronic device displays the first user interface object having the second size if the first user interface object is still selected by the first input and the first user interface object has not moved more than a threshold amount of movement (e.g., 10, 20, 40, 60, 80, or 200 centimeters) within a threshold amount of time (e.g., 0.5, 1, 2, 4, 10, or 20 seconds). Additionally, or alternatively, if the electronic device detects that the first input is no longer selecting the first user interface object, the first user interface object is optionally displayed having the second size in the three-dimensional environment. In some embodiments, the electronic device displays the first virtual object at the second (e.g., virtual) size because the second (e.g., virtual) size causes the electronic device to display the first virtual object at a target angular size for the current distance from the viewpoint of the user (e.g., causes the first user interface object to occupy a target amount of space in the user's field of view). In some embodiments, the electronic device displays the first user interface object at the second size because that size will cause the first user interface object (at the second location in the three-dimensional environment) to occupy the same or similar (e.g., within 1%, 5%, 10%, or 20%) amount of space in the user's field of view as compared to the when the first user interface object was displayed at the first location in the three-dimensional environment.

Displaying the first user interface object with the size indicated by the visual indication after moving the first user interface object to a desired location in the three-dimensional environment provides an efficient way for updating the size of the first user interface object after movement of that object (but not before), thus providing a mechanism which allows the user to efficiently interact with the three-dimensional environment, and reduce potential disorientation that can lead to vertigo or motion sickness symptoms, thereby reducing cognitive burden on the user when interacting with the three-dimensional environment.

In some embodiments, visually deemphasizing the portion of the first user interface object relative to the three-dimensional environment includes modifying a transparency of the first user interface object (1412a). For example, while the user interface 1302 is moving from the location indicated in FIG. 13B to the location indicated in FIG. 13C, the electronic device 101 modifies a transparency of user interface 1302. For example, while the first user interface object is moving in the three-dimensional environment, the transparency of the portion of the first user interface object that is being visually deemphasized increases (as compared to when the first user interface object was not selected and/or being moved by the first input). In some embodiments, the transparency of the portion of the first user interface object is uniform, such that multiple (or, optionally, all) portions of the first user interface object have an equivalent amount of transparency. In some embodiments, visually deemphasizing the portion of the first user interface object includes lowering the brightness of the portion of the first user interface object as compared to when the first user interface object was not selected and/or being moved by the first input. In some embodiments, visually deemphasizing the portion of the first user interface object includes reducing the occlusion of the portion of the first user interface object as compared to when the first user interface object was not selected and/or being moved by the first input.

Modifying the transparency of the portion of the first user interface object that is being visually deemphasized provides an efficient way for deemphasizing the first user interface object while moving the first user interface object in the three-dimensional environment and reduces potential disorientation that can lead to vertigo or motion sickness symptoms, thus providing a mechanism via which the user is able to safely interact with a three-dimensional environment, thereby reducing cognitive burden on the user when interacting with the three-dimensional environment.

In some embodiments, visually deemphasizing the portion of the first user interface object relative to the three-dimensional environment includes modifying a transparency of the portion of the first user interface object by a first amount, and modifying a transparency of a second portion of the first user interface object by a second amount, different from the first amount (1414a), such as user interface 1308 in FIG. 13C. For example, while the first user interface object is moving in the three-dimensional environment, multiple portions of the first user interface object are visually deemphasized. In some embodiments, the transparency of the portion and the transparency of the second portion of the first user interface are different. In some embodiments, if the portion of the first user interface object is at or closer to the center of the first user interface object than the second portion of the first user interface object, the portion of the first user interface object is optionally less transparent than the second portion of the first user interface object. Conversely, if the portion of the first user interface object is further from the center of the first user interface object than the second portion of the first user interface object, the portion of the first user interface object is optionally more transparent than the second portion of the first user interface object. In some embodiments, the amount of deemphasis applied to different portions of the first user interface object (e.g., the portion and the second portion) is based on a distance between those different portions to a location in the three-dimensional environment where the user is current gazing (e.g., the closer a respective portion of the first user interface object is to the current gaze location of the user, the less transparent the respective portion is, and the further the respective portion of the first user interface object is from the current gaze location of the user, the more transparent the respective portion is).

Modifying different portions of the first user interface object with different amounts of transparencies while moving the first user interface object to the three-dimensional environment provides an efficient way for deemphasizing the first user interface object while moving the first user interface object in the three-dimensional environment and reduces potential disorientation that can lead to vertigo or motion sickness symptoms, thus providing a mechanism via which the user is able to safely interact with a three-dimensional environment, thereby reducing cognitive burden on the user when interacting with the three-dimensional environment.

In some embodiments, while moving the first user interface object from the first location to the second location, the electronic device displays (1416a), in association with the first user interface object, a virtual shadow of the first user interface object (e.g., separate from the first user interface object) indicating a current location of the first user interface object in the three-dimensional environment, such as virtual shadow 1332. In some embodiments, the virtual shadow is not displayed until the first input selects the first user interface object. In some embodiments, the virtual shadow is not displayed until the first user interface object starts moving from the first location to the second location in the three-dimensional environment. In some embodiments, the virtual shadow is displayed below the first user interface object. In some embodiments, the shadow casts onto (e.g., overlays) one or more objects and/or surfaces that are below the first user interface object in the three-dimensional environment, such as a floor in the three-dimensional environment or representations of physical objects in the three-dimensional environment. In some embodiments, the virtual shadow indicates the current location (e.g., and/or current distance from the viewpoint of the user) of first user interface object in the three-dimensional environment. For example, if the first user interface object is currently hovering above a representation of a table in the three-dimensional environment, the virtual shadow is displayed on the representation of the table to indicate the current location of the first user interface object. In some embodiments, as the first user interface object is moving from the first location to the second location, the virtual shadow moves with the first user interface object to indicate the current location of the first user interface object in the three-dimensional environment.

Displaying a virtual shadow for the first user interface object provides an efficient way indicating the location of the first user interface object in the three-dimensional environment, and reduces potential disorientation that can lead to vertigo or motion sickness symptoms, thus providing a mechanism via which the user is able to safely interact with a three-dimensional environment, thereby reducing cognitive burden on the user when interacting with the three-dimensional environment.

In some embodiments, while displaying the first user interface object at the first location and before receiving the first input, the first user interface object has a first size in the three-dimensional environment (1418*a*) (e.g., the actual size of the first user interface object in the three-dimensional environment is the first size). In some embodiments, while moving the first user interface object from the first location to the second location in the three-dimensional environment, the electronic device maintains (1418*b*) the first user interface object with the first size in the three-dimensional environment, such as the (e.g., actual) size of user interface 1306 not changing as the user interface 1306 is moving from the location in FIG. 13B to the location in FIG. 13C. For example, as the first user interface object is moving from the first location to the second location the size of the first user interface object in the three-dimensional environment does not change. However, based on the direction of the movement in the three-dimensional environment (e.g., closer to the user's viewpoint or away from the user's viewpoint), the angular size of the first user interface object may change. For example, if the first user interface object moves closer to the user's viewpoint (e.g., the second location is closer to the user's viewpoint than the first location), the first user interface object optionally occupies more space in the user's field of view compared to the first user interface object at the first location (e.g., the angular size of the first user interface object changed). Conversely, if the first user interface object moves further from the user's viewpoint (e.g., the second location is further from the user's viewpoint than the first location), the first user interface object optionally occupies less space in the user's field of view compared to when the first user interface object is at the first location (e.g., the angular size of the first user interface object changed).

In some embodiments, after moving the first user interface object to the second location in the three-dimensional environment and in accordance with a determination that one or more criteria are satisfied (e.g., if the first user interface object has moved less than a threshold amount (e.g., 1, 5, 10, 15, 20, or 40 centimeters) after moving the first user interface object to the second location, if a threshold amount of time (e.g., 0, 0.5, 1, 3, 5, 10, or 20 seconds) has passed after moving the first user interface object to the second location in the three-dimensional environment, if the first user interface object is still selected by the first input, if the first user interface object is no longer selected by the first input, and/or any other suitable criteria), the electronic device displays (1418*c*) the first user interface object having a second size, different from the first size, in the three-dimensional environment, wherein the second size is based on a distance from the first user interface object (e.g., at the second location) to the first viewpoint of the user, such as the size of user interface 1306 in FIG. 13D. For example, after moving the first user interface object from the first location to the second location, the first user interface object is resized to the second size, but optionally not before the first user interface object reaches the second location in the three-dimensional environment. In some embodiments, the first user interface object is displayed at the second size because the second size causes the first user interface object to be displayed at a target angular size (e.g., causes the first user interface object to occupy a target amount of space in the user's field of view) based on the current distance of the first user interface object from the viewpoint of the user. In some embodiments, the first user interface object is displayed at the second size because the second size allows the first user interface object to be interactable at its current location in the three-dimensional environment and/or distance from the viewpoint of the user. Thus, if the first user interface object is moving away from the user's viewpoint of the three-dimensional environment, the various content of the first user interface object optionally have sizes that allow the user to continue to interact with the first user interface object even after moving the first user interface object away from the user's viewpoint in the three-dimensional environment (e.g., the portions of the first user interface object are not too small that the user would have to move closer to the first user interface object to interact with the first user interface object). Conversely, if the first user interface object is moving closer to the user's viewpoint of the three-dimensional environment, the various content of the first user interface object have sizes that allow the user to continue to interact with the first user interface object even after moving the first user interface object closer to the user's viewpoint in the three-dimensional environment (e.g., the portions of the first user interface object are not too large that the user would have to move away from the first user interface object to interact with the first user interface object). In some embodiments, the size of the first user interface object is a function of the first user interface object's location/distance relative to the viewpoint of the user of the electronic device. For example, the second size increases the further the first user interface object is from the viewpoint of the user. In some embodiments, the second size decreases the closer the first user interface object is to the viewpoint of the user. Displaying the first user interface object with the second size after moving the first user interface object to a desired location in the three-dimensional environment provides an efficient way for updating the size of the first user interface object after movement of that object, thus providing a mechanism which allows the user to safely interact with the three-dimensional environment while moving the first user interface object and reduce potential disorientation that can lead to vertigo or motion sickness symptoms, thereby reducing cognitive burden on the user when interacting with the three-dimensional environment.

In some embodiments, while moving the first user interface object from the first location to second location (1420*a*), after displaying the first user interface object having the first size in the three-dimensional and before displaying the first user interface object at the second location (1420*b*) (e.g., while the first user interface object has not yet been moved to the second location), the electronic device displays (1420*c*) the first user interface object having a third size, different from the first size, wherein the third size in the three-dimensional environment is based on a current distance of the first user interface object from the first viewpoint of the user. For example, the after moving the user interface 1306 from the location indicated in FIG. 13C and before moving the user interface 1306 to the location indicated in FIG. 1306, the electronic device 101 updates the user interface 1306 to a third size based on how close/far the user interface 1306 has moved from the user's viewpoint of the three-dimensional environment 1320. For example, while the first user interface object is moving in the three-dimensional environment but has not yet been moved to its final location in the three-dimensional environment, the size of the first user interface object changes. In some embodiments, the first user interface object is displayed at the third size because the third size causes the electronic device to be displayed at a target angular size (e.g., causes the first user interface object to occupy a target amount of space in the user's field of view) based on the current distance of the user interface object from the viewpoint of the user. In some embodiments, the first user interface object is displayed at the third size because the third size allows the first user interface object to be interactable at its current location in the three-dimensional environment and distance from the viewpoint of the user. In some embodiments, the third size of the first user interface object is a function of the first user interface object's location relative to the viewpoint of the user of the electronic device. For example, the third size increases the further the first user interface object is from the viewpoint of the user. In some embodiments, the third size decreases the closer the first user interface object is from the viewpoint of the user.

Updating the size of the first user interface object as the first user interface object is moving in the three-dimensional environment provides an efficient way for displaying the first user interface with a size corresponding to a target angular size while moving the first user interface object in the three-dimensional environment, thus providing a mechanism which allows the user to safely interact with the three-dimensional environment while moving the first user interface object and reduce potential disorientation that can lead to vertigo or motion sickness symptoms, thereby reducing cognitive burden on the user when interacting with the three-dimensional environment.

In some embodiments, moving the first user interface from the first location to the second location corresponds to a first portion of the first input (1422*a*). In some embodiments, after moving the first user interface object to the second location in accordance with the (e.g., speed, distance, duration, direction, etc. of) first portion of the first input and while displaying the first user interface object having the second size at the second location, the electronic device receives (1422*b*), via the one or more input devices, a second portion of the first input for moving the first user interface object from the second location to a third location in the three-dimensional environment. For example, after the electronic device updates the size of the first user interface object to have the second size at the second location in the three-dimensional environment, the first input further moves the first user interface object to the third location in the three-dimensional environment. In some embodiments, the electronic device detects the second portion of the first input after the first input maintains selection of the first user interface object after moving the first user interface object to the second location, and the second portion corresponds to additional movement of the first input being detected.

In some embodiments, while moving the first user interface object from the second location to the third location in the three-dimensional environment, the electronic device updates (1422*c*) the first user interface object from having the second size to having a third size, different from the second size, in the three-dimensional environment, wherein the third size in the three-dimensional environment is based on a current distance of the first user interface object from the first viewpoint of the user. For example, after updating the size of the first user interface object to have the second size in response to moving the first user interface object to the second location in the three-dimensional environment, further movement of the first user interface object (e.g., optionally with the same input) causes the size of the first user interface to be updated again. In some embodiments, the size of the first user interface object changes multiple times after the object is moved to the second location and before the object is moved to the third location. In some embodiments, the first user interface object is displayed at the third size because the third (e.g., virtual) size causes the first user interface object to be displayed at a target angular size (e.g., causes the first user interface object to occupy a target amount of space in the user's field of view) based on the current distance of the first user interface object to the viewpoint of the user. In some embodiments, the first user interface object is displayed at the third size because the third size allows the first user interface object to be interactable at its current location in the three-dimensional environment and distance from the viewpoint of the user. In some embodiments, the size of the first user interface object is a function of the first user interface object's location relative to the viewpoint of the user of the electronic device. For example, the third size increases the further the first user interface object is from the viewpoint of the user. In some embodiments, the third size decreases the closer the first user interface object is from the viewpoint of the user.

Displaying the first user interface object with the third size after detecting further movement of the first user interface object away from the second location in the three-dimensional environment provides an efficient way for updating the size of the first user interface object as the first user interface object moves in the three-dimensional environment, thus providing a mechanism which allows the user to safely interact with the three-dimensional environment while moving the first user interface object and reduce potential disorientation that can lead to vertigo or motion sickness symptoms, thereby reducing cognitive burden on the user when interacting with the three-dimensional environment.

In some embodiments, the one or more criteria include a criterion that is satisfied when a threshold amount of time has passed (e.g., 0.5, 1, 2, 3, 4, 5, 10, 15, 20, or 30 seconds) after moving the first user interface object to the second location in the three-dimensional environment (1424*a*). For example, the electronic device 101 resizes the user interface 1306 to the size indicated in FIG. 13D because after moving the user interface 1306 to the location indicated in FIG. 13D, the above-mentioned threshold amount of time passed. For example, after moving the first user interface object from the first location to the second location in the three-dimensional environment, the first user interface object is updated to have the second size if a threshold amount of time (e.g., 0.5, 1, 2, 3, 5, 6, 12, 20, 40, or 60 seconds) has passed after movement of the first user interface object to the second location. Thus, the electronic device optionally updates the size of the first user interface object to the second size when the above-mentioned threshold amount of time has passed. In some embodiments, the one or more criteria includes a criterion that is satisfied when the first user interface has moved less than a movement threshold (e.g., 10, 20, 40, 60, 80, or 200 centimeters) for a respective amount of time (e.g., 0.5, 1, 2, 4, 10, or 20 seconds) after moving the first user interface object to the second location in the three-dimensional environment.

Displaying the first user interface object with the second size after the first user interface object has been located at the second location in the three-dimensional environment for a respective amount of time provides a mechanism which allows the user to safely interact with the three-dimensional environment while moving the first user interface object and reduce potential disorientation that can lead to vertigo or motion sickness symptoms, thereby reducing cognitive burden on the user when interacting with the three-dimensional environment.

In some embodiments, in accordance with a determination that the first user interface object moved from the first location to the second location in the three-dimensional environment at a first speed, the threshold amount of time is a first amount of time (1426a). For example, if the user interface 1306 moved from the location indicated in FIG. 13C to the location indicated in FIG. 13D with the first amount of speed, the electronic device 101 resizes user interface 1306 to the size in FIG. 13D after the first amount of time has passed. For example, if the first input caused the first user interface object to move from the first location to the second location with the first speed, the first user interface object must remain at the second location for a first amount of time (e.g., 1, 2, 3, 4, 5, 20, 40, or 60 seconds) before the first user interface object is updated to the second size.

In some embodiments, in accordance with a determination that the first user interface object moved from the first location to the second location in the three-dimensional environment at a second speed, greater than the first speed, the threshold amount of time is a second amount of time, greater than the first amount of time (1426b). For example, if the user interface 1306 moved from the location indicated in FIG. 13C to the location indicated in FIG. 13D with the second amount of speed, the electronic device 101 resizes user interface 1306 to the size in FIG. 13D after the second amount of time has passed. For example, if the first input caused the first user interface object to move from the first location to the second location with the second speed (e.g., a faster speed), the first user interface object must remain at the second location for a second amount of time (e.g., 2, 4, 6, 8, 10, 20, 40, or 60 seconds) before the first user interface object is updated to the second size. Thus, in some embodiments, the quicker the first user interface object moves to the second location in the three-dimensional environment, the longer the time delay until the electronic device displays the first user interface having the second size.

Displaying the first user interface object with the second size after the first user interface object has been located at the second location in the three-dimensional environment for different amounts of time avoids excessive rescaling of the first user interface object, thus providing a mechanism which allows the user to safely interact with the three-dimensional environment while moving the first user interface object and reduce potential disorientation that can lead to vertigo or motion sickness symptoms, thereby reducing cognitive burden on the user when interacting with the three-dimensional environment.

In some embodiments, aspects/operations of methods 800, 1000, 1200, and/or 1400 may be interchanged, substituted, and/or added between these methods. For example, the three-dimensional environments of methods 800, 1000, 1200, and/or 1400 and/or spatial criteria of methods 800 and/or 1000 are optionally interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at an electronic device in communication with a display generation component and one or more input devices:
while displaying, via the display generation component, a three-dimensional environment including a plurality of virtual objects with a first spatial arrangement relative to a current viewpoint of a user of the electronic device that corresponds to respective poses of the plurality of virtual objects in the three-dimensional environment, detecting, via the one or more input devices, movement of the current viewpoint of the user in the three-dimensional environment from a first viewpoint to a second viewpoint;
in response to detecting the movement corresponding to movement of the current viewpoint of the user from the first viewpoint to the second viewpoint, displaying, via the display generation component, the three-dimensional environment from the second viewpoint including the plurality of virtual objects with a second spatial arrangement, different from the first spatial arrangement, relative to the current viewpoint of the user;
while displaying the three-dimensional environment from the second viewpoint including the plurality of virtual objects with the second spatial arrangement relative to the current viewpoint of the user that corresponds to the respective poses of the plurality of virtual objects in the three-dimensional environment, receiving, via the one or more input devices, an input corresponding to a request to update a spatial arrangement of the plurality of virtual objects relative to the current viewpoint of the user to satisfy one or more criteria that specify a range of distances or a range of orientations of virtual objects relative to the current viewpoint of the user; and
in response to the input corresponding to the request to update the three-dimensional environment, displaying, via the display generation component, the three-dimensional environment from the second viewpoint including displaying the plurality of virtual objects with a third spatial arrangement that corresponds to updated poses of the plurality of virtual objects in the three-dimensional environment that are different from the respective poses of the plurality of virtual objects in the three-dimensional environment, wherein the third spatial arrangement is different from the second spatial arrangement, relative to the current viewpoint of the user, wherein the third spatial arrangement of the plurality of virtual objects satisfies the one or more criteria.

2. The method of claim 1, wherein receiving the input corresponding to the request to update the spatial arrangement of the plurality of virtual objects includes receiving the input via a hardware input device of the one or more input devices.

3. The method of claim 2, wherein the input corresponding to the request to update the spatial arrangement of the plurality of virtual objects satisfies one or more first input criteria, and the method further comprises:
    receiving, via the hardware input device, a second input; and
    in response to receiving the second input:
        in accordance with a determination that the second input satisfies one or more second input criteria different from the one or more first input criteria, performing a respective operation corresponding to the second input without updating the spatial arrangement of the plurality of virtual objects.

4. The method of claim 1, wherein receiving the input corresponding to the request to update the spatial arrangement of the plurality of virtual objects includes detecting selection of a user interface element displayed in the three-dimensional environment via the display generation component.

5. The method of claim 1, wherein displaying the plurality of virtual objects with the second spatial arrangement includes displaying, via the display generation component, the plurality of virtual objects at first positions in the three-dimensional environment, and the method further comprises:
    in response to receiving the input, moving the plurality of virtual objects from the first positions to second positions in the three-dimensional environment.

6. The method of claim 1, further comprising:
    while displaying, via the display generation component, the three-dimensional environment including a respective virtual object of the plurality of virtual objects at a first position in the three-dimensional environment, wherein the spatial arrangement of the plurality of virtual objects relative to the current viewpoint of the user is a first respective spatial arrangement that satisfies the one or more criteria, receiving, via the one or more input devices, an input corresponding to a request to update a position of the respective virtual object in the three-dimensional environment;
    in response to the input corresponding to the request to update the position of the respective virtual object in the three-dimensional environment, displaying, via the display generation component, the plurality of virtual objects with a second respective spatial arrangement that does not satisfy the one or more criteria, including displaying the respective virtual object at a second position, different from the first position, in the three-dimensional environment;
    while displaying the three-dimensional environment including displaying the respective virtual object at the second position in the three-dimensional environment, receiving, via the one or more input devices, a second input corresponding to a request to update the spatial arrangement of the plurality of virtual objects relative to the current viewpoint of the user to satisfy the one or more criteria; and
    in response to receiving the second input, updating the position of the respective virtual object to satisfy the one or more criteria without updating positions of one or more other virtual objects in the plurality of virtual objects.

7. The method of claim 1, wherein displaying the plurality of virtual objects with the third spatial arrangement includes:
    in accordance with a determination that the three-dimensional environment is associated with a first spatial template, displaying, via the display generation component, the plurality of virtual objects with the third spatial arrangement includes displaying, via the display generation component, a respective virtual object of the plurality of virtual objects with an orientation relative to the current viewpoint of the user that satisfies one or more criteria associated with the first spatial template, and
    in accordance with a determination that the three-dimensional environment is associated with a second spatial template, displaying, via the display generation component, the plurality of virtual objects with the third spatial arrangement includes displaying, via the display generation component, the respective virtual object of the plurality of virtual objects with an orientation relative to the current viewpoint of the user that satisfies one or more criteria associated with the second spatial template.

8. The method of claim 7, wherein displaying the plurality of virtual objects with the third spatial arrangement includes:
    in accordance with a determination that the three-dimensional environment is associated with a shared content spatial template, displaying, via the display generation component, the respective virtual object of the plurality of virtual objects at a pose that orients a respective side of the respective virtual object towards the current viewpoint of the user and a second viewpoint of a second user in the three-dimensional environment.

9. The method of claim 7, wherein displaying the plurality of virtual objects with the third spatial arrangement includes:
    In accordance with a determination that the three-dimensional environment is associated with a shared activity spatial template, displaying, via the display generation component, the respective virtual object of the plurality of virtual objects at a pose that orients a first side of the respective virtual object towards the current viewpoint of the user and a second side, different from the first side, of the respective virtual object towards a second viewpoint of a second user.

10. The method of claim 7, wherein displaying the plurality of virtual objects with the third spatial arrangement includes:
    in accordance with a determination that the three-dimensional environment is associated with a group activity spatial template, displaying, via the display generation component, a representation of a second user at a pose oriented towards the current viewpoint of the user of the electronic device.

11. The method of claim 1, further comprising:
    while displaying, via the display generation component, the three-dimensional environment including a second user associated with a second viewpoint in the three-dimensional environment, wherein the spatial arrangement of the plurality of virtual objects relative to the current viewpoint of the user is a first respective spatial arrangement that satisfies the one or more criteria, detecting an indication of movement of the second viewpoint of the second user in the three-dimensional environment from a first respective viewpoint to a second respective viewpoint;
    while displaying the three-dimensional environment with the second viewpoint of the second user at the second respective viewpoint, receiving, via the one or more input devices, a second input corresponding to a request to update the spatial arrangement of the plurality of virtual objects relative to the current viewpoint of the user to satisfy the one or more criteria; and
    in response to receiving the second input, updating the spatial arrangement of the plurality of virtual objects in accordance with the second respective viewpoint of the second user to a second respective spatial arrangement that satisfies the one or more criteria.

12. The method of claim 1, further comprising:
while displaying, via the display generation component, the three-dimensional environment, wherein the spatial arrangement of the plurality of virtual objects relative to the current viewpoint of the user is a first respective spatial arrangement that satisfies the one or more criteria, receiving, via the one or more input devices, a sequence of one or more inputs corresponding to a request to update one or more positions of the plurality of virtual objects in the three-dimensional environment;
in response to receiving the sequence of one or more inputs, displaying, via the display generation component, the plurality of virtual objects at respective positions in the three-dimensional environment in accordance with the sequence of one or more inputs in a second respective spatial arrangement that does not satisfy the one or more criteria;
while displaying the three-dimensional environment including displaying the plurality of virtual objects at the respective positions in the three-dimensional environment, receiving, via the one or more input devices, a second input corresponding to a request to update the spatial arrangement of the plurality of virtual objects relative to the current viewpoint of the user to satisfy the one or more criteria; and
in response to receiving the second input, updating the positions of the plurality of virtual objects in accordance with the respective positions of the plurality of virtual objects in the three-dimensional environment to a third respective spatial arrangement that satisfies the one or more criteria.

13. The method of claim 1, further comprising:
while displaying, via the display generation component, the three-dimensional environment, wherein the spatial arrangement of the plurality of virtual objects relative to the current viewpoint of the user is a first respective spatial arrangement that satisfies the one or more criteria, detecting one or more indications of requests by a second user in the three-dimensional environment to update one or more positions of the plurality of virtual objects in the three-dimensional environment;
in response to detecting the one or more indications, displaying, via the display generation component, the plurality of virtual objects at respective positions in the three-dimensional environment in accordance with the one or more indications in a second respective spatial arrangement that does not satisfy the one or more criteria;
while displaying the three-dimensional environment including displaying the plurality of virtual objects at the respective positions in the three-dimensional environment, receiving, via the one or more input devices, a second input corresponding to a request to update the spatial arrangement of the plurality of virtual objects relative to the current viewpoint of the user to satisfy the one or more criteria; and
in response to receiving the second input, updating the positions of the plurality of virtual objects in accordance with the respective positions of the plurality of virtual objects in the three-dimensional environment to a third respective spatial arrangement that satisfies the one or more criteria.

14. The method of claim 1, further comprising:
while the spatial arrangement of the plurality of virtual objects does not satisfy the one or more criteria:
in accordance with a determination that the input corresponding to the request to update the spatial arrangement of the plurality of virtual objects has not been received, maintaining the spatial arrangement of the plurality of virtual objects until the input corresponding to the request to update the spatial arrangement of the plurality of virtual objects has been received.

15. The method of claim 1, further comprising:
displaying, in the three-dimensional environment, the plurality of virtual objects, including displaying a first virtual object of the plurality of virtual objects at a location that exceeds a predefined threshold distance from the current viewpoint of the user;
while the plurality of virtual objects are displayed in the three-dimensional environment, including displaying the first virtual object of the plurality of virtual objects at the location that exceeds the predefined threshold distance from the current viewpoint of the user, receiving, via the one or more input devices, a second input corresponding to a request to update the spatial arrangement of the plurality of virtual objects relative to the current viewpoint of the user to satisfy the one or more criteria; and
in response to receiving the second input, updating the viewpoint of the user to a respective viewpoint that is within the predefined threshold distance of the first virtual object, wherein the spatial arrangement of the plurality of virtual objects relative to the respective viewpoint satisfies the one or more criteria.

16. The method of claim 1, further comprising:
displaying, via the display generation component, the plurality of virtual objects with first spacing between a first virtual object of the plurality of virtual objects and a second virtual object of the plurality of virtual objects, wherein the first spacing does not satisfy one or more spacing criteria of the one or more criteria;
while displaying the plurality of virtual objects with the first spacing between the first virtual object and the second virtual object, receiving, via the one or more input devices, a second input corresponding to a request to update the spatial arrangement of the plurality of virtual objects relative to the current viewpoint of the user to satisfy the one or more criteria; and
in response to receiving the second input, displaying, via the display generation component, the plurality of virtual objects with second spacing between the first virtual object and the second virtual object, wherein the second spacing satisfies the one or more spacing criteria.

17. The method of claim 1, wherein detecting the movement of the current viewpoint of the user in the three-dimensional environment from the first viewpoint to the second viewpoint includes detecting, via the one or more input devices, movement of the electronic device in a physical environment of the electronic device or movement of the display generation component in a physical environment of the display generation component.

18. An electronic device, comprising:
one or more processors;
memory; and
one or more programs, wherein the one or more programs are stored in the memory and configured to be executed by the one or more processors, the one or more programs including instructions for:
while displaying, via a display generation component, a three-dimensional environment including a plurality of virtual objects with a first spatial arrangement relative to a current viewpoint of a user of the electronic device that corresponds to respective poses of the plurality of virtual objects in the three-dimensional environment, detecting, via one or more input devices, movement of the current viewpoint of the user in the three-dimensional environment from a first viewpoint to a second viewpoint;
in response to detecting the movement corresponding to movement of the current viewpoint of the user from the first viewpoint to the second viewpoint, displaying, via the display generation component, the three-dimensional environment from the second viewpoint including the plurality of virtual objects with a second spatial arrangement, different from the first spatial arrangement, relative to the current viewpoint of the user;
while displaying the three-dimensional environment from the second viewpoint including the plurality of virtual objects with the second spatial arrangement relative to the current viewpoint of the user that corresponds to the respective poses of the plurality of virtual objects in the three-dimensional environment, receiving, via one or more input devices, an input corresponding to a request to update a spatial arrangement of the plurality of virtual objects relative to the current viewpoint of the user to satisfy one or more criteria that specify a range of distances or a range of orientations of virtual objects relative to the current viewpoint of the user; and
in response to the input corresponding to the request to update the three-dimensional environment, displaying, via the display generation component, the three-dimensional environment from the second viewpoint including displaying the plurality of virtual objects with a third spatial arrangement that corresponds to updated poses of the plurality of virtual objects in the three-dimensional environment that are different from the respective poses of the plurality of virtual objects in the three-dimensional environment, wherein the third spatial arrangement is different from the second spatial arrangement, relative to the current viewpoint of the user, wherein the third spatial arrangement of the plurality of virtual objects satisfies the one or more criteria.

19. The electronic device of claim 18, wherein the one or more programs further include instructions for receiving the input corresponding to the request to update the spatial arrangement of the plurality of virtual objects includes receiving the input via a hardware input device of the one or more input devices.

20. The electronic device of claim 19, wherein the input corresponding to the request to update the spatial arrangement of the plurality of virtual objects satisfies one or more first input criteria, and wherein the one or more programs further include instructions for:
receiving, via the hardware input device, a second input; and
in response to receiving the second input:
in accordance with a determination that the second input satisfies one or more second input criteria different from the one or more first input criteria, performing a respective operation corresponding to the second input without updating the spatial arrangement of the plurality of virtual objects.

21. The electronic device of claim 18, wherein the one or more programs further include instructions for receiving the input corresponding to the request to update the spatial arrangement of the plurality of virtual objects includes detecting selection of a user interface element displayed in the three-dimensional environment via the display generation component.

22. The electronic device of claim 18, wherein the one or more programs further include instructions for displaying the plurality of virtual objects with the second spatial arrangement includes displaying, via the display generation component, the plurality of virtual objects at first positions in the three-dimensional environment, and wherein the one or more programs further include instructions for:
in response to receiving the input, moving the plurality of virtual objects from the first positions to second positions in the three-dimensional environment.

23. The electronic device of claim 18, wherein the one or more programs further include instructions for:
while displaying, via the display generation component, the three-dimensional environment including a respective virtual object of the plurality of virtual objects at a first position in the three-dimensional environment, wherein the spatial arrangement of the plurality of virtual objects relative to the current viewpoint of the user is a first respective spatial arrangement that satisfies the one or more criteria, receiving, via the one or more input devices, an input corresponding to a request to update a position of the respective virtual object in the three-dimensional environment;
in response to the input corresponding to the request to update the position of the respective virtual object in the three-dimensional environment, displaying, via the display generation component, the plurality of virtual objects with a second respective spatial arrangement that does not satisfy the one or more criteria, including displaying the respective virtual object at a second position, different from the first position, in the three-dimensional environment;
while displaying the three-dimensional environment including displaying the respective virtual object at the second position in the three-dimensional environment, receiving, via the one or more input devices, a second input corresponding to a request to update the spatial arrangement of the plurality of virtual objects relative to the current viewpoint of the user to satisfy the one or more criteria; and
in response to receiving the second input, updating the position of the respective virtual object to satisfy the one or more criteria without updating positions of one or more other virtual objects in the plurality of virtual objects.

24. The electronic device of claim 18, wherein the one or more programs further include instructions for displaying the plurality of virtual objects with the third spatial arrangement including:
in accordance with a determination that the three-dimensional environment is associated with a first spatial template, displaying, via the display generation component, the plurality of virtual objects with the third spatial arrangement includes displaying, via the display generation component, a respective virtual object of the plurality of virtual objects with an orientation relative to the current viewpoint of the user that satisfies one or more criteria associated with the first spatial template, and in accordance with a determination that the three-dimensional environment is associated with a second spatial template, displaying, via the display generation component, the plurality of virtual objects with the third spatial arrangement includes displaying, via the display generation component, the respective virtual object of the plurality of virtual objects with an orientation relative to the current viewpoint of the user that satisfies one or more criteria associated with the second spatial template.

25. The electronic device of claim 24, wherein the one or more programs further include instructions for displaying the plurality of virtual objects with the third spatial arrangement including:

in accordance with a determination that the three-dimensional environment is associated with a shared content spatial template, displaying, via the display generation component, the respective virtual object of the plurality of virtual objects at a pose that orients a respective side of the respective virtual object towards the current viewpoint of the user and a second viewpoint of a second user in the three-dimensional environment.

26. The electronic device of claim 24, wherein the one or more programs further include instructions for displaying the plurality of virtual objects with the third spatial arrangement including:

In accordance with a determination that the three-dimensional environment is associated with a shared activity spatial template, displaying, via the display generation component, the respective virtual object of the plurality of virtual objects at a pose that orients a first side of the respective virtual object towards the current viewpoint of the user and a second side, different from the first side, of the respective virtual object towards a second viewpoint of a second user.

27. The electronic device of claim 24, wherein the one or more programs further include instructions for displaying the plurality of virtual objects with the third spatial arrangement including:

in accordance with a determination that the three-dimensional environment is associated with a group activity spatial template, displaying, via the display generation component, a representation of a second user at a pose oriented towards the current viewpoint of the user of the electronic device.

28. The electronic device of claim 18, wherein the one or more programs further include instructions for:

while displaying, via the display generation component, the three-dimensional environment including a second user associated with a second viewpoint in the three-dimensional environment, wherein the spatial arrangement of the plurality of virtual objects relative to the current viewpoint of the user is a first respective spatial arrangement that satisfies the one or more criteria, detecting an indication of movement of the second viewpoint of the second user in the three-dimensional environment from a first respective viewpoint to a second respective viewpoint;

while displaying the three-dimensional environment with the second viewpoint of the second user at the second respective viewpoint, receiving, via the one or more input devices, a second input corresponding to a request to update the spatial arrangement of the plurality of virtual objects relative to the current viewpoint of the user to satisfy the one or more criteria; and in response to receiving the second input, updating the spatial arrangement of the plurality of virtual objects in accordance with the second respective viewpoint of the second user to a second respective spatial arrangement that satisfies the one or more criteria.

29. The electronic device of claim 18, wherein the one or more programs further include instructions for:

while displaying, via the display generation component, the three-dimensional environment, wherein the spatial arrangement of the plurality of virtual objects relative to the current viewpoint of the user is a first respective spatial arrangement that satisfies the one or more criteria, receiving, via the one or more input devices, a sequence of one or more inputs corresponding to a request to update one or more positions of the plurality of virtual objects in the three-dimensional environment;

in response to receiving the sequence of one or more inputs, displaying, via the display generation component, the plurality of virtual objects at respective positions in the three-dimensional environment in accordance with the sequence of one or more inputs in a second respective spatial arrangement that does not satisfy the one or more criteria;

while displaying the three-dimensional environment including displaying the plurality of virtual objects at the respective positions in the three-dimensional environment, receiving, via the one or more input devices, a second input corresponding to a request to update the spatial arrangement of the plurality of virtual objects relative to the current viewpoint of the user to satisfy the one or more criteria; and in response to receiving the second input, updating the positions of the plurality of virtual objects in accordance with the respective positions of the plurality of virtual objects in the three-dimensional environment to a third respective spatial arrangement that satisfies the one or more criteria.

30. The electronic device of claim 18, wherein the one or more programs further include instructions for:

while displaying, via the display generation component, the three-dimensional environment, wherein the spatial arrangement of the plurality of virtual objects relative to the current viewpoint of the user is a first respective spatial arrangement that satisfies the one or more criteria, detecting one or more indications of requests by a second user in the three-dimensional environment to update one or more positions of the plurality of virtual objects in the three-dimensional environment;

in response to detecting the one or more indications, displaying, via the display generation component, the plurality of virtual objects at respective positions in the three-dimensional environment in accordance with the one or more indications in a second respective spatial arrangement that does not satisfy the one or more criteria;

while displaying the three-dimensional environment including displaying the plurality of virtual objects at the respective positions in the three-dimensional environment, receiving, via the one or more input devices, a second input corresponding to a request to update the spatial arrangement of the plurality of virtual objects relative to the current viewpoint of the user to satisfy the one or more criteria; and in response to receiving the second input, updating the positions of the plurality of virtual objects in accordance with the respective positions of the plurality of virtual objects in the three-dimensional environment to a third respective spatial arrangement that satisfies the one or more criteria.

31. The electronic device of claim 18, wherein the one or more programs further include instructions for:
while the spatial arrangement of the plurality of virtual objects does not satisfy the one or more criteria:
in accordance with a determination that the input corresponding to the request to update the spatial arrangement of the plurality of virtual objects has not been received, maintaining the spatial arrangement of the plurality of virtual objects until the input corresponding to the request to update the spatial arrangement of the plurality of virtual objects has been received.

32. The electronic device of claim 18, wherein the one or more programs further include instructions for:
displaying, in the three-dimensional environment, the plurality of virtual objects, including displaying a first virtual object of the plurality of virtual objects at a location that exceeds a predefined threshold distance from the current viewpoint of the user;
while the plurality of virtual objects are displayed in the three-dimensional environment, including displaying the first virtual object of the plurality of virtual objects at the location that exceeds the predefined threshold distance from the current viewpoint of the user, receiving, via the one or more input devices, a second input corresponding to a request to update the spatial arrangement of the plurality of virtual objects relative to the current viewpoint of the user to satisfy the one or more criteria; and
in response to receiving the second input, updating the viewpoint of the user to a respective viewpoint that is within the predefined threshold distance of the first virtual object, wherein the spatial arrangement of the plurality of virtual objects relative to the respective viewpoint satisfies the one or more criteria.

33. The electronic device of claim 18, wherein the one or more programs further include instructions for:
displaying, via the display generation component, the plurality of virtual objects with first spacing between a first virtual object of the plurality of virtual objects and a second virtual object of the plurality of virtual objects, wherein the first spacing does not satisfy one or more spacing criteria of the one or more criteria;
while displaying the plurality of virtual objects with the first spacing between the first virtual object and the second virtual object, receiving, via the one or more input devices, a second input corresponding to a request to update the spatial arrangement of the plurality of virtual objects relative to the current viewpoint of the user to satisfy the one or more criteria; and
in response to receiving the second input, displaying, via the display generation component, the plurality of virtual objects with second spacing between the first virtual object and the second virtual object, wherein the second spacing satisfies the one or more spacing criteria.

34. The electronic device of claim 18, wherein the one or more programs further include instructions for detecting the movement of the current viewpoint of the user in the three-dimensional environment from the first viewpoint to the second viewpoint includes detecting, via the one or more input devices, movement of the electronic device in a physical environment of the electronic device or movement of the display generation component in a physical environment of the display generation component.

35. A non-transitory computer readable storage medium storing one or more programs, the one or more programs comprising instructions, which when executed by one or more processors of an electronic device, cause the electronic device to perform a method comprising:
while displaying, via a display generation component, a three-dimensional environment including a plurality of virtual objects with a first spatial arrangement relative to a current viewpoint of a user of the electronic device that corresponds to respective poses of the plurality of virtual objects in the three-dimensional environment, detecting, via one or more input devices, movement of the current viewpoint of the user in the three-dimensional environment from a first viewpoint to a second viewpoint;
in response to detecting the movement corresponding to movement of the current viewpoint of the user from the first viewpoint to the second viewpoint, displaying, via the display generation component, the three-dimensional environment from the second viewpoint including the plurality of virtual objects with a second spatial arrangement, different from the first spatial arrangement, relative to the current viewpoint of the user;
while displaying the three-dimensional environment from the second viewpoint including the plurality of virtual objects with the second spatial arrangement relative to the current viewpoint of the user that corresponds to the respective poses of the plurality of virtual objects in the three-dimensional environment, receiving, via one or more input devices, an input corresponding to a request to update a spatial arrangement of the plurality of virtual objects relative to the current viewpoint of the user to satisfy one or more criteria that specify a range of distances or a range of orientations of virtual objects relative to the current viewpoint of the user; and
in response to the input corresponding to the request to update the three-dimensional environment, displaying, via the display generation component, the three-dimensional environment from the second viewpoint including displaying the plurality of virtual objects with a third spatial arrangement that corresponds to updated poses of the plurality of virtual objects in the three-dimensional environment that are different from the respective poses of the plurality of virtual objects in the three-dimensional environment, wherein the third spatial arrangement is different from the second spatial arrangement, relative to the current viewpoint of the user, wherein the third spatial arrangement of the plurality of virtual objects satisfies the one or more criteria.

36. The non-transitory computer readable storage medium of claim 35, further storing instructions which, when executed by the one or more processors, further cause the electronic device to perform receiving the input corresponding to the request to update the spatial arrangement of the plurality of virtual objects includes receiving the input via a hardware input device of the one or more input devices.

37. The non-transitory computer readable storage medium of claim 36, wherein the input corresponding to the request to update the spatial arrangement of the plurality of virtual objects satisfies one or more first input criteria, and further storing instructions which, when executed by the one or more processors, further cause the electronic device to perform:

receiving, via the hardware input device, a second input; and in response to receiving the second input:

in accordance with a determination that the second input satisfies one or more second input criteria different from the one or more first input criteria, performing a respective operation corresponding to the second input without updating the spatial arrangement of the plurality of virtual objects.

38. The non-transitory computer readable storage medium of claim 35, further storing instructions which, when executed by the one or more processors, further cause the electronic device to perform receiving the input corresponding to the request to update the spatial arrangement of the plurality of virtual objects includes detecting selection of a user interface element displayed in the three-dimensional environment via the display generation component.

39. The non-transitory computer readable storage medium of claim 35, further storing instructions which, when executed by the one or more processors, further cause the electronic device to perform displaying the plurality of virtual objects with the second spatial arrangement includes displaying, via the display generation component, the plurality of virtual objects at first positions in the three-dimensional environment, and the one or more programs further include instructions for:

in response to receiving the input, moving the plurality of virtual objects from the first positions to second positions in the three-dimensional environment.

40. The non-transitory computer readable storage medium of claim 35, further storing instructions which, when executed by the one or more processors, further cause the electronic device to perform:

while displaying, via the display generation component, the three-dimensional environment including a respective virtual object of the plurality of virtual objects at a first position in the three-dimensional environment, wherein the spatial arrangement of the plurality of virtual objects relative to the current viewpoint of the user is a first respective spatial arrangement that satisfies the one or more criteria, receiving, via the one or more input devices, an input corresponding to a request to update a position of the respective virtual object in the three-dimensional environment;

in response to the input corresponding to the request to update the position of the respective virtual object in the three-dimensional environment, displaying, via the display generation component, the plurality of virtual objects with a second respective spatial arrangement that does not satisfy the one or more criteria, including displaying the respective virtual object at a second position, different from the first position, in the three-dimensional environment;

while displaying the three-dimensional environment including displaying the respective virtual object at the second position in the three-dimensional environment, receiving, via the one or more input devices, a second input corresponding to a request to update the spatial arrangement of the plurality of virtual objects relative to the current viewpoint of the user to satisfy the one or more criteria; and in response to receiving the second input, updating the position of the respective virtual object to satisfy the one or more criteria without updating positions of one or more other virtual objects in the plurality of virtual objects.

41. The non-transitory computer readable storage medium of claim 35, further storing instructions which, when executed by the one or more processors, further cause the electronic device to perform displaying the plurality of virtual objects with the third spatial arrangement including:

in accordance with a determination that the three-dimensional environment is associated with a first spatial template, displaying, via the display generation component, the plurality of virtual objects with the third spatial arrangement includes displaying, via the display generation component, a respective virtual object of the plurality of virtual objects with an orientation relative to the current viewpoint of the user that satisfies one or more criteria associated with the first spatial template, and in accordance with a determination that the three-dimensional environment is associated with a second spatial template, displaying, via the display generation component, the plurality of virtual objects with the third spatial arrangement includes displaying, via the display generation component, the respective virtual object of the plurality of virtual objects with an orientation relative to the current viewpoint of the user that satisfies one or more criteria associated with the second spatial template.

42. The non-transitory computer readable storage medium of claim 41, further storing instructions which, when executed by the one or more processors, further cause the electronic device to perform displaying the plurality of virtual objects with the third spatial arrangement including:

in accordance with a determination that the three-dimensional environment is associated with a shared content spatial template, displaying, via the display generation component, the respective virtual object of the plurality of virtual objects at a pose that orients a respective side of the respective virtual object towards the current viewpoint of the user and a second viewpoint of a second user in the three-dimensional environment.

43. The non-transitory computer readable storage medium of claim 41, further storing instructions which, when executed by the one or more processors, further cause the electronic device to perform displaying the plurality of virtual objects with the third spatial arrangement including:

In accordance with a determination that the three-dimensional environment is associated with a shared activity spatial template, displaying, via the display generation component, the respective virtual object of the plurality of virtual objects at a pose that orients a first side of the respective virtual object towards the current viewpoint of the user and a second side, different from the first side, of the respective virtual object towards a second viewpoint of a second user.

44. The non-transitory computer readable storage medium of claim 41, further storing instructions which, when executed by the one or more processors, further cause the electronic device to perform displaying the plurality of virtual objects with the third spatial arrangement including:

in accordance with a determination that the three-dimensional environment is associated with a group activity spatial template, displaying, via the display generation component, a representation of a second user at a pose oriented towards the current viewpoint of the user of the electronic device.

45. The electronic device of claim 35, further storing instructions which, when executed by the one or more processors, further cause the electronic device to perform:
- while displaying, via the display generation component, the three-dimensional environment including a second user associated with a second viewpoint in the three-dimensional environment, wherein the spatial arrangement of the plurality of virtual objects relative to the current viewpoint of the user is a first respective spatial arrangement that satisfies the one or more criteria, detecting an indication of movement of the second viewpoint of the second user in the three-dimensional environment from a first respective viewpoint to a second respective viewpoint;
- while displaying the three-dimensional environment with the second viewpoint of the second user at the second respective viewpoint, receiving, via the one or more input devices, a second input corresponding to a request to update the spatial arrangement of the plurality of virtual objects relative to the current viewpoint of the user to satisfy the one or more criteria; and
- in response to receiving the second input, updating the spatial arrangement of the plurality of virtual objects in accordance with the second respective viewpoint of the second user to a second respective spatial arrangement that satisfies the one or more criteria.

46. The electronic device of claim 35, further storing instructions which, when executed by the one or more processors, further cause the electronic device to perform:
- while displaying, via the display generation component, the three-dimensional environment, wherein the spatial arrangement of the plurality of virtual objects relative to the current viewpoint of the user is a first respective spatial arrangement that satisfies the one or more criteria, receiving, via the one or more input devices, a sequence of one or more inputs corresponding to a request to update one or more positions of the plurality of virtual objects in the three-dimensional environment;
- in response to receiving the sequence of one or more inputs, displaying, via the display generation component, the plurality of virtual objects at respective positions in the three-dimensional environment in accordance with the sequence of one or more inputs in a second respective spatial arrangement that does not satisfy the one or more criteria;
- while displaying the three-dimensional environment including displaying the plurality of virtual objects at the respective positions in the three-dimensional environment, receiving, via the one or more input devices, a second input corresponding to a request to update the spatial arrangement of the plurality of virtual objects relative to the current viewpoint of the user to satisfy the one or more criteria; and
- in response to receiving the second input, updating the positions of the plurality of virtual objects in accordance with the respective positions of the plurality of virtual objects in the three-dimensional environment to a third respective spatial arrangement that satisfies the one or more criteria.

47. The electronic device of claim 35, further storing instructions which, when executed by the one or more processors, further cause the electronic device to perform:
- while displaying, via the display generation component, the three-dimensional environment, wherein the spatial arrangement of the plurality of virtual objects relative to the current viewpoint of the user is a first respective spatial arrangement that satisfies the one or more criteria, detecting one or more indications of requests by a second user in the three-dimensional environment to update one or more positions of the plurality of virtual objects in the three-dimensional environment;
- in response to detecting the one or more indications, displaying, via the display generation component, the plurality of virtual objects at respective positions in the three-dimensional environment in accordance with the one or more indications in a second respective spatial arrangement that does not satisfy the one or more criteria;
- while displaying the three-dimensional environment including displaying the plurality of virtual objects at the respective positions in the three-dimensional environment, receiving, via the one or more input devices, a second input corresponding to a request to update the spatial arrangement of the plurality of virtual objects relative to the current viewpoint of the user to satisfy the one or more criteria; and
- in response to receiving the second input, updating the positions of the plurality of virtual objects in accordance with the respective positions of the plurality of virtual objects in the three-dimensional environment to a third respective spatial arrangement that satisfies the one or more criteria.

48. The non-transitory computer readable storage medium of claim 35, further storing instructions which, when executed by the one or more processors, further cause the electronic device to perform:
- while the spatial arrangement of the plurality of virtual objects does not satisfy the one or more criteria:
  - in accordance with a determination that the input corresponding to the request to update the spatial arrangement of the plurality of virtual objects has not been received, maintaining the spatial arrangement of the plurality of virtual objects until the input corresponding to the request to update the spatial arrangement of the plurality of virtual objects has been received.

49. The non-transitory computer readable storage medium of claim 35, further storing instructions which, when executed by the one or more processors, further cause the electronic device to perform:
- displaying, in the three-dimensional environment, the plurality of virtual objects, including displaying a first virtual object of the plurality of virtual objects at a location that exceeds a predefined threshold distance from the current viewpoint of the user;
- while the plurality of virtual objects are displayed in the three-dimensional environment, including displaying the first virtual object of the plurality of virtual objects at the location that exceeds the predefined threshold distance from the current viewpoint of the user, receiving, via the one or more input devices, a second input corresponding to a request to update the spatial arrangement of the plurality of virtual objects relative to the current viewpoint of the user to satisfy the one or more criteria; and
- in response to receiving the second input, updating the viewpoint of the user to a respective viewpoint that is within the predefined threshold distance of the first virtual object, wherein the spatial arrangement of the plurality of virtual objects relative to the respective viewpoint satisfies the one or more criteria.

50. The non-transitory computer readable storage medium of claim 35, further storing instructions which, when executed by the one or more processors, further cause the electronic device to perform:

displaying, via the display generation component, the plurality of virtual objects with first spacing between a first virtual object of the plurality of virtual objects and a second virtual object of the plurality of virtual objects, wherein the first spacing does not satisfy one or more spacing criteria of the one or more criteria;

while displaying the plurality of virtual objects with the first spacing between the first virtual object and the second virtual object, receiving, via the one or more input devices, a second input corresponding to a request to update the spatial arrangement of the plurality of virtual objects relative to the current viewpoint of the user to satisfy the one or more criteria; and in response to receiving the second input, displaying, via the display generation component, the plurality of virtual objects with second spacing between the first virtual object and the second virtual object, wherein the second spacing satisfies the one or more spacing criteria.

51. The non-transitory computer readable storage medium of claim 35, further storing instructions which, when executed by the one or more processors, further cause the electronic device to perform detecting the movement of the current viewpoint of the user in the three-dimensional environment from the first viewpoint to the second viewpoint includes detecting, via the one or more input devices, movement of the electronic device in a physical environment of the electronic device or movement of the display generation component in a physical environment of the display generation component.

\* \* \* \* \*